United States Patent [19]
Daniels

[11] Patent Number: 5,573,088
[45] Date of Patent: Nov. 12, 1996

[54] CONTROLLABLE RESISTANCE DEVICE AND FORCE DAMPENER, AND VEHICLE UTILIZING THE SAME

[76] Inventor: John J. Daniels, 325 Roosevelt Dr., Seymour, Conn. 06483

[21] Appl. No.: 240,884

[22] Filed: May 10, 1994

[51] Int. Cl.⁶ .................................................... F16F 15/03
[52] U.S. Cl. ........................... 188/267; 188/276; 188/296
[58] Field of Search ..................................... 188/267, 276, 188/322.5, 293, 294, 296; 267/140.14, 140.15

[56] References Cited

U.S. PATENT DOCUMENTS

| | | | |
|---|---|---|---|
| 4,896,754 | 1/1990 | Carlson et al. | 188/267 X |
| 5,090,531 | 2/1992 | Carlson | 188/267 X |
| 5,248,113 | 9/1993 | Daniels | 188/267 X |

FOREIGN PATENT DOCUMENTS 1753092  7/1992  U.S.S.R. ................................ 188/267

*Primary Examiner*—Josie Ballato
*Attorney, Agent, or Firm*—John J. Daniels

[57] ABSTRACT

A variable resistance device capable of utilizing a variable viscosity material, such as an electro-rheological fluid or a magneto-rheological fluid. In one embodiment, a moving member is provided having at least one projecting member for defining a flow path of the variable viscosity material, and for maintaining a precise gap distance between the moving member and other components of the variable resistance device. The moving member engages a shaft so that the moving member is rotatable by the shaft about the longitudinal axis of the shaft, and is also slidable on the shaft along the longitudinal axis. A controllable force dampener device is also provided. In one embodiment, a first expandable bellows and a second expandable is seperated by an ER fluid (or MR fluid) valve for controllably restricting the flow of the variable viscosity material between the first bellows and the second bellows to effect active force dampening. The variable resistance device and the force dampener are incorporated into a drive train/braking system and suspension system of a vehicle. Other uses of the inventive variable resistance device include a high efficiency wind-to-energy generator, a reel for the controlled unwinding of a line, a variable resistance exercise device, a safety brake for a circular saw, and other applications where controlled resistance is desired. Other uses of the force dampener include earthquake-proof buildings, dampening vibration of a helicopter rotor or airplane propeller, a high-precision weapons mount, engine mounts, and other applications where active controllable dampening of force is desired.

22 Claims, 59 Drawing Sheets

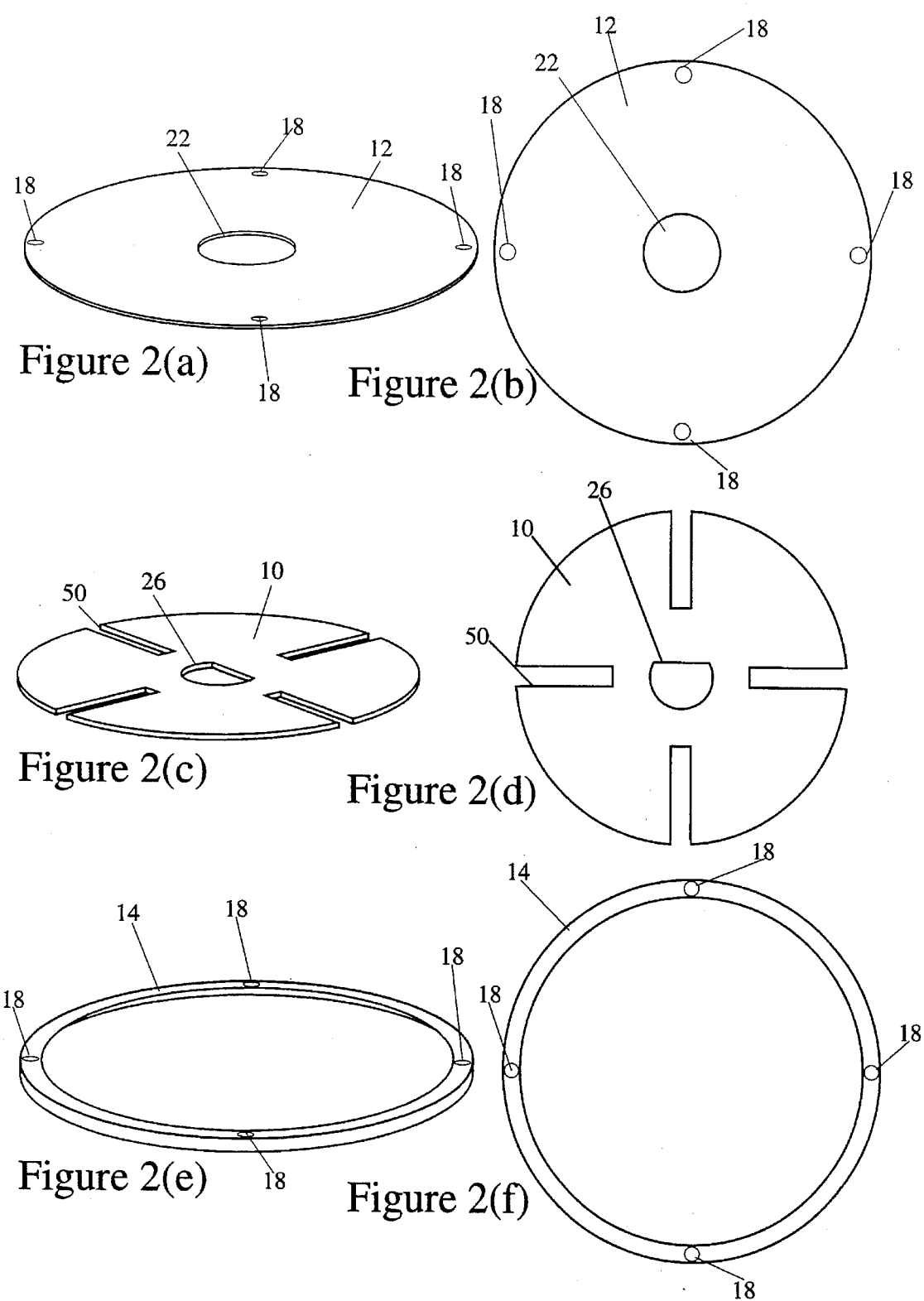

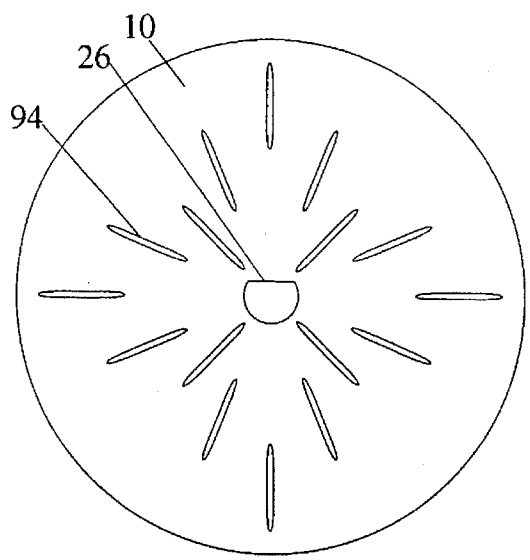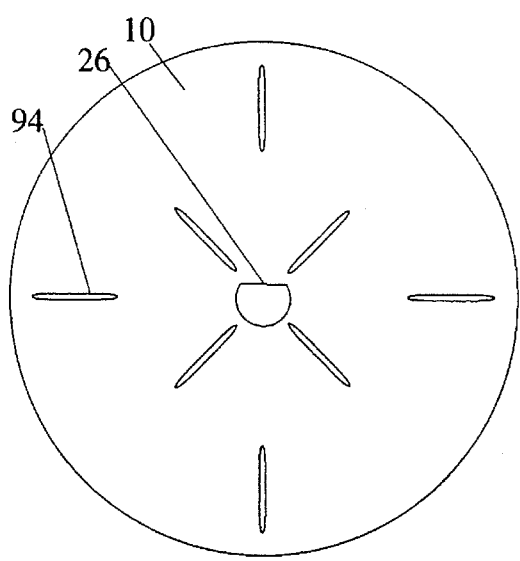
Figure 7(a) Figure 7(b)
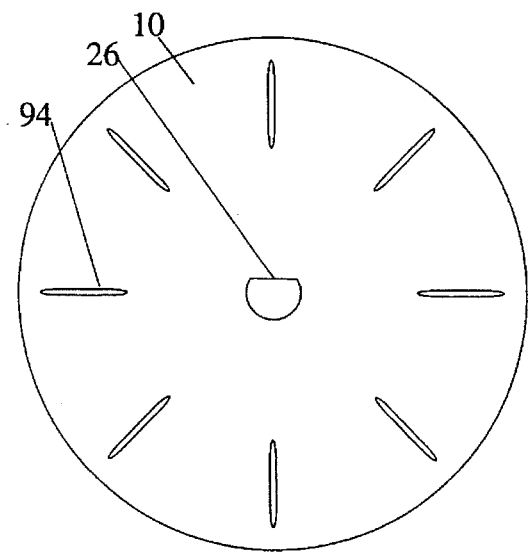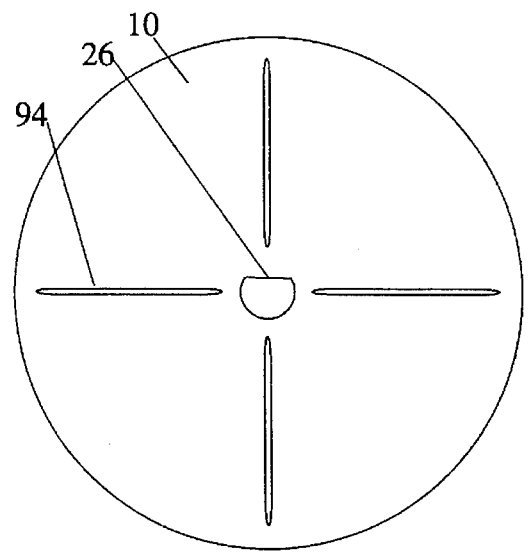
Figure 7(c) Figure 7(d)

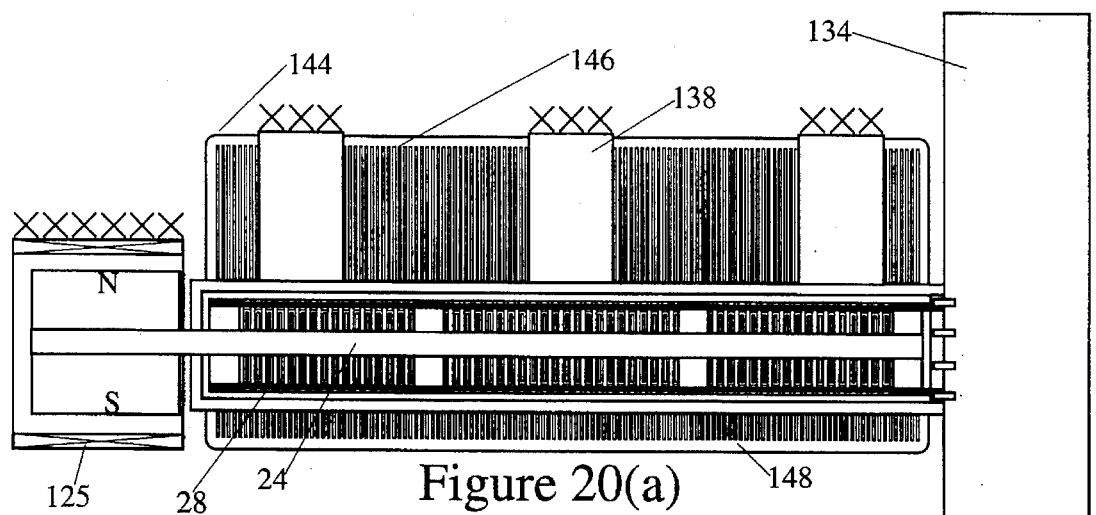
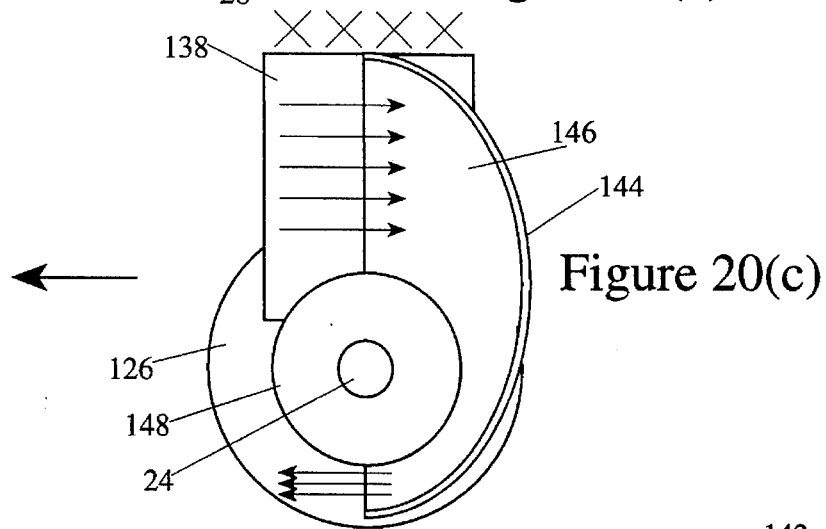
Figure 20(a)
Figure 20(c)
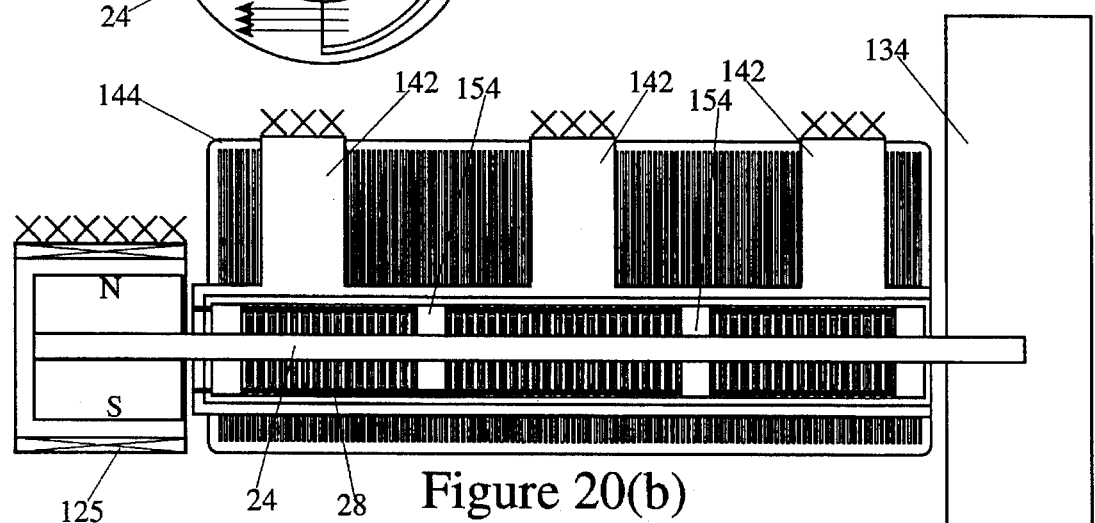
Figure 20(b)

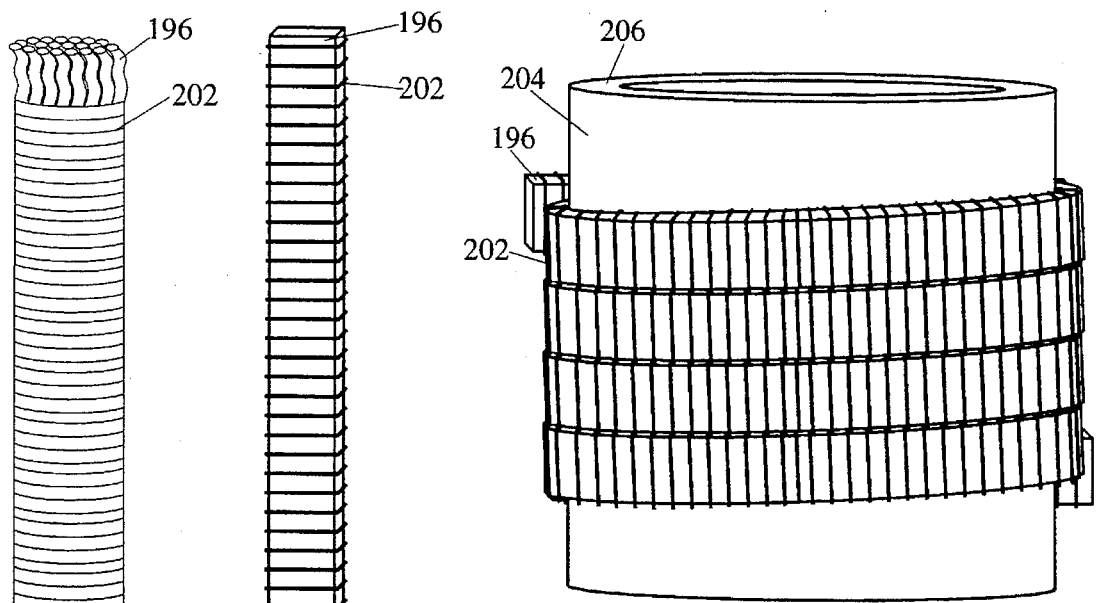
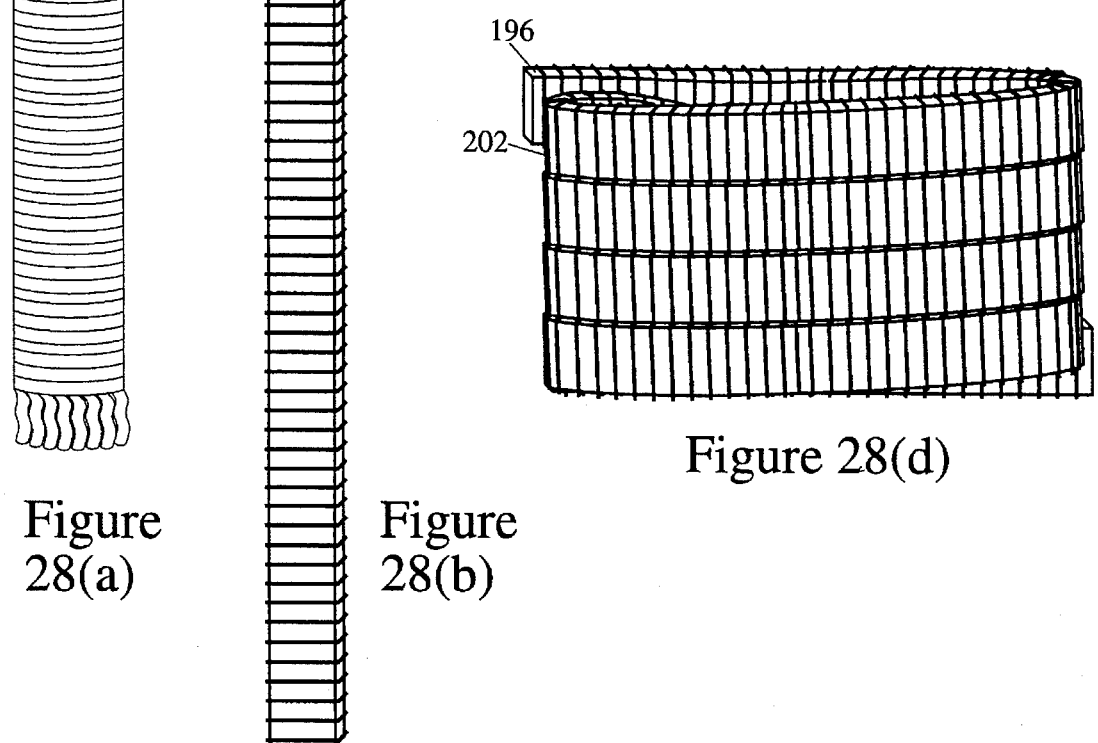
Figure 28(a)
Figure 28(b)
Figure 28(c)
Figure 28(d)

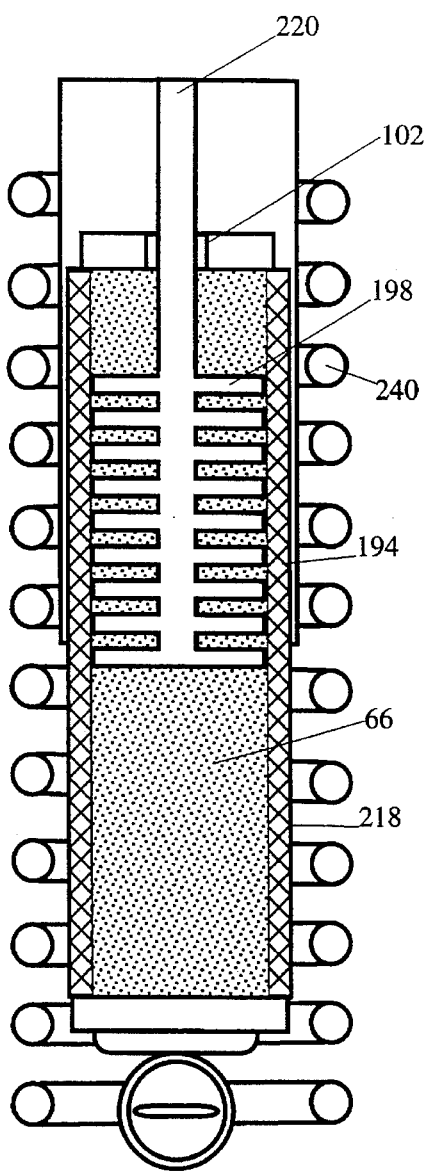
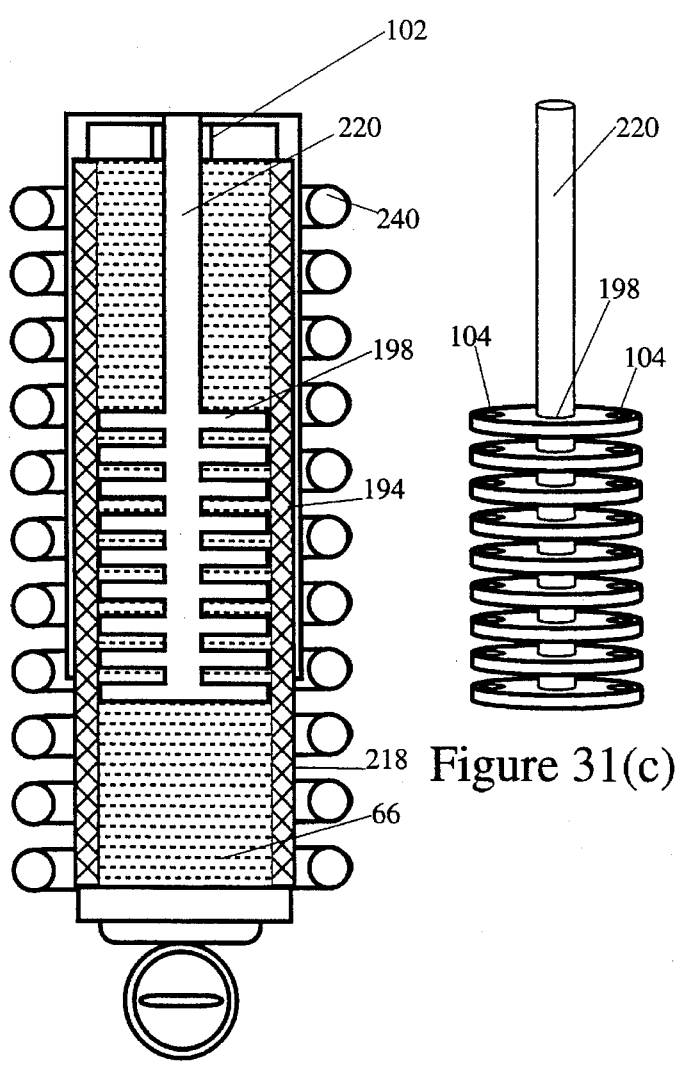
Figure 31(a)
Figure 31(b)
Figure 31(c)

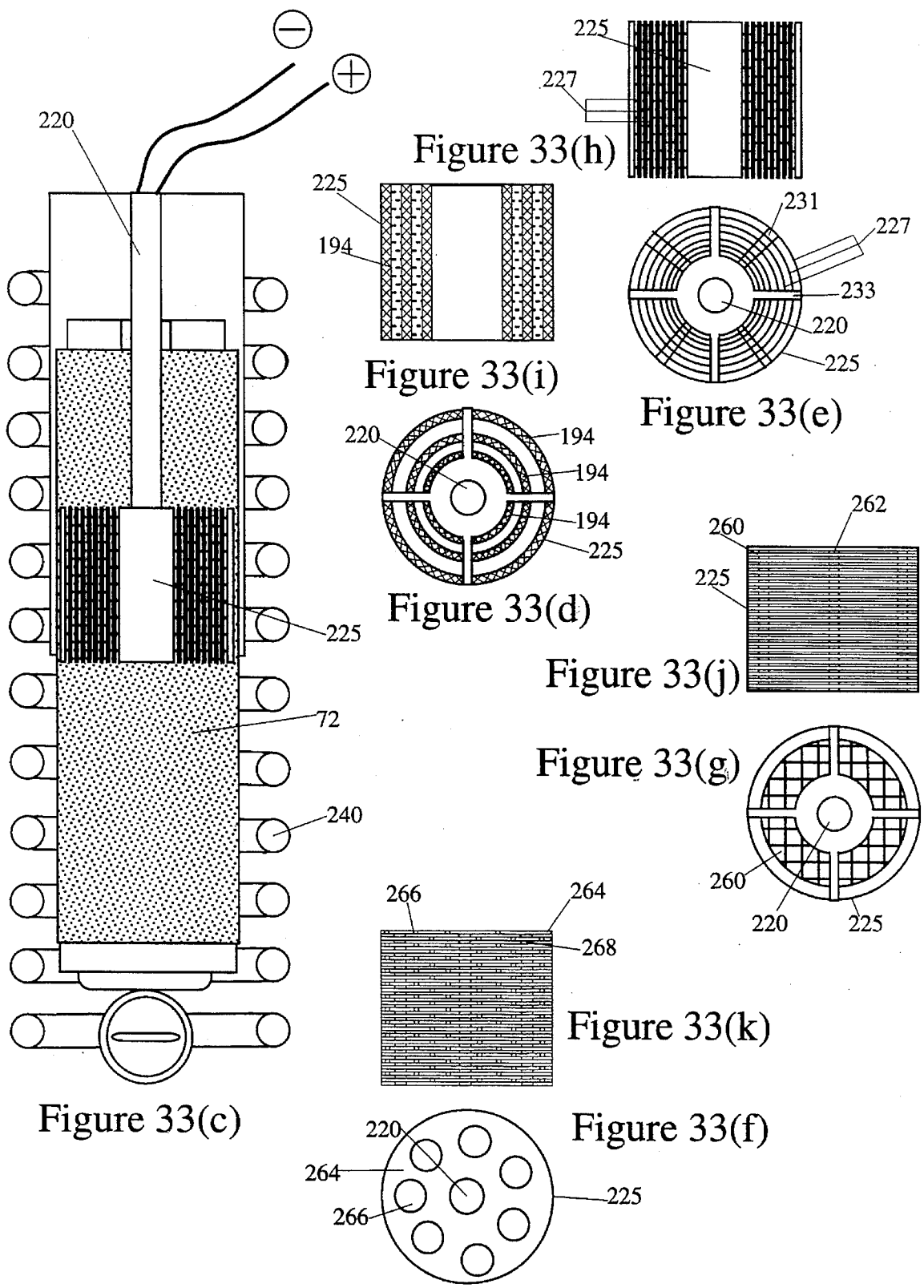

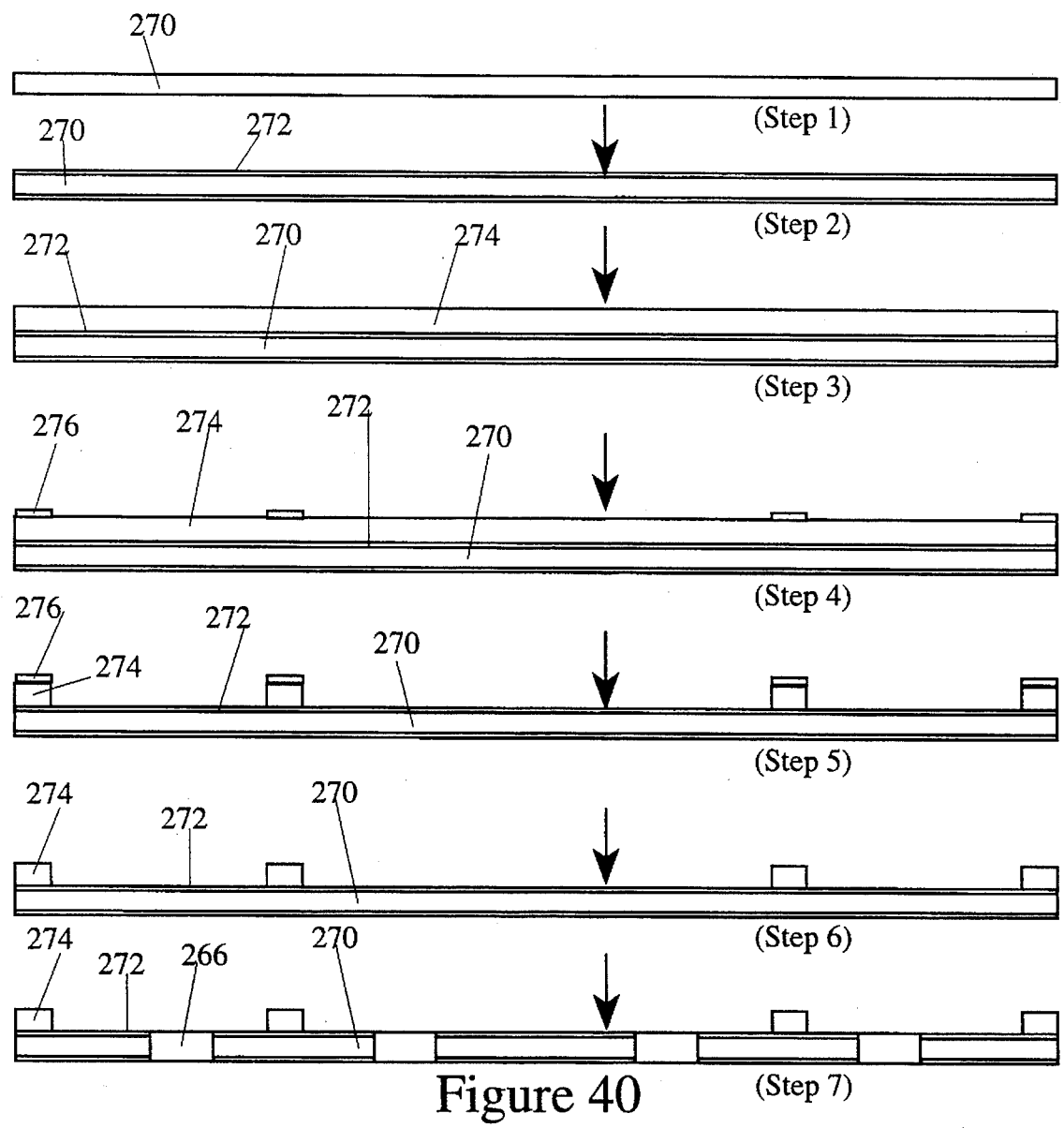
Figure 40
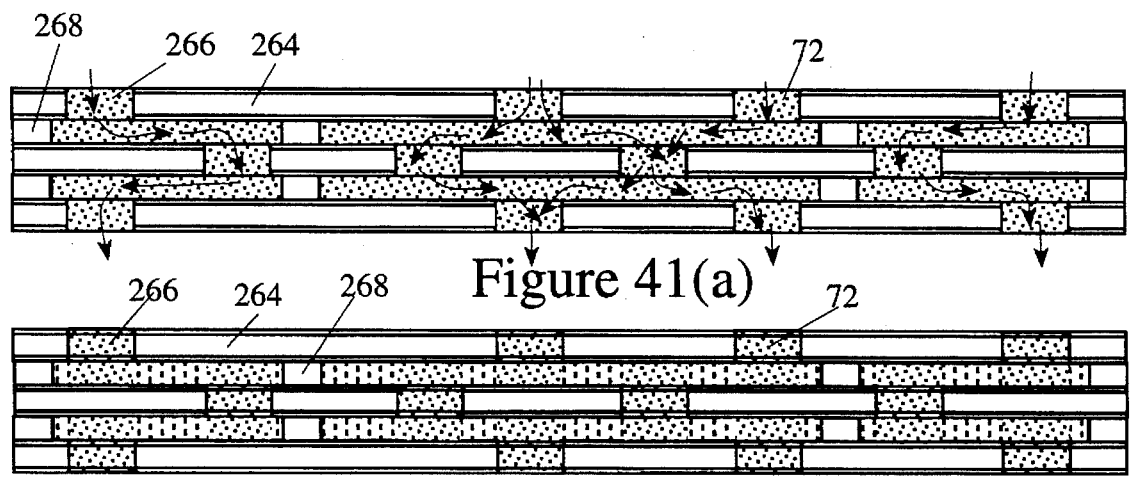
Figure 41(a)
Figure 41(b)

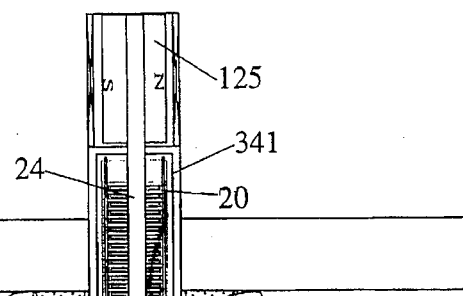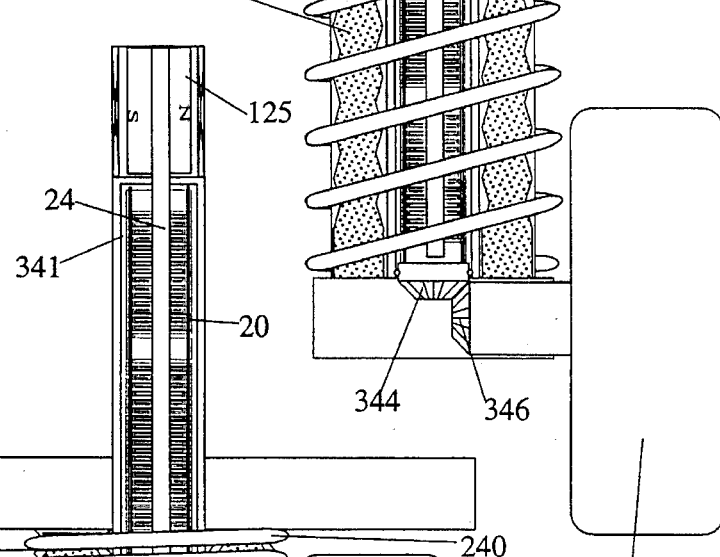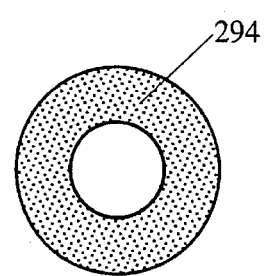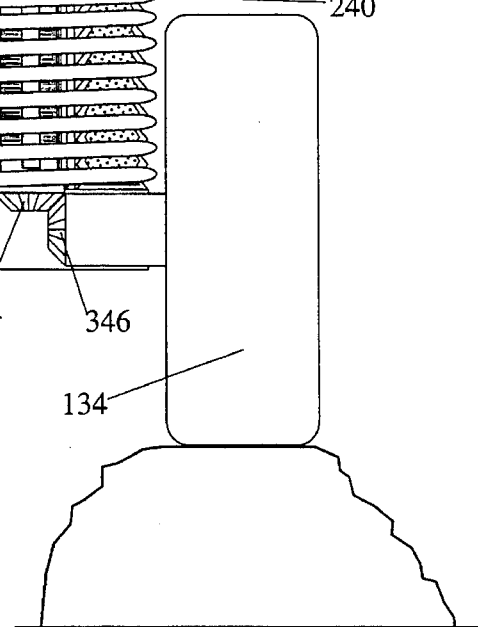
Figure 51(a)
Figure 51(b)
Figure 51(c)

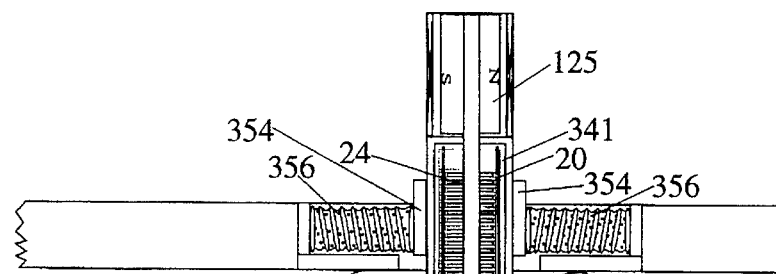
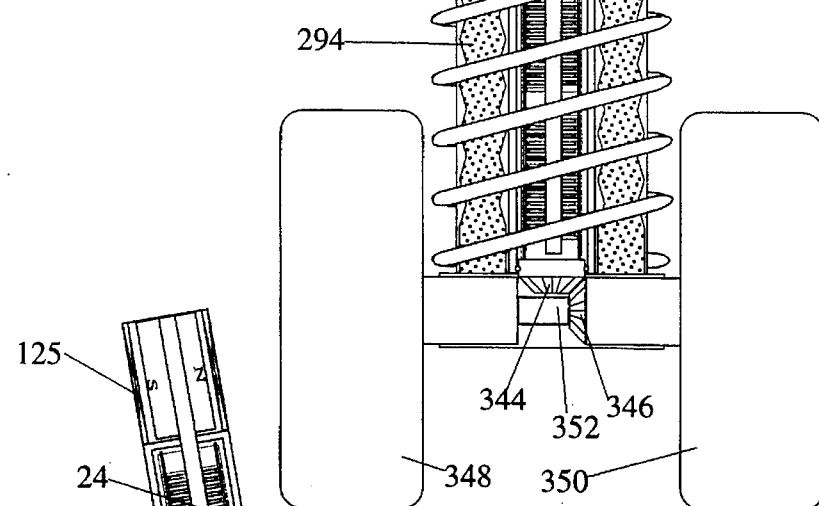
Figure 51(d)
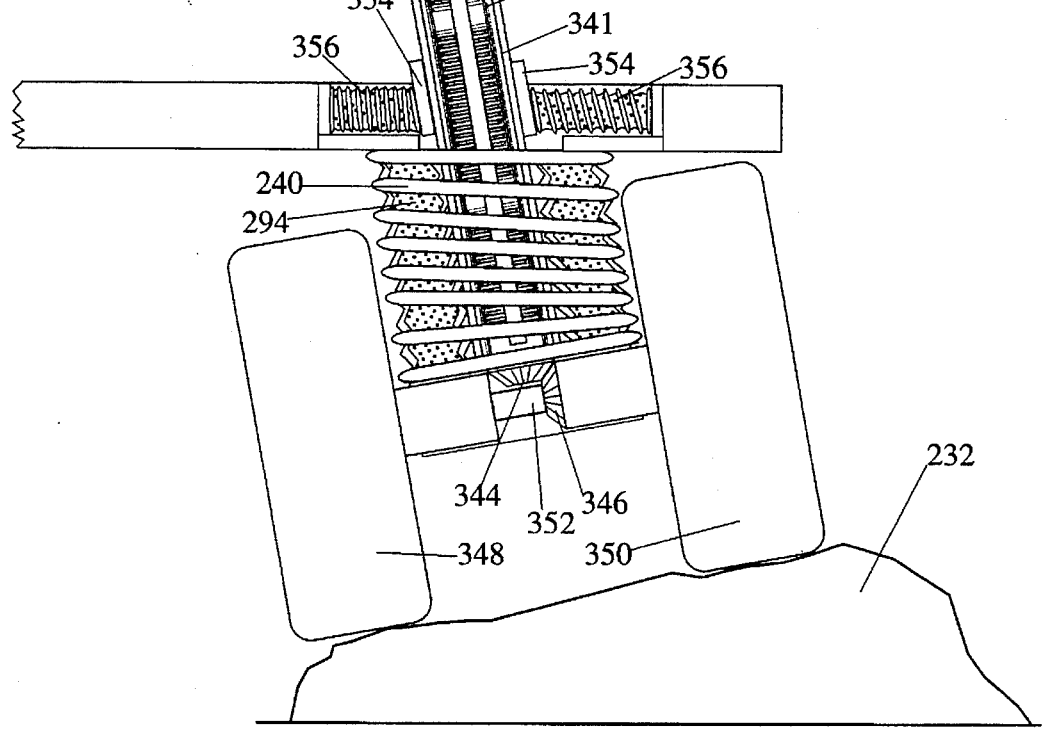
Figure 51(e)

CONTROLLABLE RESISTANCE DEVICE AND FORCE DAMPENER, AND VEHICLE UTILIZING THE SAME

BACKGROUND OF THE INVENTION

The present invention pertains to a variable resistance device utilizing a variable viscosity material for use as a brake and/or clutch. The variable viscosity material may be an electro-rheological fluid, magneto-rheological fluid, ferrofluid, or magnetizable powder. The present invention also pertains to a variable force dampener device utilizing the variable viscosity material for use in dampening an applied force. More particularly, the present invention pertains to a variable resistance device for use in driving and/or braking of a vehicle, wind-to-energy conversion, a reel for controlled unwinding of a line, a variable resistance exercise device, a safety brake for a circular saw, or other applications where smooth rotational braking and coupling is desired. The invention further pertains to a variable force dampener for use in a vehicle suspension, earthquake proofing of buildings, engine mounts, dampening vibration of a helicopter rotor or airplane propeller, a high-precision weapons mount, or other applications where dynamic force dampening is desired. The present invention also pertains to an electric powered vehicle having a drive train and braking system utilizing the inventive variable resistance device, and a suspension system utilizing the inventive variable force dampener.

A conventional braking system requires the direct contact of two friction surfaces, so that the kinetic energy of the object being braked is dissipated through the direct contact of the friction surfaces. Examples of a conventional braking system can be found in automotive disk brakes and drum brakes.

A conventional clutch, on the other hand, is designed to couple a first driven rotational member with a second rotational member, so that through the coupling of the clutch, the second rotational member is also driven. Again, two friction surfaces are brought into contact, under gradually increasing contact pressure, until a desired coupling of the rotational members occurs. An example of a conventional clutch can be found in the drive train of an automobile.

The required direct contact between friction surfaces makes a conventional brake and a conventional clutch subject to degradation due to wearing. Also, conventional brakes and clutches require complicated and numerous parts, making them expensive to manufacture, difficult to maintain and prone to failure.

Alternative clutches and brakes have been developed that utilize a variable viscosity material. In these devices, a rotating member is confined within a hollow member so as to define a gap therebetween. The gap is filled with a variable viscosity material. Upon application of an applied field, the variable viscosity material undergoes a change in flow characteristics effective to variably couple the rotating member to the hollow member, without ever requiring direct frictional contact between the rotating member and the hollow member. In the case of a brake, the hollow member is fixed, so that as the viscosity of the variable viscosity material increases in response to an applied field, a variable braking force is applied to slow or stop the rotation of the rotating member. In the case of a clutch, the rotating member (driver member) is rotated by, for example, a motor. The hollow member is rotationally driven by a variable coupling with the rotating member, as the viscosity of the variable viscosity material increases in response to an applied field. These devices have the tremendous advantage of no wearing surfaces and few parts, making them relatively uncomplicated and easy to maintain as compared with the conventional clutches and brakes that require friction contact between surfaces.

One type of variable viscosity material is known as an electro-rheological fluid (ER fluid). ER fluids exhibit changes in rheological behavior in response to an applied electrical field. The properties of ER fluids have been studied since their initial observations in the 1940's by Winslow (see, Winslow, W. M., 1949 "Induced Fibrillation of Suspensions," *Journal of Applied Physics*, 20(12): 1137–1140). It was observed that a finely dispersed suspension of starch or silica gel in mineral oil exhibits an increase in flow resistance when exposed to electrical fields on the order of 1 kV/mm (W. Winslow, U.S. Pat. No. 2,417,850, Mar. 25, 1947). An ER fluid comprises, generally, fine particles (usually 1 to 100 mm in diameter) dispersed in a carrier fluid. In some cases, a surfactant is added to help suspend the particles in the fluid.

The electro-rheological phenomenon will now be described with reference to FIGS. 54(a) through 54(c). The electro-rheological effect is due to an interaction between charges placed on electrodes and those in the particles dispersed in the ER fluid. When no charge is on the electrodes (FIG. 54(a), the ER fluid device is electrically neutral. Charges, which can be either positive (ions, protons) or negative (ions, electrons), are free to move in the ER fluid. When voltage is applied (FIG. 54(b), a positive charge is acquired by one electrode while a negative charge is acquired by the other electrode, thereby, applying an electrical field to the ER fluid disposed between the electrodes. Charges in the particles dispersed in the ER fluid react by shifting the negative charge to the particle side nearest the positive electrode, and the positive charge to the particle side nearest the negative electrode. After the charges re-orient, the particles react to the local electrical field by lining up with their positive and negative ends touching in a chain-like formation. The re-orientation and particle alignment occur nearly simultaneously, in milli-seconds. When the chains of particles are subjected to a shearing force (FIG. 54(c)), the charges still attract, even though the particles are pulled away from each other. This attraction is the basis of the ER effect and is experienced as shear resistance. The amount of applied voltage on the electrodes determines the amount of charge that moves in the particles, and is thus directly proportional to shear resistance. When the chains are physically pulled beyond the strength of their attractive force, they brake, reform, and brake again. Yield strength represents the condition when the reforming and braking cycle reaches equilibrium.

The electro-rheological effect has been defined as an apparent change in the viscosity. From a macroscopic point of view, a change in apparent viscosity does occur. However, the actual plastic viscosity of an ER fluid, defined as the change in stress per unit change in shear strain rate, remains approximately constant as the applied electrical field is varied. The parameter that changes is the amount of shear stress needed to initiate flow. For this description, the ER effect will be considered a change in viscosity of the ER fluid in response to an applied field. It is generally accepted that the ER phenomenon originates from particle polarization induced by an electrical field. The observed changes in mechanical properties exhibited by an ER fluid are a direct result of the formation and breakdown of the induced particle-chain network.

FIGS. 53(a) and 53(b) show an ER fluid clutch as described in the prior art literature (see, P. Coulter, et al. "Electro-Rheological Materials and Their Usage in Intelligent Material Systems and Structures," *Technomic Publishing Company, Inc.,* 1992) FIG. 53(a) shows a concentric cylinder clutch configuration in which an inner rotating cylinder is disposed within an outer sealed cylinder so as to define a gap therebetween. An ER fluid is disposed in the gap, and a potential is applied to the inner rotating cylinder and the outer sealed cylinder. With no electrical field present, rotation of the inner rotating cylinder creates a shear stress between the inner rotating cylinder and the outer sealed cylinder, but little or no torque is transmitted to the outer sealed cylinder. In this case, the ER fluid has low viscosity, and thus there is little or no coupling of the rotation of the inner rotating cylinder to the outer sealed cylinder. When an electrical field is applied, the ER fluid stiffens in proportion to the field strength, and stress is transferred to the outer sealed cylinder as torque. If the outer sealed cylinder is free to rotate, the mechanism acts as a clutch with the ER fluid providing a variable coupling mechanism between rotation of the inner rotating cylinder and the outer sealed cylinder. If the outer sealed cylinder is fixed, the mechanism acts as an ER fluid brake, whereby the variable viscosity of the ER fluid provides a variable braking force on rotation of the inner rotating cylinder.

Since the ability of the ER phenomenon to act as a coupling mechanism greatly depends on the strength of the applied electrical field, the electrode surface area available for applying the electrical field is very important. In the configuration shown in FIG. 53(a), the electrode surface area is limited to the peripheral surface area of the inner rotating cylinder. A more advanced ER clutch configuration, shown in FIG. 53(b), is known as a parallel disk clutch configuration. In this configuration, the available electrode surface area is increased by providing the inner rotating member as a series of disks fixed to a rotating shaft. The sealed outer cylinder has a plurality of electrode surfaces each disposed between the respective disks of the rotating inner member, so that potential applied to the disks of the inner rotating member and the electrode surfaces of the outer sealed cylinder applies an electrical field to the ER fluid disposed therebetween. This configuration offers an increase in electrode surface area, and thus the electrical field is applied to a greater volume of ER fluid as compared with the electrical field applied by the electrode surface area available from the ER fluid clutch configuration shown in FIG. 53(a).

The electrical field applied to the ER fluid disposed between the electrode surfaces is proportional to the gap distance between the electrode surfaces. Therefore, to increase the applied electrical field, and thus greatly enhance the ER fluid effect, the gap distance must be minimized. It is extremely difficult to provide and maintain the necessary minimum gap distances (typically less than 1 mm) when forming a moving electrode type mechanism (for example, the parallel disk clutch configuration shown in FIG. 53(b). It is particularly difficult to consistently manufacture rotating electrode devices that maintain such a small gap distance. Thus, the prior art has failed to provide a design which is adaptable to mass production manufacturing techniques, contributing to the fact that, to date, there has been little or no commercial realization of the ER fluid effect.

The design of devices utilizing the ER fluid effect has also been hampered due to a variety of other problems. For example, ER fluids historically had a low yield strength and temperature sensitivity which severely limited their use in most applications. ER fluids also typically cannot tolerate the presence of common impurities, such as water or other contaminates, further limiting their applicability. Furthermore, the lack of available inexpensive, variable high-voltage power supplies limits the commercial feasibility of controllable ER fluid systems. Recently, a new generation of ER fluids has been developed which overcome many of the problems associated with low yield strength, temperature sensitivity, and the problems associated with the presence of water. Examples of ER fluids having a variety of advantageous properties and formulas are described, for example, in U.S. Pat. No. 3,970,573 issued to Westhaver; U.S. Pat. No. 4,129,513 issued to Stangroom; U.S. Pat. No. 4,483,788 issued to Stangroom et al.; U.S. Pat. No. 4,502,973 issued to Stangroom; U.S. Pat. No. 4,645,614 issued to Goossens; U.S. Pat. No. 4,812,251 issued to Stangroom; U.S. Pat. No. 4,744,914 issued to Filisko et al.; U.S. Pat. No. 4,772,407 issued to Carlson; U.S. Pat. No. 4,879,056 issued to Filisko; and U.S. Pat. No. 4,994,918 issued to Chung. These patent references show that there has been a great deal of advancement in the formulation of ER fluids. However, the prior art literature and the marketplace are still lacking in any commercially realizable application of the ER fluid phenomenon.

Another type of variable viscosity material which exhibits a change in flow characteristics in response to an applied field is known as a magneto-rheological fluid (MR fluid). MR fluids manifest a magneto-rheological effect in response to an applied magnetic field and are the true magnetic analogs of electro-rheological fluids (ER fluids). Typically, magneto-rheological fluids consist of micron-sized, magnetically polarizable particles dispersed in a carrier medium. The formation of particle chains (fibrils) upon the application of a magnetic field is the basic operation of a magneto-rheological fluid. In the presence of a shear force, the equilibrium that is established between the formation and braking of fibrils corresponds to the yield strength defined for the fluid. MR fluids exhibit Bingham plastic behavior similar to that of ER fluids. However, the yield stress values generated by MR fluids are significantly greater than those measured for their ER fluid counterparts. Currently, a good ER fluid will exhibit a yield stress greater than 3 kPa with an applied electrical field of 4 kV/mm. In contrast, yield stress values in excess of 80 kPa have been obtained for MR fluids upon the application of a magnetic field. Further, MR fluids have demonstrated the capability of operating over a temperature range of −40° to 150° C. with only a small variation in the yield strength of the MR fluid. MR fluids can respond to the application of a magnetic field on the millisecond time scale, similar to that exhibited by ER fluids. Furthermore, MR fluids are not affected by the presence of chemical impurities that normally are encountered in various processes used for mass manufacturing and can utilize raw materials that are non-toxic, environmentally safe, and compatible with most device components, while requiring a low voltage power supply (see, K. D. Weiss, et al., "High Strength Magneto-and Electro-Rheological Fluids" SAE *Technical Papers Series* #932451). Examples of magneto-rheological fluids are described in U.S. Pat. No. 4,992,190 issued to Shtarkman; and U.S. Pat. No. 5,167,850 issued to Shtarkman.

Another type of magnetically reactive fluid is known as ferrofluids. Ferrofluids or magnetic liquids are not the magnetic analogs of ER fluids. Ferrofluids typically consist of colloidal magnetic particles, such as magnetite and magnesium-zinc ferrite dispersed in a continuous carrier phase. Upon the application of a magnetic fluids, colloidal magnetic fields retain their liquid properties. Due to the effect of Brownian motion on the polarized particles, ferrofluids do not exhibit the ability to form particle fibrils or develop yield stress. Rather, these magnetic liquids experience a body force on the entire fluid which is proportional to the magnetic field gradient. This force causes these liquids to be attracted to regions of high magnetic field strength. An example of a ferrofluid is described in U.S. Pat. No. 4,687,596 issued to Borduz et al.

Fine, dry, stainless-steel powders have been utilized instead of friction pads to control loads in prior art magnetic particle clutches and brakes. An example of a prior art magnetic particle brake is shown in FIG. 53(c). A disk-shaft assembly is centered in a gap within a housing. The gap between the disk and the housing is filled with a fine, dry, stainless-steel powder. The powder is free-flowing until a magnetic field is applied from a stationary coil. When power is applied, the powder particles form chains along the magnetic field lines, linking the disk to the housing. A torque proportional to the magnetic field and to the applied input current is thus developed. These conventional magnetic particle clutches and brakes suffer from many of the same disadvantages as the prior art ER fluid or MR fluid clutches and brakes. In particular, the materials used and the manufacturing techniques utilized in forming the disk-shaft assembly and the housing, results in high production costs and non-adaptability to high-volume mass production manufacturing techniques. Typically, the manufacture of these devices requires expensive and labor consuming machining manufacturing processes, thereby, preventing the utilization of inexpensive mass production manufacturing techniques, such as injection molding, metal stamping, and electroplating.

Furthermore, all of the prior art devices utilize a smooth and flat rotating surface and depend upon the ability of the variable viscosity material to adhere to the smooth and flat rotating surface in order to develop resistance to rotation. Additionally, these prior art devices lack any means for easily maintaining a consistent gap distance between the rotating electrode member and the facing components (inner walls of the housing) of the clutch or brake.

A typical vehicle suspension system utilizes a conventional shock absorber as a force dampener. In a conventional shock absorber, a piston is attached to the vehicle body and moves through a fluid contained in a cylinder. The force required to cause the fluid to flow from one side of the piston to the other is approximately proportional to the velocity of the piston in the cylinder. The dampening force of the conventional shock absorber is controlled by the viscosity of the fluid and the size of an orifice in the piston through which the fluid flows. The orifice can pass only so much fluid in a given length of time. If the vehicle body to which the piston is attached is displaced faster than the liquid can transfer through the orifice, a bottoming effect occurs. This effect is experienced by the vehicle occupants when a pot hole in the street is hit at too fast a rate. The suspension springs may appear to bottom out, but actually, it is the conventional shock absorber which has bottomed out.

ER fluids have been utilized in prior art controllable force dampers. FIGS. 53(d) and 53(e) show example configurations of two prior art devices known as fixed plate and sliding plate dampers, respectively. In the fixed plate dampener, the dampening force on a piston is realized by the control of a pressure drop across valve-like channels through which the ER fluid is forced to flow. In a sliding plate dampener, the dampening force originates from the controlled shear resistance between the moving piston, which acts as one electrode, and adjacent parallel surfaces, which remain motionless and act as the other electrode. These prior art controllable force dampers have been typically ineffective for use in consistently controlling an appreciable force, and thus their commercial utilization has been extremely slight, if not non-existent. In the case of the parallel plate type prior art controllable dampener, an effective ER fluid valve has not been provided. Such an ER fluid valve should be easy to manufacture and be effective to control the flow rate of the ER fluid through it to such an extent as to be able to provide a commercially usable controllable force dampener. In the case of the sliding plate dampener, there is too little electrode surface area to develop the resistance due to the ER fluid effect necessary for such a device to be commercially acceptable.

SUMMARY OF THE INVENTION

The present invention overcomes the drawbacks of the prior art. An object of the present invention is to provide a variable resistance device capable of utilizing a variable viscosity material, such as an electro-rheological fluid or a magneto-rheological fluid. Another object of the present invention is to provide such a variable resistance device that is easy to manufacture and adaptable to inexpensive high-volume mass production manufacturing techniques. Another object of the present invention is to provide uses for the inventive variable resistance device, such as in a regenerative braking system for a vehicle, drive coupling for an electric or combustion engine vehicle, high efficiency wind-to-energy generator, high efficiency hydro-electric generator, a reel for the controlled unwinding of a line, a variable resistance exercise device, a safety brake for a circular saw, and other applications where controlled braking and/or dynamic coupling is desired.

Another object of the present invention is to provide a controllable force dampener utilizing an electro-rheological or a magneto-rheological fluid. A further object of the present invention is to provide such a force dampener capable of being manufactured by inexpensive and efficient mass production manufacturing techniques and capable of a precisely controlled dampening of a force. Another object of the present invention is to provide uses for the inventive controllable force dampener, such as in the suspension system of a vehicle, earthquake-proof buildings, dampening vibration of a helicopter rotor or airplane propeller, a high-precision weapons mount, engine mounts, and other applications where active controllable dampening of force is desired.

In accordance with one aspect of the invention, a resistance device is provided which utilizes a variable viscosity material capable of undergoing a change in flow characteristics in response to an applied field. A moving member is provided having at least one surface in contact with the variable viscosity material, so that the change in flow characteristics of the variable viscosity material variably resists movement of the moving member depending on the applied field. At least one projecting member projects into the variable viscosity material for defining a flow path of the variable viscosity material when movement of the moving member causes the variable viscosity material to flow. The projecting member is effective for maintaining a precise gap distance between the moving member and other components of the inventive variable resistance device facing the moving member and defining the gap therebetween. The projecting members also enhance the resistance effect of the change of viscosity of the variable viscosity material in response to the applied field. A container contains the variable viscosity fluid, the moving member and the projecting member. A shaft having a longitudinal axis is also contained in the container. The moving member has an engaging through-hole for engaging the shaft so that the moving member is rotatable by the shaft relative to the container, about the longitudinal axis of the shaft, and is also slidable on the shaft along the longitudinal axis. As will be described in detail below, this configuration allows for an easy to manufacture and relatively inexpensive device, that is capable of being mass produced, while maintaining the strict gap tolerances necessary for effective use of the electro-rheological or magneto-rheological phenomenon.

The variable viscosity material may be an electrically reactive material, such as an ER fluid. In this case, an opposing electrode member is disposed in opposing facing relationship with a moving electrode member, so that the projecting member and at least a portion of the variable viscosity material is disposed between the opposing electrode member and the moving electrode member. The moving electrode member is movable by rotation of the shaft relative to the opposing electrode member. An electrical potential is applied to the opposing electrode member, and an opposite electrical potential is applied to the moving electrode member so as to apply an electrical field to the variable viscosity material disposed therebetween. At least one projecting member projects from the moving electrode member and/or the opposing electrode member into the variable viscosity material to thereby maintain the predetermined gap, and also to enhance the resistance characteristics of the inventive resistance device. A spacer member is disposed between the opposing electrode member and the moving electrode member and may be made of a flexible, compressible material so that the gap between the moving electrode member and the opposing electrode member is adjustable. The shaft is disposed so as to extend through an exit through-hole in the top of the container. A brush contact applies the potential to the rotating shaft, and thus to the moving electrode member, through an electrical contact between the moving electrode member and the shaft. A confining electrode is disposed in facing relationship around the shaft and applied with the potential, so that an electrical field is applied to any of the variable viscosity fluid disposed between the shaft and the confining electrode. This configuration provides a dynamic fluid seal in which ER fluid is prevented from escaping through the exit through-hole in the container, while contaminants are prevented from entering into the container, by creating a dam of gelled ER fluid disposed between the confining electrode and the shaft.

The projecting member may be fixed to the moving electrode member, and comprise a non-conductive material, while the moving electrode member has a conductive surface. The dielectric constant of the projecting member should be selected so as to match the dielectric constant of the ER fluid, to thereby reduce any effects on the electrical field between the moving electrode member and the opposing electrode member due to the existence of the projecting member in the gap.

The inventive variable resistance device can be configured with any number of moving electrode members and opposing electrode members, so that the resistance capacity available can be modified depending on anticipated loads. In accordance with this feature, each moving electrode member is sandwiched between two respective opposing electrode members to form an assembled stack. Thus, the moving electrode member is disposed between a first opposing electrode member and a second opposing electrode member so that an obverse side of the moving electrode member faces the first opposing electrode member, and a reverse side of the moving member faces the second electrode member. The thus formed stack has each moving electrode member sandwiched between respective adjacent facing opposing electrode members so as to maximize the electrode surface area available for applying the electrical field to the variable viscosity material. A spacer member may be disposed between the first opposing electrode member and the second opposing electrode member for maintaining the gap between the electrode surfaces of the moving member and the opposing electrode members. The spacer member is disposed between two consecutive opposing electrode members, so that the gap can be maintained with high precision. The spacer member can be comprised of a rigid non-compressible material, in which case the gap becomes fixed. Alternatively, the spacer member can be comprised of flexible compressible material, in which case the gap can be adjusted by compressing the spacer member.

In another embodiment of the invention, a plurality of gap maintaining members are disposed between the moving members and the corresponding opposing electrode members for maintaining the predetermined gap between them. The gap maintaining members may be bearings which are held in receiving surfaces, or grooves, disposed in either or both of the moving electrode members and the opposing electrode members. Alternatively, gap maintaining ridges can be disposed between the moving electrode members and the corresponding opposing electrode members for maintaining the predetermined gap.

In accordance with an inventive method of forming the components of the inventive variable resistance device, either or both of the moving electrode members and the opposing electrode members can be formed by injection molding a substrate and then electroplating a conductive surface thereon. In accordance with an inventive control method, the electrical field is applied selectively to particular moving electrode members and/or corresponding opposing electrode members so as to control a number of pairs of respective moving members and corresponding opposing electrode members having an electrical field applied to the variable viscosity material disposed between them. Thus, a constant power supply can be used, and the resistance available from the inventive variable resistance device is obtained as a percentage of the capacity of the device. For example, five out of ten pairs of respective moving electrode members and corresponding opposing electrode members may be energized, while the other five remain non-energized. In this case, the resistance available from the variable resistance device will be 50% of its total capacity. In addition, or alternatively, the electrical field can be variably applied between respective moving electrode members and corresponding opposing electrode members, so as to variably control the strength of the electrical field applied to the variable viscosity material. Also, if the gap distance between the moving electrode members and the corresponding opposing electrode members can be varied (such as through the use of compressible spacer members), then the gap may be adjusted so as to apply a variable electrical field to the variable viscosity material.

In accordance with another embodiment of the invention, the variable viscosity material comprises an MR fluid, capable of undergoing a change in flow characteristics in response to an applied magnetic field. In this case, a magnetic field generating coil is used to apply the magnetic field to the MR fluid. The magnetic field generating coil is formed by wrapping a conductive winding around a magnetizable core, and then forming the magnetizable core into a hollow cylindrical shape. The magnetic field may also be applied by a plurality of individually controllable magnetic field generating coils, each disposed so as to apply an individually controllable magnetic field to the variable viscosity material (MR fluid). A unitary moving member, comprising a plurality of disk members joined together by a plurality of projecting members may be provided. The plurality of disk members are joined together by the plurality of projecting members so as to form a gap between adjacent moving members which is filled with the variable viscosity material. This unitary moving member may be formed by a simple injection molding process, or other machining operation, and may be conductive or non-conductive. The magnetic permeability of the moving member should be high, so as to limit its hindrance to the magnetic field which is applied to the variable viscosity material.

The inventive variable resistance device may be used in a braking system for braking rotation of a rotating object, such as a saw blade, an automobile wheel, a helicopter rotor, or an aircraft propeller. Rotation of the moving members of the variable resistance device is coupled to rotation of the rotating object, and the applied field (electrical or magnetic) is controlled so that the change in flow characteristics of the variable viscosity material provides resistance to rotation of the moving member, and thus brakes the rotation of the rotating object. The rotation of the rotating object can be linked to the rotation of the shaft which rotates the moving members, so that an increase in viscosity of the variable viscosity material provides resistance to rotation of the moving members, so as to apply a braking force on the rotating object. The link between the rotating object and the shaft may be flexible, so that in the case of a vehicle tire, the rotating object can be displaced (such as in response to the encountering of a bump and to allow steering). An electrical generator rotated by the shaft may be provided so that when the rotation of the rotating object is linked with the rotation of the shaft, energy is produced.

Alternatively, the container of the inventive variable resistance device can be fixed to the rotating object, so that an increase in the viscosity of the variable viscosity fluid couples rotation of the rotating object to rotation of the shaft for braking the rotating object. In this case, the variable resistance device acts as clutch. An electrical motor can be provided for driving the rotating object through the coupling of the rotation of the rotating object to the rotation of the shaft. A battery supplies electrical current to the electrical motor, and the supply of electrical current from the electrical generator and the supply of the electrical current from the battery can be controlled, so that when the rotating object is being driven, the electrical current is supplied from the battery to the electrical motor, and when the rotating object is being braked, the electrical current is supplied from the electrical generator to the battery. This feature provides a drive system and a regenerative braking system for use with an electric vehicle.

The inventive variable resistance device can be used to variably resist a reel, for the controlled unwinding of a line. A rotatably supported bobbin holds a coil of line, and the inventive resistance device is used to control rotation of the bobbin. The rotation of the moving members is coupled to the rotation of the bobbin member, so that the tension on the line unwinding from the bobbin member can be variably controlled. This use of the invention is particularly effective for providing a tension responsive fishing reel (as described in Applicant's U.S. Pat. No. 5,248,113, issued Sep. 28, 1993; and Applicant's U.S. Pat. No. 5,252,958, issued Oct. 12, 1993, both being incorporated by reference herein), or for use in maintaining an appropriate tension on a fine wire being drawn through a wire forming die. Other uses of the inventive variable resistance device include coupling rotation of a wind driven propeller to rotation of an electrical generator to provide a highly efficient, self-adjusting, wind-to-energy conversion system. The same can be applied for use in generating hydro-electric power. Another use of the inventive variable resistance device is to provide a variable resistance exercise device, as described in Applicant's copending U.S. patent application, Ser. No. 148,066 filed Nov. 3, 1993, and incorporated by reference herein.

In accordance with another aspect of the invention, a controllable force dampener device is provided. A first bellows, having a first opening, is capable of being expanded and contracted and contains a varying volume of a variable viscosity material. A second bellows, having a second opening, is capable of being expanded and contracted, and also contains a varying amount of the variable viscosity material. An ER fluid (or MR fluid) valve disposed between the first bellows and the second bellows, and in communication with the first opening and the second opening, controllably restricts the flow of the variable viscosity material between the first bellows and the second bellows. Thus, in accordance with the invention, a force acting to compress the first bellows causes the variable viscosity material to flow from the first opening, through the fluid valve, through the second opening and into the second bellows, so that the second bellows is expanded. In a similar manner, a force acting to expand the first bellows causes the variable viscosity material to flow from the second bellows through the fluid valve and into the first bellows. The ER fluid (MR fluid) valve is controlled to adjust the flow rate of the variable viscosity material from the first bellows to the second bellows, and vice-versa, so that the force acting to compress (expand) the first bellows is variably dampened. A spring may be provided for compressing the second bellows to cause the variable viscosity material to flow from the second opening, through the ER fluid (MR fluid) valve, through the first opening and into the first bellows, causing the first bellows to expand after the force being dampened stops acting to compress the first bellows. Thus, the inventive force dampener is brought back into an equilibrium state after the force acting to compress the first bellows has been dampened. Alternatively, the restoring spring may be absent from the system and equilibrium restored, for example, by a suspension spring of a vehicle suspension system.

In accordance with one configuration of the inventive ER fluid valve, at least two wire mesh electrodes are stacked in facing relationship with each other and disposed in a flow path of the variable viscosity material. A potential is applied to each mesh electrode so that an electrical field is applied to the variable viscosity material (ER fluid) between the adjacent mesh electrodes. By controlling the potential applied to the mesh electrodes, or by controlling the gap between the mesh electrodes having potential applied thereto, the flow of the variable viscosity material through the inventive ER fluid valve is controlled. In another configuration, the ER fluid valve comprises a first ganged-plates member for receiving an electrical potential and comprising a plurality of parallel plates. Each plate is fixed at one end to a mounting member. A second ganged-plates member receives a potential and also comprises a plurality of plates, each plate being fixed at one end to another mounting member. The first and second ganged-plates members are disposed in the flow path of the variable viscosity material in an interlocking manner with each respective plate of the first ganged-plates member being disposed adjacent to and facing a corresponding plate of the second ganged-plates member, so as to define a gap between adjacent interlocked plates. The potential is applied to the first and second ganged-plates members, so that the electrical field is applied to the variable viscosity material (ER fluid) disposed between the adjacent and facing plates. Thus, the flow rate through the inventive ER fluid valve can be variably controlled.

In another configuration of the inventive ER fluid valve, at least two parallel plate electrodes, each having at least one through-hole, are stacked in facing relationship with each other and disposed in the flow path of the variable viscosity material. The variable viscosity material flows through each through-hole, and potential applied to each parallel plate electrode applies the electrical field to the variable viscosity material disposed between the adjacent parallel plate electrodes, thereby, controlling the flow of the variable viscosity material.

In accordance with an inventive method for manufacturing this configuration of the inventive ER fluid valve, a substrate is provided having a conductive surface. A spacer element material layer is formed on the substrate and is patterned to form spacer elements. At least one through-hole is formed in the substrate, and at least two thus-formed parallel plate electrodes are stacked, so that the spacer elements maintain a predetermined gap between the respective conductive surface of adjacent facing parallel plate electrodes.

In an embodiment of the inventive MR fluid valve, a fluid valve hose is formed by wrapping a conductive winding around a hollow magnetizable tube. Current applied to the conductive winding creates a magnetic field within the magnetizable tube, thereby forming an MR fluid valve hose along the length of the tube. These inventive ER and MR fluid valves offer tremendous advantages over the configurations described in the prior art because they allow an easy to manufacture, effective variable viscosity fluid valve which provides for controlling the flow of a variable viscosity fluid, while allowing for the use of available materials and/or mass production manufacturing techniques.

The inventive variable resistance device and the inventive force dampener are incorporated into a drive train/braking system and suspension system of a vehicle such as an automobile. The drive train/braking system provides antilock and regerenative braking capabilities, as well as a continuosly variable coupling between a motor/generator and the driven wheels of the vehicle. The suspension system provides active force dampening to counteract the displacement of the vehicle caused by a bump or pothole, and also allows height adjustment capabilites for raising and lowing the vehicle frame relative to the ground.

In accordance with an inventive use, the inventive force dampening and height adjusting force dampener is incorporated in an advanced weapons mount for aiming and maintaining target acqusition when mounted on a variety of movable platforms such as a helecopter, aircraft, watercraft or landcraft.

BRIEF DESCRIPTION OF THE DRAWINGS

FIG. 2(i) is an isometric view of an embodiment of an opposing electrode member of the inventive variable resistance device;

FIG. 2(b) is top a plan view of the opposing electrode member shown in FIG. 2(a);

FIG. 2(c) is an isometric view of an embodiment of a rotating electrode member of the inventive variable resistance device;

FIG. 2(d) is a top plan view of the rotating electrode member shown in FIG. 2(c);

FIG. 2(e) is an isometric view of an embodiment of a spacer member of the inventive variable resistance device;

Figure 3A:
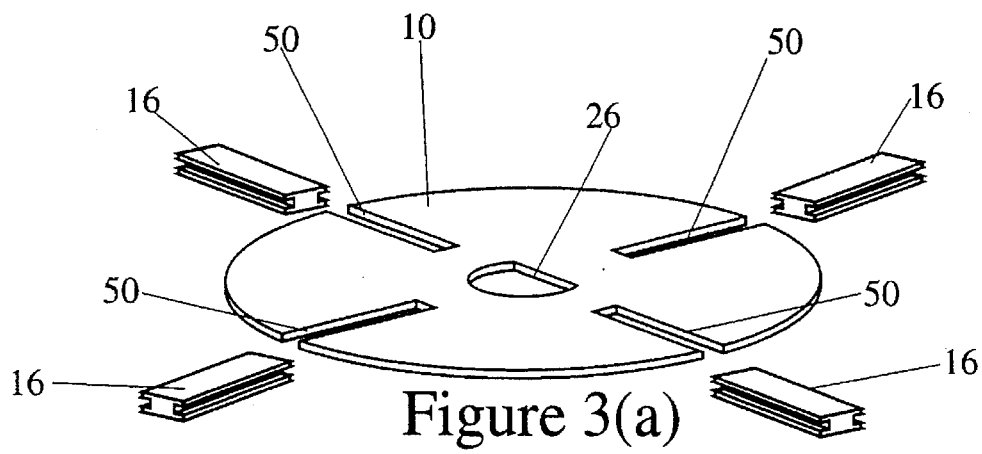
Figure 3B:
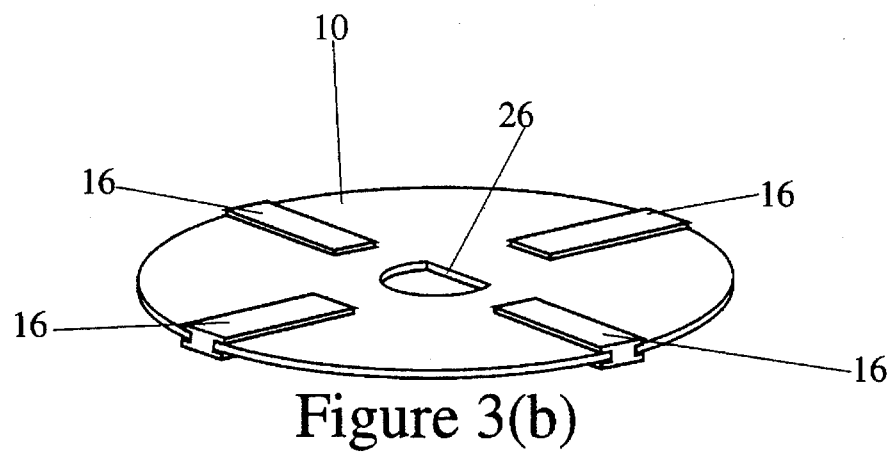
Figure 3C:
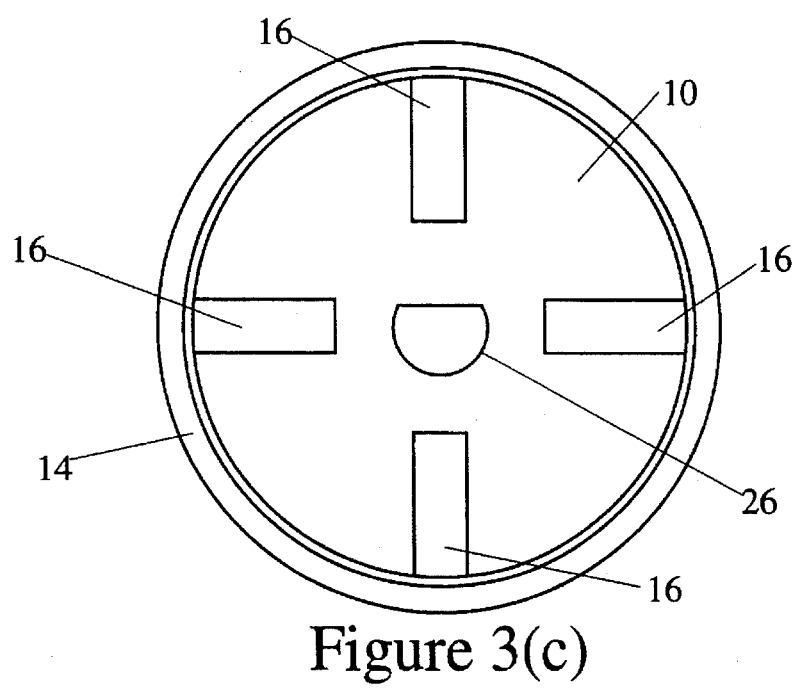
Figure 3D:
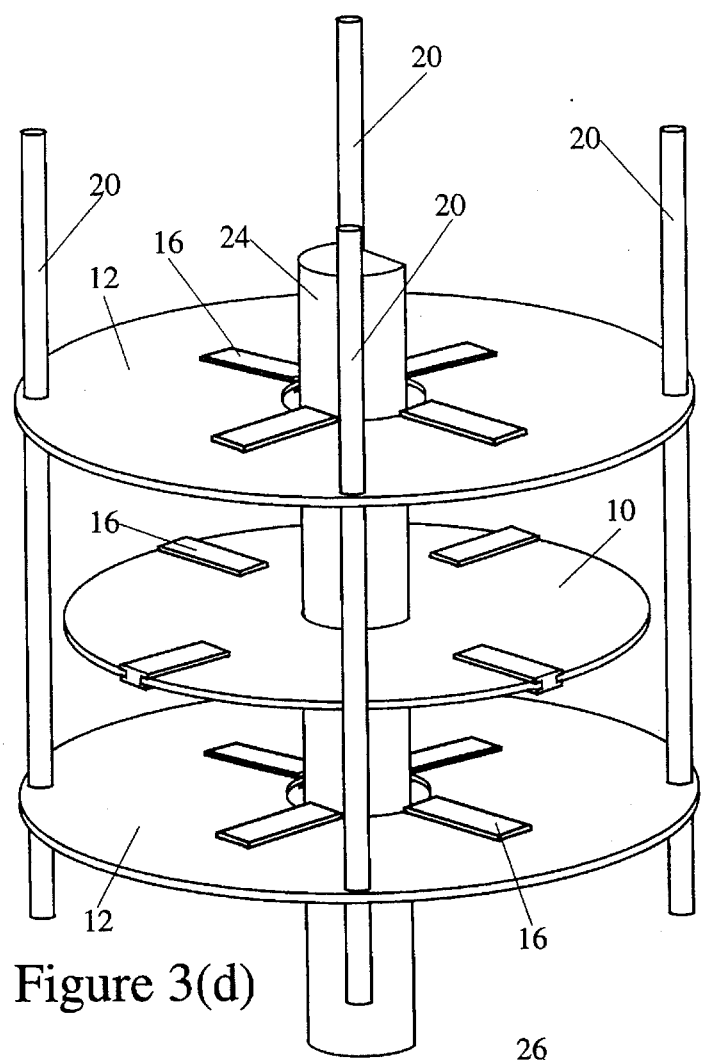
Figure 3E:
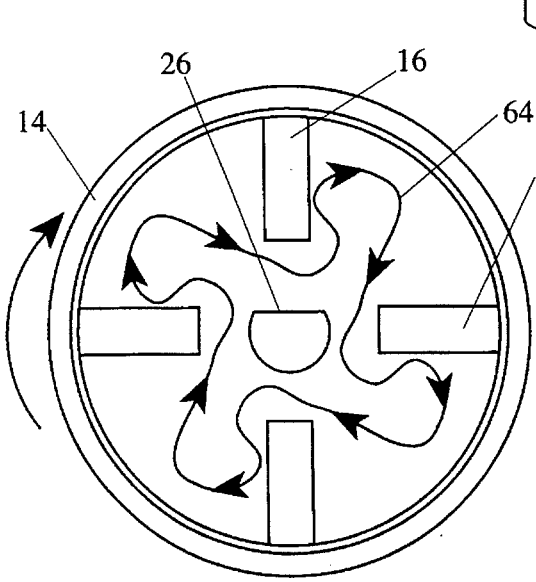
Figure 3F:
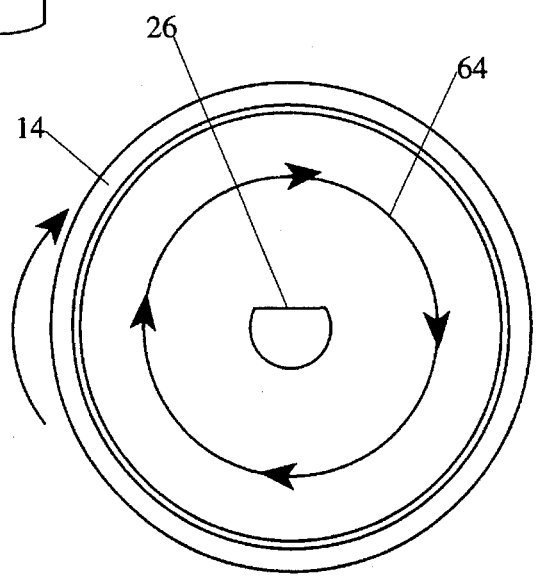
Figure 4A:
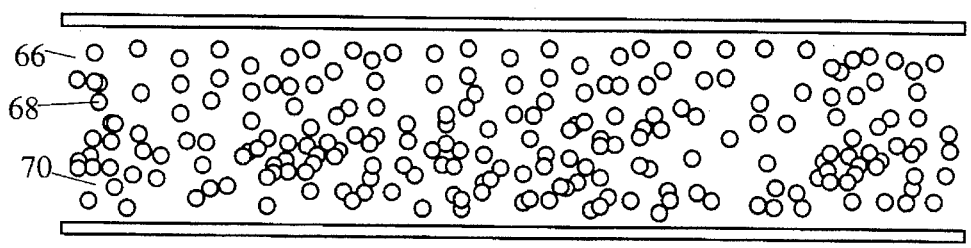
Figure 4B:
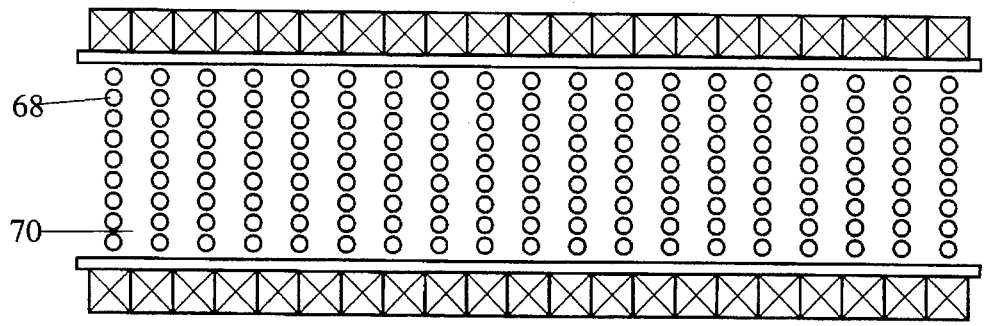
Figure 4C:
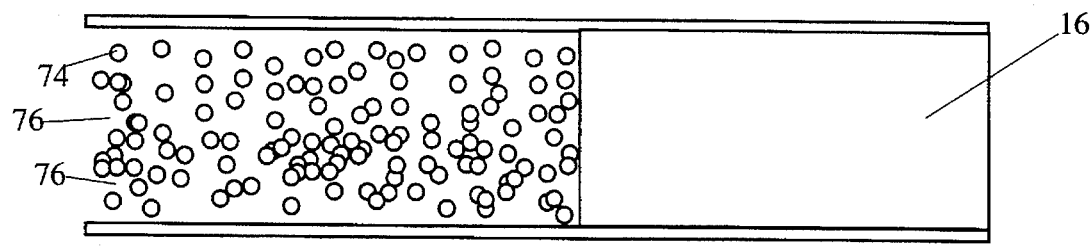
Figure 4D:
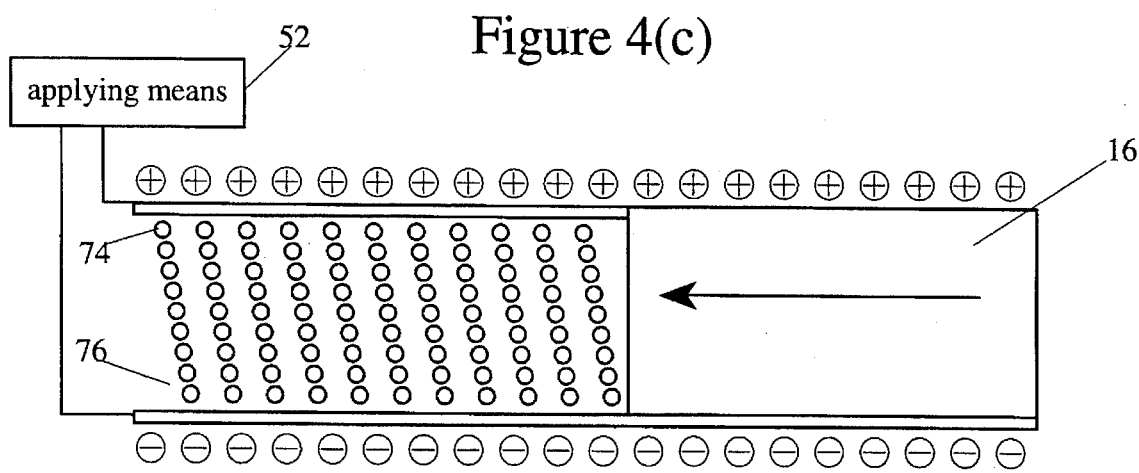
Figure 5A:
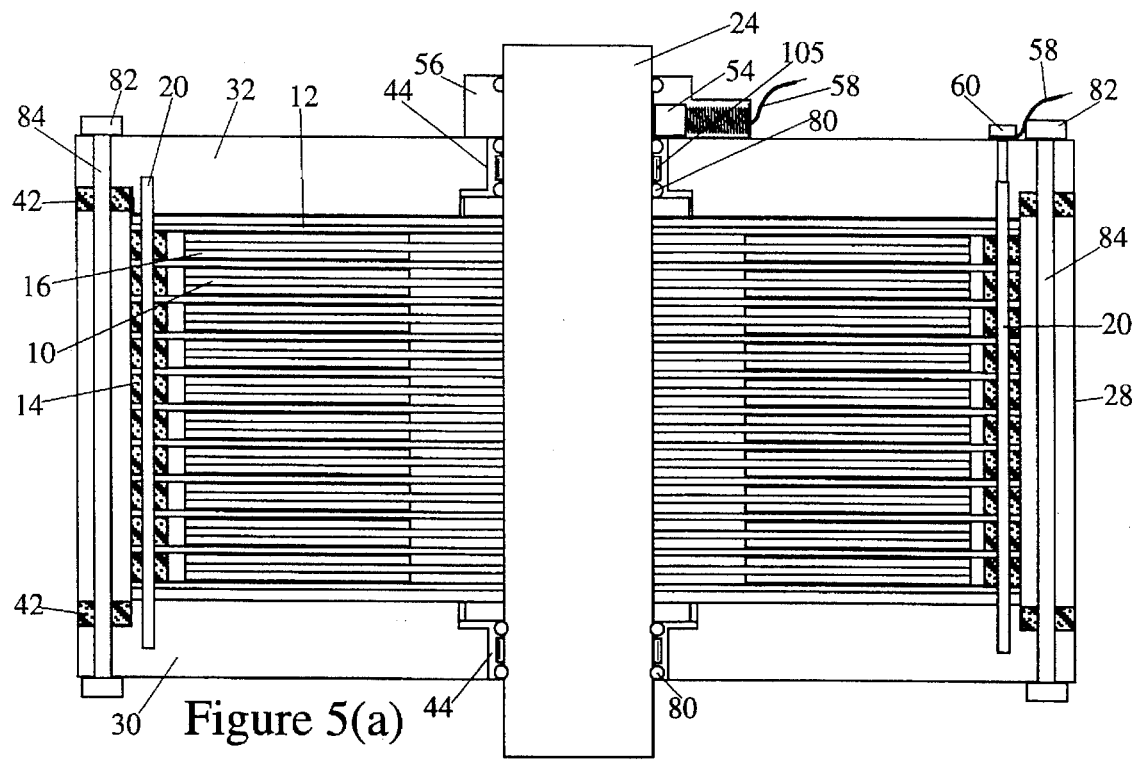
Figure 5B:
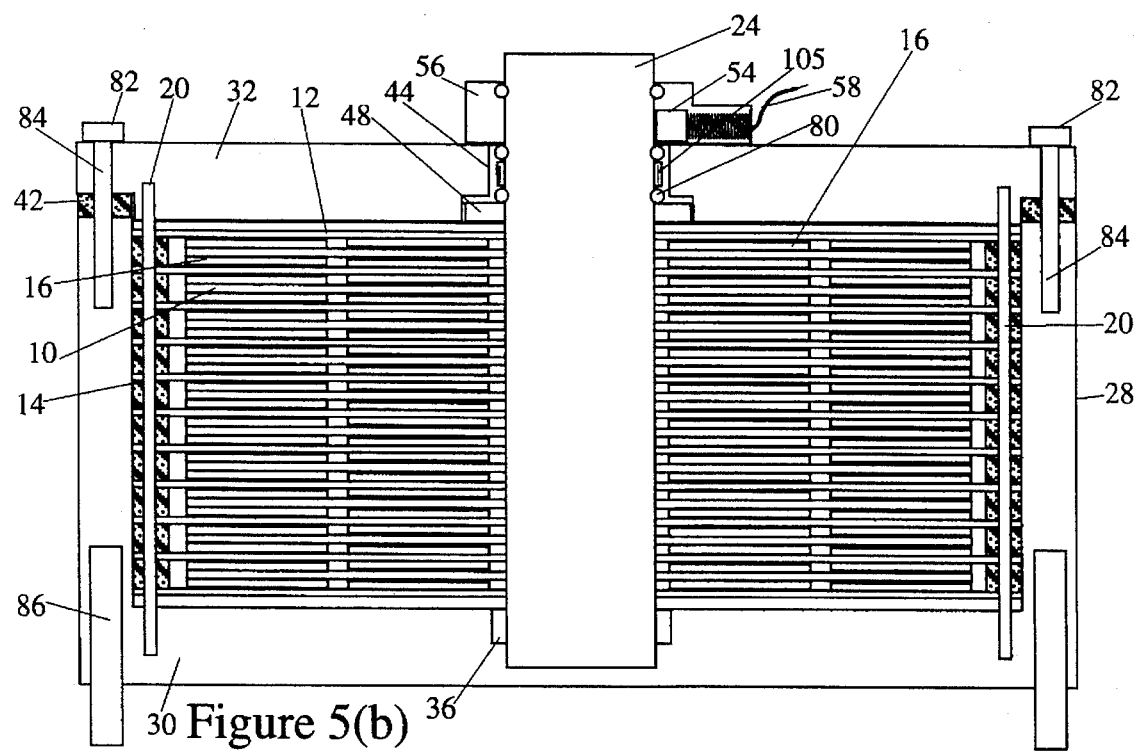
Figure 5C:
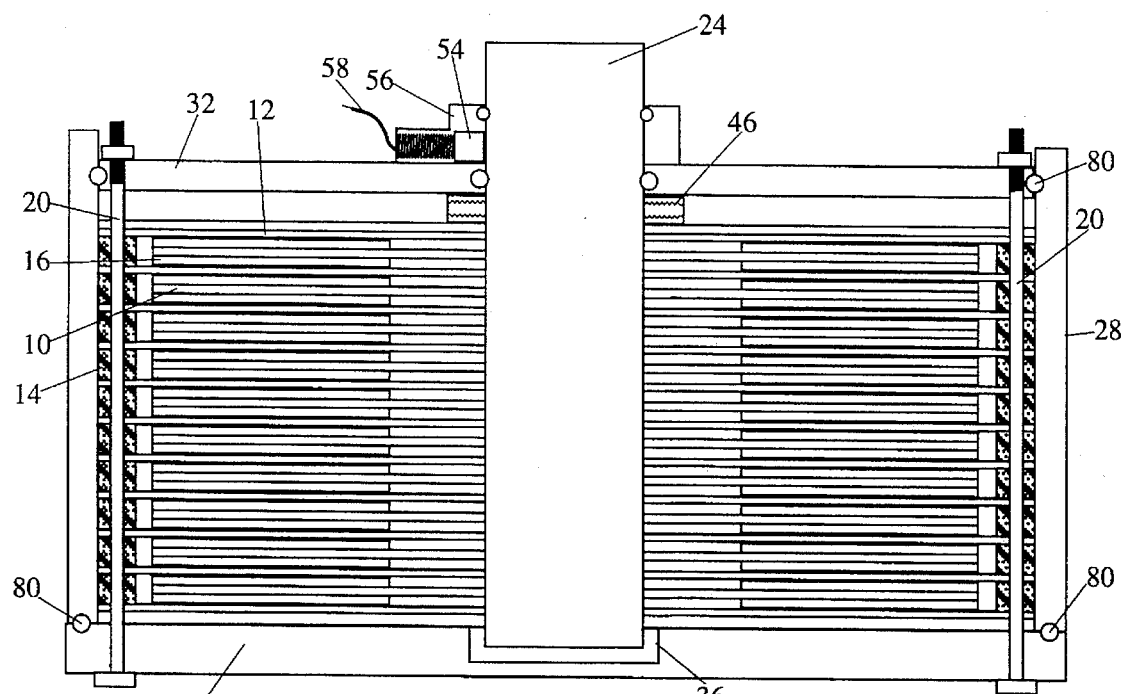
Figure 5D:
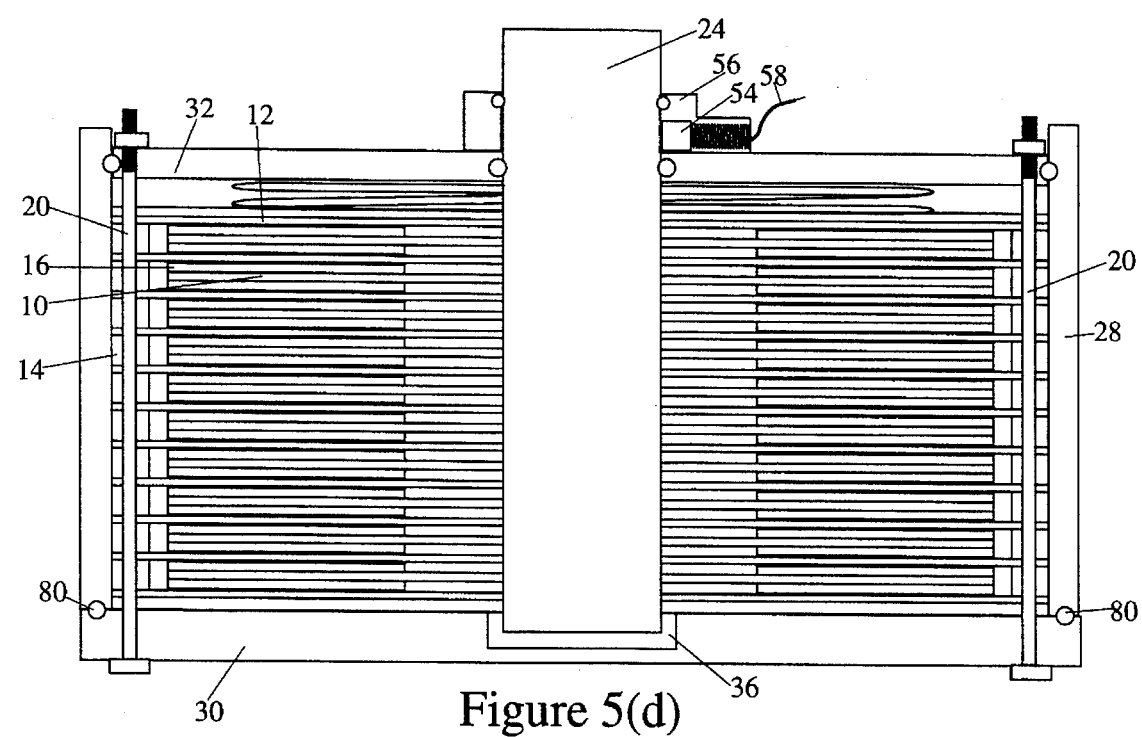
Figure 6A:
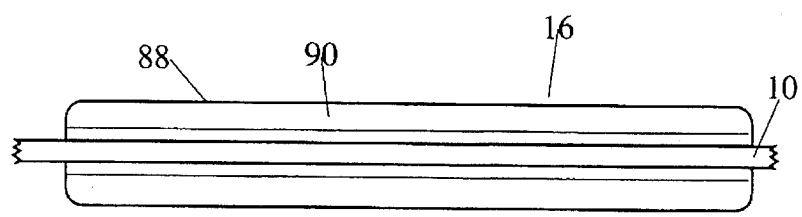
Figure 6B:
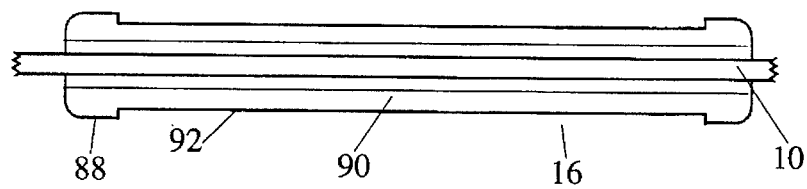
Figure 6C:
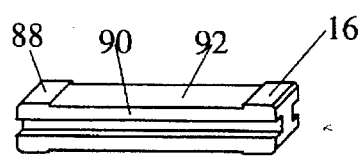
Figure 6D:
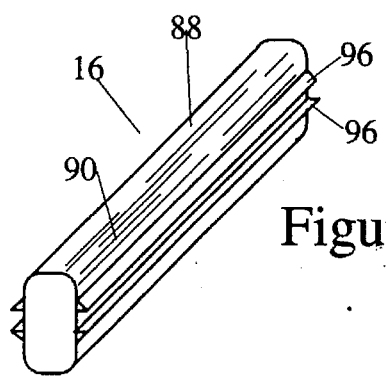
Figure 6F:
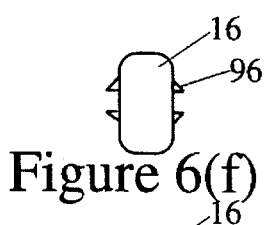
Figure 6G:
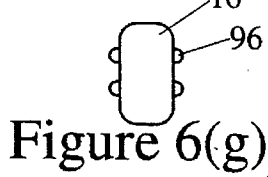
Figure 6H:
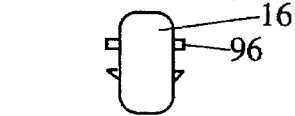
Figure 6I:
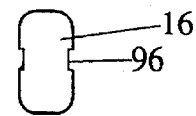
Figure 6E:
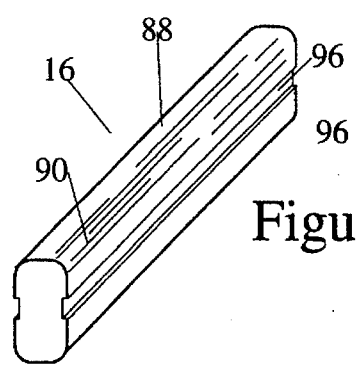
Figure 8:
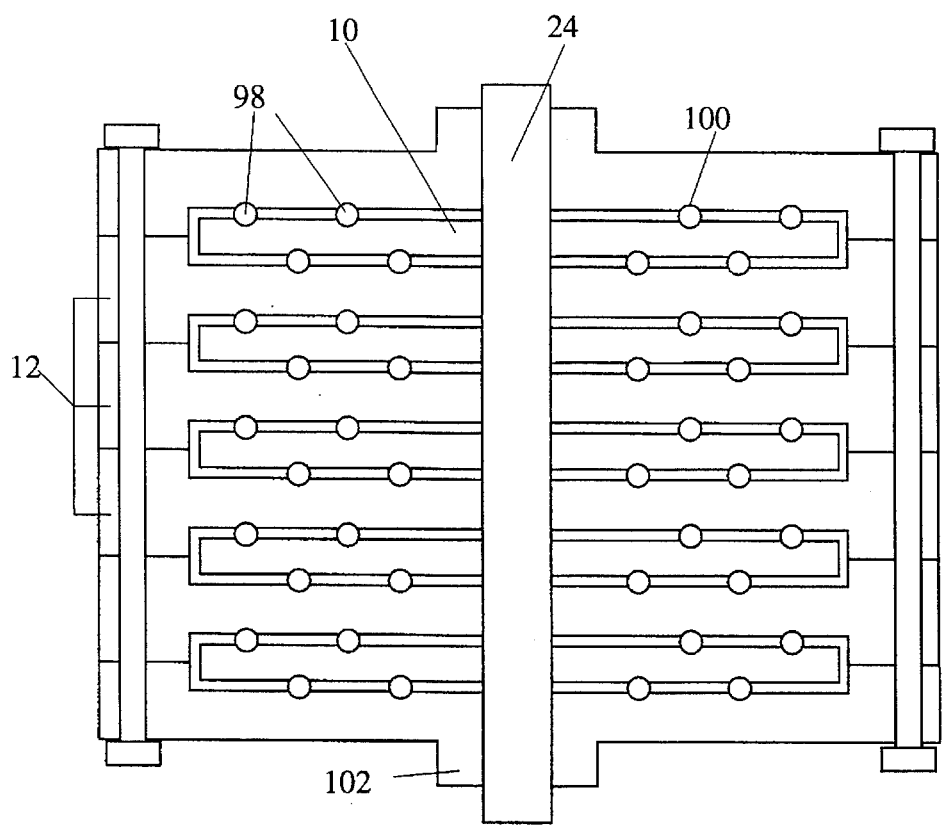
Figure 9A:
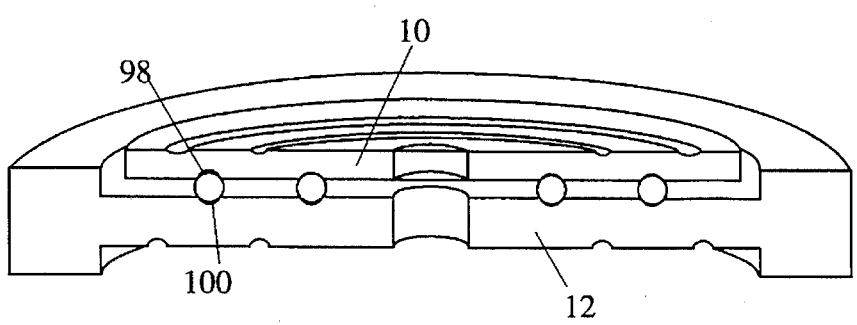
Figure 9B:
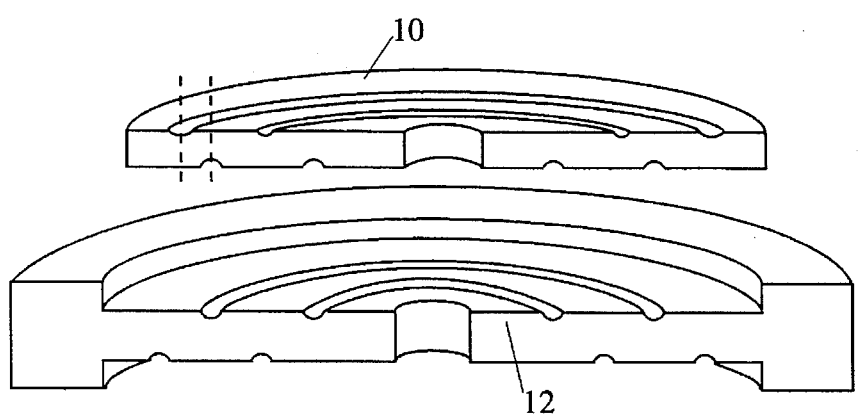
Figure 10A:
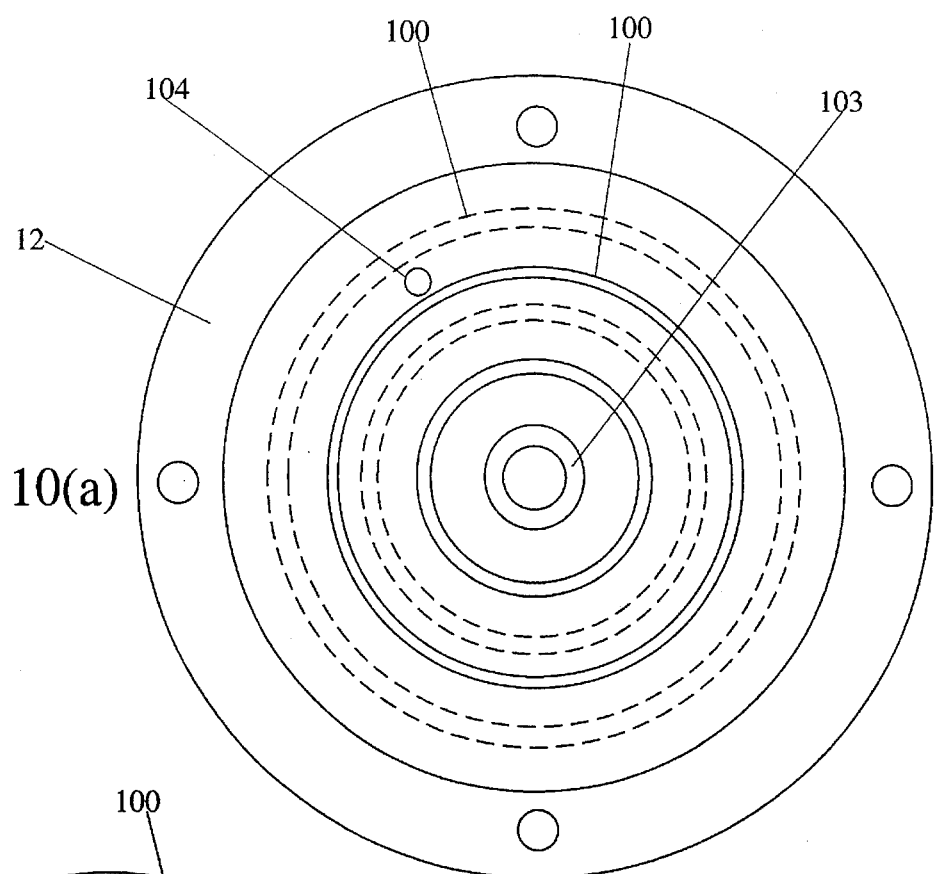
Figure 10B:
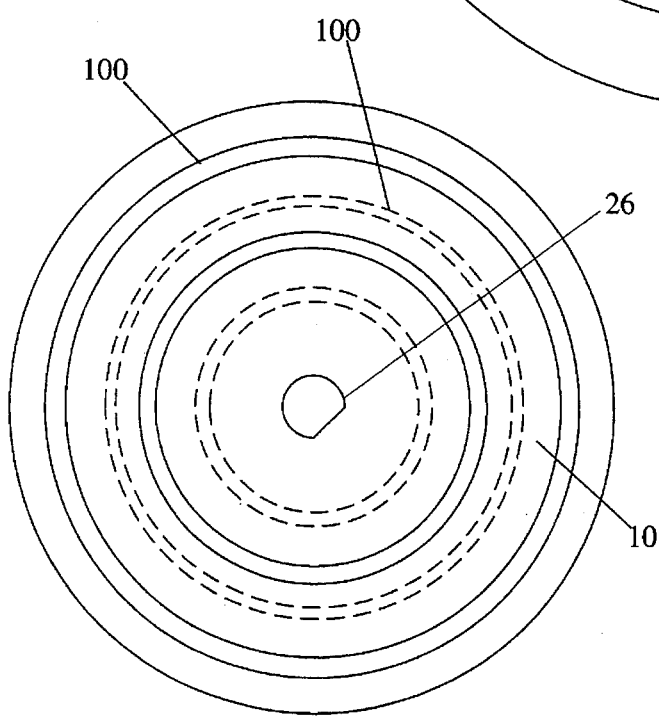
Figure 10C:
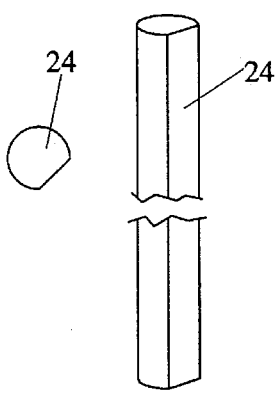
Figure 11:
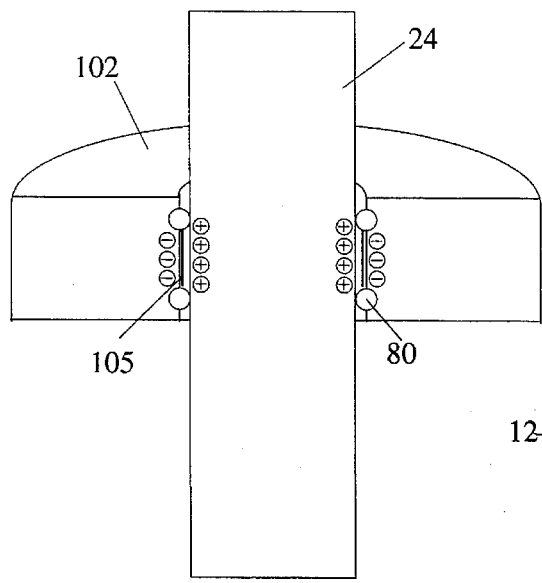
Figure 12A:
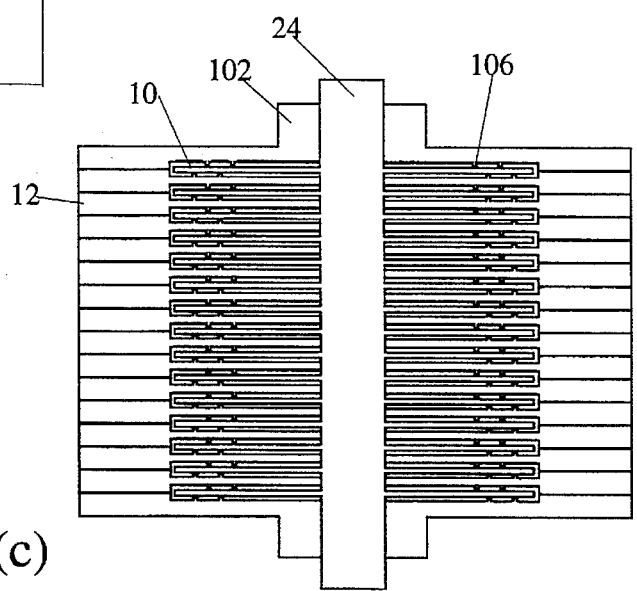
Figure 12C:
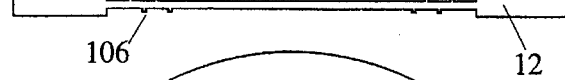
Figure 12B:
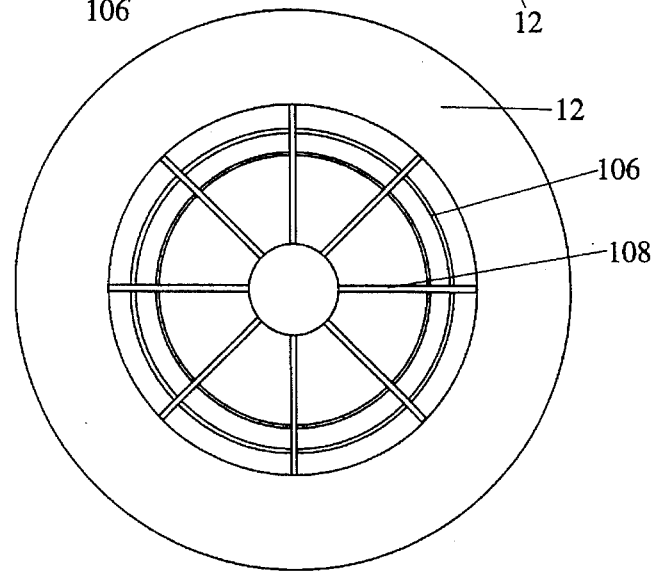
Figure 13:
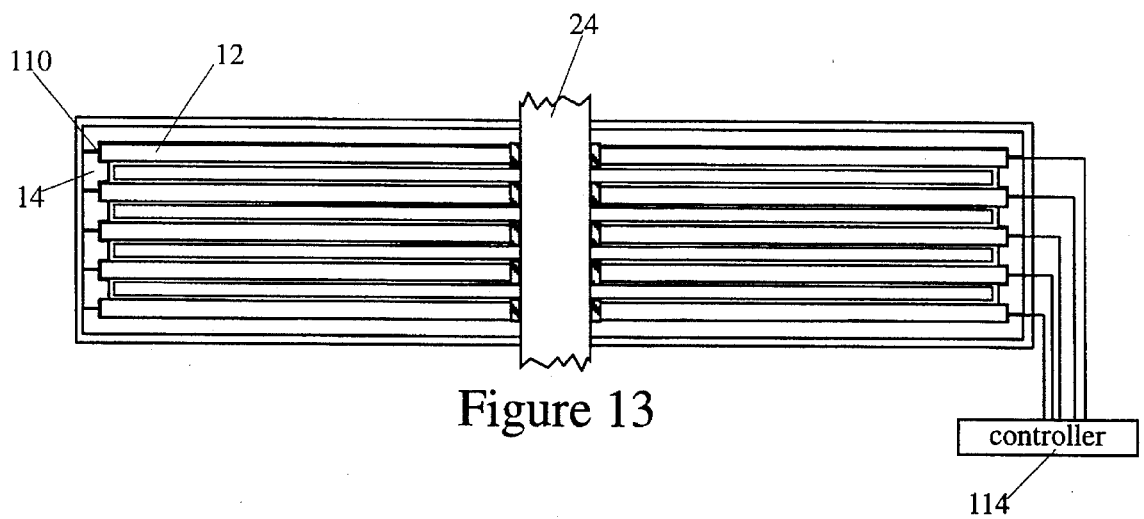
Figure 14A:
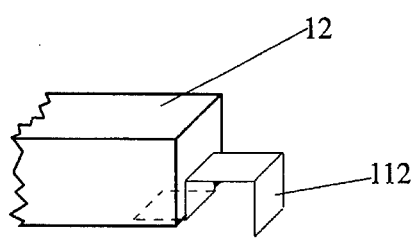
Figure 14B:
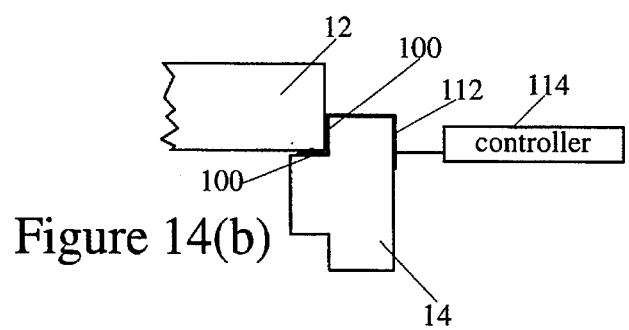
Figure 15A:
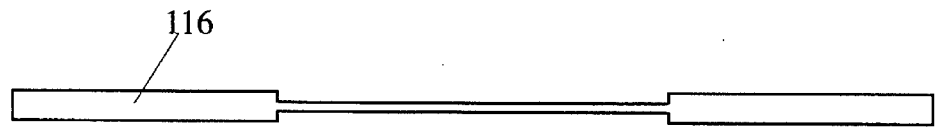
Figure 15B:
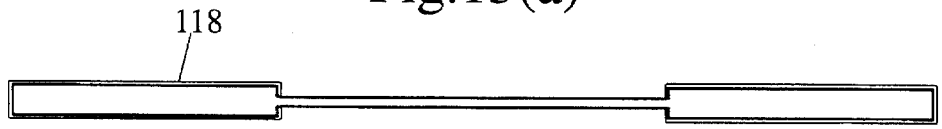
Figure 15C:
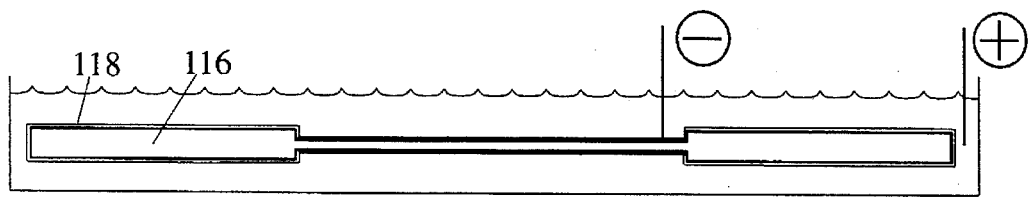
Figure 15D:
Figure 16A:
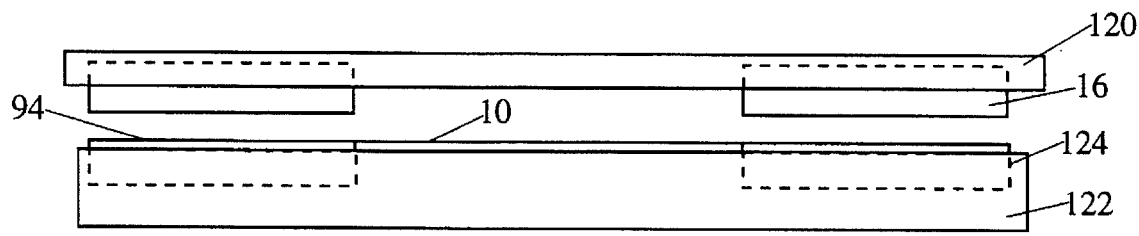
Figure 16B:
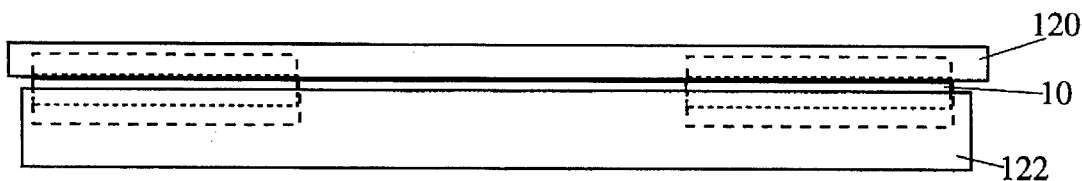
Figure 16C:
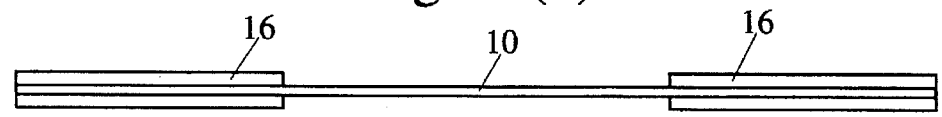
Figure 17A:
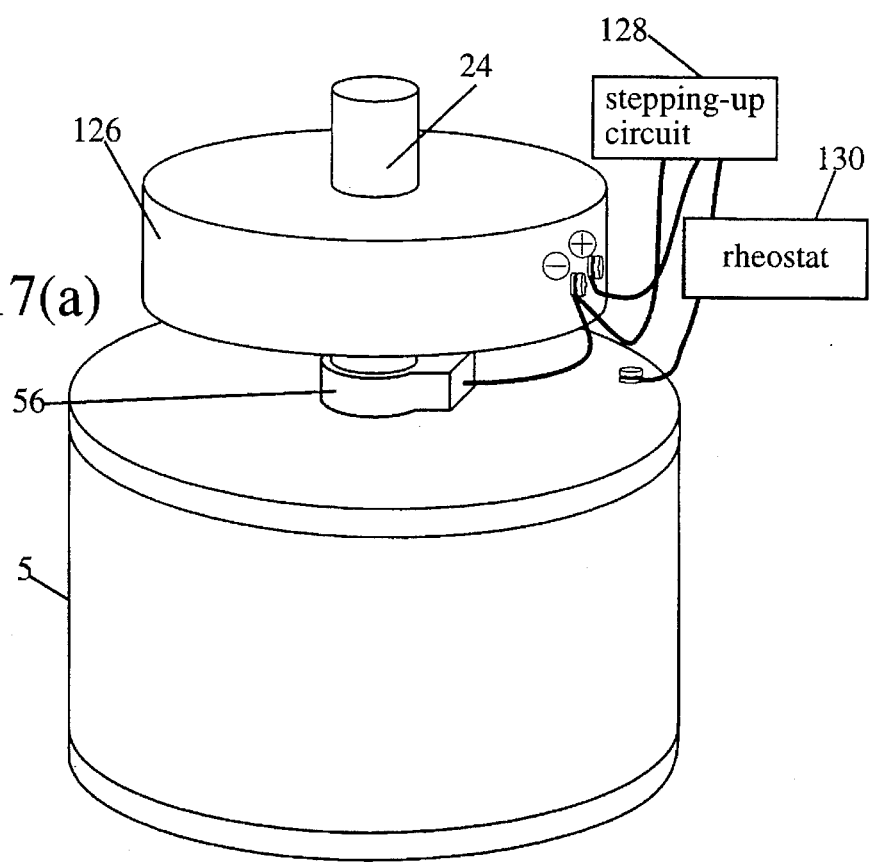
Figure 17B:
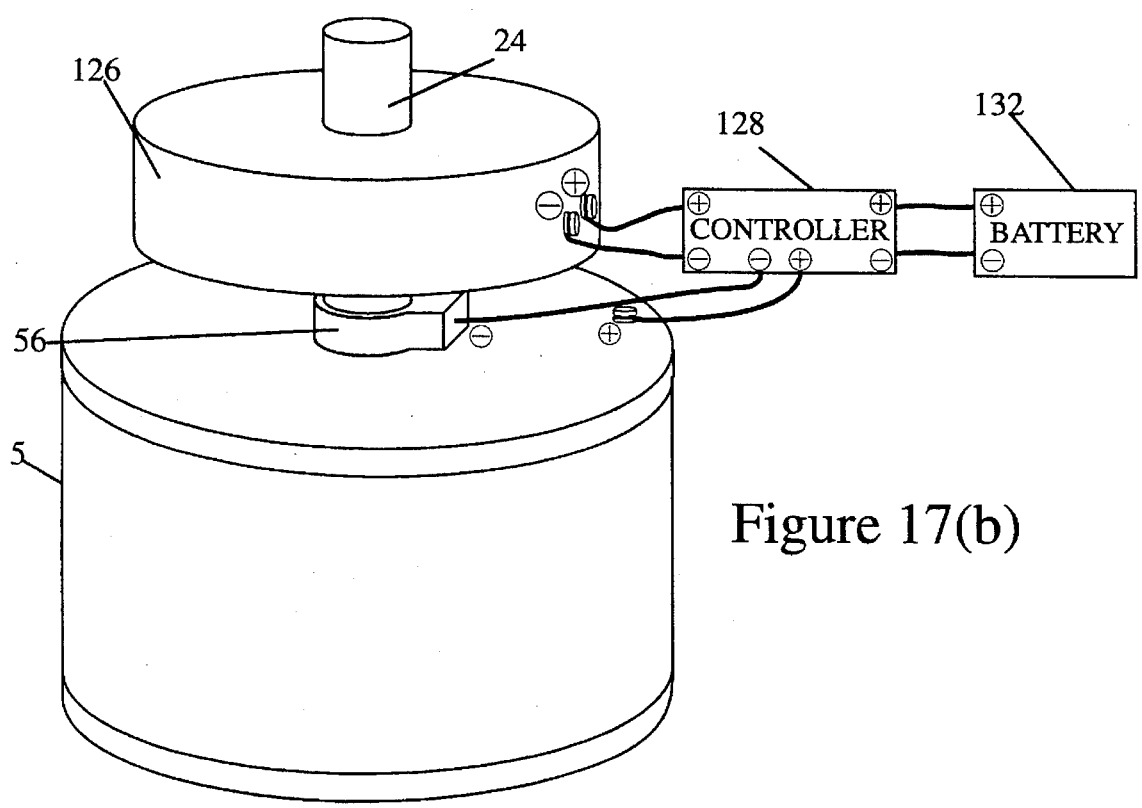
Figure 18A:
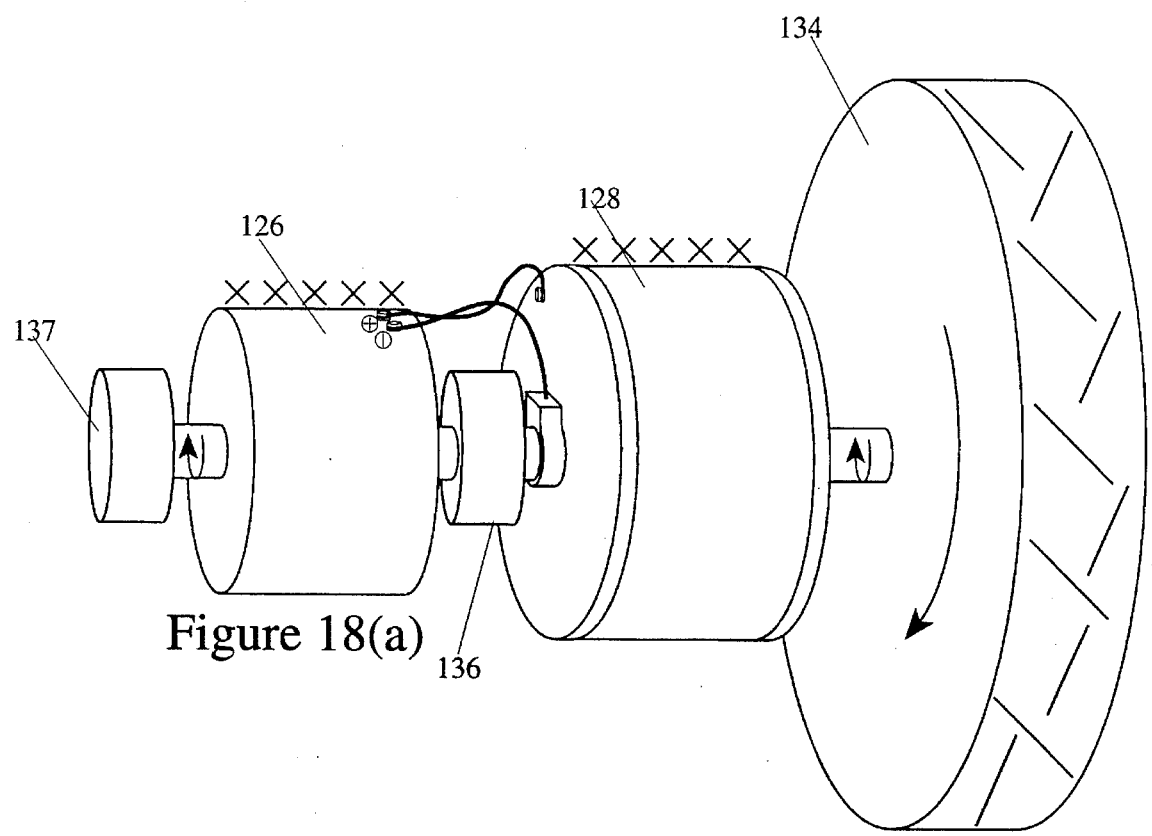
Figure 18B:
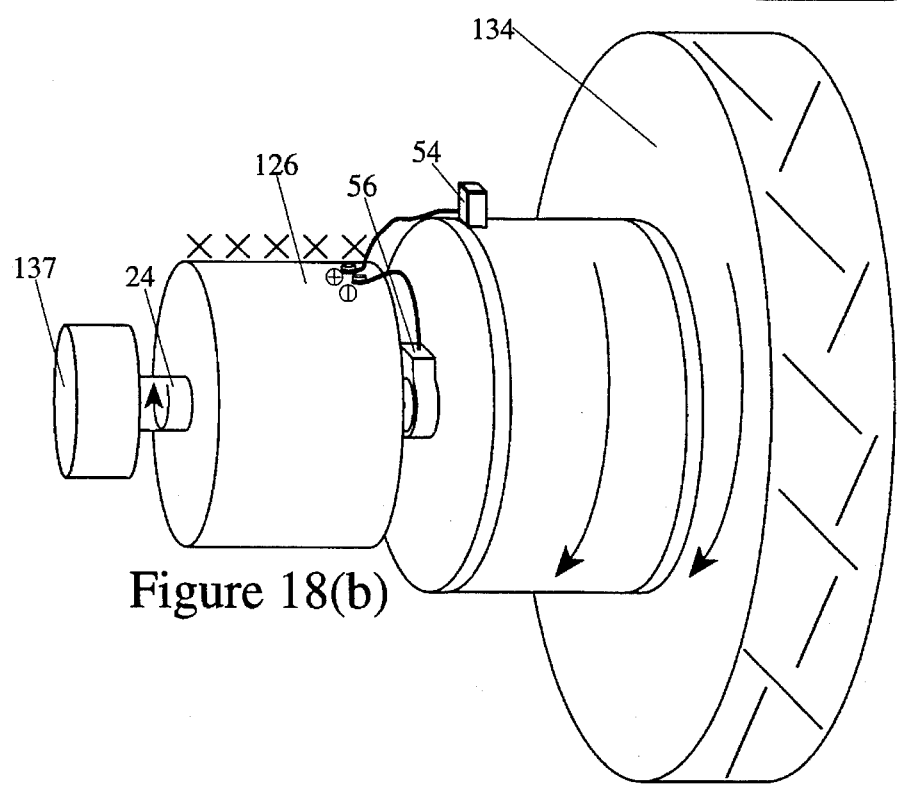
Figure 19A:
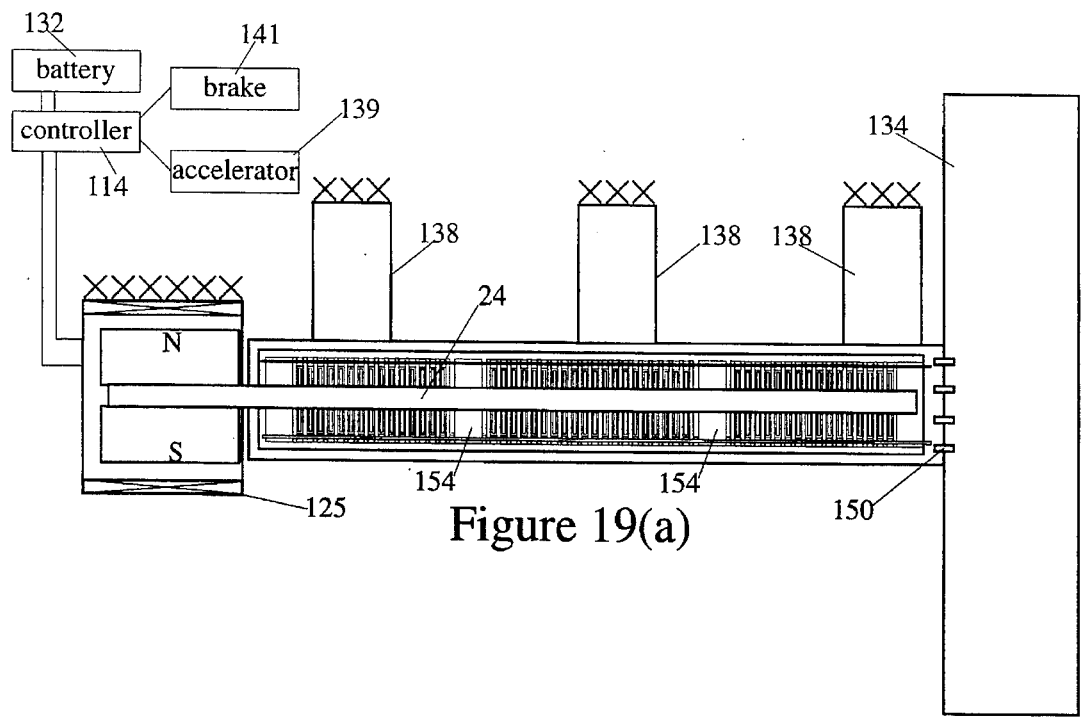
Figure 19B:
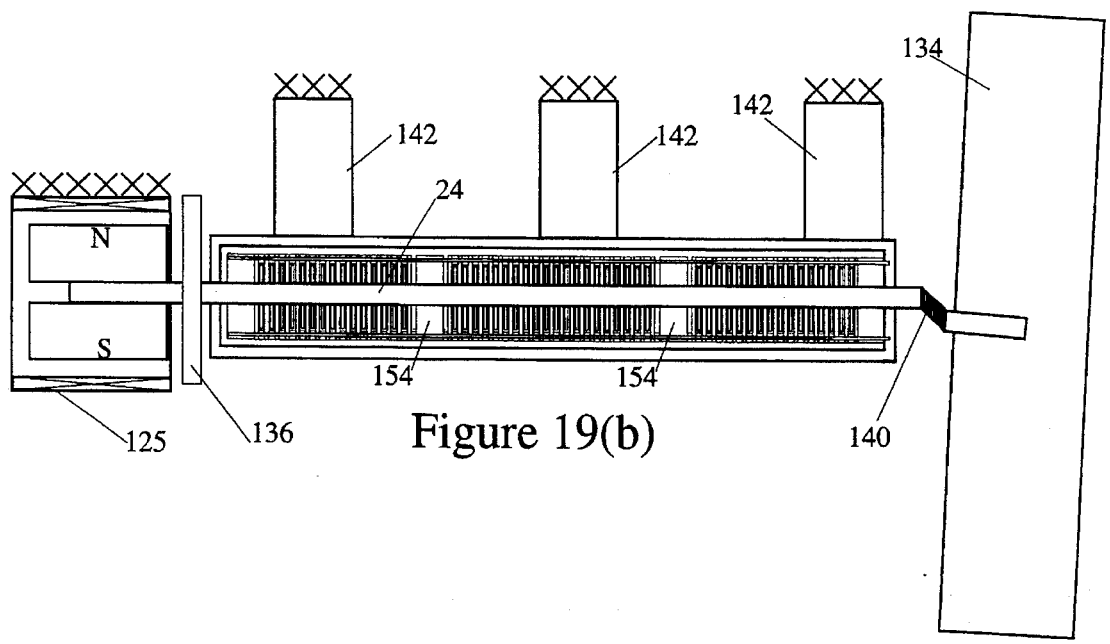
Figure 21A:
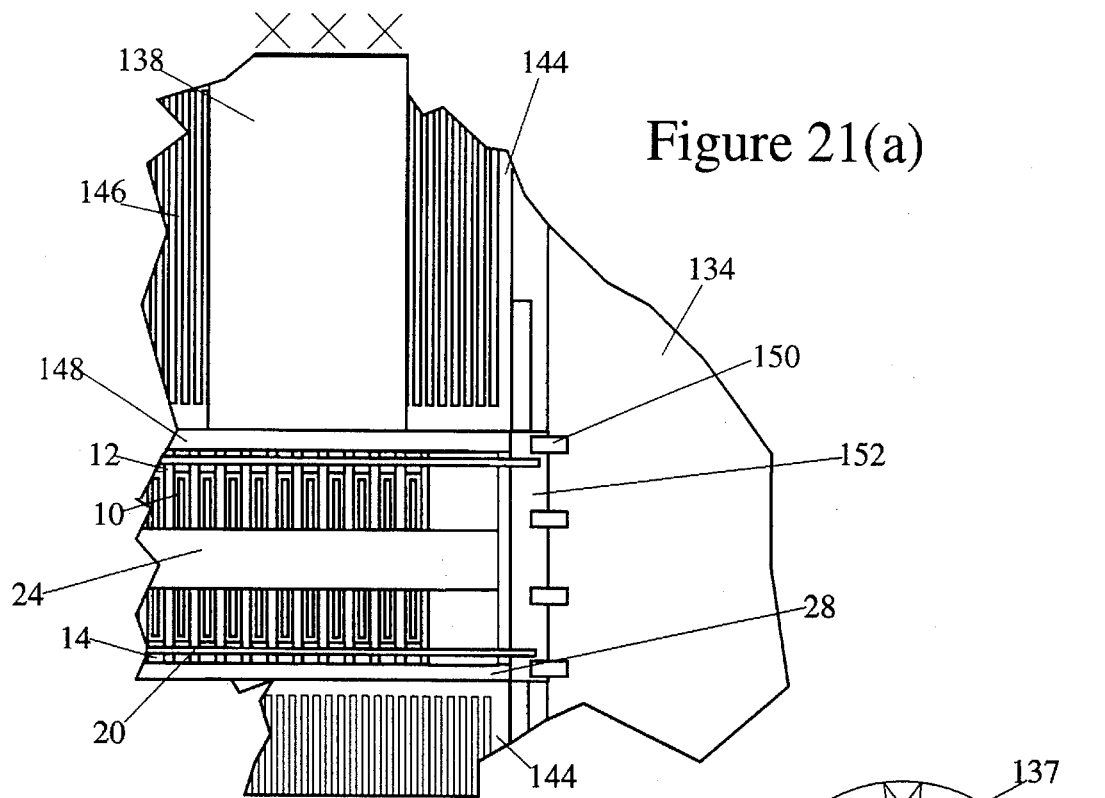
Figure 21C:
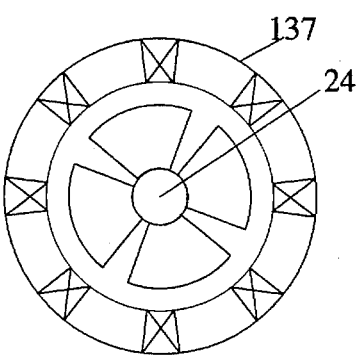
Figure 21B:
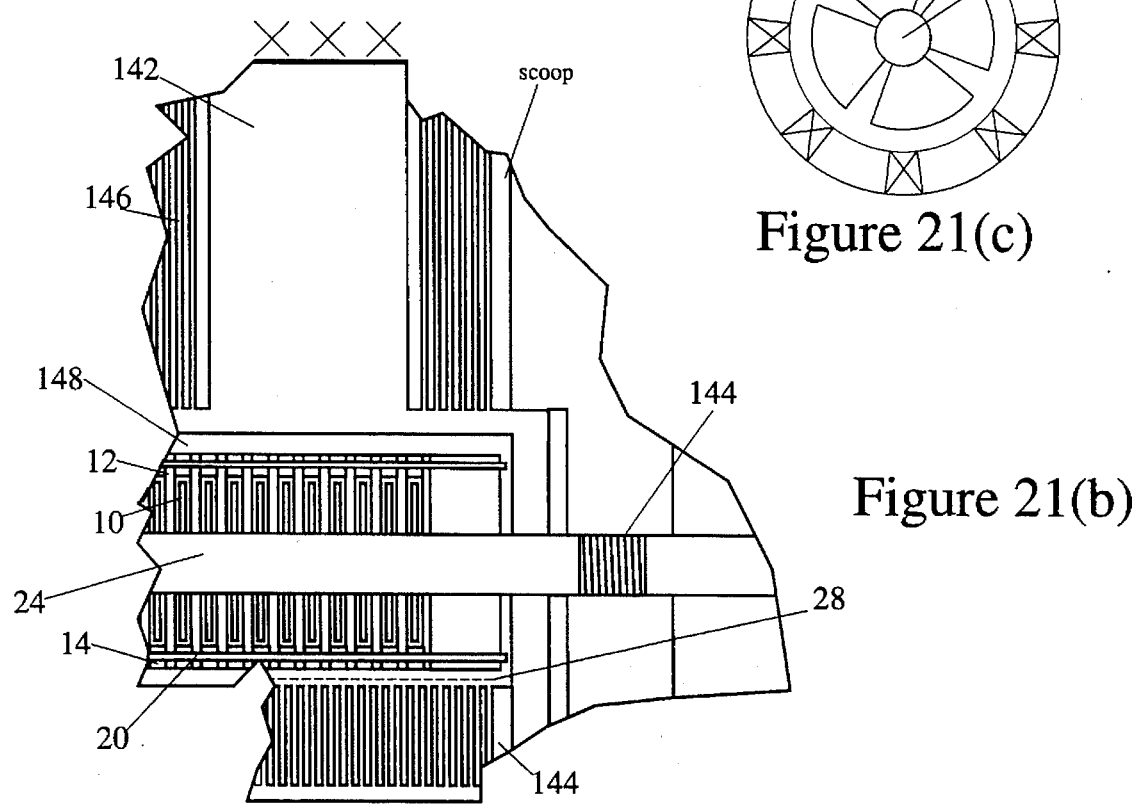
Figure 22A:
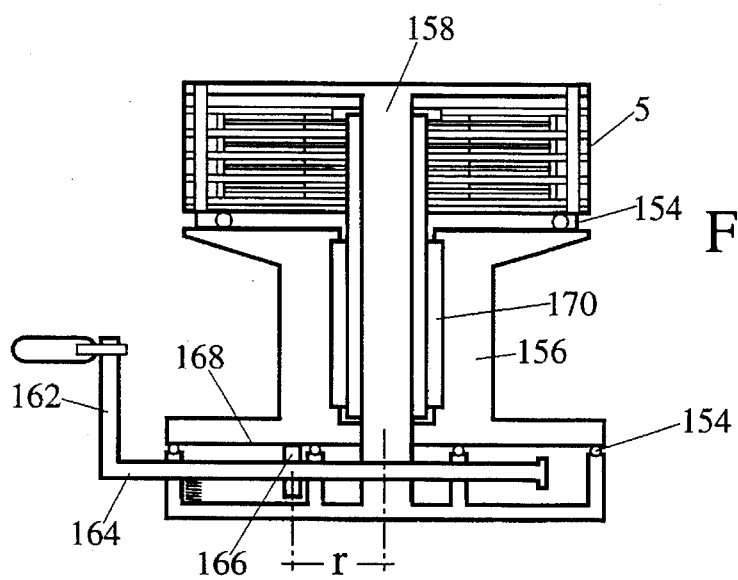
Figure 22B:
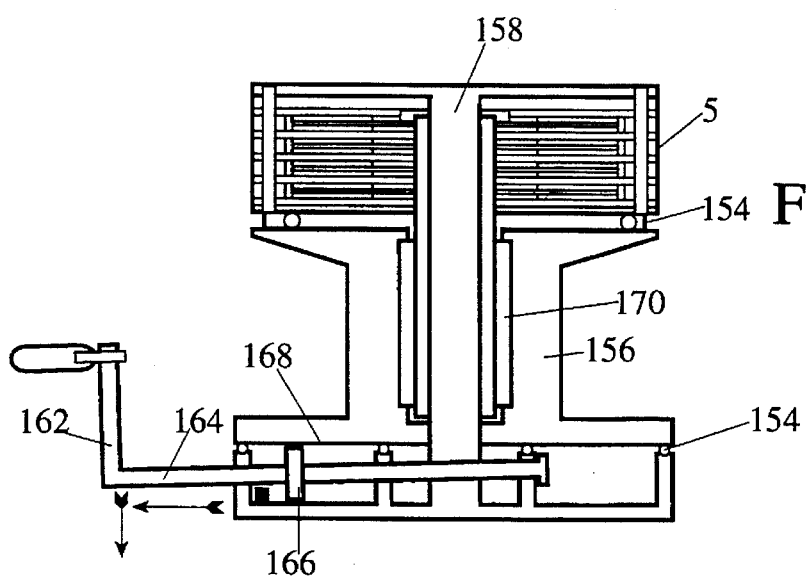
Figure 22C:
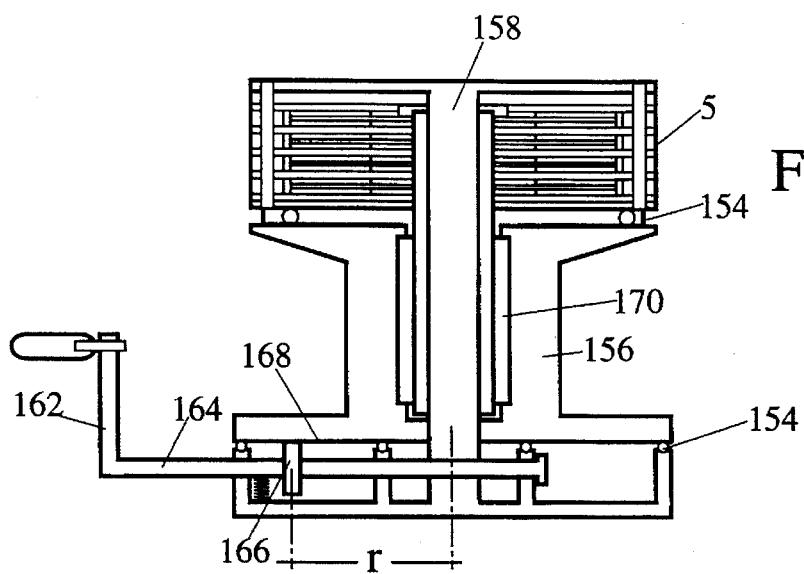
Figure 22D:
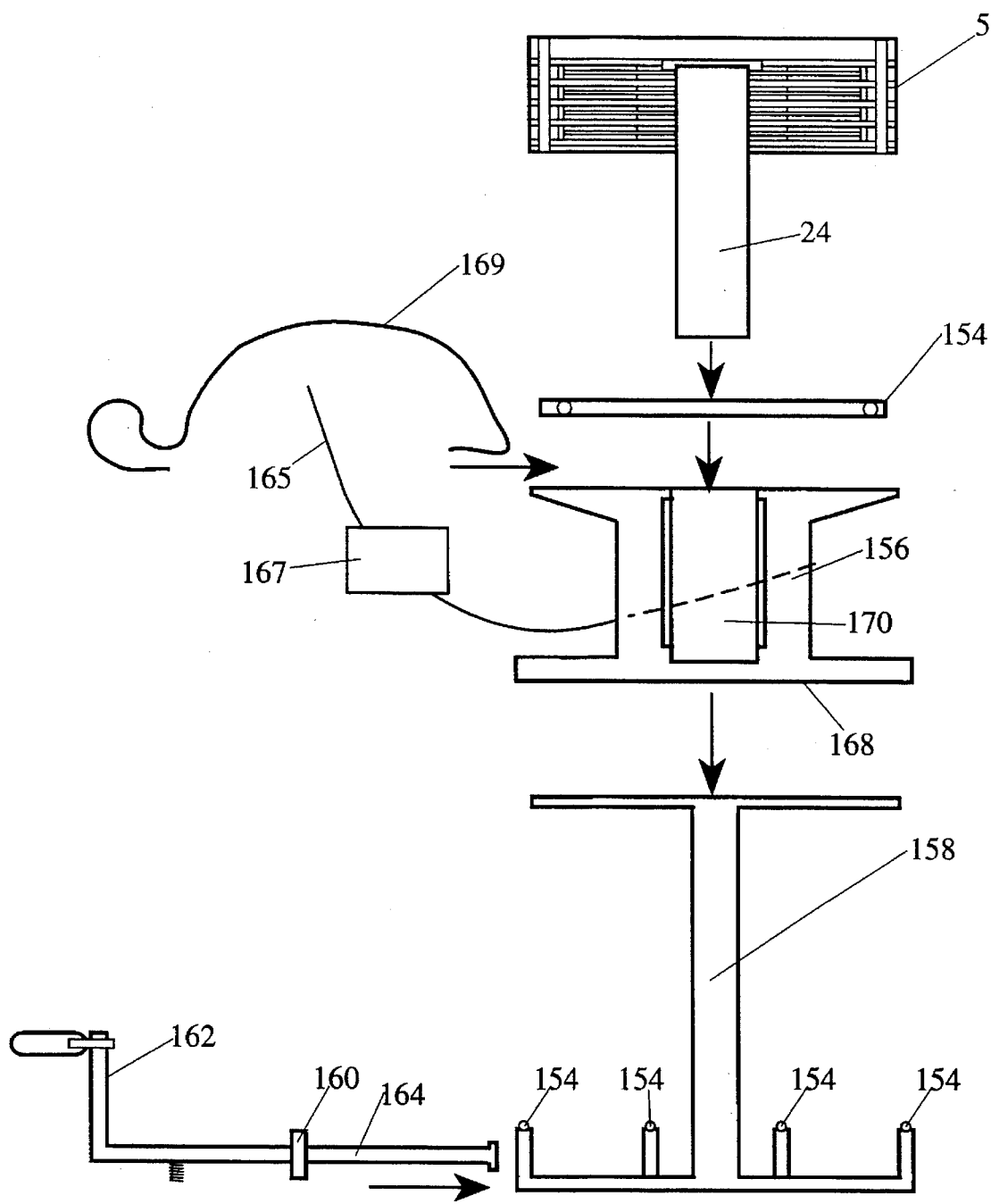
Figure 23:
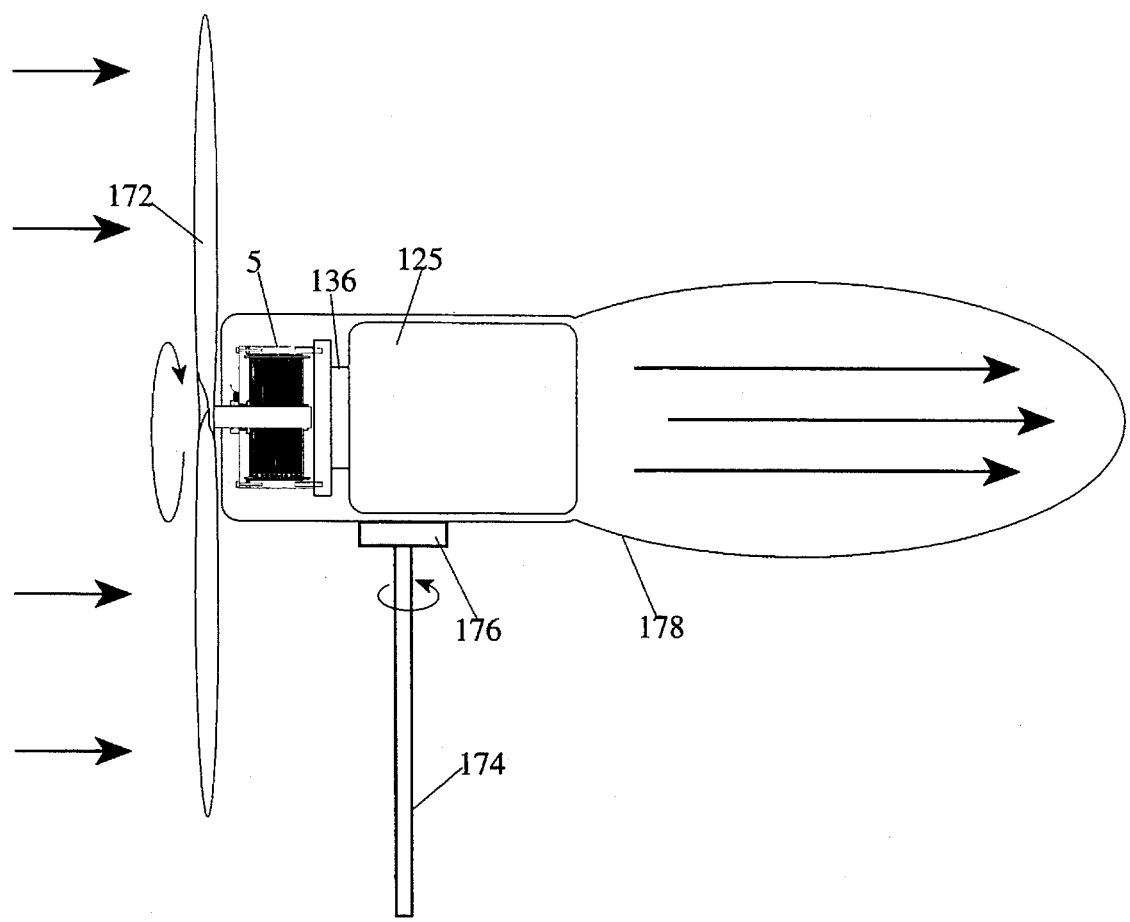
Figure 24A:
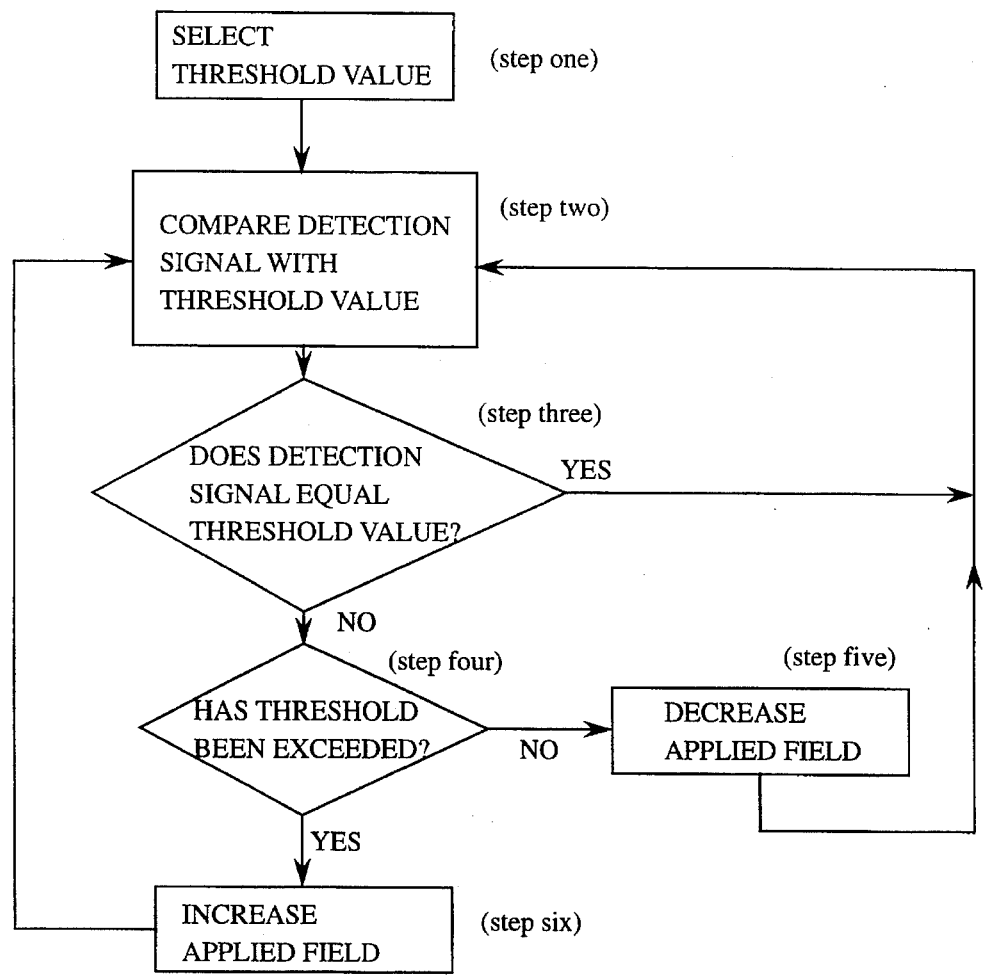
Figure 24B:
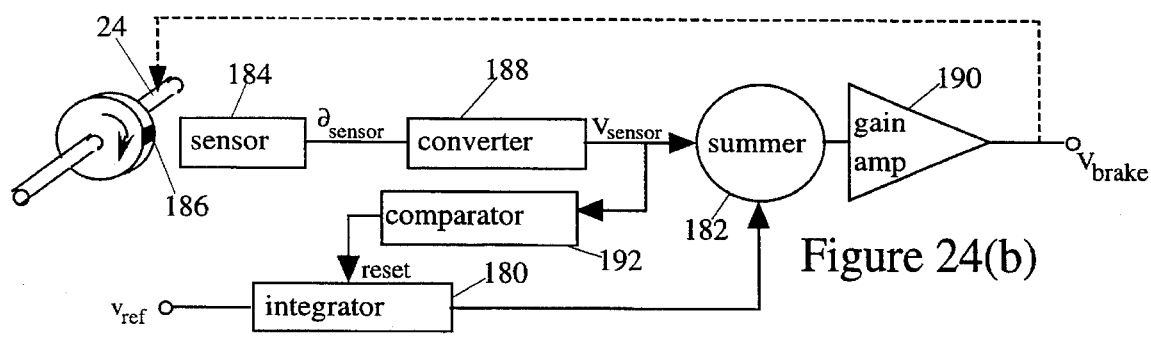
Figure 24D:
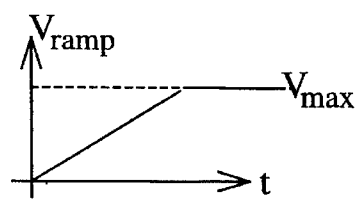
Figure 24C:
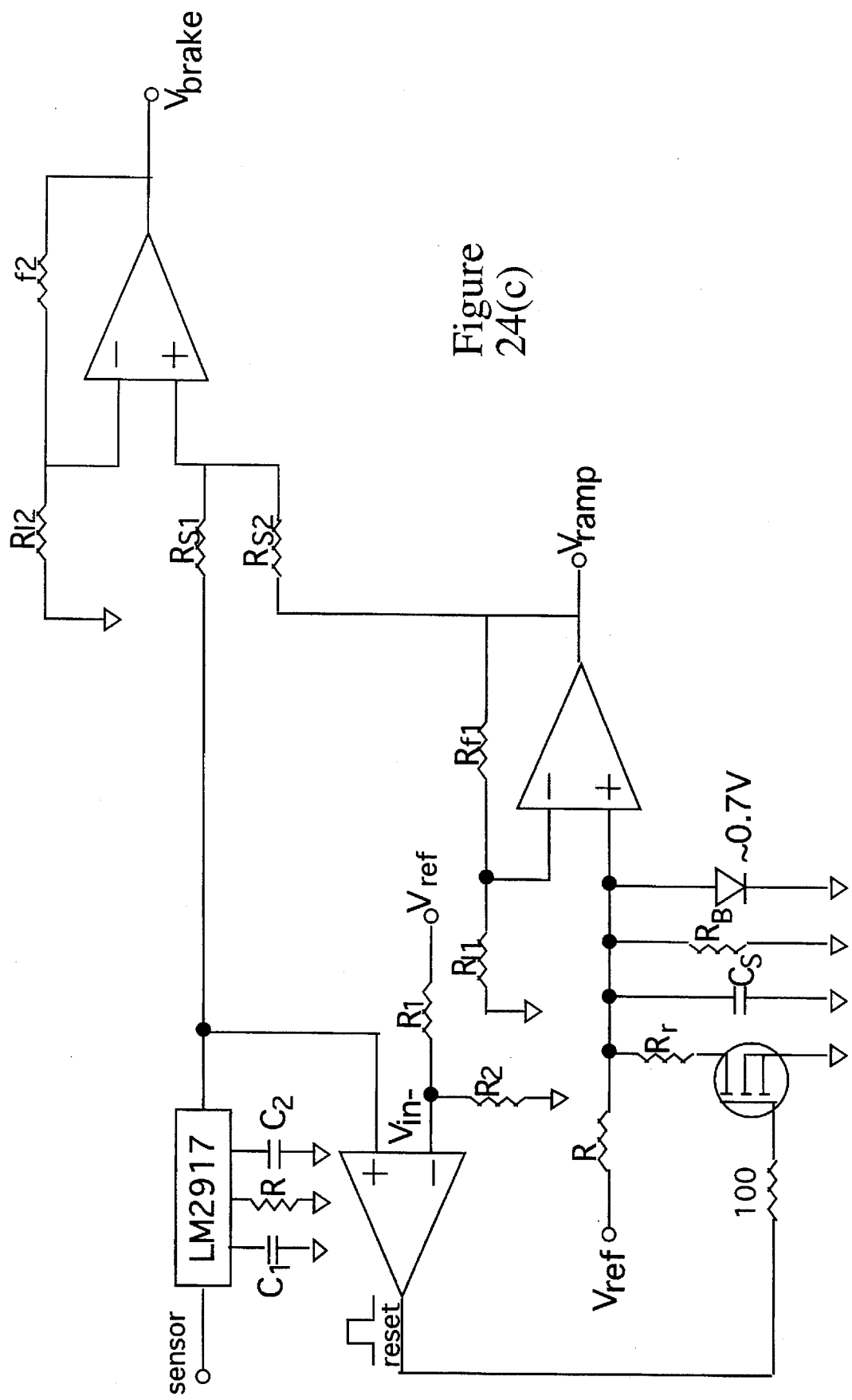
Figure 25A:
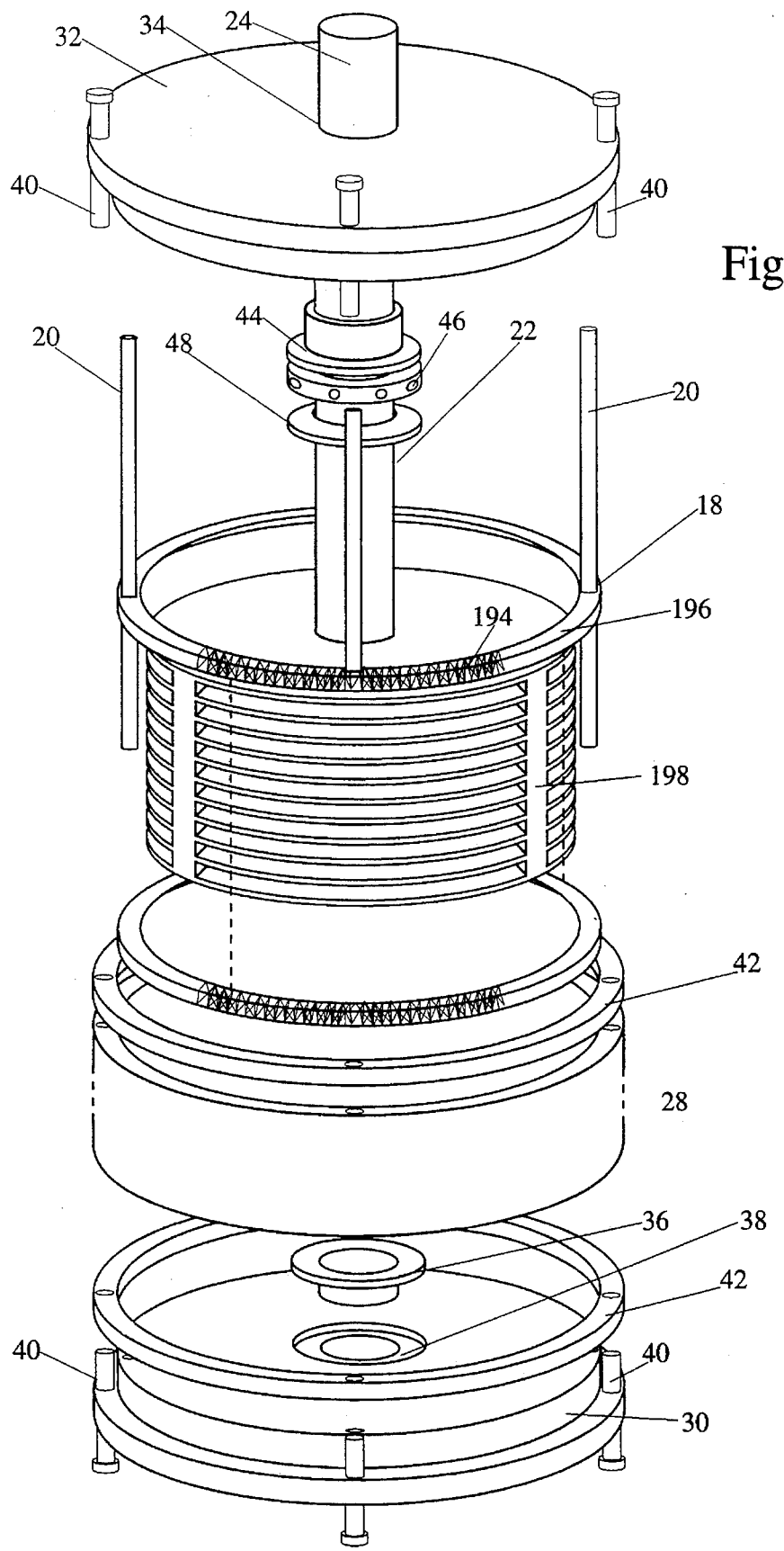
Figure 25B:
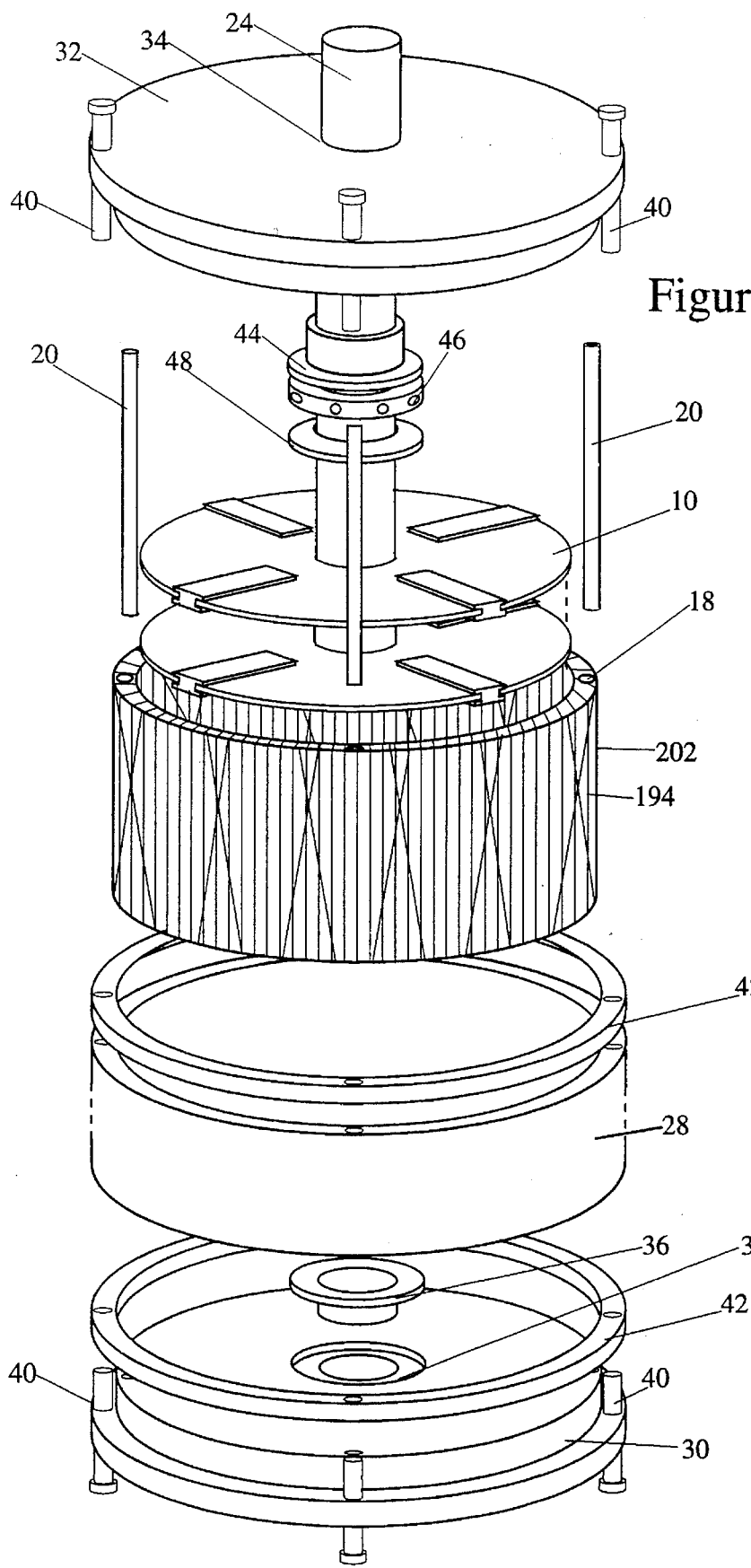
Figure 26:
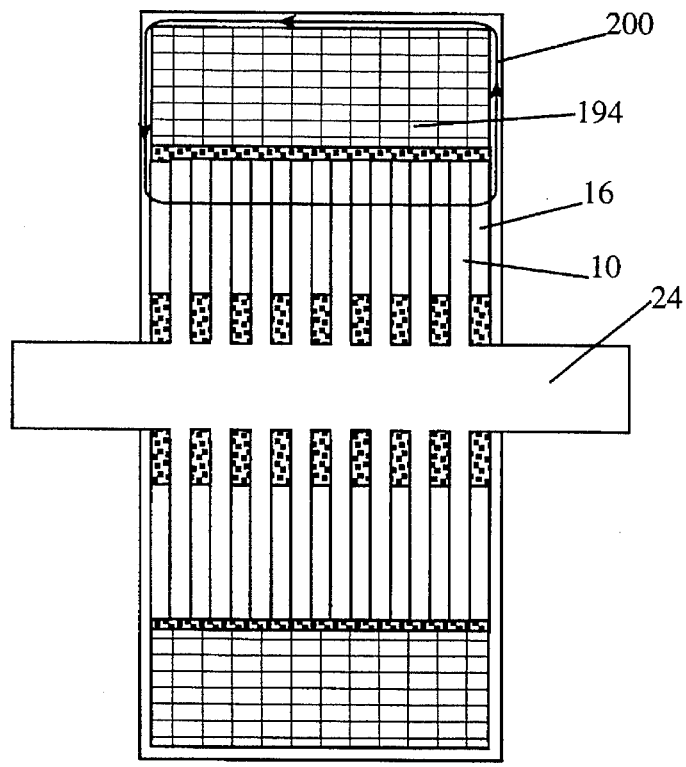
Figure 27:
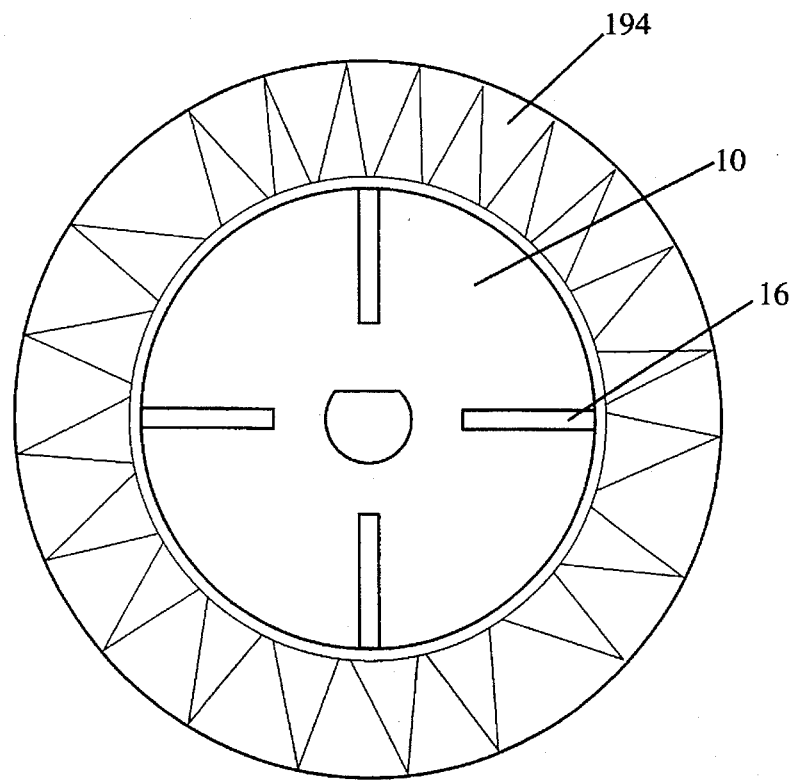
Figures 29A, 29B, 29C:
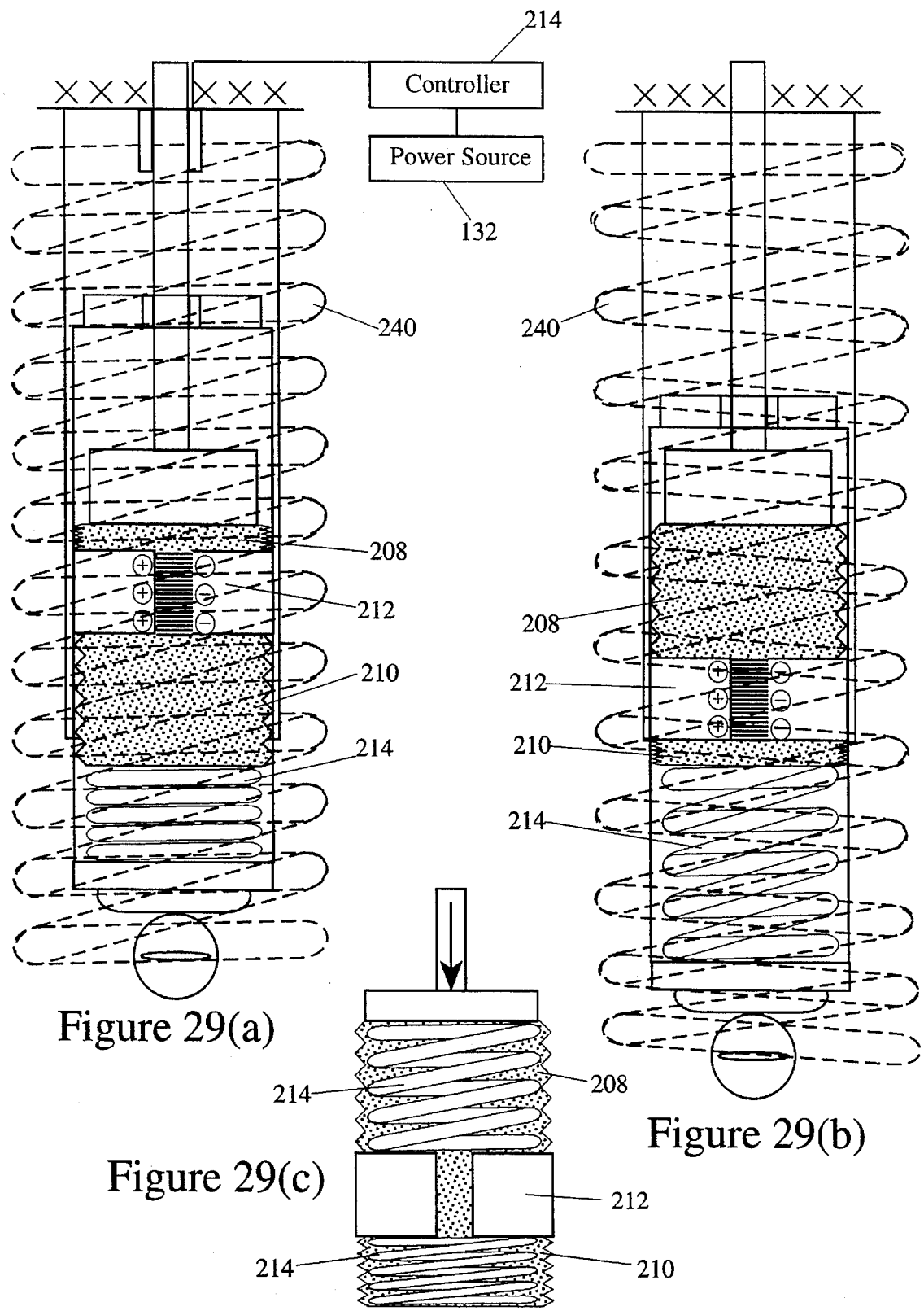
Figures 30A, 30B, 30C:
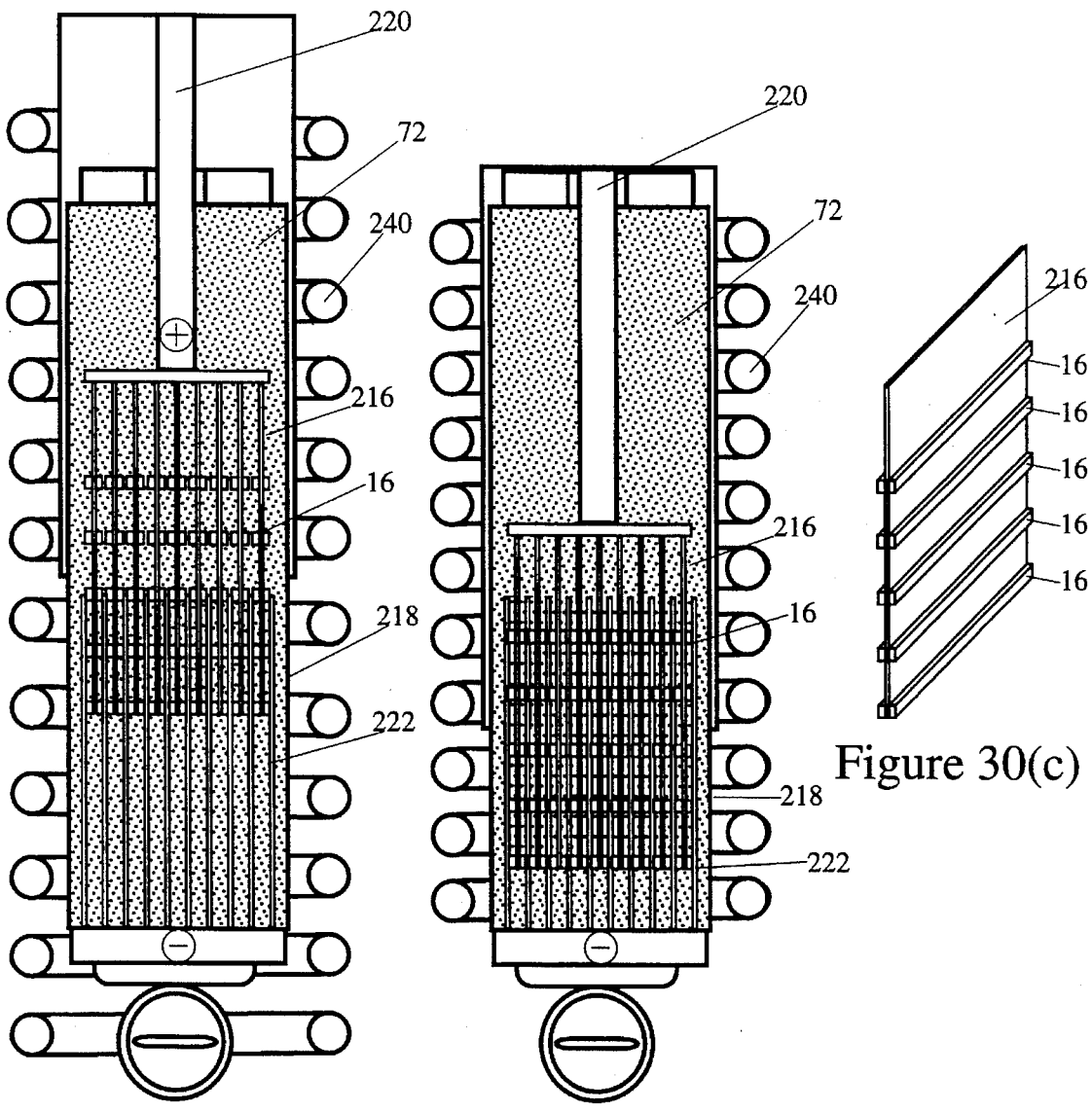
Figure 31D:
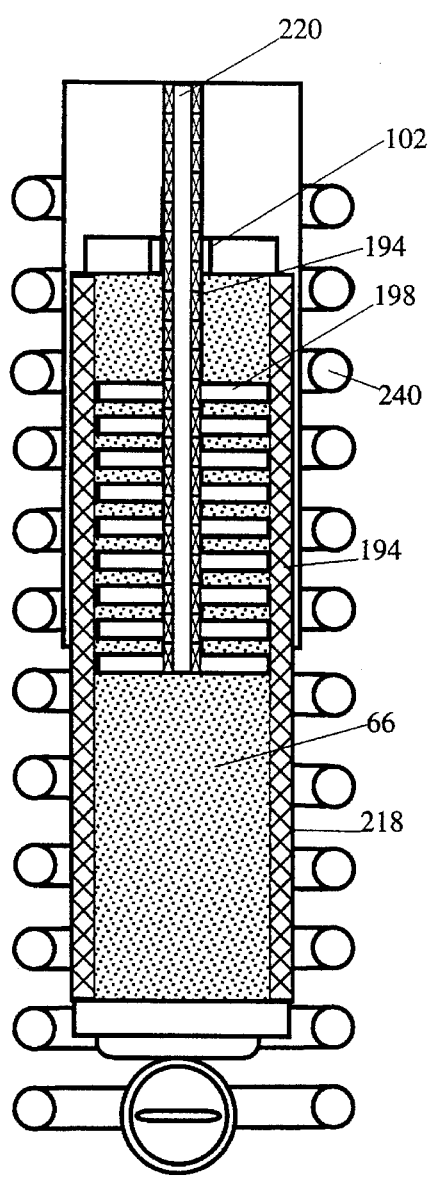
Figure 31E:
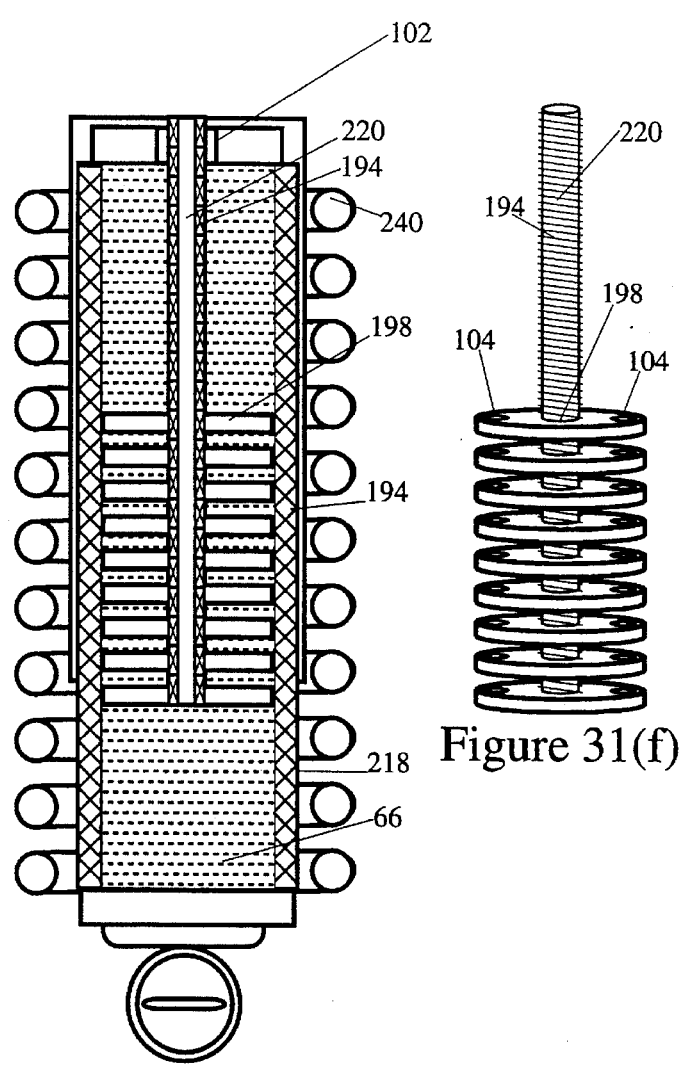
Figure 31F:
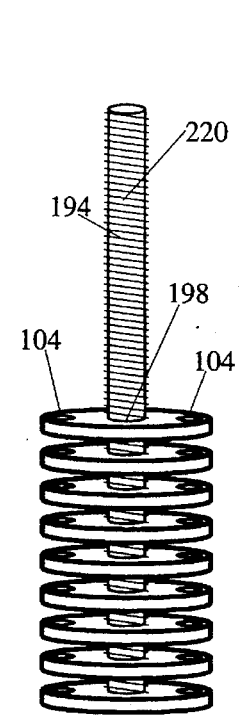
Figure 32A:
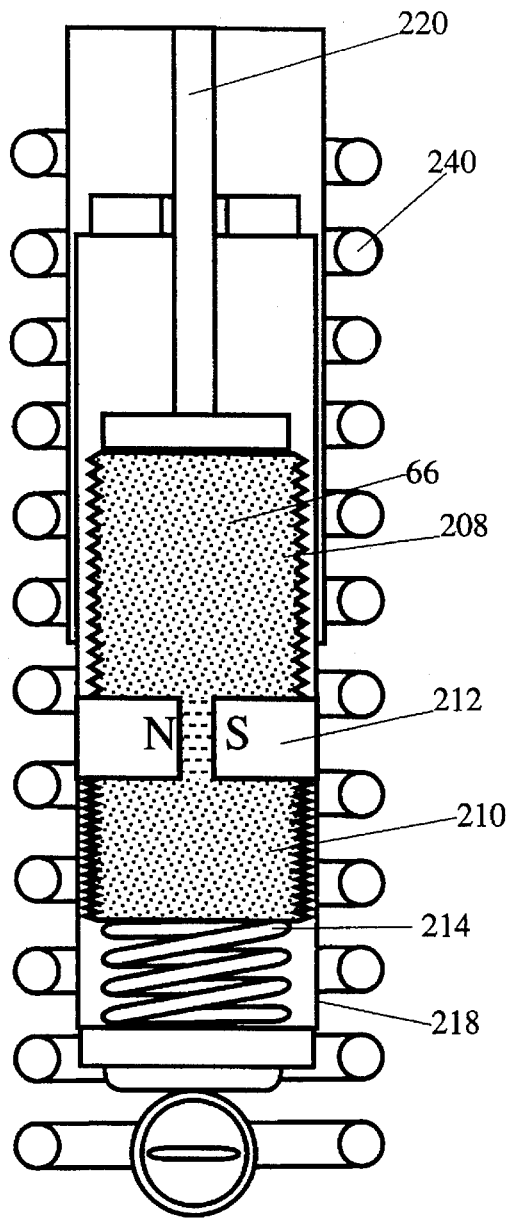
Figure 32B:
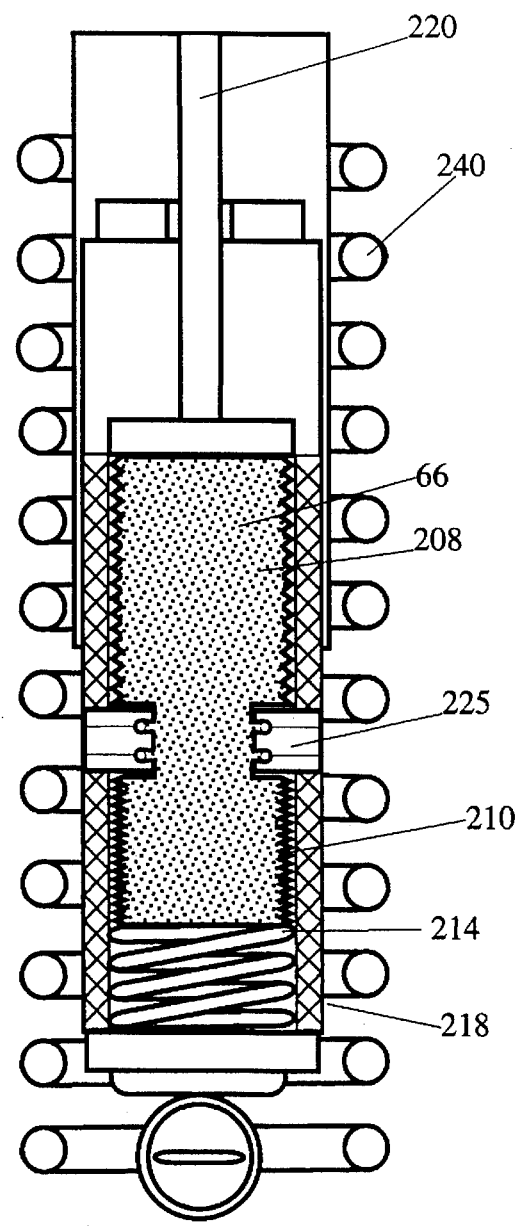
Figure 33A:
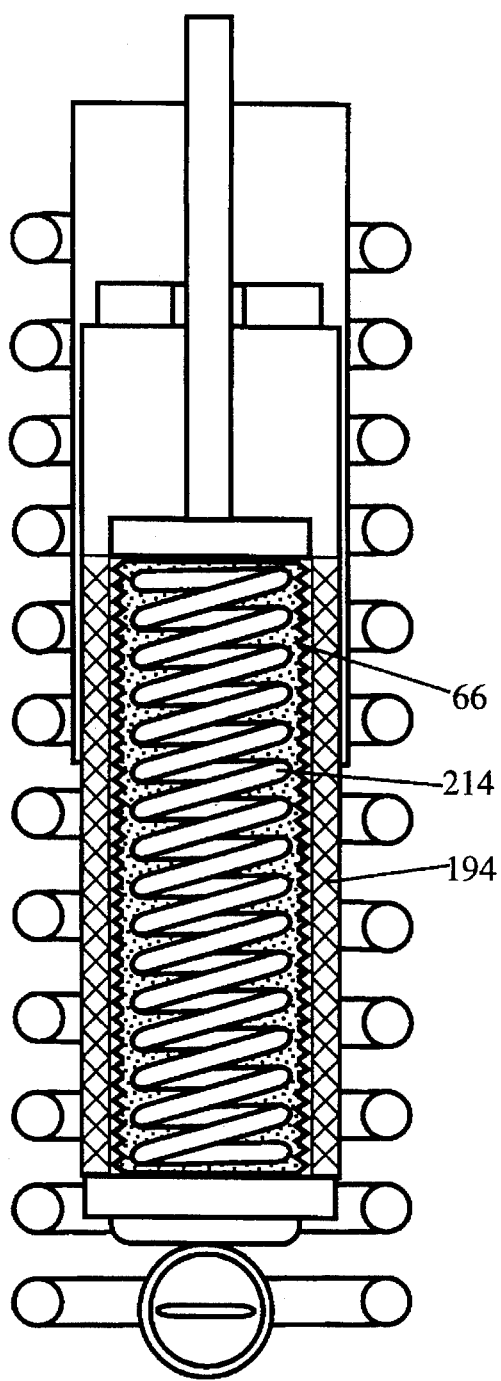
Figure 33B:
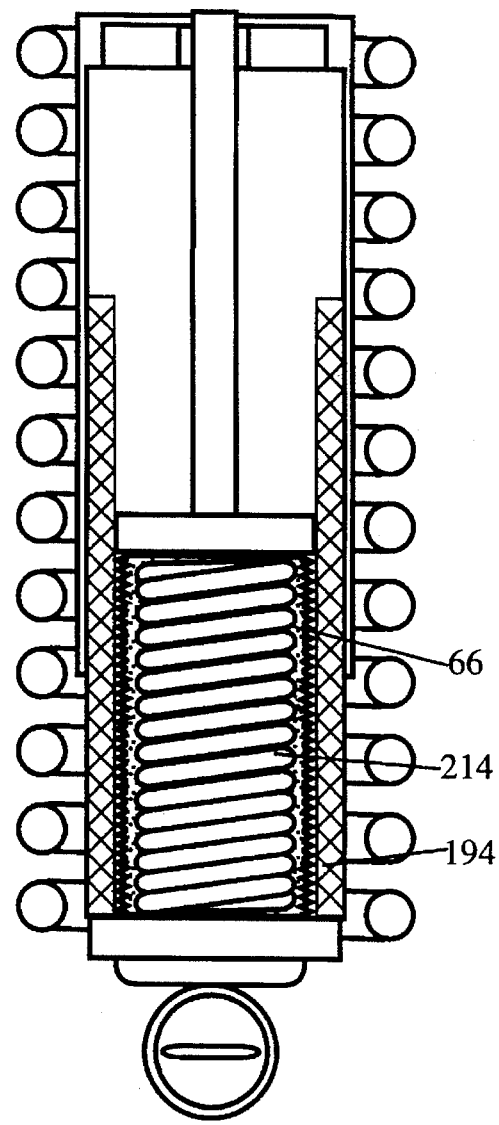
Figure 34A:
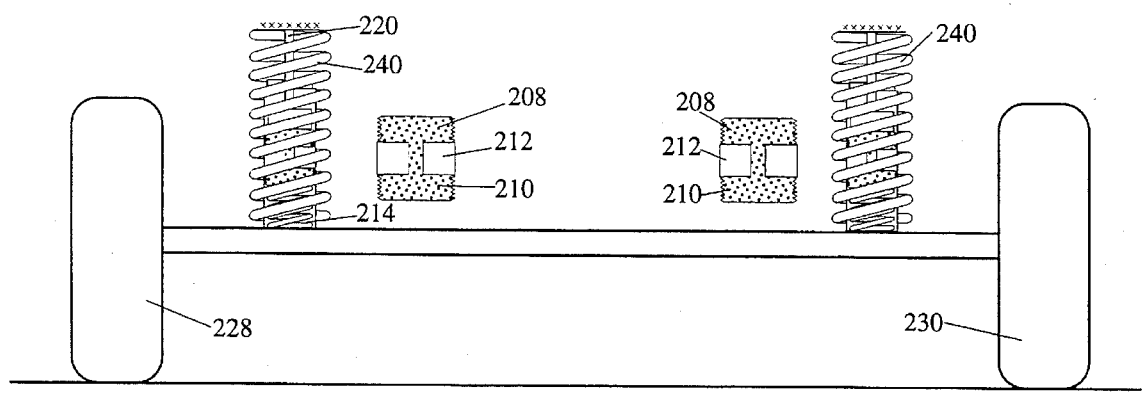
Figure 34B:
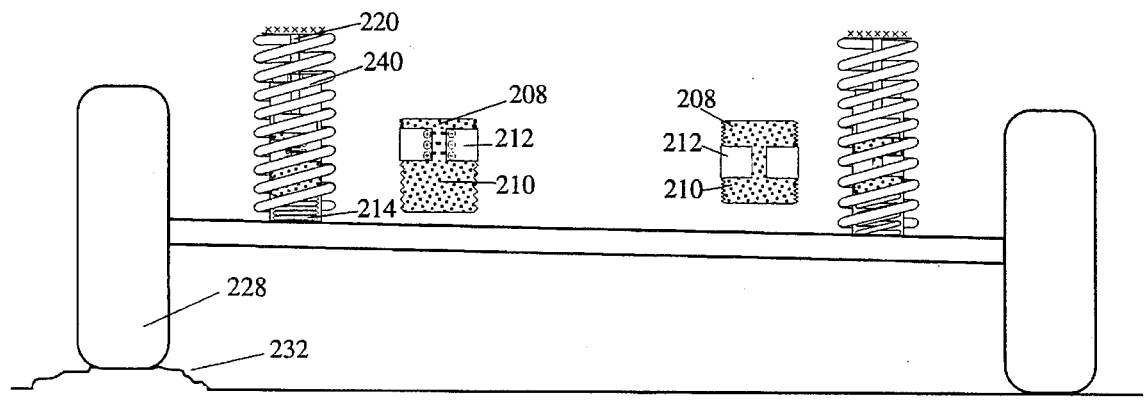
Figure 34C:
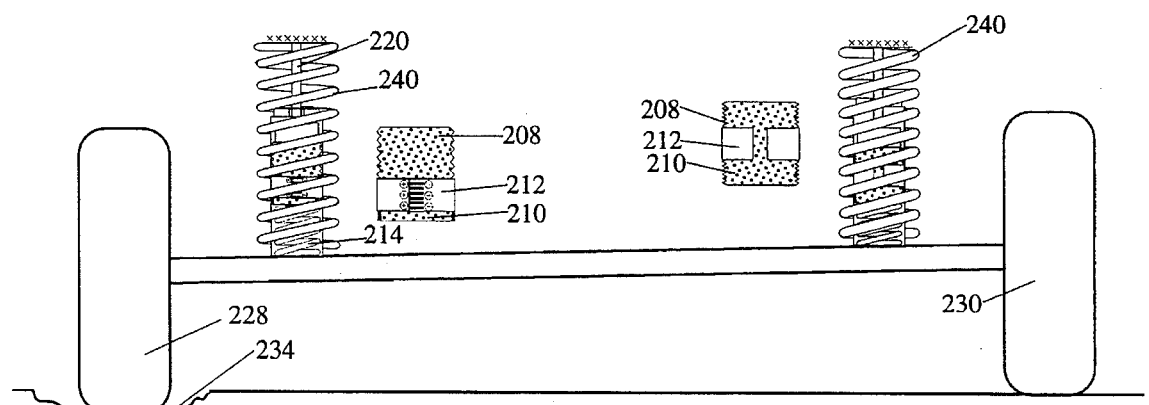
Figure 35A:
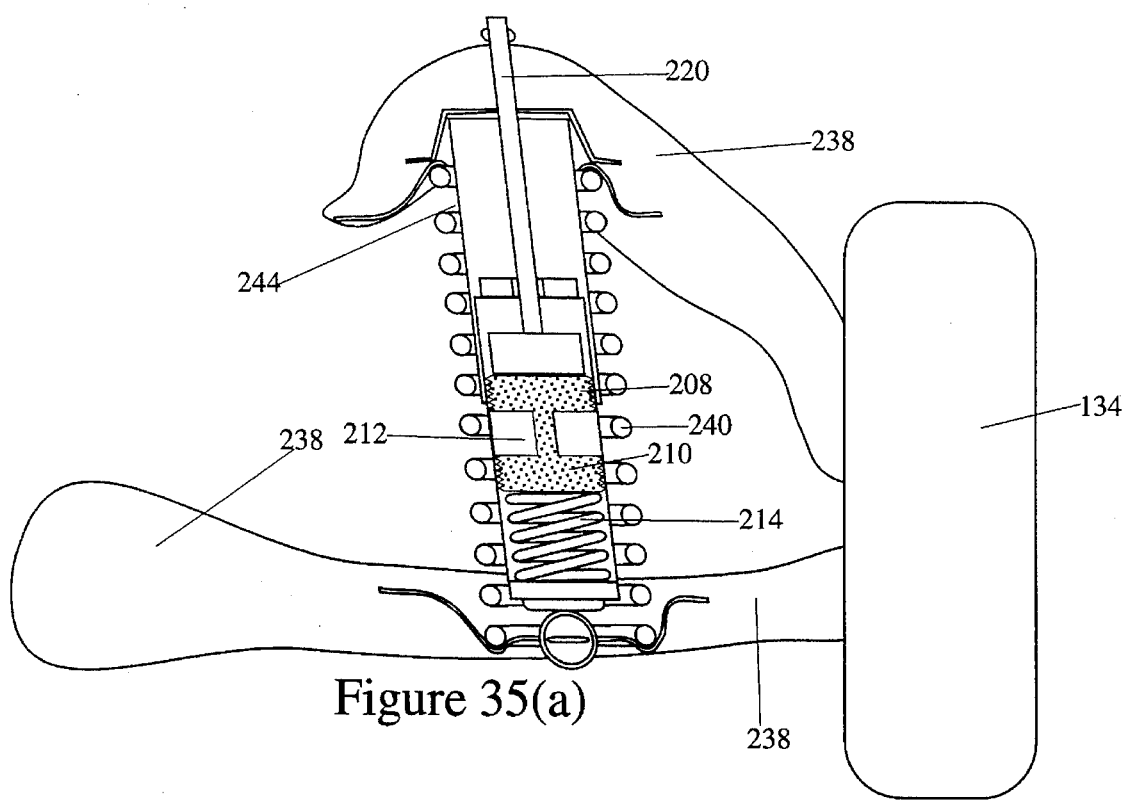
Figure 35B:
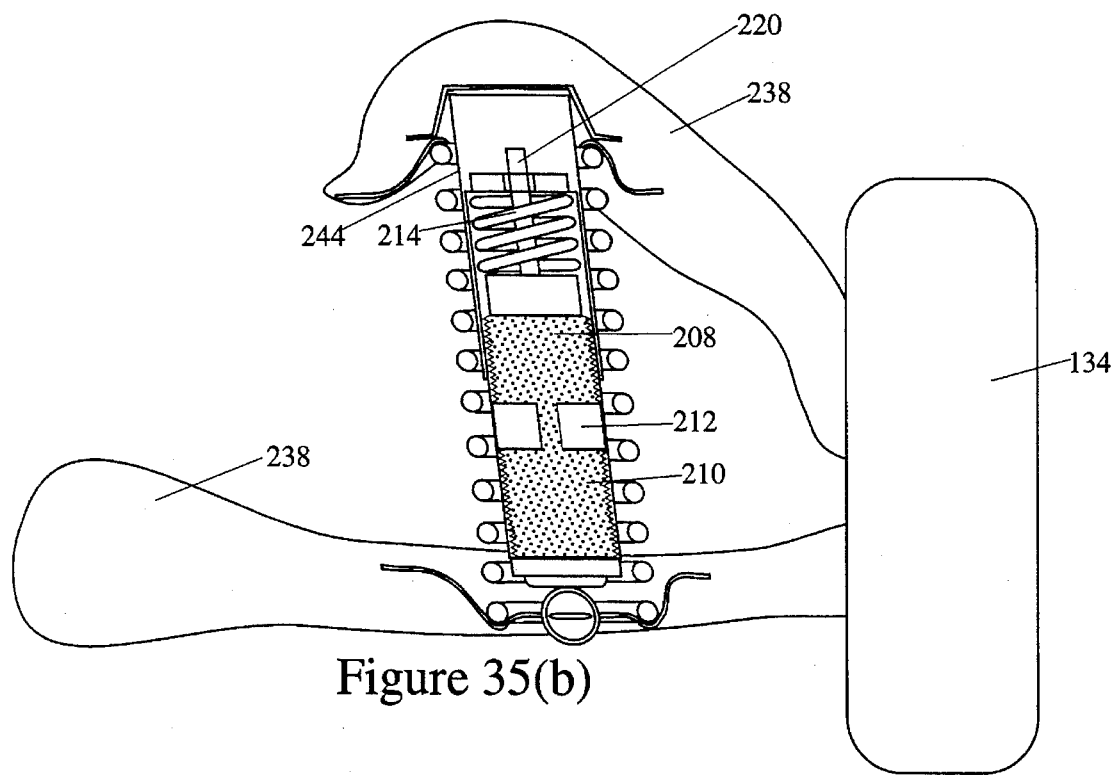
Figure 36A:
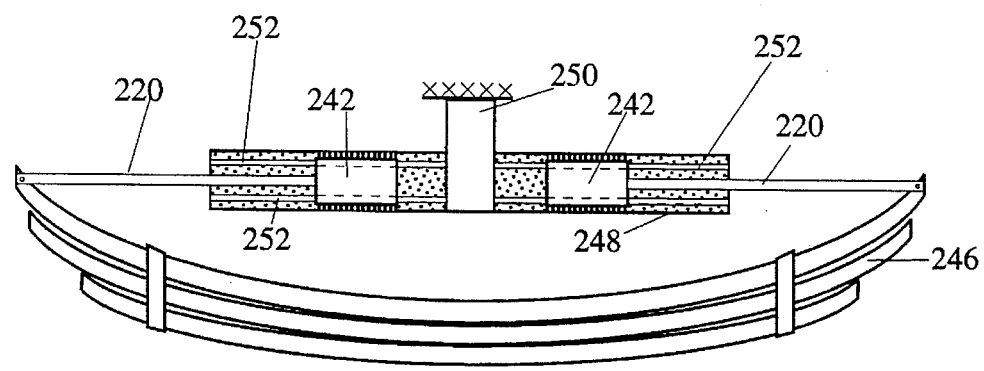
Figure 36B:
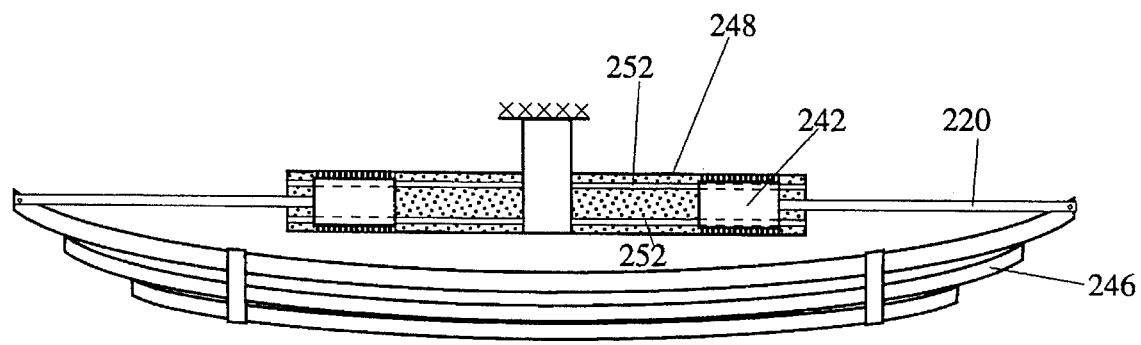
Figure 37A:
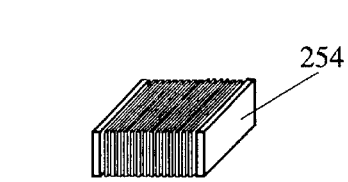
Figure 37B:
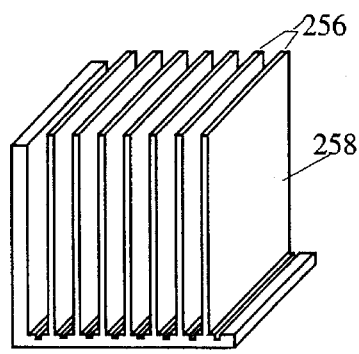
Figure 37C:
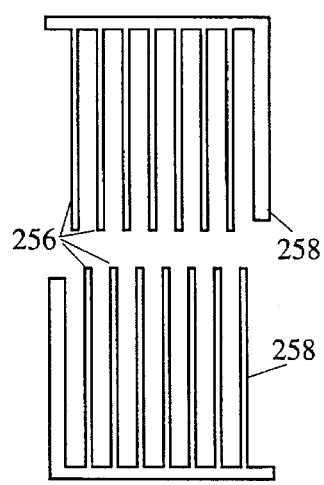
Figure 37D:
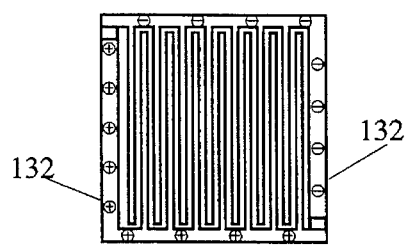
Figure 38A:
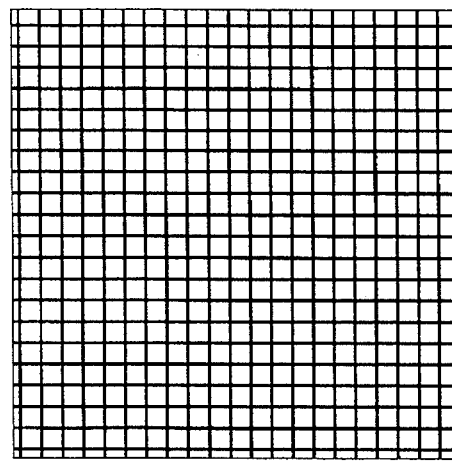
Figure 38B:
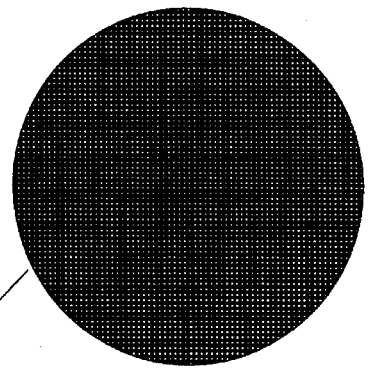
Figure 38D:
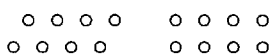
Figure 38C:
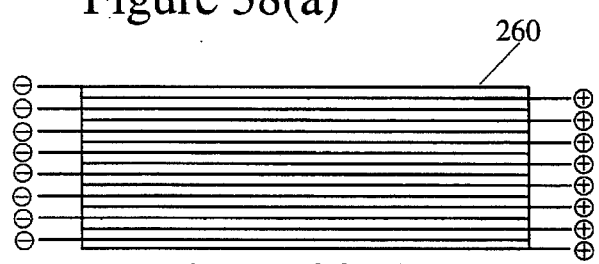
Figure 38E:
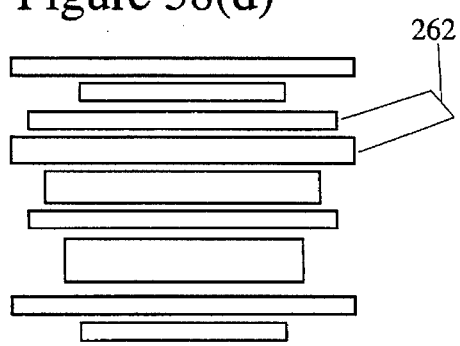
Figure 39A:
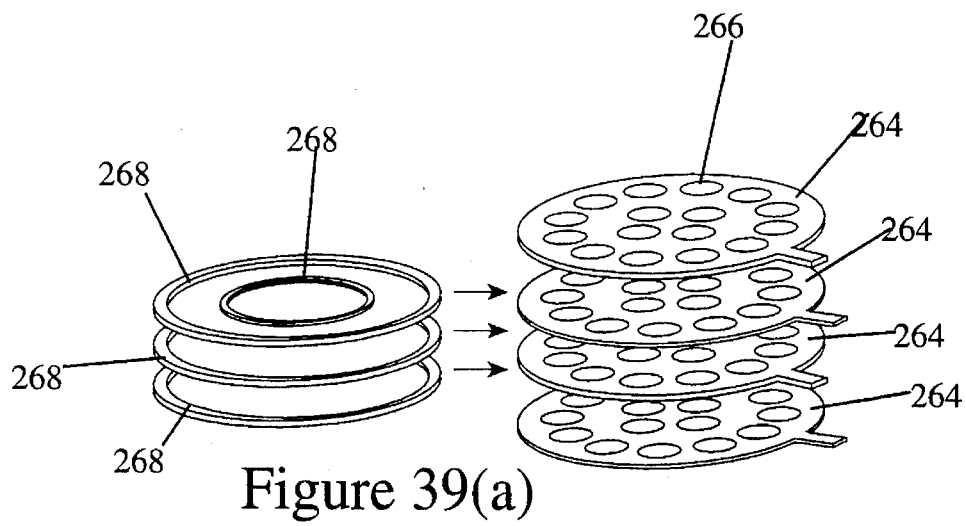
Figure 39B:
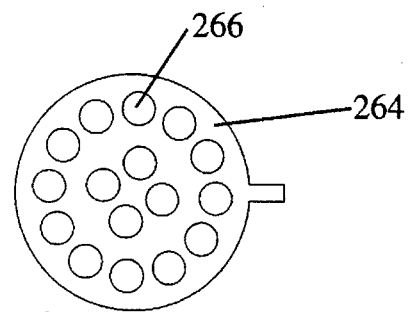
Figure 39C:
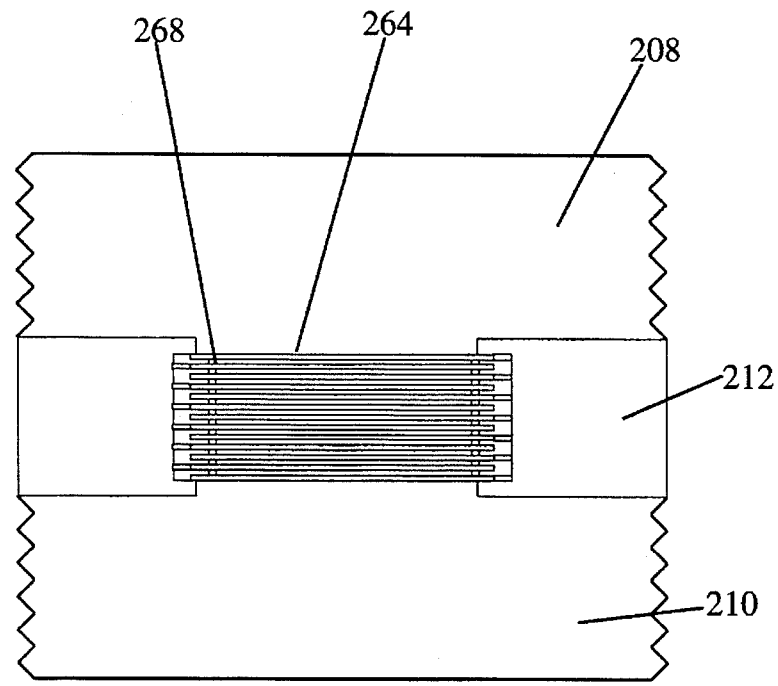
Figure 42A:
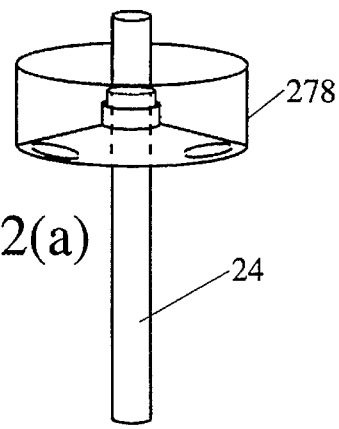
Figure 42B:
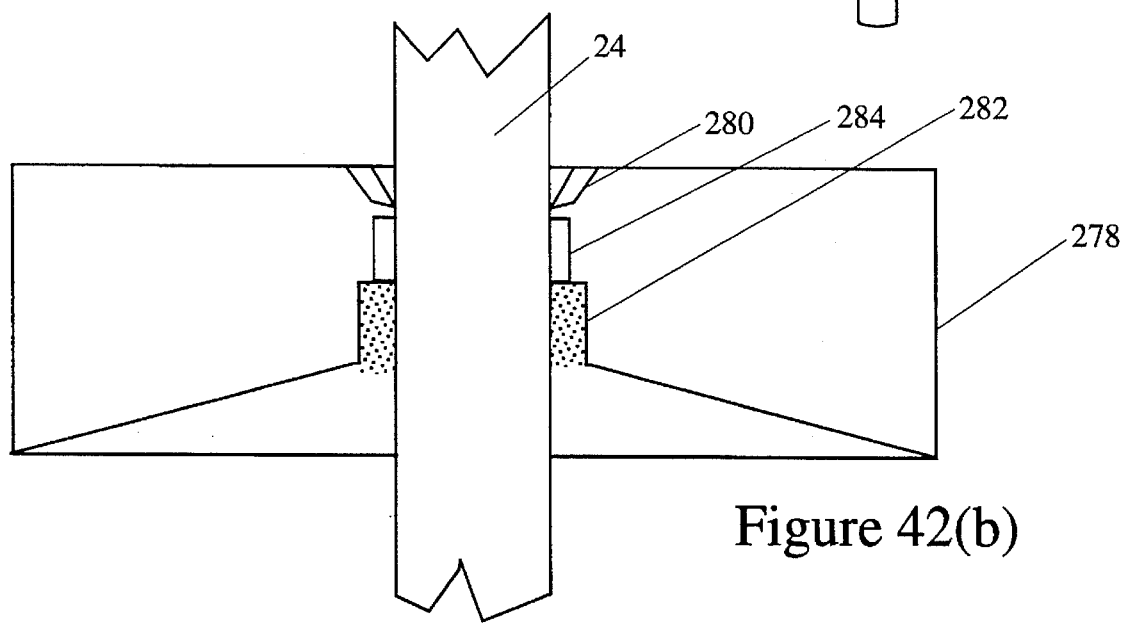
Figure 42C:
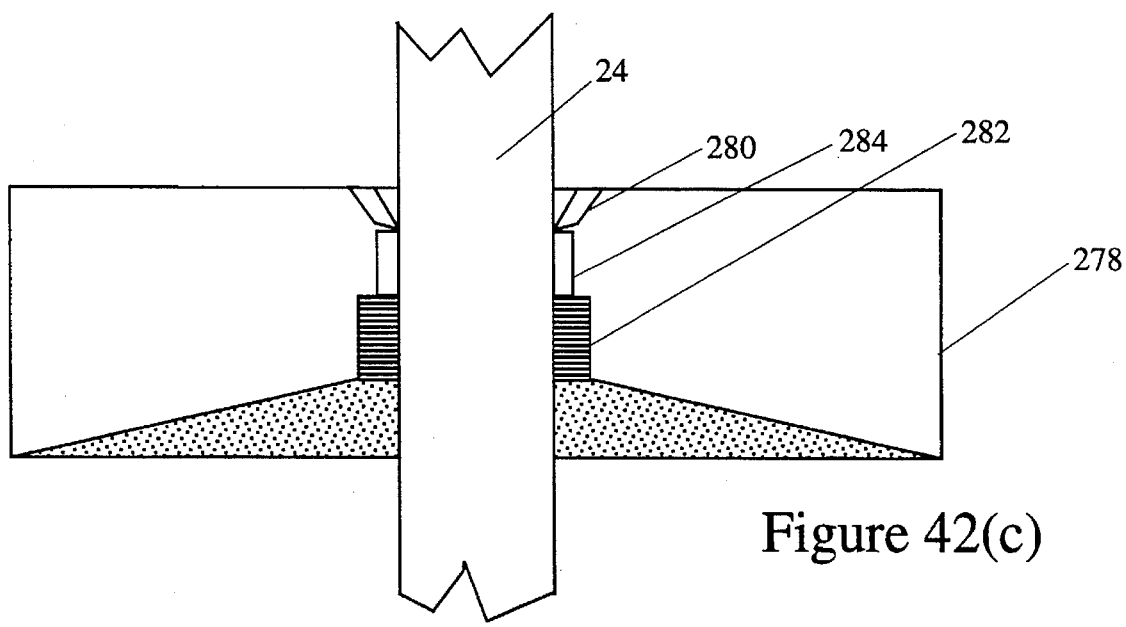
Figure 43A:
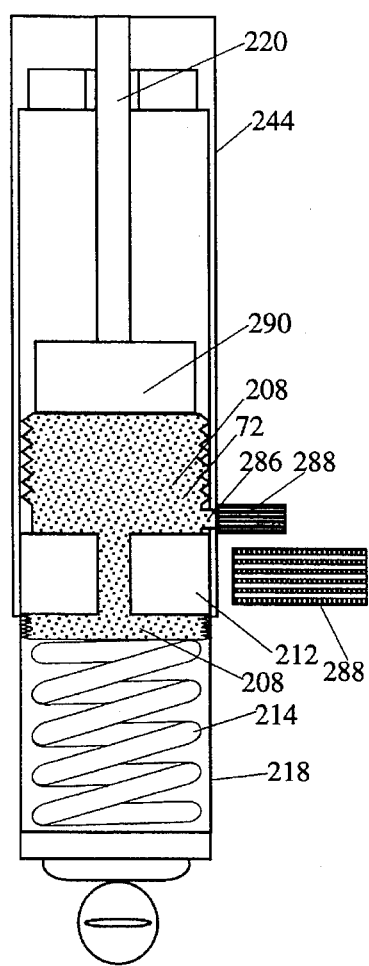
Figure 43B:
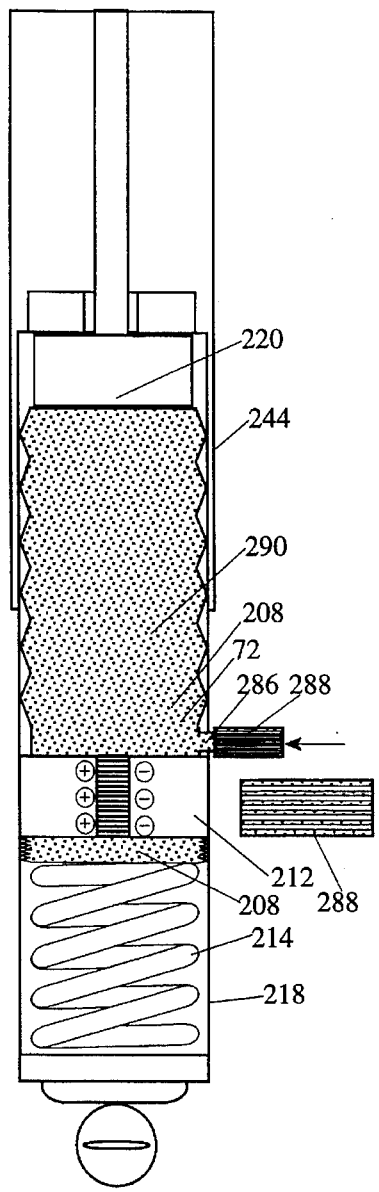
Figure 43C:
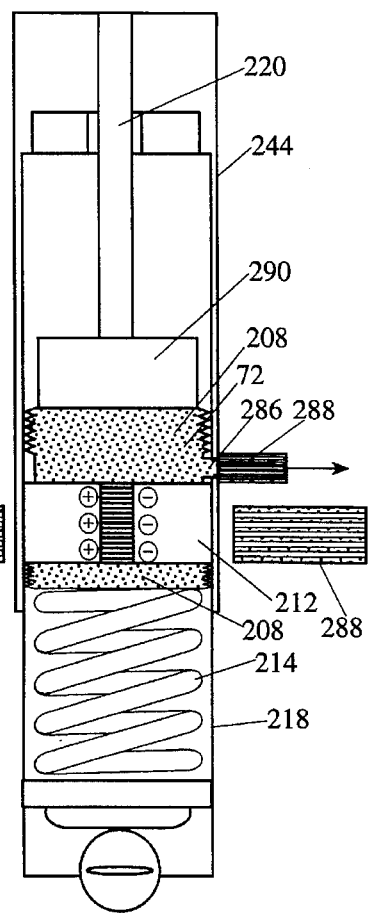
Figure 44A:
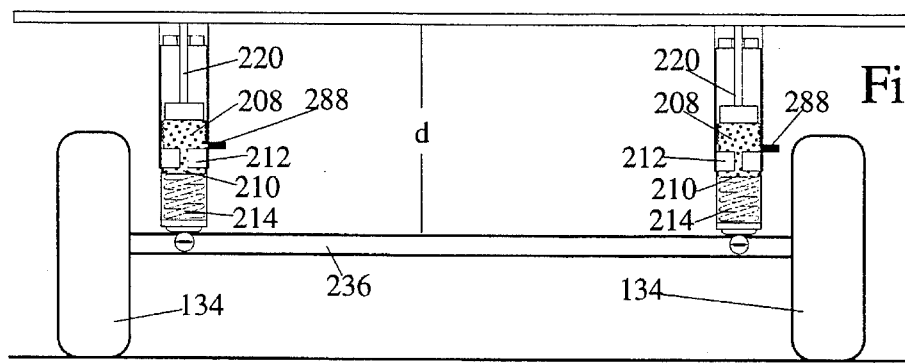
Figure 44B:
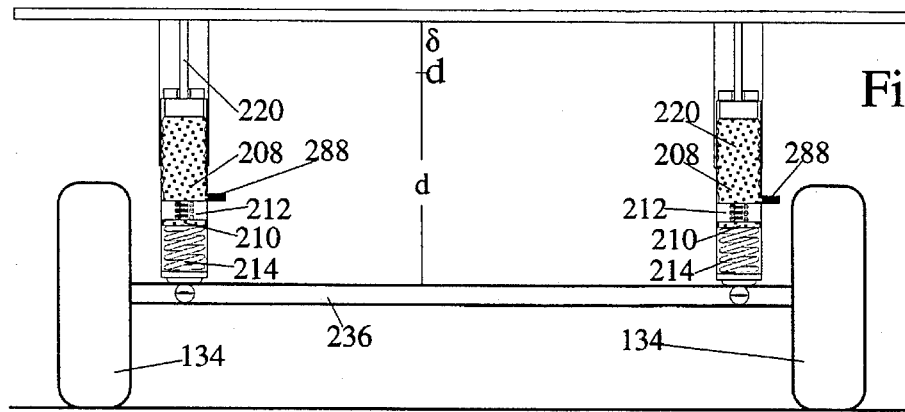
Figure 44C:
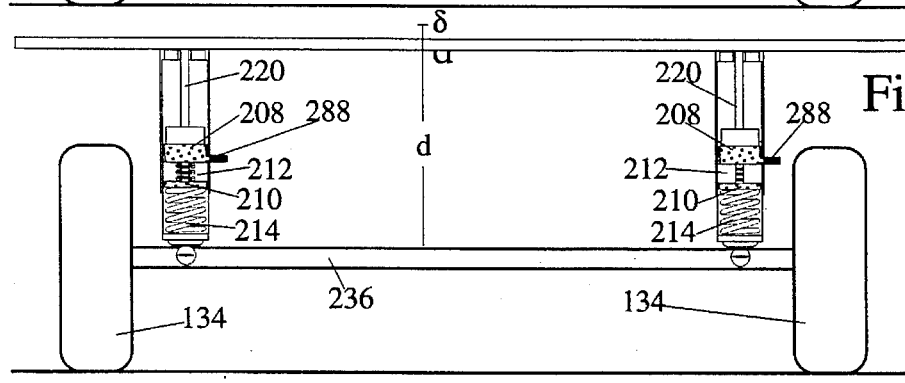
Figure 44D:
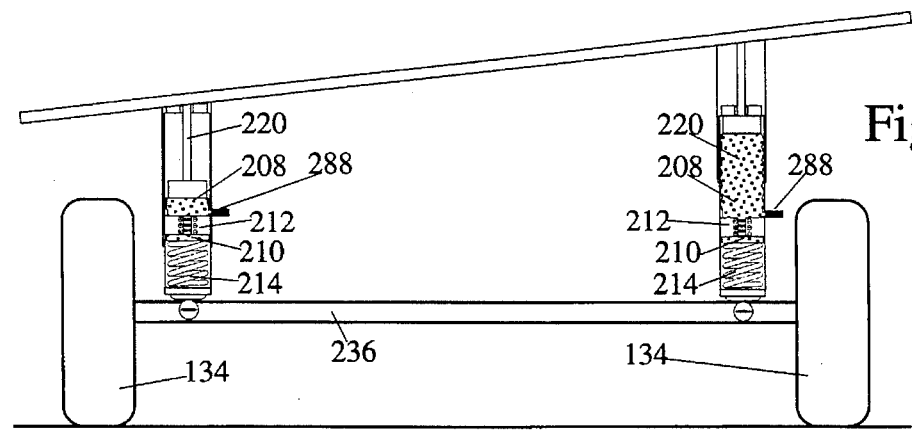
Figure 45:
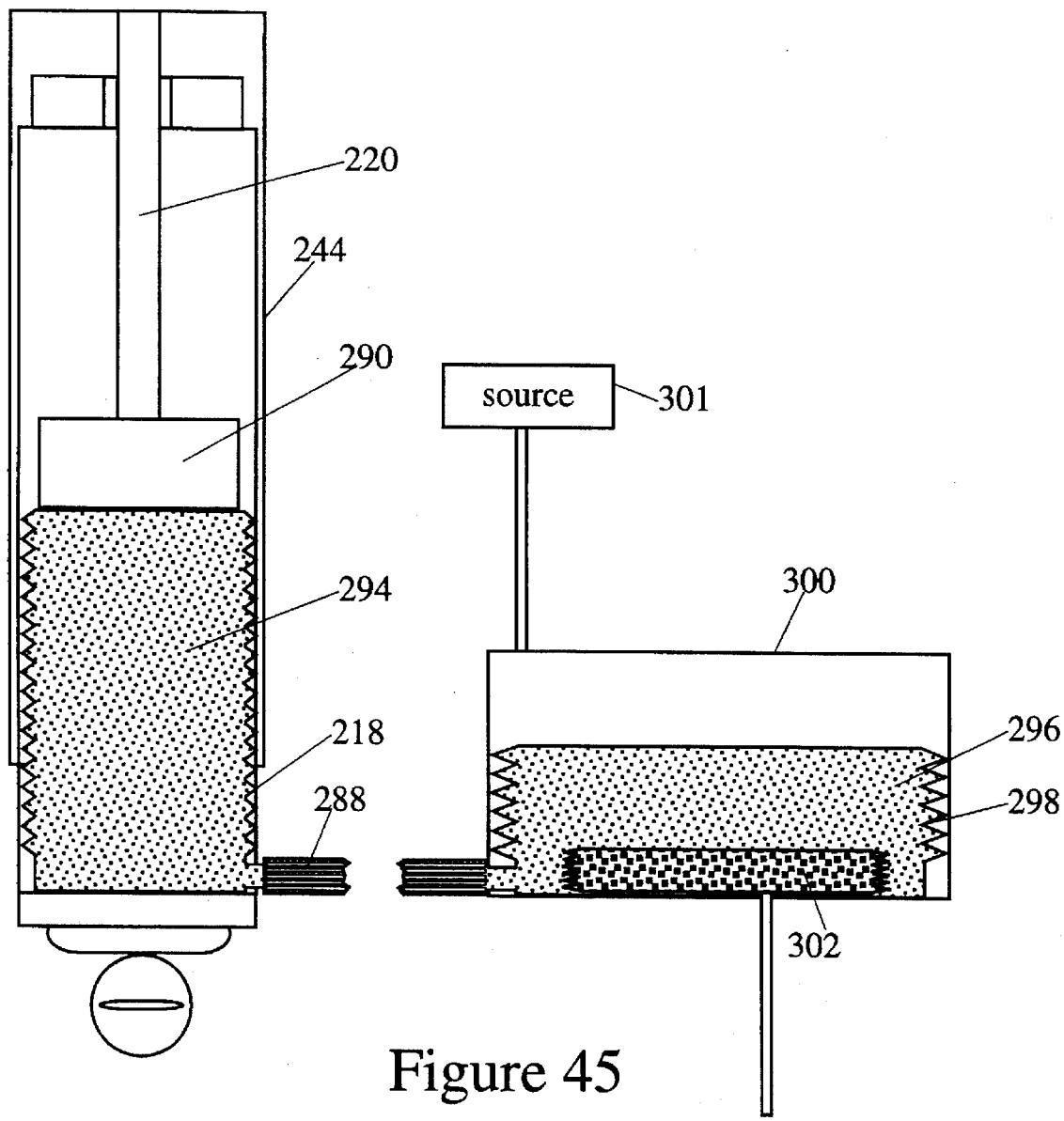
Figures 46A, 46B:
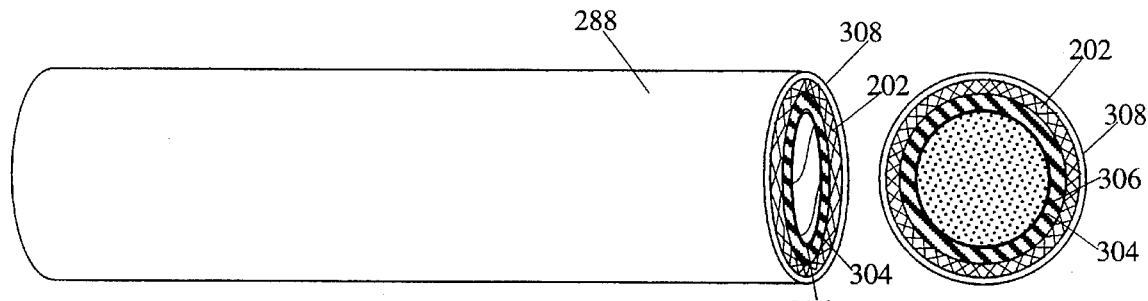
Figure 46C:
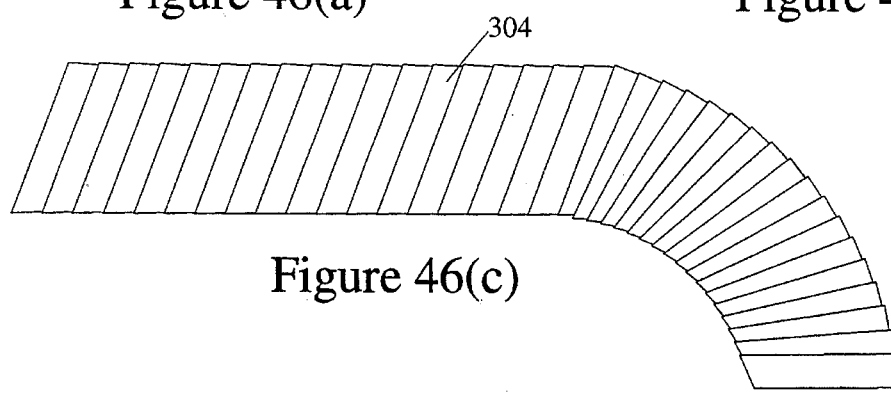
Figures 46D, 46E, 46H:
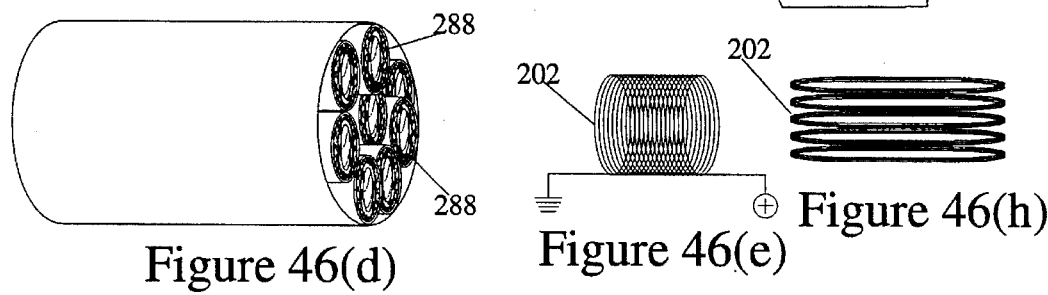
Figures 46F, 46G:
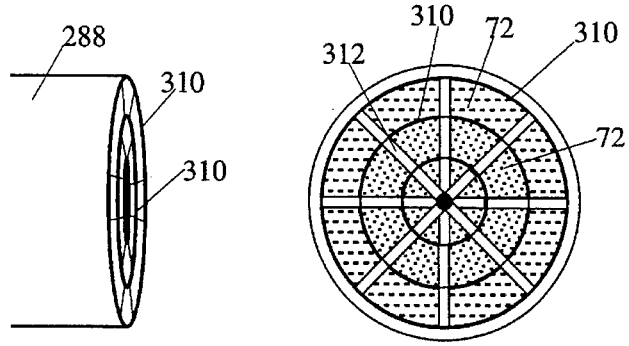
Figure 47:
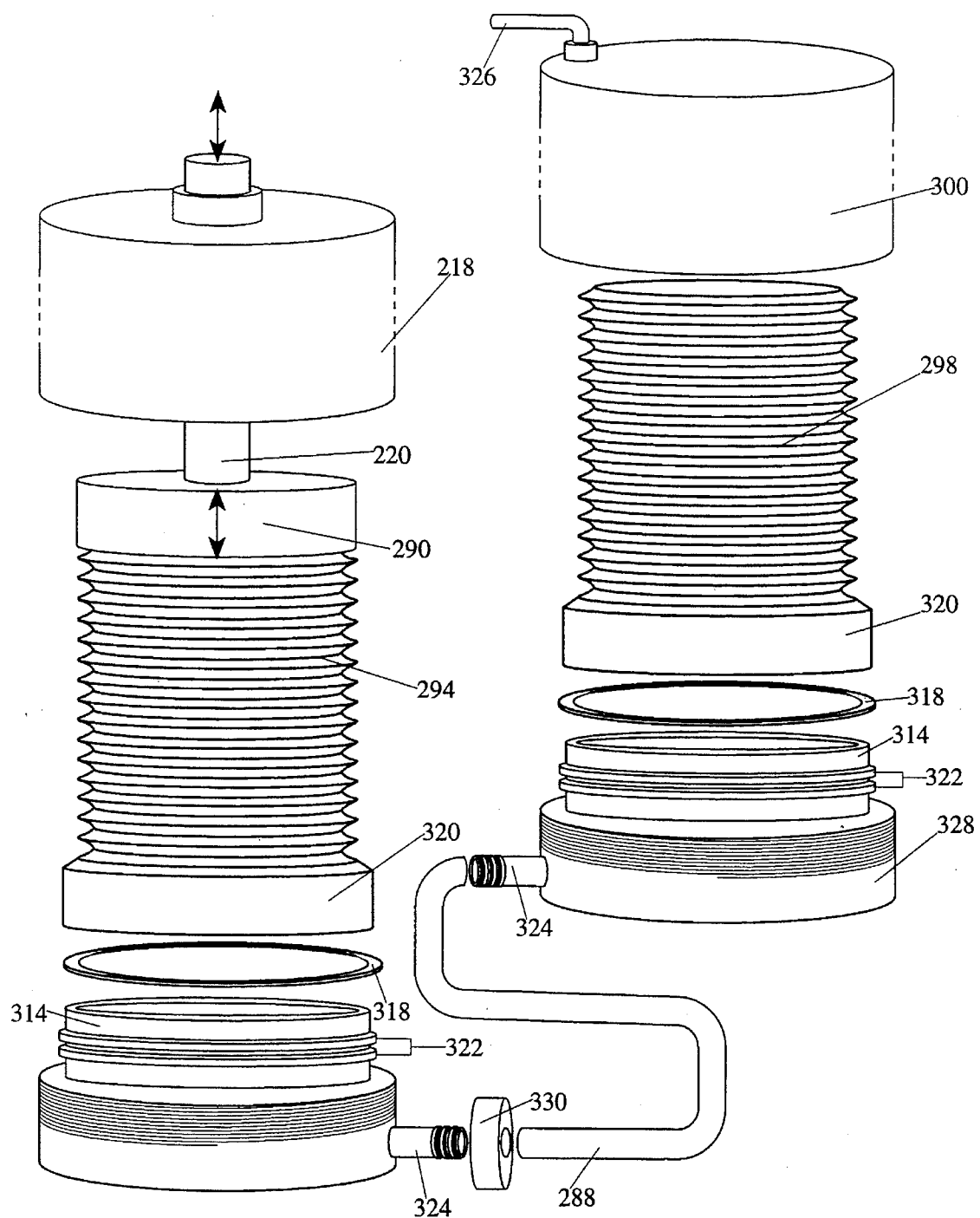
Figure 48A:
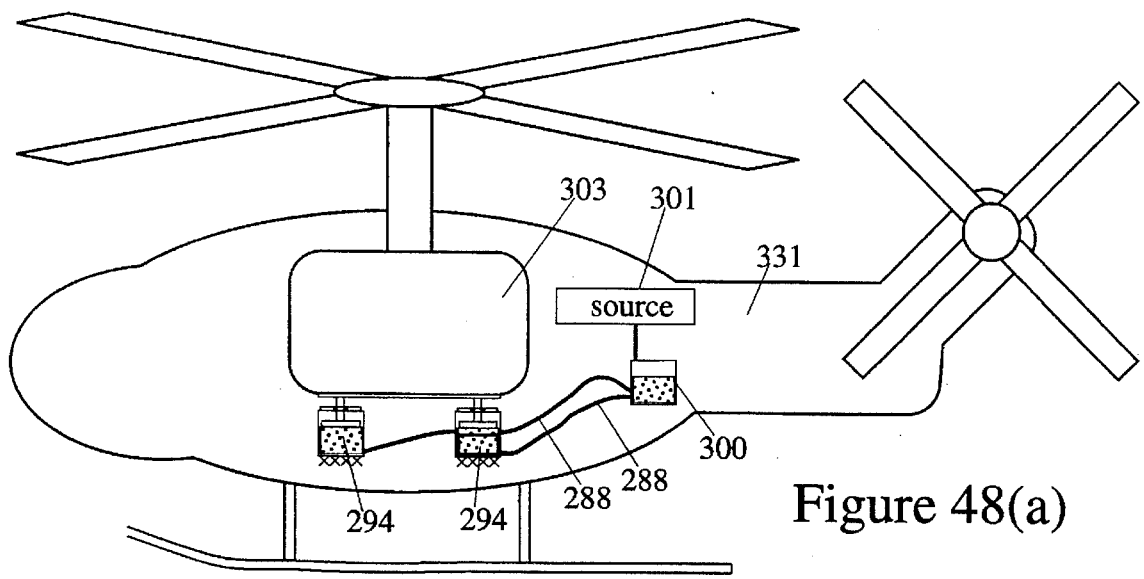
Figure 48B:
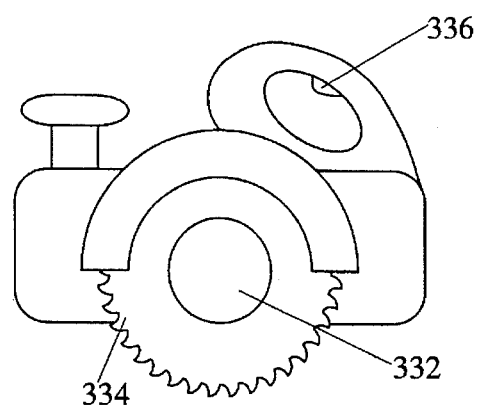
Figure 49A:
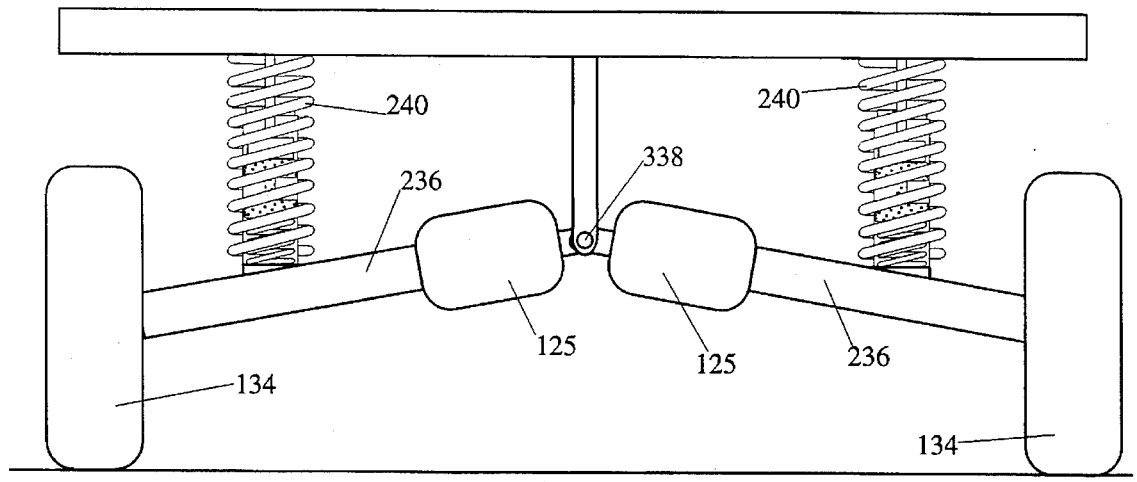
Figure 49B:
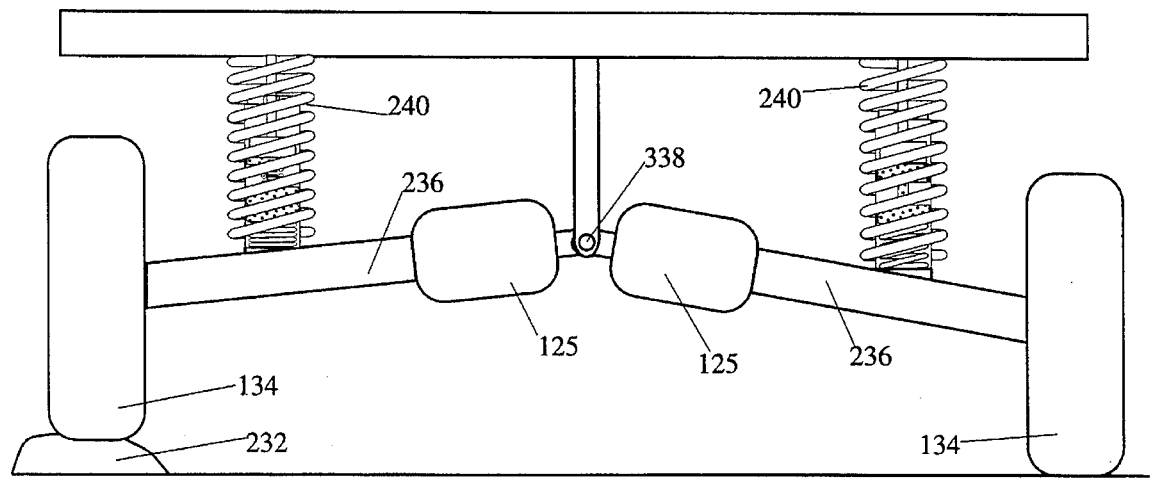
Figure 50A:
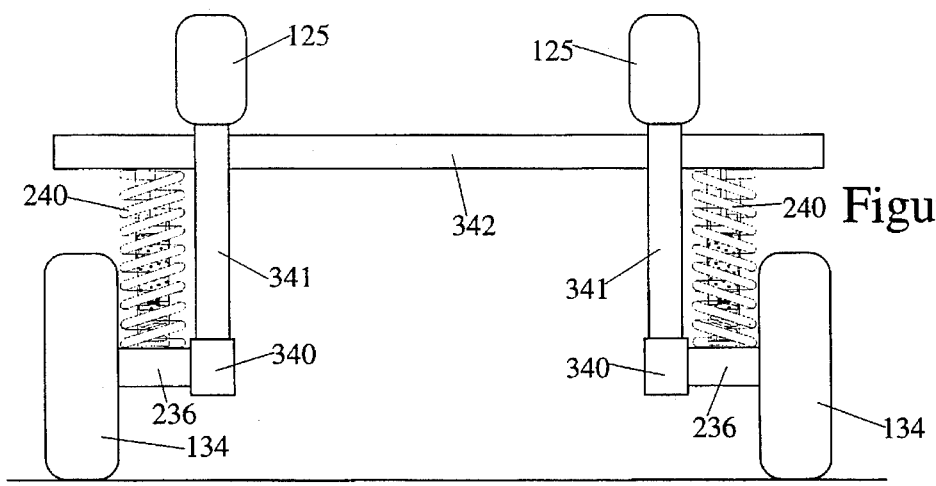
Figure 50B:
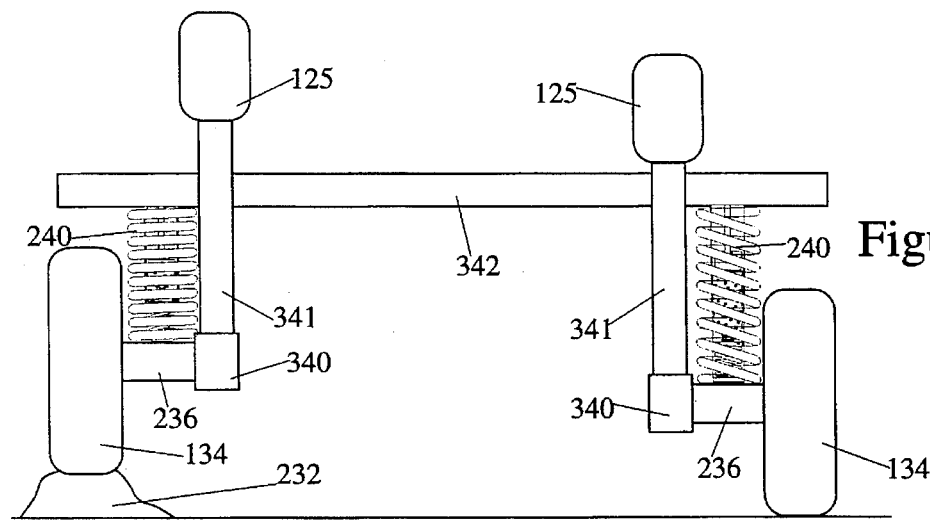
Figure 50C:
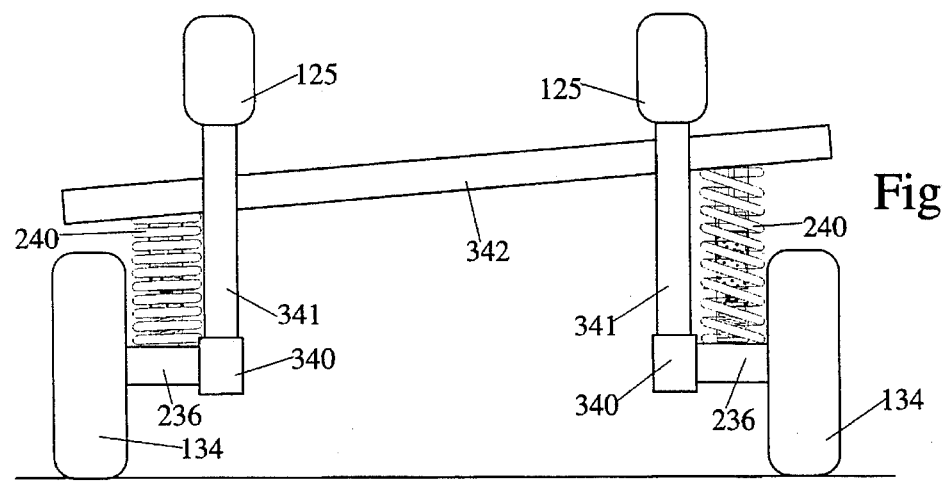
Figure 51F:
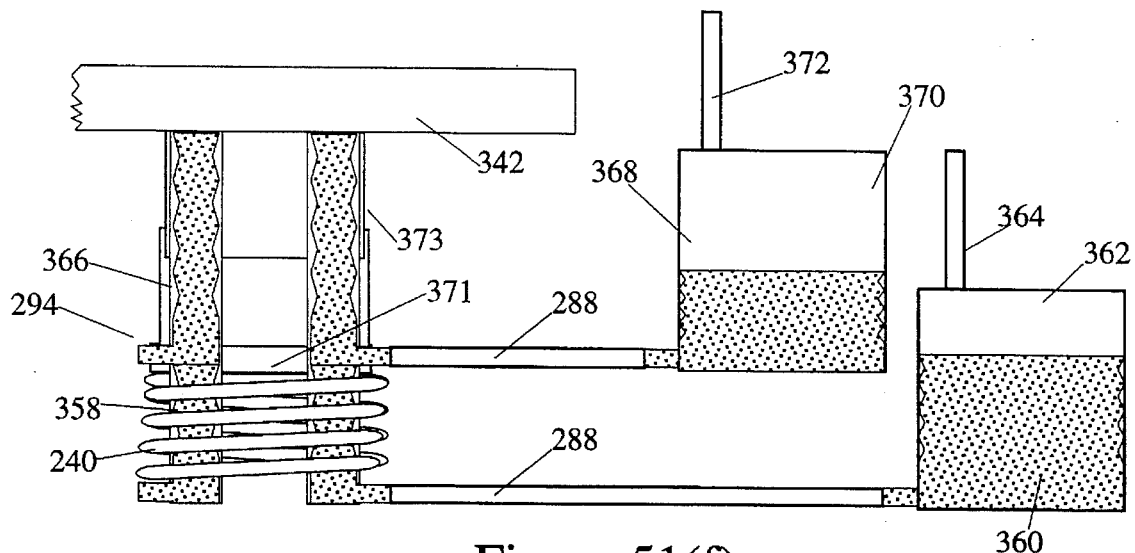
Figure 51G:
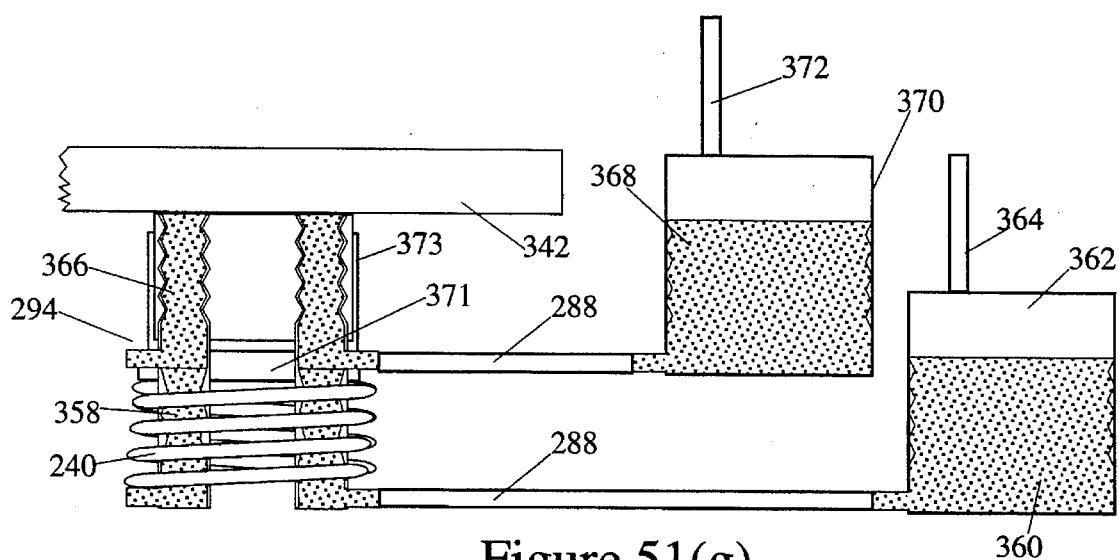
Figure 51H:
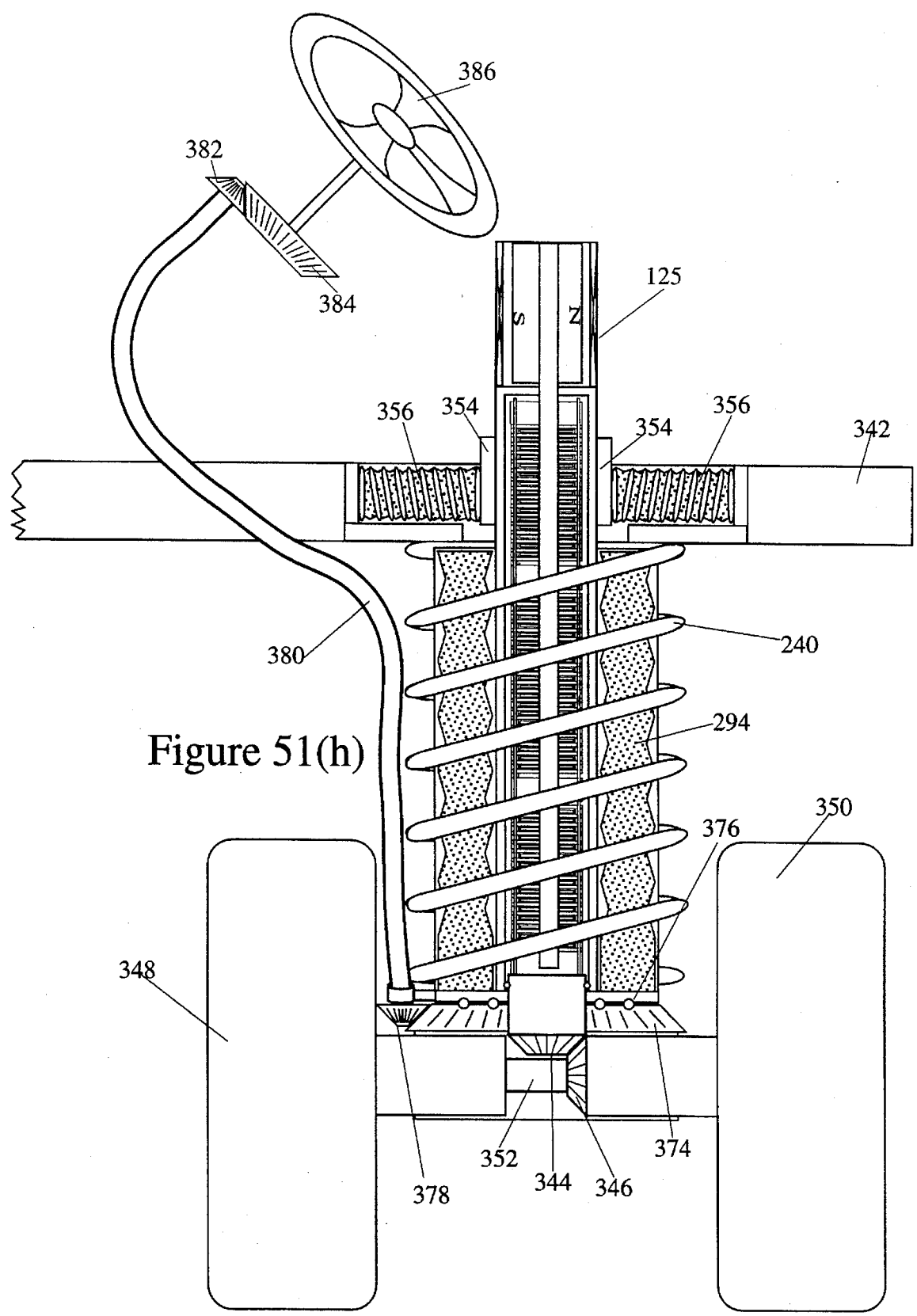
Figure 51I:
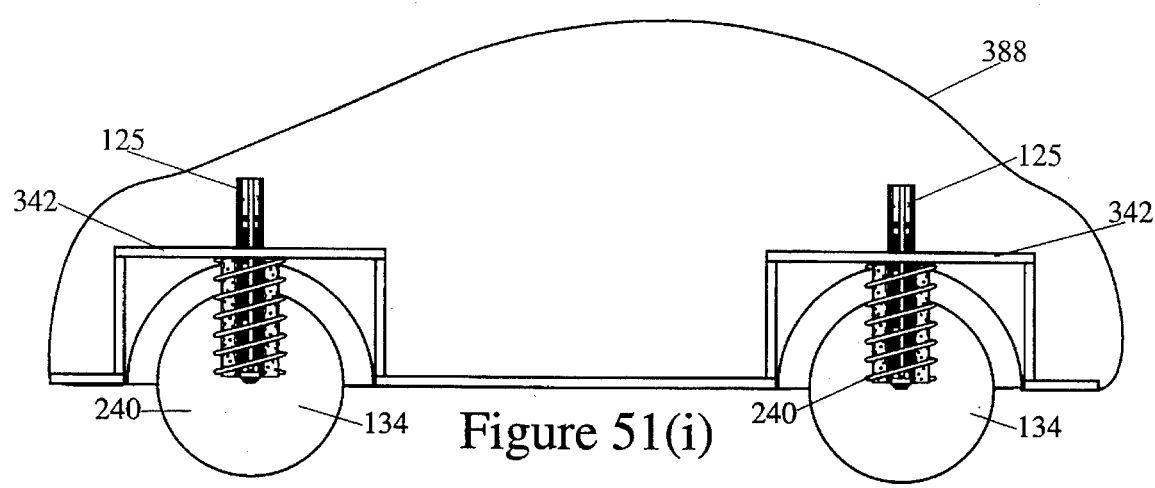
Figure 51J:
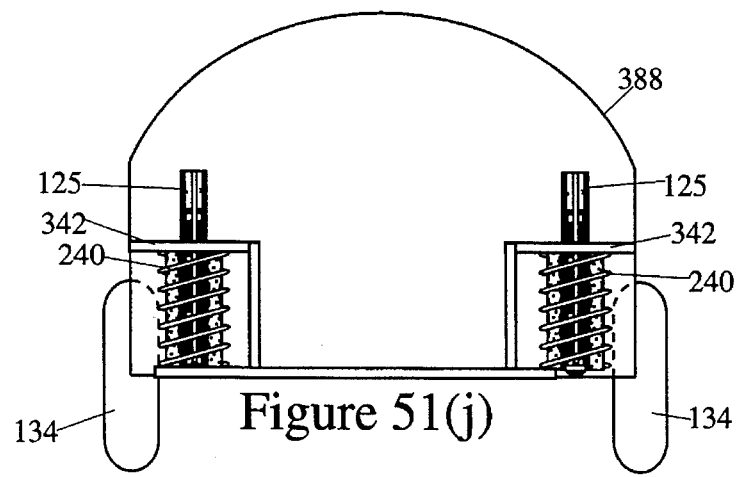
Figure 52A:
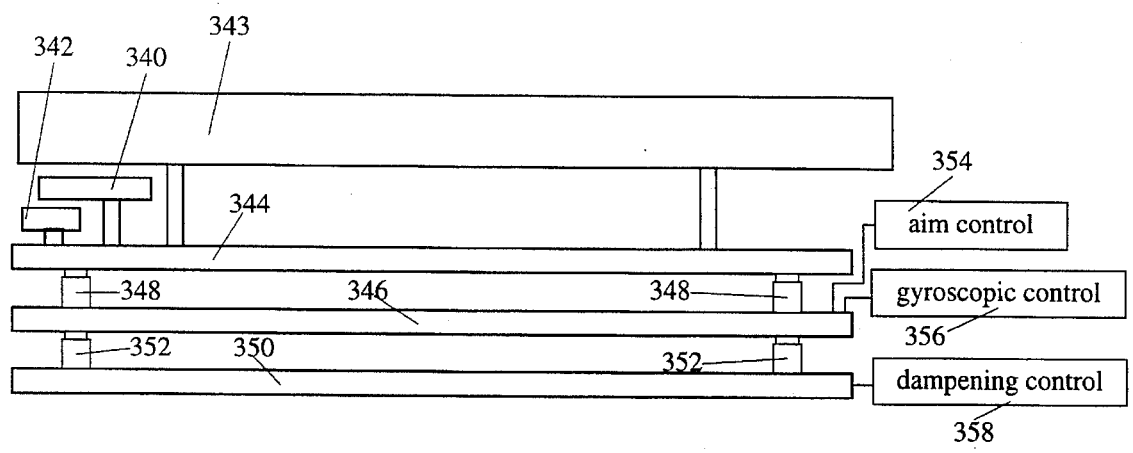
Figure 52B:
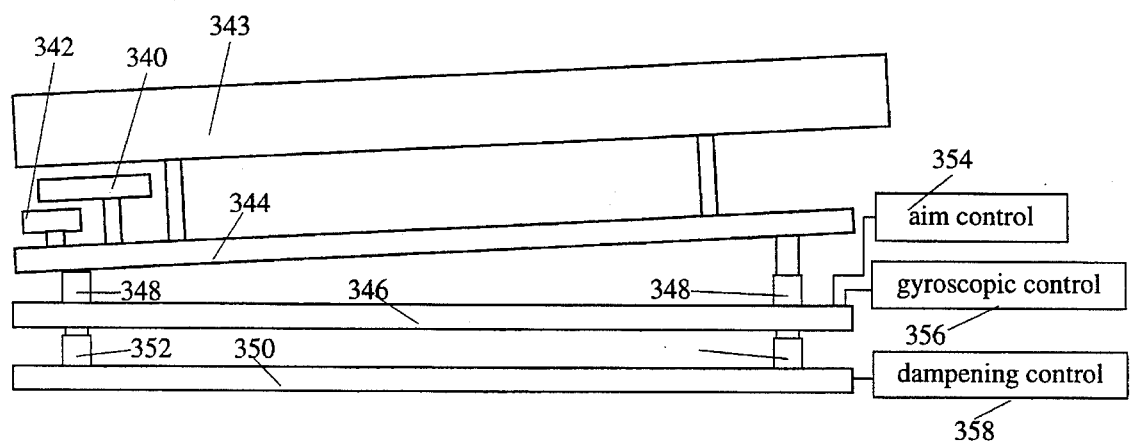
Figure 52C:
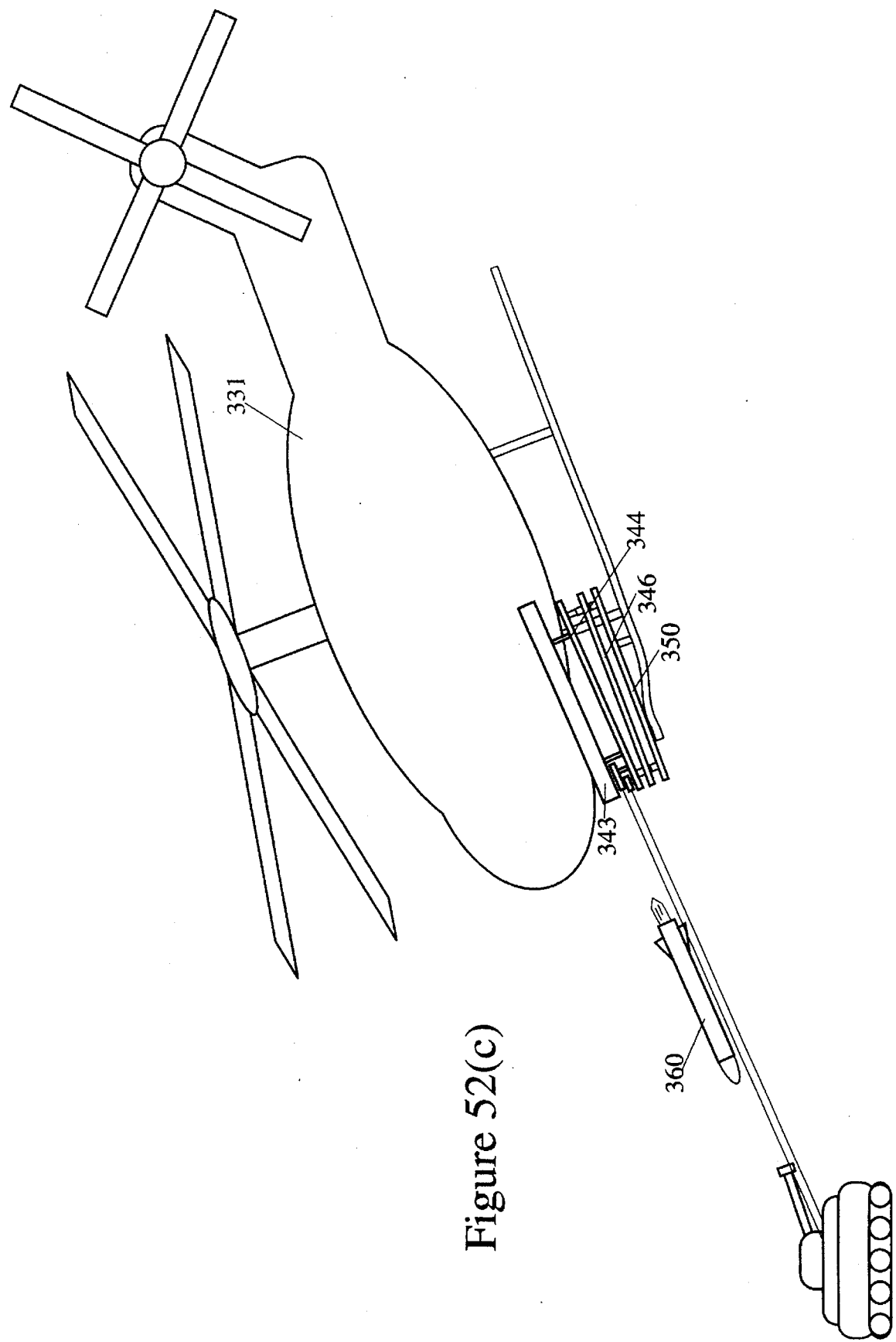
Figures 53A, 53B, 53C, 53D, 53E:
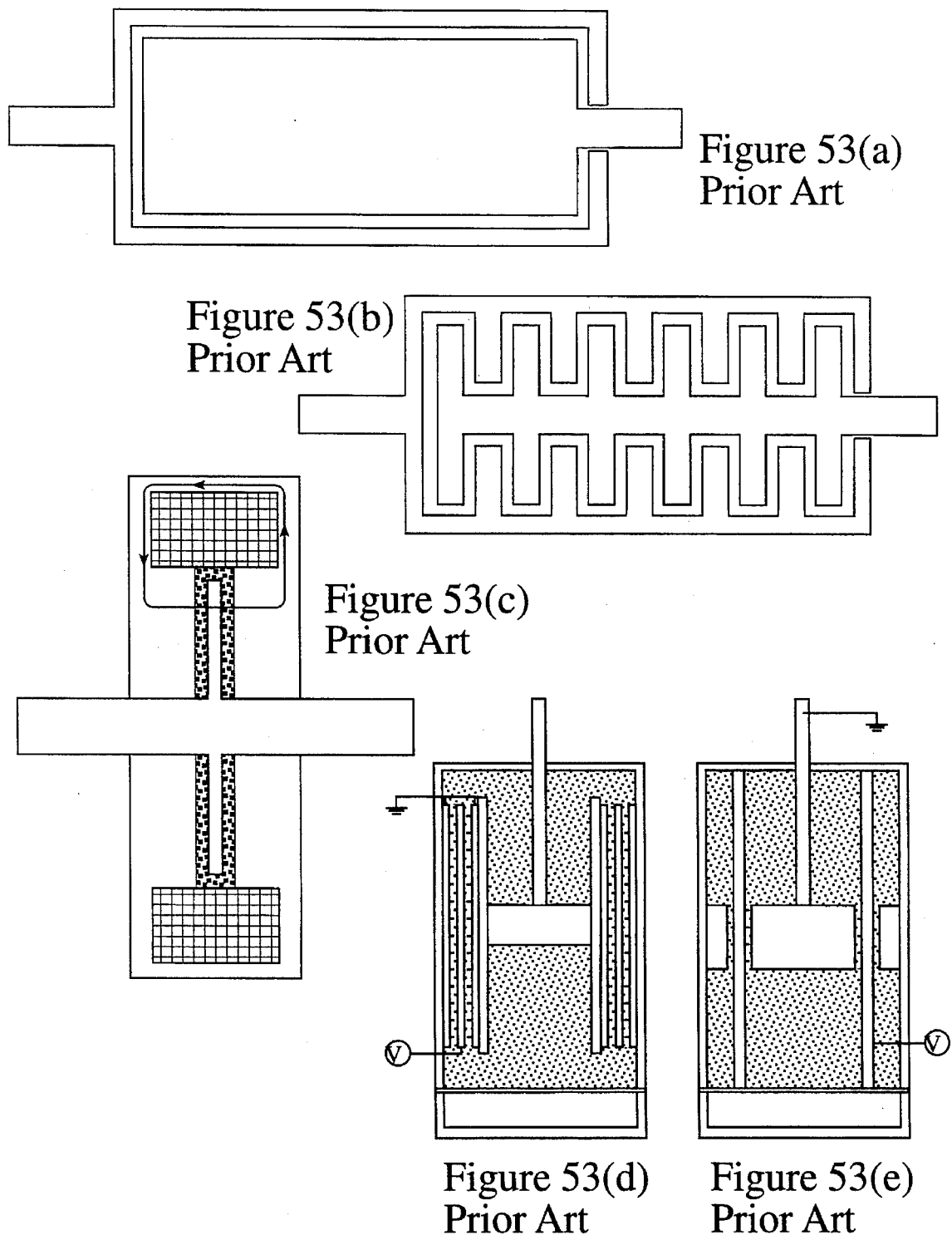
Figure 54A:
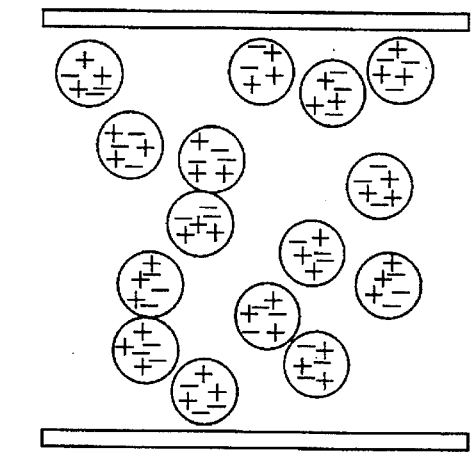
Figure 54B:
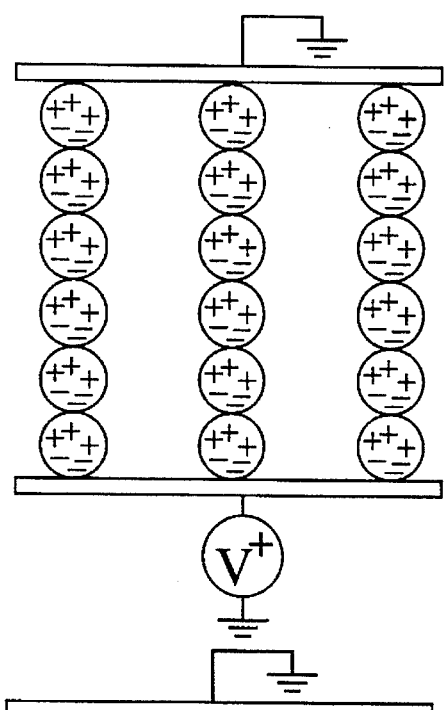
Figure 54C:
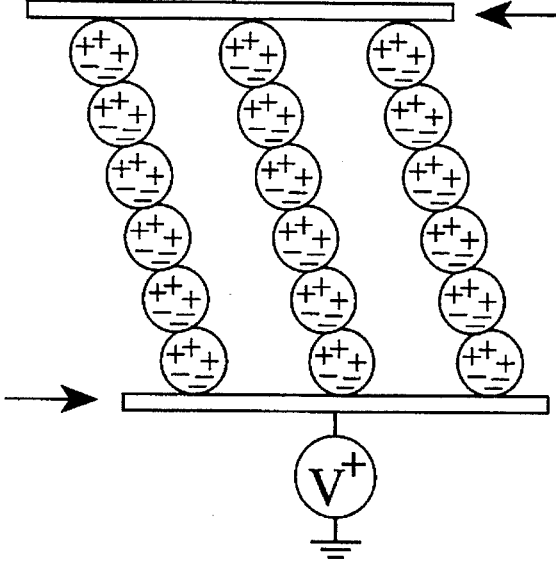

FIG. (f) is top plan view of the spacer member shown in FIG. 2(e);

FIG. 3(a) is an isometric view of the rotating electrode member and sweeping ridges prior to engagement;

FIG. 3(b) is an isometric view of the rotating electrode member having the sweeping ridges engaged thereon;

FIG. 3(c) is a top plan view of the rotating electrode member having the sweeping ridges engaged thereon, and the spacer member;

FIG. 3(d) is an isometric view of the rotating electrode member having sweeping ridges engaged thereon, and disposed between a pair of opposing electrode members, each having sweeping ridges engaged thereon;

FIG. 3(e) shows the flow path of a variable viscosity material due to the influence of sweeping ridges;

FIG. 3(f) shows the flow path of a variable viscosity material without the influence of sweeping ridges;

FIG. 4(a) illustrates a magneto-rheological fluid with no applied magnetic field;

FIG. 4(b) illustrates the magneto-rheological fluid with an applied magnetic field;

FIG. 4(c) illustrates an electro-rheological fluid with no applied electrical field;

FIG. 4(d) illustrates the electro-rheological fluid with an applied electrical field;

FIG. 5(a) is a cross-sectional view of an assembled embodiment of the inventive variable resistance device;

FIG. 5(b) is a cross-sectional view of another embodiment of the inventive variable resistance device;

FIG. 5(c) is a cross-sectional view of another embodiment of the inventive variable resistance device;

FIG. 5(d) is a cross-sectional view of another embodiment of the inventive variable resistance device;

FIG. 6(a) is an enlarged cross-sectional view of an embodiment of the inventive sweeping ridge;

FIG. 6(b) is an enlarged cross-sectional view of another embodiment of the inventive sweeping ridge;

FIG. 6(c) is an isometric view of the embodiment of the sweeping ridge shown in FIG. 6(b);

FIG. 6(d) is an enlarged isometric view of another embodiment of the sweeping ridge;

FIG. 6(e) is an enlarged isometric view of another embodiment of the sweeping ridge;

FIG. 6(f) is a front view of the embodiment of the sweeping ridge shown in FIG. 6(d);

FIG. 6(g) is a front view of another embodiment of the sweeping ridge;

FIG. 6(h) is a front view of another embodiment of the sweeping ridge;

FIG. 6(i) is a front view of the embodiment of the sweeping ridge shown in FIG. 6(e);

FIG. 7(a) is a top plan view of another embodiment of the rotating electrode member;

FIG. 7(b) is a top plan view of another embodiment of the rotating electrode member;

FIG. 7(c) is a top plan view of another embodiment of the rotating electrode member;

FIG. 7(d) is a top plan view of another embodiment of the rotating electrode member;

FIG. 8 is a cross-sectional view of another embodiment of the inventive variable resistance device;

FIG. 9(a) is a cross-sectional perspective view of an assembled rotating electrode member and opposing electrode member in accordance with the embodiment shown in FIG. 8;

FIG. 9(b) is a cross-sectional perspective view of an unassembled rotating electrode member and opposing electrode member in accordance with the embodiment shown in FIG. 8;

FIG. 10(a) is a top plan view of an opposing electrode member in accordance with the embodiment shown in FIG. 8;

FIG. 10(b) is a top plan view of the rotating electrode member in accordance with the embodiment shown in FIG. 8;

FIG. 10(c) is a top plan and cut perspective view of a shaft in accordance with the embodiment shown in FIG. 8;

FIG. 11 is an enlarged isolated view of the shaft and a sealing cap in accordance with the embodiment shown in FIG. 8;

FIG. 12(a) is a cross-sectional view of another embodiment of the inventive variable resistance device;

FIG. 12(b) is a cross-sectional side view of an assembled rotating electrical/opposing electrode member and a top plan view of an opposing electrode member in accordance with the embodiment of the inventive variable resistance device shown in FIG. 12(a);

FIG. 12(c) is a top plan view of the opposing electrode member shown in FIG. 12(b);

FIG. 13 is a cross-sectional view of another embodiment of the inventive variable resistance device;

FIG. 14(a) is an isolated cut-away view of a portion of an opposing electrode member and an input electrical contact in accordance with the embodiment shown in FIG. 13;

FIG. 14(b) is a cut-away cross-sectional view of the opposing electrode member, input electrode contact and a space maintaining surface in accordance with the embodiment shown in FIG. 13;

FIG. 15(a) shows a substrate for forming a rotating electrode member in accordance with an inventive forming method;

FIG. 15(b) shows the substrate shown in FIG. 15(a) having masked non-electrode surfaces;

FIG. 15(c) shows the masked rotating electrode member substrate shown in FIG. 15(b) being electroplated;

FIG. 15(d) shows the finished rotating electrode member;

FIG. 16(a) shows a first step in an inventive press fit manufacturing process for engaging sweeping ridges to the rotating electrode members;

FIG. 16(b) is a second step of the press fit manufacturing process;

FIG. 16(c) is a finished rotating electrode member having press fitted sweeping ridges;

FIG. 17(a) shows a configuration of the variable resistance device with an electrical generator;

FIG. 17(b) shows another configuration of the variable resistance device with an electrical generator;

FIG. 18(a) shows a use of the inventive variable resistance device as a brake for a wheel;

FIG. 18(b) shows another use of the inventive variable resistance device as a clutch/brake for a wheel;

FIG. 19(a) is a cross-sectional view showing the use of the inventive variable resistance device as a clutch/brake for a wheel;

FIG. 19(b) is a cross-sectional view showing the use of the inventive variable resistance device as a brake for a wheel;

FIG. 20(a) is a cross-sectional view showing the use of the inventive variable resistance device as a clutch/brake for a wheel, and showing cooling means;

FIG. 20(b) is a cross-sectional view showing the use of the inventive variable resistance device as a brake for a wheel, and showing cooling means;

FIG. 20(c) is a cross-sectional side view of the cooling means shown in FIG. 20(a);

FIG. 21(a) is a cut-away isolated view showing the use of the inventive variable resistance device as a clutch/brake for a wheel;

FIG. 21(b) is a cut-away cross-sectional view showing the use of the inventive variable resistance device as a brake for a wheel;

FIG. 21(c) is a cross-sectional view showing parts of a high resolution rotational sensor;

FIG. 22(a) is a cross-sectional view showing a use of the inventive variable resistance device for controlled unwinding of a line from a reel;

FIG. 22(b) is a cross-sectional view of the reel shown in FIG. 22(a);

FIG. 22(c) is cross-sectional view of the reel shown in FIG. 22(a);

FIG. 22(d) is an exploded cross-section view of the reel shown in FIG. 22(a);

FIG. 23 is a schematic view showing the use of the inventive variable resistance device as a clutch for a wind-to-energy conversion system;

FIG. 24(a) is a flow chart illustrating a control operation of the inventive variable resistance device;

FIG. 24(b) is a block diagram of a circuit for controlling the variable resistance device depending on rotational velocity;

FIG. 24(c) is a schematic circuit diagram of the circuit shown in FIG. 24(b);

FIG. 24(d) is a graph plotting an example of the value $V_{ramp}$ over time;

FIG. 25(a) is an exploded view of another embodiment of the inventive variable resistance device using a magnetically reactive variable viscosity material;

FIG. 25(b) is an exploded view of another embodiment of the inventive variable resistance device using a magnetically reactive variable viscosity material;

FIG. 26 is a cross-sectional view of the embodiment of the inventive variable resistance device shown in FIG. 25(a) and 25(b);

FIG. 27 is a top plan view of a rotating member and a magnetic field generating coil of an embodiment of the inventive variable resistance device using a magnetically reactive material;

FIG. 28(a) shows a conductive wire wrapped around a cable made from a magnetizable material in accordance with an inventive magnetic field generating coil manufacturing process;

FIG. 28(b) shows a conductive wire wrapped around a magnetizable substrate in accordance with the inventive magnetic field generating coil manufacturing process;

FIG. 28(c) shows the wire wrapped substrate shown in FIG. 28(b) being formed into a magnetic field generating coil;

FIG. 28(d) shows the finished magnetic field generating coil in accordance with the inventive magnetic field generating coil manufacturing process;

FIG. 29(a) shows an embodiment of an inventive force dampener device;

FIG. 29(b) is another view of the embodiment of the inventive force dampener device shown in FIG. 29(a);

FIG. 29(c) is an isolated view of an embodiment of the inventive force dampener components;

FIG. 30(a) is another embodiment of the inventive force dampener device;

FIG. 30(b) shows the embodiment of the inventive force dampener device shown in FIG. 30(a), dampening a force;

FIG. 30(c) is an isolated view of a sheet electrode member of the embodiment of the inventive force dampener device shown in FIG. 30(a);

FIG. 31(a) is another embodiment of the inventive force dampener device;

FIG. 31(b) shows the embodiment of the inventive force dampener device shown in FIG. 31(a), dampening a force;

FIG. 31(c) is an isolated isometric view of a plunger member of the inventive force dampener device shown in FIG. 31(a);

FIG. 31(d) is another configuration of the embodiment of the inventive force dampener device shown in FIG. 31(a);

FIG. 31(e) shows the configuration of the inventive force dampener device shown in FIG. 31(d), dampening a force;

FIG. 31(f) is an isometric view of a plunger member of the configuration of the inventive force dampener device shown in FIG. 31(d);

FIG. 32(a) is another embodiment of the inventive force dampener device;

FIG. 32(b) is another embodiment of the inventive force dampener device;

FIG. 33(a) is another embodiment of the inventive force dampener device;

FIG. 33(b) shows the embodiment of the inventive force dampener device shown in FIG. 33(a) dampening a force;

FIG. 33(c) shows another embodiment of the inventive force dampener including a piston having a variable effective oriface;

FIG. 33(d) is a sectional side view of a configuration of the piston shown in FIG. 33(c);

FIG. 33(e) is a sectional side view of another configuration of the piston shown in FIG. 33(c);

FIG. 33(f) is a sectional side view of another configuration of the piston shown in FIG. 33(c);

FIG. 33(g) is a sectional side view of another configuration of the piston shown in FIG. 33(c);

FIG. 33(h) is a top plan view of the configuration of the piston shown in FIG. 33(e);

FIG. 33(i) is a top plan view of the configuration of the piston shown in FIG. 33(d);

FIG. 33(j) is a top plan view of the configuration of the piston shown in FIG. 33(g);

FIG. 33(k) is a top plan view of the configuration of the piston shown in FIG. 33(f);

FIG. 34(a) shows the inventive force dampener device in use in a suspension system of a vehicle;

FIG. 34(b) shows the use of the inventive force dampener device in the suspension of a vehicle when encountering bump;

FIG. 34(c) shows the use of the inventive force dampener device in the suspension of a vehicle when encountering a pothole;

FIG. 35(a) shows a configuration of the inventive force dampener device used as a shock absorber for a car;

FIG. 35(b) shows another configuration of the inventive force dampener device used as a shock absorber for a car;

FIG. 36(a) shows the use of the inventive force dampener device in conjunction with a leaf-spring suspension of a car;

FIG. 36(b) shows the use of the inventive force dampener device in conjunction with a leaf-spring suspension of a car;

FIG. 37(a) is an isolated perspective view of an example of an ER fluid valve in accordance with the inventive force dampener device;

FIG. 37(b) is an enlarged perspective view of a ganged-plates member in accordance with the ER fluid valve shown in FIG. 37(a);

FIG. 37(c) is an enlarged top plan view of two ganged-plates members making up the ER fluid valve shown in FIG. 37(a);

FIG. 37(d) is an enlarged top plan view of the assembled ER fluid valve shown in FIG. 37(a);

FIG. 38(a) is an enlarged isolated plan view of portion of a mesh electrode in accordance with another inventive ER fluid valve;

FIG. 38(b) is an enlarged isolated plan view of a mesh electrode in accordance with the inventive ER fluid valve;

FIG. 38(c) is side view of a stack of mesh electrodes;

FIG. 38(d) is a representation of off-set and aligned mesh electrode wires;

FIG. 38(e) is an enlarged isolated view of spacer components for the inventive mesh electrode stack;

FIG. 39(a) shows another configuration of the inventive ER fluid valve;

FIG. 39(b) is an isolated top plan view of a hole plate electrode in accordance with the inventive ER fluid valve shown in FIG. 39(a);

FIG. 39(c) is an enlarged isolated view of the inventive ER fluid valve shown in FIG. 39(a) shown assembled and disposed between a first bellows and a second bellows;

FIG. 40 shows the steps of an inventive manufacturing process for forming the hole plate ER fluid valve shown in FIG. 39(a);

FIG. 41(a) shows the flow paths of an ER fluid in a non-energized hole plate ER fluid valve;

FIG. 41(b) shows the non-flow state of an ER fluid through an energized inventive hole plate ER fluid valve;

FIG. 42(a) is an isolated view of an inventive sealing cap for the inventive force dampener device;

FIG. 42(b) is an isolated enlarged cross-sectional view of the sealing cap shown in FIG. 42(a);

FIG. 42(c) is an isolated enlarged cross-sectional view of the sealing cap shown in FIG. 42(a), showing energized confining electrodes;

FIG. 43(a) is a cross-sectional view of a height adjusting embodiment of the inventive force dampener in an equilibrium position;

FIG. 43(b) is a cross-sectional view of the height adjusting embodiment of the inventive force dampener shown in FIG. 43(a) in a raised position;

FIG. 43(c) is a cross-sectional view of the height adjusting embodiment of the inventive force dampener shown in FIG. 43(a) in a lowered position;

FIG. 44(a) shows the use of the inventive height adjusting force dampener in an equilibrium state;

FIG. 44(b) shows the use of the inventive height adjusting force dampener in a vehicle body raising state;

FIG. 44(c) shows the use of the inventive height adjusting force dampener in a vehicle body lowering state;

FIG. 44(d) shows the use of the inventive height adjusting force dampener in an improved road handling state;

FIG. 45 shows another embodiment of the inventive height adjusting force dampener;

FIG. 46(a) is a perspective view of the inventive MR fluid valve hose;

FIG. 46(b) is a front view of the inventive MR fluid valve hose shown in FIG. 46(a);

FIG. 46(c) is an isolated view of a hollow magnetizable core in accordance with the inventive MR fluid valve hose shown in FIG. 46(a);

FIG. 46(d) is a perspective view of a grouped plurality of MR fluid valve hoses;

FIG. 46(e) shows an isolated view of a conductive winding patterns used in accordance with the inventive MR fluid valve hose shown in FIG. 46(a);

FIG. 46(f) is a cut perspective view of the inventive ER fluid valve hose;

FIG. 46(g) is a front view of the inventive ER fluid valve hose shown in FIG. 46(e);

FIG. 46(h) shows an isolated view of a conductive winding pattern used in accordance with the inventive MR fluid valve hose shown in FIG. 46(a);

FIG. 47 shows another embodiment of the inventive height adjusting force dampener;

FIG. 48(a) shows a use for the inventive force dampener for actively dampening rotor and engine vibration of a helicopter;

FIG. 48(b) shows a use for the inventive variable resistance device for braking rotation of a circular saw blade;

FIG. 49(a) shows a configuration of an inventive vehicle suspension system and drive train;

FIG. 49(b) shows the configuration of the inventive vehicle suspension system and drive train shown in FIG. 49(a) when encountering a bump;

FIG. 50(a) shows another configuration of the inventive vehicle suspension system and drive train;

FIG. 50(b) shows the configuration of the inventive vehicle suspension system and drive train shown in FIG. 50(a) when encountering a bump;

FIG. 50(c) shows the configuration of the inventive vehicle suspension system and drive train shown in FIG. 50(a) when providing improved road handling capabilities;

FIG. 51(a) shows a configuration of the inventive vehicle suspension system and drive train utilizing a toroidal dampener bellows;

FIG. 51(b) shows the configuration of the inventive vehicle suspension system and drive train shown in FIG. 51(a) when encountering a bump;

FIG. 51(c) is an isolated cross-sectional top plan view of the toroidal dampener bellows;

FIG. 51(d) is another configuration of the inventive vehicle suspension system and drive train utilizing a toroidal dampener bellows;

FIG. 51(e) shows the configuration of the inventive vehicle suspension system and drive train shown in FIG. 51(d) when encountering a bump;

FIG. 51(f) shows an inventive two-stage height adjusting force dampener in a raised position;

FIG. 51(g) shows the inventive two-stage height adjusting force dampener shown in FIG. 51(f) in a lowered position;

FIG. 51(h) shows the configuration of the inventive vehicle suspension system and drive train utilizing a toroidal damener bellows and having an independent steering system;

FIG. 51(i) schematically shows a side view of an autmobile incorporating the inventive vehicle suspension system and drive train;

FIG. 51(j) schematically shows a rear view of the automobile shown in FIG. 51(i);

FIG. 52(a) shows an inventive weapons mount incorporating a height adjustable and force dampened weopons mount;

FIG. 52(b) shows the inventive weapons mount shown in FIG. 52(a), having an adjusted pitch;

FIG. 52(c) shows the inventive weapons mount shown in FIG. 52(b) in use mounted on a helecopter;

FIG. 53(a) shows a prior art single cylinder rotational resistance device;

FIG. 53(b) shows a prior art multi-electrode rotational resistance device;

FIG. 53 (c) shows a prior art magnetic material brake;

FIG. 53(d) shows a prior art force dampener;

FIG. 53(e) shows another prior art force dampener;

FIG. 54(a) illustrates a non-energized ER fluid disposed between electrode surfaces;

FIG. 54(b) illustrates an energized ER fluid disposed in an electrical field applied by two electrode surfaces; and FIG. 54(c) illustrates a shearing force applied to the energized ER fluid shown in FIG. 54(b).

DETAILED DESCRIPTION OF THE INVENTION

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 1:
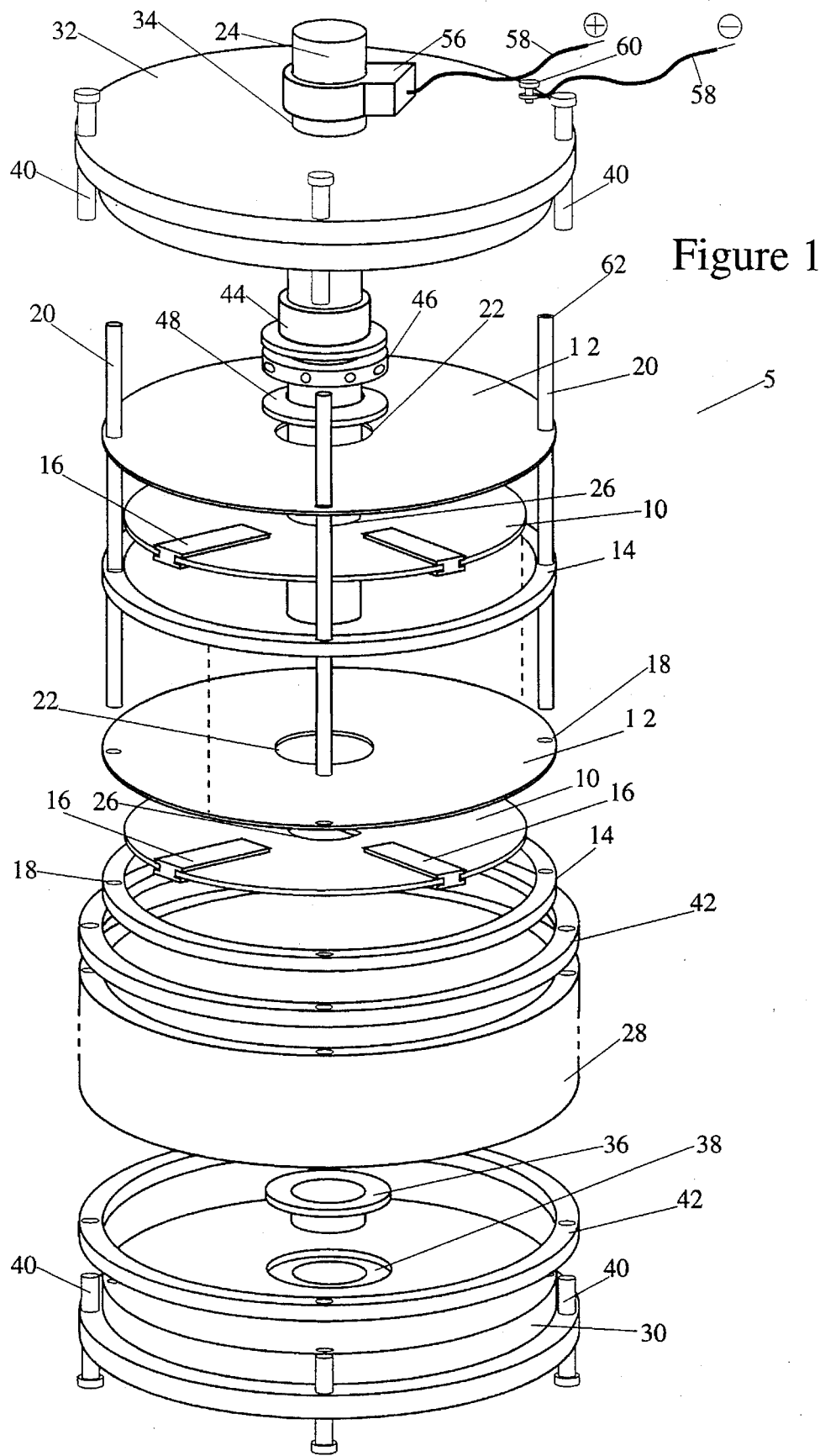
FIG. 1 is an exploded view of an embodiment of the inventive variable resistance device.

FIG. 1 shows an exploded view of an embodiment of the inventive variable resistance device 5. In accordance with this embodiment, a stack is formed comprising a plurality of rotating electrode members 10, each sandwiched between a pair of opposing electrode members 12. A spacer member 14 may be disposed between the pair of the opposing electrode members 12 for maintaining a predetermined gap between the facing surfaces of the rotating electrode member 10 and a respective opposing electrode member 12. The rotating electrode member 10 may also have at least one sweeping ridge 16 disposed thereon which also maintains the predetermined gap between the facing surfaces of each rotating electrode member 10 and its respective facing opposing electrode members 12. The sweeping ridges 16 also enhance resistance to rotation of the rotating electrode member 10 when a magnetically reactive or an electrically reactive material (described below with reference to FIGS. 4(a) through 4(d)) is energized. Each spacer member 14 and opposing electrode member 12 has rod through-holes 18 through which pass stacking rods 20 for maintaining proper orientation of the stationary components of the assembled stack.

As shown in FIGS. 2(a) and 2(b), each opposing electrode member 12 has a receiving through-hole 22 through which a shaft 24 passes without touching the opposing electrode member 12. As shown in FIGS. 2(c) and 2(d), each rotating electrode member 10 includes an engaging through-hole 26 through which the shaft 24 passes and engages with the rotating electrode member 10. Thus, as the shaft 24 rotates so does each rotating electrode member 10.

Referring again to FIG. 1, the assembled stack, including the opposing electrode members 12, spacer members 14, rotating electrode members 10, and a portion of the shaft 24, is contained within a containing tube 28. The containing tube 28 is sealed at one end by a bottom end cap 30 and at the other end by a top end cap 32. In this configuration, the shaft 24 exits through an exit through-hole 34 in the top end cap 32 and rests in a friction reducing bushing 36 which is seated in a bushing seat 38 in the bottom end cap 30. The top end cap 32 and the bottom end cap 30 are fixed to the containing tube 28 by fixing bolts 40, and a neoprene seal 42 may be used to hermetically seal the containing tube 28 and the bottom end cap 30. A neoprene seal 42 may also be used to seal the containing tube 28 and the top end cap 32. It is important to select materials for the components of the inventive variable resistance device that will not react adversely when exposed to the variable viscosity material used having a particular chemical formulation. A dynamic sealing member 44 (which will be described in more detail with reference to FIG. 11) is provided around the shaft 24 for preventing leaking of a contained variable viscosity material through the exit through-hole 34. The variable viscosity material (which may be an electro-rheological material or a magneto-rheological material) is contained within the containing tube 28 and disposed in the gap between each rotating electrode member 10 and its respective facing opposing electrode members 12. By energizing the variable viscosity material, rotation of the rotating electrode member 10 is controllably resisted, so as to provide an available variable resistance from the inventive variable resistance device 5.

A shaft lock 46 is disposed around the shaft 24 for maintaining the shaft 24 within the containing tube 28 and preventing it from being removed through the exit through-hole 34. Since the bottom end cap 30 is sealed, the shaft 24 is retained against the friction reducing bushing 36. A friction reducing disk 48 may be disposed between the shaft lock 46 and a contacting surface, such as the top surface of the last opposing electrode member 12 in the stack, to provide a smooth rotation of the shaft 24. The opposing electrode members 12 and the spacer members 14 have rod through-holes 18 through which pass stacking rods 20 for maintaining the orientation of the components of the assembled shaft 24. The stacking rods 20 may be fixed to the top end cap 32 and bottom end cap 30, so that the opposing electrode members 12 are held in place against the rotation of the rotating electrode member 10. Thus, as the variable viscosity material becomes more viscous, rotation of the rotating electrode members 10 by the shaft 24 is resisted (brake) or the rotation of the shaft 24 is coupled to the rotation as the containing tube 28 (clutch).

FIGS. 2(a) and 2(b) show isolated views of the opposing electrode members 12. The opposing electrode members 12 may be formed by a metal stamping manufacturing process performed on a sheet of metal, such as aluminum, steel, etc. Metal stamping is a very inexpensive manufacturing process, thus enhancing the adaptability to mass produce the inventive variable resistance device 5.

FIGS. 2(c) and 2(d) are isolated views of the rotating electrode members 10. The rotating electrode members 10 may be stamped from a metal sheet having receiving grooves 50 which receive and engage with the sweeping ridges 16. The sweeping ridges 16 may be easily manufactured through a simple machining operation, injection molding, or stamping (or other known manufacturing method). The rotating electrode members 10 and the opposing electrode members 12 are conductive in this embodiment of the present invention, so that an electrical field may be applied to the variable viscosity fluids disposed in the gap between each rotating electrode member 10 and its respective facing opposing electrode members 12 of the assembled stack. Therefore, in accordance with this embodiment of the inventive variable resistance device 5, the sweeping ridges 16 are non-conductive.

FIGS. 2(e) and 2(f) are isolated views of a spacer member 14. The spacer members 14 may be formed from conductive or non-conductive material, and may also be stamped, injection molded, cast, or produced by any other manufacturing method. Since each of the various components of the assembled stack (i.e. opposing electrode members 12, rotating electrode members 10, and spacer members 14) can be easily formed by a variety of available mass manufacturing methods, the inventive variable resistance device 5 is adaptable to high volume mass production, thus lowering its cost to produce and increasing its efficiency and reproducibility.

FIG. 3(a) shows a rotating electrode member 10 and four sweeping ridges 16 just prior to engagement on the rotating electrode member 10. The sweeping ridges 16 are retained on the rotating electrode member 10 by sliding into a respective receiving groove 50 of the rotating electrode member 10. FIG. 3(b) shows the completed rotating electrode member 10 having sweeping ridges 16 fixed thereon. The rotating electrode member 10 may be stamped from a sheet of aluminum, and the sweeping ridges 16 may be manufactured from non-conductive material. Thus, the electrode surface of the rotating electrode member 10 is separated from the electrode surface of the opposing electrode member 12 with the non-conductive sweeping ridges 16 in contact with the opposing electrode member 12. The sweeping ridges 16 maintain a precise gap, and greatly enhance the resistance characteristics of the inventive variable resistance device 5.

Referring again to FIG. 1, in accordance with the present invention, a variable viscosity material (not shown) capable of undergoing a change in flow characteristics in response to an applied field, is contained within the containing tube 28. A moving member (rotating electrode member 10) having at least one surface facing the variable viscosity material is provided. In the embodiments of the inventive variable resistance device 5 using an electrical reactive material, the terms "moving member" and "rotating electrode member" are used interchangeably. Although the moving member is shown as a rotating electrode member 10, it may, alternatively, be a sliding sheet electrode disposed in parallel arrangement with another sheet electrode (which may be stationary or sliding relative to the sliding sheet electrode). Such a configuration is described herein with reference to FIGS. 30(a) through 30(c). Applying means 52 (shown, for example, in FIG. 4(c)) applies the applied field to the variable viscosity material. The applying means 52 may be a high-voltage power source for creating an electrical field for energizing an ER fluid, or a low voltage power source for creating a magnetic field for energizing an MR fluid.

Referring again to FIG. 1, in this embodiment, a power supply, for example, a battery 132 as shown in FIG. 19(a)) supplies through a power supply wire 58 a first potential (i.e., positive potential) to the shaft 24 through a brush contact 54 housed in a brush contact housing 56 (shown, for example, in FIG. 5(a)). An opposite potential (i.e., negative potential) is applied from the power supply through another power supply wire 58 to an electrical connection screw 60 which is in electrical contact with an electrical connection hole 62 of at least one of the stacking rods 20. The stacking rods 20 are electrically connected with each of the opposing electrode members 12 so that the potential is applied to each opposing electrode member 12. The potential applied through the power supply wire 58 to the brush contact 54 is then applied through the shaft 24 to each of the rotating electrode members 10 through the engagement of the shaft 24 in the shaft-engaging through-hole 26 of the rotating electrode members 10. Thus, in accordance with the inventive variable resistance device 5, at least one projecting member (sweeping ridge 16) projects from the moving member (rotating electrode member 10) into the variable viscosity material. Containing means (containing tube 28) contains at least the variable viscosity material, the moving member 10, and the projecting member 16. The shaft 24 has at least a portion contained within the containing means 28 and has a longitudinal axis. The moving member 10 has an engaging through-hole 26 for engaging the shaft 24 so that the moving member 10 is rotatable by the shaft 24 relative to the containing means 28 about the longitudinal axis of the shaft 24. The moving member 10 is also slidable on the shaft 24 along the longitudinal axis.

By the construction shown in FIG. 1, an easy to assemble variable resistance device is provided. An assembled stack having any desired number of rotating electrode members 10 disposed between respective adjacent facing opposing electrode members 12 can be manufactured and assembled into an assembled stack contained within a containing tube 28 of appropriate dimensions. In assembly of the stack, the shaft 24 is easily inserted through the receiving through-holes 22 of the opposing electrode members 12 and through the engaging through-holes 26 of the rotating electrode members 10, so as to provide for the rotation of the rotating electrode members 10. If a variable resistance device having a higher resistance capability is desired, the number of components of the stack can be increased. Alternatively, if the size of the resistance device is desired to be reduced, the number of components of the assembled stack can be decreased. Also, the dimensions of each of the components of the assembled resistance device can be altered depending on design considerations, so that a customized resistance device can be easily manufactured in accordance with the present invention. The device can be easily assembled, either by automated machine or by hand, by stacking the components of the assembled stack into the containing tube 28 with the bottom end cap 30 in place and the shaft 24 seated in the friction reducing bushing 36 at the bottom end cap 30. Once the assembly of the assembled stack, friction reducing disk 48, shaft lock 46, and dynamic sealing member 44 has been completed, the end cap is then fixed to the containing tube 28. Since the moving members (rotating electrode member 10) are slidable on the shaft 24 along the longitudinal axis of the shaft 24, the tolerances of the assembled stack are self-adjusting. Stated otherwise, the rotating electrode member 10 floats on the shaft 24, but is rotatable by the shaft 24. Thus, even though the gap between the rotating electrode member 10 and respective opposing electrode members 12 must be precise, the precision is easily and automatically obtained regardless of the number of components of the assembled stack. The gap is maintained by the sweeping ridges 16 and/or spacer members 14, and therefore each rotating electrode member 10 will slide on the shaft 24 to its appropriate location, with the precise gap provided and maintained during use.

Referring now to FIG. 3(d), in accordance with another embodiment of the invention, at least one projecting member (sweeping ridge 16) is disposed projecting from the opposing electrode member 12 into the variable viscosity material disposed between the opposing electrode member 12 and the moving member. Stated otherwise, one or more sweeping ridges 16 can be provided on either or both of the moving member (rotating electrode member 10) and the opposing electrode member 12. By this construction, the flow path due to the projecting members is such that resistance to rotation of the rotating electrode member 10 is greatly enhanced as compared with an embodiment of the invention in which neither the rotating electrode member 10 nor the opposing electrode member 12 has a sweeping ridge 16 disposed thereon.

An experimental test showing the flow path due to a rotating electrode member 10 having sweeping ridges 16 was conducted. In the experimental test a soap and water solution was disposed in the gap between the rotating electrode member 10 and opposing structure comprised of a clear Plexiglas window. The flow path of the soap and water solution in response to rotation of the rotating electrode member 10 was determined by observing the formation of soap bubbles through the Plexiglas window. The observed flow path is shown in FIG. 3(e). As shown, the flow path 64 of the variable viscosity material due to the sweeping ridges 16 fixed on the rotating electrode member 10 is such that the variable viscosity material must make many changes in direction in order to flow around the sweeping ridges 16 of the rotating electrode member 10. This causes an enhanced resistance to rotation of the rotating electrode member 10, which may be further enhanced by the addition of sweeping ridges 16 to the opposing electrode members 12. FIG. 3(f) shows the flow path 64 of the variable viscosity material when the sweeping ridges 16 are absent from both the rotating electrode member 10 and the opposing electrode member 12. In this case, the turbulence of the flow path due to the sweeping ridges 16 does not occur. Thus, in accordance with the present invention, the projecting members (sweeping ridges 16) provide two important features. Namely, the projecting members 16 maintain a very precise, very consistent predetermined gap between each rotating electrode member 10 and its respective facing opposing electrode members 12, and also provide for an enhanced (and thus stronger) resistance to rotation of the rotating electrode member 10 as compared with the construction lacking the sweeping ridges 16. These features provide a superior variable resistance device as compared with any obtained by the prior art.

As shown in FIG. 1, the spacer members 14 disposed between the opposing electrode member 12 and the moving member are provided for maintaining the integrity of the predetermined gap between the facing surfaces of the rotating electrode member 10 and its respective facing opposing electrode members 12. Although it has been described that the rotating electrode member 10 is rotated relative to a non-rotating opposing electrode member 12, it must also be said that the shaft 24 can be held fixed from rotation, thereby preventing rotation of the rotating electrode members 10. In this case, the opposing electrode member 12 may be rotated relative to the non-rotating rotating electrode member 10. Alternatively, both the rotating electrode member 10 and the opposing electrode member 12 may rotate in the same direction, such as the case when the inventive device is utilized as clutch. When fully coupled by the variable viscosity material disposed between them, the rotating electrode member 10 and the opposing electrode member 12 will rotate in unison. The rotating electrode member 10 and the opposing electrode member 12 may rotate in opposite directions with the variable coupling obtained by the inventive variable resistance device acting to slow rotation of either or both the shaft 24 and the containing tube 28.

FIG. 4(a) shows a magneto-rheological fluid 66 which may be used as the variable viscosity material in an embodiment of the inventive variable resistance device 5 shown in FIGS. 25(a) and 25(b). When the magneto-rheological fluid 66 is not energized (i.e., no applied magnetic field), the magnetically polarizable particles 68 dispersed in a carrier medium 70 of the magneto-rheological fluid 66 are randomly oriented and the fluid is more or less free-flowing. Magneto-rheological fluid 66 typically consist of micron-sized, magnetically polarizable particles 68 dispersed in a carrier medium 70. As shown in FIG. 4(b), the formation of particle chains upon the application of a magnetic field is essential to the operation of the magneto-rheological fluid 66. In the presence of the magnetic field, the magnetically ;polarizable particles 68 line up in particle fibrils which impart resistance to a shear force applied to the magneto-rheological fluid 66. In the presence of a shear force, an equilibrium that is established between the formation and braking of particle fibrils corresponds to the yield strength defined for the fluid.

FIG. 4(c) shows the non-energized state of an ER fluid 72, such as that used as the variable viscosity material of the embodiment of the inventive variable resistance device 5 shown in FIG. 1. In a typical ER fluid, dielectric particles 74 (1–100 microns) are dispersed in a dielectric carrier fluid 76. The carrier fluid 76 is usually a silicon or mineral oil, although many different types of fluids can be used. The dielectric properties of the particles 74 and the carrier fluid 76 must be different to ensure that the application of an electrical field will polarize the particles 74. This causes the particles 74 to align and produce the unique ER flow characteristic. As shown in FIG. 4(c), when the particles 74 are not energized by an electrical field, the ER fluid is substantially free-flowing. However, as shown in FIG. 4(d), upon application of an electrical field by applying potential to the top electrode and a potential to the bottom electrode, the dielectric particles 74 in the ER fluid align into fibrils which impart resistance to a shear force acting on the ER fluid. In accordance with the present invention, a sweeping ridge 16 which moves with the rotating electrode member 10 relative to the variable viscosity material, enhances the resistance of rotation of the rotating electrode member 10 by altering the flow path of the variable viscosity material, and also by forming an abutting surface which collides with the fibrils in the energized ER fluid as the sweeping ridge 16 sweeps around with rotation of the rotating electrode member 10.

FIG. 5(a) shows a cross-sectional view of an embodiment of the inventive variable resistance device 5. In this embodiment, the shaft 24 extends through both the top end cap 32 and the bottom end cap 30. A dynamic seal, including confining electrode 105 and O rings 80, is disposed at the exit points of the shaft 24 through the bottom end cap 30 and top end cap 32 to retain the ER fluid within the containing tube 28. In the case of an MR fluid, a magnetic field generating coil can be used in place of the confining electrode 105. The stacking rods 20 are received by appropriately shaped surfaces of the bottom end cap 30 and top end cap 32 so as to fix the spacer members 14 and opposing electrode members 12 in place, and to prevent them from being rotated by the rotation of the rotating electrode members 10. The spacer members 14, in this embodiment, comprise compressible material, such as neoprene, open or closed cell foam, latex, rubber, or other compressible material, so that the gap between the facing surfaces of the rotating electrode member 10 and the opposing electrode member 12 can be selectively adjusted. In this embodiment, the bottom end cap 30 is urged towards the top end cap 32 by tightening nuts 82 on through bolts 84 which secure the top end cap 32 and the bottom end cap 30 to the containing tube 28. As the distance between the bottom end cap 30 and the top end cap 32 decreases, the compressible spacer members 14 are compressed thereby reducing the gap between the facing surfaces of each rotating electrode member 10 and its respective facing opposing electrode members 12. The sweeping ridges 16, in this case, are not compressible. Once the nuts 82 on the through bolts 84 have been tightened just enough for the sweeping ridges 16 in contact with the opposing electrode members 12 to cause a slight resistance to rotation of the shaft 24 (when the ER fluid is non-energized or not present), the spacer members 14 have been compressed a suitable amount to provide the appropriate gap between the rotating electrode members 10 and the respective opposing electrode members 12, which is maintained during use of the device by the sweeping ridges 16. The contact between the sweeping ridges 16 and the opposing electrode member 12 is lubricated by the carrier fluid of the ER fluid. Also, to decrease any frictional effects, the sweeping ridges 16 can be made from Teflon or the like.

FIG. 5(b) shows an embodiment in which the bottom end cap 30 is sealed to the containing tube 28 (or the containing tube 28 may be injection molded or otherwise formed with an integral sealed bottom end). Mounting bolts 86 are provided for fixing the inventive variable resistance device 5 to a frame. The top end cap 32 is fixed to the containing tube 28 by threaded bolts, or another fastening method. A neoprene seal 42 may be provided to seal the top end cap 32 with the containing tube 28. The brush contact housing 56 houses a brush contact 54 which is urged by a spring against the shaft 24. A potential applied through the power supply wire 58 is applied to the shaft 24, while the shaft 24 is free to rotate. The shaft 24, in turn, applies the potential to the rotating electrode members 10 engaged with it. Alternatively, a construction, such as that used in a brushless motor, can be utilized to energize the rotating electrode members 10. In this embodiment, the bottom end of the shaft 24 rests in friction reducing bushing 36 while the shaft 24 is retained in the containing tube 28 by the shaft lock 46. The shaft lock 46 sits on a friction reducing disk 48 which is disposed between the shaft lock 46 and supporting plate member. The supporting plate member may be absent if the opposing electrode member 12 in contact with the friction reducing disk 48 is robust enough to prevent movement of the shaft 24 from warping the opposing electrode member 12 and altering the gap between this opposing electrode member 12 and its respective facing rotating electrode member 10. As shown, the electrical contact (brush contact 54) is in rotational engagement with the shaft 24 for applying the potential to the moving member through electrical contact between the moving member and the shaft 24. Also, the confining electrode 105 is disposed annularly in facing relationship around the shaft 24 and is applied with the potential so that an electrical field is applied to any of the variable viscosity fluid disposed between the shaft 24 and the confining electrode 105. Thus, any variable viscosity material disposed between the confining electrode 105 and the shaft 24 is energized, so that an increase in its viscosity prevents the variable viscosity material from leaking out through the exit through-hole 34 in the top end cap 32 fixed to the containing tube 28. Furthermore, in addition to the spacer members 14 being compressible, the sweeping ridges 16 may also be compressible. In this case, the gap containing the ER fluid between opposing electrode surfaces can be selectively decreased beyond the gap maintained by a non-compressed sweeping ridge 16. Since the ER phenomenon is dependent on the applied electrical field, the varying gap distance results in a variable resistance device which can utilize a constant power supply. Alternatively, a variable power supply can by used in combination with the compressible sweeping ridges 16 to give a very high resolution variable resistance. As shown, the opposing electrode members 12 can have sweeping ridges 16 fixed thereon (also shown in FIG. 3(d)).

FIG. 5(c) shows another embodiment of the inventive variable resistance device 5 in which the top end cap 32 slides within the inner diameter of the containing tube 28, and is sealed with the containing tube 28 by an O ring 80 disposed between the edge of the top end cap 32 and the inner sides of the containing tube 28. FIG. 5(d) shows an embodiment wherein the spacer members 14 are formed of a non-compressible material. In this embodiment, a spring may be provided for urging the assembled stack together so that an appropriate gap is maintained between the rotating electrode members 10 and respective opposing electrode members 12. The spring may be absent, in which case the assembled stack is held together by the clamping force exerted by the end caps 30, 32, and a non-variable predetermined gap between the opposing electrode members 12 and rotating electrode members 10 is maintained by the sweeping ridges 16 and/or the spacer members 14.

FIG. 6(a) shows a configuration of the sweeping ridges 16 retained on a rotating electrode member 10. In this configuration, the sweeping ridge 16 has a contacting surface 88 extending along its top side and its bottom side for contacting with a respective opposing electrode member 12 disposed facing the obverse and reverse sides of the rotating electrode member 10. A sweeping face 90 of the sweeping ridge 16 is pushed through and confronts the variable viscosity fluid as the rotating electrode member 10 is rotated. FIG. 6(b) shows another configuration of the sweeping ridge 16 in which the contacting surface is disposed at either side of a recess 92 at both the top and the bottom sides of the sweeping ridge 16. By providing the sweeping ridge 16 with a smaller contacting surface, the recess 92 reduces any frictional effects due to contact between the sweeping ridge 16 and the opposing electrode members 12. In this case, the sweeping ridge 16 has a slightly reduced sweeping face 90 due to the recess 92, as compared with the sweeping ridge 16 shown in FIG. 6(a), but affords the inventive variable resistance device 5 a lower internal resistance due to a reduction in frictional resistance. FIG. 6(c) shows a perspective view of the sweeping ridge 16 shown in FIG. 6(b).

FIGS. 6(d) through 6(i) show different configurations of the sweeping ridge 16 adapted to be press fit into a receiving slot 94 in the rotating electrode members 10 in a simple manufacturing process described in detail with reference to FIGS. 16(a)–16(d). FIG. 6(d) shows a perspective view of a sweeping ridge 16 having an engaging surface 96 formed by retaining bumps 96. FIG. 6(f) is a side view of the sweeping ridge 16 shown in FIG. 6(d). FIG. 6(g) shows an alternative configuration of the retaining bumps, which are rounded. FIG. 6(h) shows another alternative configuration of the retaining bumps in which the bottom retaining bumps are configured so as to be slid into the receiving groove 50 (FIGS. 3(a) and 3(b) or pressed into the receiving slot 94 (FIGS. 7(a) through 7(d)) of the rotating electrode member 10, while the top retaining bumps are square to prevent the sweeping ridge 16 from being pressed through the rotating electrode member 10. FIG. 6(e) is an isometric view of another configuration of the sweeping ridge 16, in which case an engaging surface 96 is formed as a channel along the sides of the sweeping ridge 16. FIG. 6(i) is side view of the sweeping ridge 16 shown in FIG. 6(e). The sweeping ridge construction shown in FIGS. 6(e) and 6(i) can be easily manufactured by machining a groove into the sides of a long substrate blank, and then cutting the blank into an appropriate number of lengths. Alternatively, the sweeping ridges 16 can be manufactured by mass production methods, such as injection molding. The sweeping ridges 16 should ideally have a dielectric constant effective to minimize any alteration of the electrical field applied to the ER fluid disposed between the rotating electrode member 10 and its respective facing opposing electrode members 12. For example, the dielectric constant of the material comprising the sweeping ridges 16 may be equal to, or approximately that of, the dielectric constant of the carrier fluid 76 comprising the ER fluid or the dielectric constant of the ER fluid itself.

FIGS. 7(a) through 7(d) show various configurations of the rotating electrode member 10 into which the sweeping ridges 16 are inserted by a press fit, or other assembly technique. As shown in FIG. 7(a), a relatively large number of receiving slots 94 are punched or formed in a rotating electrode member substrate for receiving respective sweeping ridges 16. Narrow sweeping ridges 16 can be press fit into place, and the narrowness of the sweeping ridges 16 acts to limit the reduction of surface area available for an electrode face on the rotating electrode member 10 caused by the sweeping ridges 16. The sweeping ridges 16 are placed so as to form effective obstructions to the flow path of the variable viscosity material (ER or MR fluid) so as to enhance the resistance to rotation of the rotating electrode member 10, and hence the resistance to rotation of the shaft 24, as the variable viscosity material becomes more viscous due to an applied field.

FIG. 7(b) shows a configuration of the rotating electrode member. 10 in which the receiving slots 94 for the sweeping ridges 16 are disposed both on the outer perimeter and inner radius of the rotating electrode member 10. The receiving slots 94 may also be disposed on the opposing electrode members 12 in a similar configuration, provided the sweeping ridges 16 disposed on the rotating electrode member 10 do not contact with the sweeping ridges 16 disposed on the opposing electrode member 12 when the rotating electrode member 10 is rotated. In an alternative configuration, the sweeping ridges 16 may be disposed only on the opposing electrode members 12 while the sweeping ridges 16 are absent from the rotating electrode member 10.

FIG. 7(c) shows a configuration in which the sweeping ridges 16 are disposed towards the outer edge of the rotating electrode member 10. The distance from the center of the rotating electrode member 10 increases the individual moment arm of applied resistance from the individual sweeping ridges 16 so that resistance to rotation of the shaft 24 is enhanced without substantially reducing the surface area available as an electrode face on the rotating electrode member 10.

FIG. 7(*d*) shows a configuration wherein the receiving slot 94 for the sweeping ridges 16 is relatively long to accommodate a relatively long sweeping ridge 16. The desired configuration and orientation of the sweeping ridges 16 can be varied depending on design considerations, such as the required ease of rotation when no applied field is present, or the required resistance capacity when a maximum applied field is present, etc. The sweeping ridges 16 fixed to one or both of the rotating electrode member 10 and the opposing electrode member 12 act to enhance the resistance to rotation of the rotating electrode member 10, and hence the rotation of the shaft 24, by altering the flow path and by presenting a sweeping face 90 to the variable viscosity material. Also, the sweeping ridges 16 provide a very effective means of maintaining a precise gap between the electrodes (rotating electrode member 10 and opposing electrode member), thereby greatly enhancing the high-volume mass manufactured consistency, reproducibility, and effectiveness of the inventive variable resistance device 5.

FIG. 8 shows a cross-section of another embodiment of the inventive resistance device which provides an easy to manufacture and easily alterable variable resistance device. In accordance with this embodiment, a variable viscosity material is disposed in a gap between a respective rotating member 10 and opposing member 12. A series of bearings 98 are disposed in bearing grooves 100 to maintain the gap distance to within a very high tolerance and to rotatably support the rotating member 10. In the case of an ER fluid, the bearings 98 should be non-conductive. In the case of an MR fluid, the bearings 98 should be non-magnetic. In the case of an MR fluid a variable magnetic field is applied by a magnetic field generating coil (as shown, for example, in FIGS. 25(*a*) and 25(*b*). In the case of an ER fluid, an electrical field is applied to the ER fluid by applying a potential to the opposing electrode members 12 and a potential to the rotating electrode members 10. The electrical field causes a change in rheology of the ER fluid, thus varying the resistance to the rotation of the rotating electrode member 10 by the shaft 24. The total resistance applied by the stack of rotating electrode members 10 is controlled by controlling the applied voltage and/or controlling the application of polarity to the facing rotating electrode member 10 and opposing electrode member 12 units (i.e., the number of opposing electrode members 12 having applied voltage and/or amount of applied voltage to individually controlled rotating electrode member 10 and opposing electrode member 12 pairs). Also, the number of rotating electrode members 10 and opposing electrode members 12 can be altered from the assembled stack, depending on the application and the anticipated resistance it requires.. A sealing cap 102 is provided at the exit points of the shaft 24 from the assembled stack. The sealing cap 102 seals the interior of the assembled stack from the external environment. By selecting an appropriate dielectric constant for the non-conductive bearings 98, rotating electrode members 10, and/or opposing electrode members 12, any uneven electrical field (which may be caused by, for example, the existence of the bearings 98 between the electrode surfaces) applied to the ER fluid is minimized. The assembled stack may be held together by bolts and nuts, or other fixing means, such as threaded members integrally formed with respective mating sections, gluing, or the like.

Referring to FIGS. 9(*a*) and 9(*b*), a cross-sectional perspective view of an assembled and an exploded rotating electrode member 10/opposing electrode member 12 pair are shown. The rotating electrode member 10 also has a second opposing electrode member 12 (not shown) disposed adjacent to the opposing electrode member 12 shown, and over the rotating electrode member 10, to provide a gap between the interior peripheral surfaces of the two opposing electrode members 12 and the peripheral surfaces of the rotating electrode member 10. As shown by these cross-sectional views, the opposing electrode members 12 in this embodiment of the invention, have a geometry which obviates the spacer members 14 described herein for maintaining the precise gap distance. The non-conductive bearings 98 are disposed in bearing grooves 100 that are offset between the grooves 100 on the top of the rotating electrode member 10 and the grooves 100 on the bottom. This helps to reduce the thickness of the rotating electrode member 10, since the cut groove surfaces are not in the same vertical plane, and also adds stability to the rotation of the rotating electrode member 10.

FIG. 10(*a*) shows a top plan view of an opposing electrode member 12 in accordance with this embodiment of the invention. Each opposing electrode member 12 may be made by machining the geometry shown from a plate of conductive material, such as aluminum, copper or steel. Alternatively, each opposing electrode member 12 can be mass produced by casting, or by forming an injection molded substrate upon which appropriate electrode surfaces are formed through electroplating or adhesion. If the opposing electrode member 12 is made of a conducting material, then an insulating collar 103 may be provided at the receiving through-hole 22 to prevent shorting between the shaft 24 and the opposing electrode member 12. Alternatively, the shaft 24 may be non-conductive and a separate electrical connection with each rotating electrode member 10 provided. One or more variable viscosity material through-holes 104 may be provided to promote the flow of the variable viscosity material within the assembled stack.

FIG. 10(*b*) shows a top plan view of the rotating electrode member 10 and FIG. 10(*c*) shows a top plan and a cut perspective view of the shaft 24. The shaft 24 is received through the engaging through-hole 26 of the rotating electrode member 10, and both the shaft 24 and the engaging through-hole 26 have retaining surfaces. The retaining surfaces lock the rotation of the shaft 24 to the rotation of the rotating electrode member 10. Each rotating electrode member 10 can be machined from a plate of conductive material, or alternatively formed by casting or by injection molding a disk-shaped substrate and forming an appropriate electrode surface thereon. The shaft 24 can be made from a rod having a retaining surface formed by a surface grinder, or can be otherwise extruded, injection molded and plated, or made by any other suitable manufacturing technique.

FIG. 11 shows an enlarged cross-sectional view of the sealing cap 102 and the shaft 24. The sealing cap 102 is disposed at the exit point of the shaft 24 from the assembled stack. A pair of O rings 80 are provided for sealing off the interior of the shaft 24 from the environment. The shaft 24 has a confining electrode 105 disposed between O rings seals, which when energized, reduces the flow of any ER fluid disposed between the confining electrode 105 and the shaft 24 to thereby enhance the seal. The confining electrode 105 is disposed annularly in facing relationship around the shaft 24, and applied with electrical potential so that an electrical field is applied to any of the variable viscosity material disposed between the shaft 24 and the confining electrode 105.

FIGS. 12(a), 12(b) and 12(c) show an alternative configuration for the assembled stack. In this case, the assembled stack is made by assembling rotating electrode members 10 and opposing electrode members 12. The rotating electrode members 10 and the opposing electrode members 12 can be formed by an efficient metal stamping operation, rather than an injection molding and electroplating process. The rotating electrode members 10 can be formed simply by stamping an appropriate disk shape from a sheet of sheet metal. The opposing electrode members 12 can be formed by a machining process, or by an injection molding and electroplating process. Concentric ridges 106 may be formed on either or both the rotating electrode members 10 and the opposing electrode members 12 to maintain an appropriate gap distance between each rotating electrode member 10 and its respective facing opposing electrode members 12. The ridges 106 also help to maintain flatness and rigidity of the opposing electrode member 12 and/or the rotating electrode member 10, as well as to increase the overall stability and strength of the assembled stack. The dielectric constant of the ridges should be selected so as to minimize any uneven electrical field applied to an ER fluid, if the variable viscosity material is an ER fluid. The stack assembly allows for the use of a constant voltage source (i.e., simple power supply). If sweeping ridges 16 are provided, appropriate slots should be disposed in the sweeping ridge 16 to accommodate the concentric ridges 106. By applying a constant voltage, while controlling the number of opposing electrode members 12 and/or rotating electrode member 10 having the potential applied thereto, the overall total resistance available through the assembled stack can be appropriately controlled. Thus, if a greater resistance is required, a larger number of rotating electrode member 10/opposing electrode member 12 pairs have voltage applied thereto to increase the resistance. If less resistance is required, fewer of the rotating electrode member 10/opposing electrode members 12 pairs have the potential applied. The rotating electrode member 10/opposing electrode member 12 pairs not having the potential applied do not add a variable resistance to the assembled stack, since the ER fluid disposed within the gap between these components is not caused to gel. It is to be noted that most of the features described herein with reference to the use of an ER fluid are, by analogy, applicable to the use of an MR fluid. However, in the case of an ER fluid the applied field is electrical while in the case of an MR fluid, the applied field is magnetic.

The total resistance available from the inventive variable resistance device 5 is obtained, for the most part, by those components of the assembled stack to which potential is applied. For example, the first six out of the fifteen total rotating electrode member 10/opposing electrode members 12 pairs (shown in FIG. 12(a)) may have the potential applied causing the particles in the ER fluid to align. The remaining rotating electrode member 10/opposing electrode members 12 pairs do not have aligned ER particles, since the potential is not applied thereto. Control of which components of the assembled stack are energized can be obtained by controlling switching elements (not shown) between the power supply and the opposing electrode members 12 (or rotating electrode members 10) and may include the use of a high-speed microprocessor. This feature allows for a much less expensive and much less complex power supply to be utilized, since only a single constant voltage needs to be supplied. Alternatively, the power supply may be configured to output a variety of constant voltages, for example 1 Kv, 2 Kv, 3 Kv, 4 Kv, so that the total resistance available from the variable resistance device is dependent on the particular voltage applied by the power supply, as well as the number of rotating electrode members 10/opposing electrode member 12 pairs having the potential applied thereto. This feature increases the range of resistance available from the variable resistance device while maintaining a simple power supply, which needs only to output a predetermined number of constant applied voltages. A microprocessor is used to control the application of the voltages to the individual rotating electrode member 10/opposing electrode member 12 pairs of the assembled stack. The microprocessor can receive input from various types of sensing devices, such as from a strain-gauge, position sensor, velocity sensor, rotation sensor, etc. The input is used by the microprocessor to determine an appropriate voltage and/or number of rotating electrode member 10/opposing electrode member 12 pairs which should be applied with the voltage. Due to the extremely fast response time of both MR fluids and ER fluids, a microprocessor having a fast clock speed, hence a fast sampling rate, can be utilized to provide nearly instantaneous alteration of the amount and strength of resistance available from the inventive resistance device. Also, shown in FIG. 12(b) is a plan view of an opposing electrode member 12. Concentric ridges 106 are provided which maintain an appropriate gap distance between the respective rotating electrode member 10 and electrode surfaces of the opposing electrode member. The ridges 106 can be formed by an injection molding process used for forming the opposing electrode member 12 substrate. The ridges 106 are then masked or otherwise prevented from forming an electrode surface thereupon during an electroplating or adhesion process. In accordance with the present invention, an easy to manufacture, assemble, and re-configure variable resistance device is obtainable, having a very small size as compared with that available in the conventional art. As is also shown, stiffening ribs 108 increase the rigidity, flatness, and strength of the opposing electrode member, and, when acting as sweeping ridges 16, result in an enhanced resistance available from the inventive variable resistance device 5.

FIG. 13 shows a simplified cross-sectional view of an embodiment of the inventive variable resistance device 5, in which the opposing electrode member 12 is held in a seat 110 formed by surfaces of the spacer members 14. The respective facing opposing electrode members 12 have disposed between them the rotating electrode member 10, which may be integrally formed with the shaft 24, or provided with a engaging through-hole 26 (shown in FIG. 2(b)) so as to be rotatable around the longitudinal axis of the shaft 24, while being slidable along the longitudinal axis. If the rotating electrode members are formed integrally with the shaft, then the opposing electrode members 12 are split in two so they can be assembled between the rotating electrode members 10. If the rotating electrode members 10 are rigid enough, and the components of the assembled stack are robust enough, sweeping ridges 16 or other gap maintaining features (such as ribs or concentric ridges 106) might be unnecessary, as shown. This configuration is particularly useful when a very free rotation of the shaft 24 is desired when there is no applied field acting on the variable viscosity material (i.e., when the minimum resistance of the inventive variable resistance device 5 is to be output).

FIG. 14(a) is an isometric cut-away view of an input contact area. An input electrical contact 112 is shaped such as to come into pressure contact with the opposing electrode member. The input electrical contact 112 is provided so as to apply potential simultaneously to all of the opposing electrode members 12 (in which case the resistance output of the inventive resistance device is varied by varying the applied voltage). Alternatively, the input electrical contact 112 is wired to a controller 114 so that each of the individual opposing electrode members 12 has the voltage separately applied thereto. In this case, the resistance output of the inventive variable resistance device 5 is controlled by controlling the specific number of individual opposing electrode members 12 (and/or rotating electrode members 10) to which the voltage is applied (for use with a constant voltage supply). A combination of the controlling methods can be utilized to more precisely vary the available resistance outputted by the inventive variable resistance device 5. For example, a total of nine out of fifteen opposing electrode members 12 may be applied with voltage ranging from 0 to the maximum applied voltage (for example, 0–4 kV for a typical ER fluid). In this case, a very precise amount of resistance will be available, which is dependent on the specific number of energized electrodes and the individual voltage values applied from the controller 114. This feature may also be utilized to compensate for different gap distances, to further improve the resolution of the range of available resistance, and to overcome any problems associated with the wearing of the various components of the device, or other circumstances by which the measured available resistance from the inventive exercise device varies. As shown in FIG. 14(b), the input electrical contact 112 is in pressure contact with the opposing electrode member. The spacer members 14 may be electrically insulating, and formed of tough plastic material, such as high density neoprene, polystyrene or polypropylene (if compatible with the formula of the variable viscosity material used in the inventive device).

As shown in FIG. 13, the entire assembled stack may be sealed by dip coating or otherwise applying an epoxy, vinyl, rubber, etc. Sealing means, such as described with reference to FIG. 1 and 5(b), may be provided for preventing the variable viscosity material from leaking at the points of exit from the assembled stack of the shaft 24.

FIGS. 15(a) through 15(d) show manufacturing steps in an inventive method for manufacturing the components of the assembled stack. In this method, a rotating electrode member substrate 116 is provided (FIG. 15(a). A mask 118 covers the rotating electrode member substrate 116 so that surfaces which are not to become electrically conductive are covered. The masked rotating electrode member substrate 116 is then electroplated, such as through a sensitizing and electroplating process (FIG. 15(c)). The masked areas of the rotating electrode member substrate 116 are then exposed, leaving the finished rotating electrode member 10 having appropriate electrically conductive surfaces 118.

FIGS. 16(a) through 16(c) show manufacturing steps in an inventive method for press fitting sweeping ridges 16 into a rotating electrode member 10. The sweeping ridges 16 are held by a press plate 120. The rotating electrode member 10 rests on a receiving die 122, which has spaces 124 for accommodating the sweeping ridges 16 projecting from the surface of the rotating electrode member 10 (FIGS. 16(a)). The press plate 120 is then forced down so that the sweeping ridges 16 are press-fitted into the receiving slots 94 of the rotating electrode member 10 (FIG. 16(b)), to leave the finished rotating electrode member 10 having installed sweeping ridges 16 (FIG. 16(c)).

FIGS. 17(a) and 17(b) show the embodiments of the inventive variable resistance device 5 in which the shaft 24, in addition to rotating the rotating electrode members 10 of the assembled stack, also rotates an electrical generator 126 so as to generate electricity. As shown in FIG. 17(a), the electrical generator 126 generates an electrical current when the shaft 24 is rotated. The electrical current is stepped-up in a stepping-up circuit 128 so that a high-voltage potential can be applied through the brush contact 54 contained in the brush contact housing 56 in rotational contact with the shaft 24 and the electrical connection screw 60 in electrical contact with one of the stacking rods 20 (shown in FIG. 1). To improve the response time of the inventive variable resistance device 5, a resistor (not shown) or other electrical energy dissipater can be used to drain any residual charge built-up between the electrode surfaces having the dielectric ER fluid disposed therebetween. The shaft 24 is in electrical contact with the rotating electrode members 10 while the stacking rod 20 is in electrical contact with the opposing electrode members 12. Thus, an electrical field is applied between each rotating electrode member 10 and its respective adjacent facing opposing electrode members 12, so as to energize the variable viscosity material disposed between them. With this configuration, and with the appropriate gearing and output capacity of the electrical generator 126, a self-regulating resistance device can be provided. In this case, if the shaft 24 is rotated at a fast rate, the electrical generator 126 produces more electrical current, which increases the resistance applied by the inventive variable resistance device 5, thereby slowing down rotation of the shaft 24. As the shaft 24 rotates more slowly, less current is provided, thereby lessening the resistance output by the inventive variable resistance device 5, allowing the shaft 24 rotation to speed up. Thus, an equilibrium is obtained wherein, if the proper design considerations are taken into account, an automatic self-regulating resistance device is provided which allows the shaft 24 to be rotated at a preset rotational velocity independent of the strength or variance of an applied rotational torque. A circuit, such as that described with reference to FIGS. 24(a) through 24(c), can be provided to improve the performance and allow variability of the self-regulating resistance device. A variable resistor 130 may be provided in the electrical circuit between the generator 126 and the inventive variable resistance device 5, so that the rotational speed of the shaft 24 can be varied. If the shaft 24 is to be rotated at a faster speed, then the variable resistor 130 is utilized to draw off and dissipate some of the electric current generated by the generator 126, thereby allowing the shaft 24 to rotate at a faster speed in response to a given rotational torque.

FIG. 17(b) shows another configuration wherein the electrical generator 126 is connected to the inventive variable resistance device 5 through an electrical circuit including a controller 114 and a battery 132. The controller 114 determines the electrical field to be applied to the variable viscosity material disposed between the rotating electrode members 10 and the opposing electrode members 12. The controller 114 determines whether the electrical generator 126 is producing enough current to obtain the desired electrical field, or whether the battery 132 is needed to supplement the current generated by the generator 126. Also, at times when the generator 126 is outputting an excess of electric current for the desired electrical field, the controller 114 sends this current to the battery 132 to replenish it. The controller 114 may include a controlling circuit, such as that described in detail with reference to FIGS. 24(a) through 24(c), or other appropriate control circuitry.

FIGS. 18(a) and 18(b) show a use of the inventive variable resistance device 5 as a brake (FIG. 18(a)) and a clutch (FIG. 18(b)) for a wheel 134 or other rotating object. As shown in FIG. 18(a), when the inventive variable resistance device 5 is used as a brake, the wheel 134 rotates the shaft 24, which in turn rotates the rotating electrode members 10. The containing tube 28 of the inventive variable resistance device 5 is fixed so that when the variable viscosity material becomes more viscous, the rotation of the rotating electrode members 10, and hence the rotation of the rotating object or wheel 134, is resisted. An electrical generator 126 is also rotated by the shaft 24 via an appropriate gearing from a gearbox 136. The electrical current generated by the electrical generator 126 is fed to the inventive variable resistance device 5 through a controller 114. The controller 114 determines how much current is to be supplied to the variable resistance device depending on, for example, the degree of braking desired for slowing down the rotating object. The current generated by the electrical generator 126 is also used to charge the battery 132 when an excess current is generated. A rotational sensor 137 (such as described in FIG. 21(c) may be provided for providing input to an anti-lock brake controller, odometer, etc.

FIG. 18(b) shows a configuration where the wheel 134 is fixed to the containing means and/or opposing electrode members 12. In this case, rotation of the wheel 134 results in rotation of the opposing electrode members 12. The shaft 24, on the other hand, is not directly rotated by the wheel 134, but rather is rotated via the coupling of the opposing electrode members 12 to the rotating electrode members 10 by an increase in the viscosity of the variable viscosity material. In this case, the inventive variable resistance device 5 acts as a clutch mechanism for variably coupling the rotating wheel 134 to the shaft 24. The shaft 24 rotates the electrical generator 126, the housing of which is fixed. A brush contact 54 housed in a brush contact housing 56, or other sliding electrical contact, is provided for supplying electrical current to the rotating electrode members 10, and another brush contact 54, or other sliding electrical contact, provides an electrical potential to the opposing electrode members 12. The clutch selectively applies a braking force on the wheel 134 by coupling the wheel rotation to the generator 126. This system can be used in addition to conventional brakes to provide a regenerative braking system.

FIGS. 19(a) and 19(b) show the inventive configuration wherein the inventive variable resistance device 5 is used as a clutch mechanism (FIG. 19(a)) and a brake mechanism (FIG. 19(b)) for an automobile. These configurations are particularly suited for use in driving and braking an electric car. A generator/motor 125 has a coil and a magnet which are rotated relative to each other, so that magnetic field lines from the magnet are effective to generate an electric current in the coil. In the configuration shown in FIG. 19(a), the generator/motor 125 is fixed to the vehicle chassis. Mounting bearings 138 are also fixed to the vehicle chassis for rotationally supporting the opposing electrode members 12. Thus, the opposing electrode members 12, which are rotated by the wheel 134 are free to rotate, thereby allowing the wheel 134 to rotate. The shaft 24 of the inventive variable resistance device 5 is rotatable with the rotating electrode members 10 disposed between the opposing electrode members 12. The variable viscosity material is effective when energized for coupling the rotation of the wheel 134 to the rotation of the magnet (or coil) of the generator/motor 125, thereby producing current during braking of the wheel 134 and allowing the generator/motor 125 to act as a driving means for rotating the wheel 134.

When driven, a battery 132 supplies current to the generator/motor 125 which drives the shaft 24. The shaft 24 is coupled through the inventive variable resistance device 5 to the wheel 134. By this variable coupling, the generator/motor 125 is not subjected to a massive load when the car is starting from a dead stop, and has not yet built up momentum. As the momentum of the car builds up, the coupling through the variable resistance device becomes stronger. A controller 114 receives a signal from an accelerator regarding a desired speed, and adjusts the current supplied to the generator/motor 125, and the applied field to the variable viscosity material, so that the clutch appropriately couples the shaft 24 driven by the motor to the rotation of the wheel 134. The shaft 24 is variably coupled to the rotation of the wheel 134 so as to obtain a desired speed, while presenting the generator/motor 125 with an optimum load. For example, at times when accelerating from a dead stop, even if the driver presses the accelerator 139 to the floor, the clutch will not be fully coupled. An appropriate current is supplied to the generator/motor 125 and the generator/motor 125 experiences an appropriate load, dependent on such things as the momentum of the car, desired acceleration, etc. Once the automobile has obtained the appropriate momentum, the wheel 134 is fully coupled with the shaft 24. When braking, a current to the generator/motor 125 is cut from the battery 132, and the wheel 134 is coupled to the generator/motor 125 to an appropriate degree so that regenerative braking replenishes the battery 132 by a current provided from the generator/motor 125 as the desired deceleration occurs. If necessary, an auxiliary friction brake may be provided to assist in sudden stops from high speed.

An anti-lock feature is obtained by sensing rotation (such as by the rotational sensor shown in FIG. 21(b)) of the wheel 134 and controlling coupling of the shaft 24 to the wheel 134 so that if the wheel 134 begins to stop rotating (a skid) then coupling is backed-off even if the driver continues to press down on the brake 141. If the rotation of the wheel 134 accelerates, then coupling is increased. FIG. 19(b) schematically shows a configuration in which the wheel 134 is rotatable with the shaft 24 via a flexible linkage 140. The flexible linkage 140 allows for independent suspension of the wheel 134. In this case, the opposing electrodes are fixed by fixing mounts 142 and not allowed to rotate. The rotation of the wheel 134 is decelerated by a variable coupling of the rotating electrode members 10 and, hence, the shaft 24, with the non-rotating opposing electrodes. The generator/motor 125 is provided for driving the wheel 134 and/or for providing a regenerative braking feature for replenishing the power in the battery 132.

FIGS. 20(a) through 20(c) show an alternative configuration wherein cooling means is provided for dissipating heat generated due to braking of the rotating electrode members 10. As shown, an air scoop 144 is provided having plurality of fins 146. The fins 146 conduct heat from the inventive variable resistance device 5 and are cooled by a flow of air (shown as parallel arrows) occurring due to movement (shown as single arrow) of the vehicle. A water, oil, or anti-freeze jacket 148 may be provided surrounding the containing means (containing tube 28) of the inventive variable resistance device 5, so that heat generated during the braking of the rotating object (wheel 134) can be removed and dissipated. This generated heat can be used to warm the occupants of the vehicle.

FIGS. 21(a) and 21(b) show cut-away close up views of the wheel 134 mounted to the variable resistance device as shown in FIGS. 20(a) and 20(b), respectively. As shown in FIG. 21(a), the containing means of the inventive variable resistance device 5 is rotatably supported by mounting bearings 138. The mounting bearings 138 are fixed to the vehicle frame through a suspension system. The water jacket 148 surrounding the inventive variable resistance device 5 dissipates heat from the variable resistance device and conducts the heat to the fins 146 of the air scoop 144. The wheel 134 is mounted to the variable resistance device by mounting studs 150 connected to a mounting plate 152. The mounting plate 152 is in turn affixed to the stacking rods 20 and/or containing tube 28 of the inventive variable resistance device 5, so that as the wheel 134 rotates, so do the opposing electrode members 12. The shaft 24 is not directly rotated by the wheel 134 in this configuration, but rather is variably coupled for rotation by the wheel 134 through the action of the variable viscosity material. A plurality of bearing supports 154 are disposed for rotatably supporting the long shaft 24 to ensure stability and maintain precise tolerance in the inventive variable resistance device 5.

FIG. 21(*b*) shows the configuration wherein the wheel 134 rotates the shaft 24 directly. The wheel 134 may be coupled to the shaft 24 via a flexible linkage 140. In this case, the opposing electrode members 12 are fixed from rotation by fixing mounts 142 supporting the containing tube 128 and fixed to the frame or suspension of the automobile. In either of these configurations, sweeping ridges 16 may be provided on either or both of the rotating electrode members 10 and the opposing electrode members 12 to enhance the resistance capabilities of the inventive variable resistance device 5. The assembled stack may comprise any number of components (rotating electrode members 10, opposing electrode members 12, spacer members 14) as is necessary to be effective for the anticipated loads experienced during braking and/or driving the wheel 134 of the automobile.

FIG. 21(*c*) shows a cross-section of essential parts of a high resolution rotational sensor 137. A multi-faced magnet is rotationally supported on the shaft 24 and surrounded by detection coils. Each time a face of the magnet sweeps across a coil, a pulse of current is generated which when amplified becomes a pulse signal. To provide ultra-high resolution, each pulse is counted by an individual transducer. The counted signals of all transducers divided by time (or microprocessor clock) are proportional to the angular velocity of the shaft 24.

As shown in FIGS. 18(*a*) through 21(*c*), in accordance with this use for the inventive variable resistance device 5, a variable viscosity material capable of undergoing a change in flow characteristics in response to an applied field is disposed so as to surround a plurality of moving members (rotating electrode members 10). In the case of an ER fluid, an opposing electrode member 12 is disposed at either side facing each rotating electrode member 10, so that an electrical field can be applied to the ER fluid disposed therebetween. In the case of an MR fluid, the applying means 52 applies a magnetic field, such as through the use of a magnetic field generating coil (described in more detail below), and thus opposing electrode members are not required. In this case, just as the opposing electrode members 12 are fixed relative to the rotating electrode members 10, so too, the magnetic field generating coil is fixed so that resistance can be developed through the action of the MR fluid acting to resist rotation of the rotating members 10. At least one projecting member (sweeping ridge 16) may be provided projecting from the moving members 10 and may also be provided projecting from the opposing stationary members (opposing electrode members 12). Coupling means couples the rotation of the moving member to the rotation of the rotating object. As shown, in FIG. 21(*a*), the coupling means includes a mounting plate 152 on which the wheel 134 is mounted by mounting studs 150. The mounting plate 152 rotates the stacking rods 20 and thus, the opposing electrode members 12 (or in the case of an MR fluid, the magnetic field generating coil) so that rotation of the rotating members 10 is coupled to rotation of the rotating object (wheel 134), via the action of the variable viscosity material. As shown, for example, in FIG. 21(*b*), the wheel 134 can be fixed to the shaft 24 via a flexible linkage 140, so that the rotation of the moving members is coupled to the rotation of the rotating object (wheel 134).

Controlling means controls the applying means 52 (e.g., the power supplied to the rotating electrode members 10 and the opposing electrode members 12 or the magnetic field applying coil) to apply an applied field so that a change in the flow characteristics of the variable viscosity material provides resistance to rotation of the moving members. Containing means, such as the containing tube 28, is provided for containing the various components of the assembled stack of the inventive variable resistance device 5. At least a portion of the shaft 24 for rotating the moving members is contained within the containing means. The coupling means may include means for linking rotation of the rotating object to rotation of the shaft 24, so that an increase in viscosity of the variable viscosity material provides a resistance to rotation of the moving member, so as to apply a braking force on the rotating object (for example, wheel 134). Electrical generating means (generator 126) rotated by the shaft 24 may be provided so that when the rotation of the rotating object is linked to the rotation of the shaft 24, the generator 126 is rotated to produce energy. The coupling means may include means for fixing the containing means (mounting studs 150 shown in FIG. 21(*a*)) to the rotating object (wheel 134) so that an increase in the viscosity of the variable viscosity material couples rotation of the rotating object to rotation of the shaft 24 for braking the rotating object.

Alternatively, the electrical generator 126 may be mounted so that rotation of the containing means rotates the electrical generator 126 to generate electricity, and the rotating object may be fixed to the shaft 24. The electrical generating means may alternatively comprise an electric generator/motor 125 for driving the rotating object through the coupling of the rotation of the rotating object to the rotation of the shaft 24. A battery 132 provides electrical current to the electrical generator/motor 125. The controller 128 may control the supply of the electrical current from the electrical generating means and the supply of the electrical current from the battery 132, so that when the rotating object is being driven, the electrical current is supplied from the battery 132 to the electrical generator/motor 125, and when the rotating object is being braked, the electrical current is supplied from the electrical generator/motor 125 to the battery 132.

Referring now to FIGS. 22(*a*) through 22(*d*), another use for the inventive variable resistance device 5 is shown. In this use, the variable resistance device is used to control the unwinding of a line wound on a bobbin 156, such as for an inventive tension responsive fishing reel described in Applicant's U.S. Pat. No. 5,248,113, issued Sep. 28, 1993; and Applicant's U.S. Pat. No. 5,252,958, issued Oct. 12, 1993, both of which are incorporated by reference herein. The bobbin 156 may be a component in a fishing reel, or may be used for a holding spool of wire as it is being drawn through a reducing die. In the case of the wire drawing use, the inventive variable resistance device 5 can be utilized to ensure that highly precise tension is applied to the wire as it is being drawn through the reducing die, thereby providing a superior end product. This is particularly useful when drawing highly ductile materials, such as gold wire or the like. In the case of the fishing reel, the inventive variable resistance device 5 provides nearly instantaneous adjustability to the drag on the bobbin 156 in response to the efforts of a fisherman bringing in a fighting fish. Conventionally, at instances when the fish exerts a sudden pull on the line, the abrupt increase in tension usually results in the line snapping. However, in accordance with the present invention, rather than snapping the line, the inventive variable resistance device 5 nearly instantaneously reduces the drag on the bobbin 156 to temporarily reduce the tension so that the line does not snap.

FIG. 22(*d*) shows an exploded view of the inventive reel. The inventive variable resistance device 5 exerts a variable resistance to rotation of the shaft 24 depending on the field applied to the variable viscosity material. The bobbin 156 is rotationally supported on a frame 158 between a bearing member 160 disposed adjacent to the variable resistance device and bearing members 160 which are part of the frame 158. A crank 162 rotates a rod 164 on which is fixed a drive member 166. As shown in FIG. 22(*a*), the drive member 166 is in contact with a drive surface 168 of the bobbin 156. When the crank 162 rotates the rod 164, the drive member 166 drives the bobbin 156 to retrieve a fishing line. The bobbin 156 is rotatably connected with the shaft 24 of the variable resistance device via a one-way clutch mechanism 170 so as to be rotatable against the resistance of the variable resistance device 5 in a direction which allows the line to be drawn out off the bobbin 156. In the other direction, the bobbin 156 is driven by the drive member 166 so that the line 165 can be retrieved onto the bobbin 156. As shown in FIG. 22(*b*), the drive member 166 can be repositioned by pushing the crank 162 and rod 164 down and out, so that the distance of the drive member 166 from the center of rotation of the bobbin 156 is increased (FIG. 22(*a*) and 22(*c*). By moving the drive member 166 in this way, the drive ratio is changed so that an angler can quickly rotate the bobbin 156 to retrieve the line after a cast (with the drive member 166 closest to the center FIG. 22(*a*)), or slowly reel in a strong fish with more mechanical advantage (with the drive member 166 farthest from the center (FIG. 22(*c*)). Thus, in accordance with this inventive use of the inventive variable resistance device 5, a rotatably supported bobbin 156 is provided for holding a coil of line 165. The inventive variable resistance device 5 controls the rotation of the bobbin 156, in response to signals generated by a pressure transducer 167 (strain gauge, etc.) which may be connected with a bail 169 of the inventive reel. The resistance device comprises a variable viscosity material capable of undergoing a change in flow characteristics in response to an applied field. A moving member 10 having at least one surface facing the variable viscosity material is provided and applying means 52 (shown in FIG. 4(*c*)) for applying the applied field to the variable viscosity material is also provided. Sweeping ridges 16 may project from the moving member into the variable viscosity material, to enhance the resistance potential of the inventive variable resistance device 5 and to maintain a precise gap distance. Coupling means, including the shaft 24 and one-way clutch mechanism 170, are provided for coupling rotation of the moving members 10 to rotation of the bobbin 156, so that the variable resistance device is effective to provide a variable drag on the release of the line from the bobbin 156.

FIG. 23 shows another use for the inventive variable resistance device 5. In this use, the variable resistance device is used to couple the rotation of a wind driven propeller 172 to an electrical generator 126 to harness the wind for the generation of electricity. The device is supported on a .pole 174 by a rotational support 176 and has a vane 178 which automatically points the propeller 172 into the wind. As wind blows across the vane 178, the vane 178 will dispose itself at a position of least resistance, thereby rotating the device on the rotational support 176 so that the propeller 172 is facing the wind. The variable resistance coupling of the variable resistance device allows the propeller 172 to build momentum during instances of low wind. This momentum is then tapped for energy once it reaches an appropriate level. This inventive use of the inventive variable resistance device 5 enhances the wind-to-electricity conversion efficiency of this inventive electricity generating device. Appropriate gearing from a gear box may be disposed between the propeller 172 and generator 126 so that the generator 126 is rotated at an appropriate speed to maximize the electrical energy production. A similarly constructed device can be used to harness other sources of energy, such as flowing water, geo-thermo generated steam, etc.

FIG. 24(*a*) is flow-chart for explaining, in general, a controlling operation of the inventive variable resistance device 5 wherein a constant rotational velocity is imparted to the shaft 24. Such control of the inventive variable resistance device 5 can be used to provide a variable resistance exercise device, such as that described in Applicant's U.S. Pat. No. 5,409,435, issued Apr. 25, 1995, and incorporated by reference herein. During instances when the inputted torque on the shaft 24 causes the shaft 24 to rotate faster than a threshold value, the resistance of the variable resistance device is increased to slow the rotation of the shaft 24. Conversely, when the inputted torque on the shaft 24 causes slower rotation than the threshold level, the resistance is reduced and the shaft 24 rotates more freely. A threshold value is received (from sensors, a memory, a user-operable input device, etc.) (step one). The threshold value may depend on any appropriate single variable or combination thereof (e.g., rotational speed, linear speed, power-generated, applied force, etc.). A detection signal dependent on the variable is compared with the threshold value (step two) to determine an appropriate potential to apply to the rotating electrode members 10 and opposing electrode members 12 to cause the appropriate ER fluid response. In the case of an MR fluid, the appropriate magnetic field is determined and applied by the magnetic field generating coil 194. If the detection signal equals the threshold value (step three), within some predetermined tolerance, the resistance is determined to be appropriate, the applied potential field is not changed, and control goes to step two. If the detection signal does not equal the threshold value (step three), then the resistance is not appropriate and the applied potential field is to be changed. If the detection signal indicates that the threshold has not been exceeded (step four), then the applied field is decreased (step five), and control goes to step two. If the detection signal indicates that the threshold has been exceeded (step four), then the applied field is increased (step six), and control goes to step two. This control flow is appropriate when the threshold value is a desired maximum, such as when a maximum limit on a rotational speed is to be maintained. If the threshold value is a desired minimum, then when the threshold is exceed in step four, the applied field is decreased in step five, and when the threshold is not exceed in step four, the applied field is increased in step six. Stated otherwise, the applied field may alternately be decreased or increased when the threshold has or has not been exceeded, depending, for example, on the sensed variable and electronics composing the controller 114 and sensor 184. The flow chart exemplifies control of the inventive variable resistance device 5 for obtaining a desired constant velocity. However, by appropriately controlling the available resistive force over time, any suitable control of the variable resistance device can be performed. For example, a constant acceleration/deceleration of an object can be obtained using a velocity sensor 184 (speed/time sensor 184) for obtaining the detected value compared with the threshold value.

FIG. 24(b) shows a block diagram of a circuit for controlling the inventive variable resistance device 5 so that the shaft 24 rotates at a selected velocity and FIG. 24(d) is a graph plotting an example of the value of $V_{ramp}$ over time. Upon resetting of the circuit, a reference voltage $V_{ref}$ is inputted into an integrator 180. To provide gradually increased adequate initial resistance, the integrator 180 outputs a voltage $V_{ramp}$ which increases during a set time up to $V_{max}$. $V_{max}$ is a predetermined base-line value for applying a predetermined base resistance to the rotation of the shaft 24. This base resistance may not be necessary if there is an adequate non-energized component resistance (such as internal resistance of the variable resistance device). $V_{ramp}$ from the integrator 180 is received by a summer 182. As the shaft 24 rotates, a sensor 184 detects the rotational velocity of the shaft 24. In this case, the sensor 184 may be a magnetic sensor, Hall effect sensor, optical sensor, or the like. The sensor 184 includes a reference member 186, which may be, for example, a magnet or an optical member fixed to the shaft 24. The reference member 186 comes into proximity with the sensor 184 with each revolution of the shaft 24. The sensor 184 outputs an electrical pulse each time the reference member 186 passes by. The electrical pulse train output by the sensor 184 is dependent on the frequency of the passes of the reference member 186, and the frequency is dependent on the rotational velocity of the shaft 24. A frequency-to-voltage converter 188 converts the frequency pulse train (fsensor) to a voltage $V_{sensor}$ having a value dependent on the rotational velocity of the shaft 24. $V_{sensor}$ from the converter is also received by the summer 182 and added to $V_{ramp}$. The sum of $V_{ramp}$ and $V_{sensor}$ from the summer 182 is received by a gain amplifier 190 and amplified to a voltage $V_{brake}$. $V_{brake}$ is used to control the variable resistance device to apply a braking force on the shaft 24 effective to maintain the velocity of the shaft 24, and hence the shaft 24 rotates at a selected speed. If the velocity of the shaft 24 drops below a predetermined level, a comparator 192, which receives $V_{sensor}$ resets the integrator 180 to begin ramping $V_{ramp}$ back up to $V_{max}$.

FIG. 24(c) shows a schematic diagram of the circuit shown in block form in FIG. 24(b). In accordance with the circuit, a voltage-to-current converter (LM2917) receives the frequency pulse train fsensor from the sensor 184, and an appropriate control of the variable resistance device is provided. As an alternative to the circuit shown, an EPROM, or other writable computer chip, can be used to store an appropriate program for controlling the variable resistance device in a manner to effect a desired applied resistance to control the rotation of the shaft 24 overtime. Also, a very high resolution sensor 137, as shown in FIG. 21(c) can be used to sense rotation of the shaft 24.

FIG. 25(a) shows an embodiment of the inventive exercise devise wherein the spacer members 14 (shown in FIG. 1) are replaced by magnetic field generating spacer members 14 comprising a conductive winding 202 wrapped around a magnetizable core 196. Each spacer member may be individually controlled so that the magnetic field generated within the gap maintained by a particular spacer member can be varied. This configuration allows for the flexible design attributes of the inventive assembled stack, wherein the number of components, and hence the resistance capacity of the assembled stack, can be varied depending on desired design parameters. FIG. 25(b) shows another embodiment of the inventive variable resistance device 5 which utilizes a magnetically reactive material (such as MR fluid, Ferrofluid, or magnetizable powder) as the variable viscosity material. In this case, the applying means 52 includes a magnetic field generating coil 194 which is formed by winding conductive wire 202 around a magnetizable core 196 having the shape of a hollow cylinder. A unitary moving member 198 is provided having individual disk members fixed to a shaft 24 with a space between adjacent disk members. The space between the adjacent disk members is filled with the variable viscosity material. As the field applied to the variable viscosity material causes a change in theology, the resistance to rotation of the shaft 24 is variably altered. Also, although not essential for this embodiment, sweeping ridges 16 may be disposed between the adjacent disk members to cause turbulence to the flow of the variable viscosity material so as to enhance the resistance effect due to the change in theology in response to the applied magnetic field. As shown in FIG. 25(b), the rotating member 10 may be a unitary moving member 198 having resistance enhancing surfaces (sweeping ridges 16), which also add rigidity and strength to the unitary moving member 198. Many of the components described with reference to embodiments of the inventive resistance device 5 utilizing an ER fluid are also adaptable for embodiments of the inventive variable resistance device 5 that utilize the magneto-rheological fluid, and vice-versa (i.e., the sweeping ridges 16 are effective for enhancing the resistance obtained due to a change in theology of a magneto-rheological fluid).

FIG. 26 is a cross-sectional view of an assembled stack in accordance with the inventive resistance device. In this embodiment, a plurality of rotating members (which may be comprised of a single unitary moving member 198, or comprised of multiple rotating members 10 rotatable by and slidably engaged on shaft 24), are surrounded by a magnetically reactive material, such as an MR fluid. Magnetic field lines 200 are generated by a magnetic field generating coil 194, which may be a single coil 194 or a plurality of coil spacer members 14, which align particulates of the magnetically reactive material. The aligned particulates present resistance to rotation of the rotating members 10, which may be enhanced by sweeping ridges 16.

FIG. 27 shows a top plan view of a rotating member 10 having sweeping ridges 16 disposed thereon surrounded by a magnetic field generating coil 194. The magnetic field generating coil 194 comprises a magnetizable core 196, such as iron, cobalt, nickel, or the like. A winding 202 of conductive wire, such as copper, conductive polymer, or the like is wrapped around the magnetizable core 196. A current passed through the conductive winding 202 generates magnetic field lines 200 which cause the magnetically reactive material to become more viscous. The sweeping ridges 16 disposed on the rotating member 10 enhance the resistance to rotation of the rotating member 10 by presenting a confronting surface swept through the viscous magnetically reactive material.

FIGS. 28(a) through 28(d) show a method for forming the magnetic field generating coil 194. This inventive method has the advantages of ease of manufacturability and allows a magnetic field generating coil 194 having an unlimited size and potential field strength to be easily formed. This feature greatly enhances the designability, customization and manufacturability of the inventive variable resistance device 5. FIG. 28(*a*) shows a magnetizable core 196 comprising a cable made up of strands of magnetizable material, such as iron, cobalt, nickel, or the like. The strands of the magnetizable material are woven together to form a flexible cable. A winding 202 of insulated conductive wire is wrapped around the magnetizable cable core 196. FIG. 28(*b*) shows an alternative configuration in which the magnetizable core 196 is a single bar or rod of magnetizable material. A conductive winding 202 is wrapped around the magnetizable core 196. As shown in FIG. 28(*c*), the magnetizable core 196 having the conductive winding 202 wrapped around it is formed into a hollow cylindrical shape. A forming member 204 may be provided around which the magnetizable core 196 is wrapped. The forming member 204 may have soft outer shell 206, such as rubber, or the like, to prevent damage to the conductive winding 202 wrapped around the magnetizable core 196 during the forming process. As shown in FIG. 28(*d*), the inventive magnetic field generating coil 194 is formed by wrapping a conductive winding 202 around a magnetizable core 196, and then forming the magnetizable core 196 into a hollow cylindrical shape. The magnetizable core 196 and winding 202 may be wrapped around the formed hollow cylindrical shape again and again to further increase the potential magnetic field generating capability of the magnetic field generating means.

FIGS. 29(*a*) and 29(*b*) show an inventive force dampener device, for use, for example, as a shock absorber in the suspension of a vehicle, such as an automobile, train, bus, all-terrain vehicle, motorcycle or the like. First containing means (first bellows 208) is provided having a first opening. The first bellows 208 is capable of being expanded and contracted for containing a varying amount of a variable viscosity material. Second containing means (second bellows 210) is provided having a second opening. The second bellows 210 is also capable of being expanded and contracted for containing a varying amount of the variable viscosity material. Valving means 212 is disposed between the first bellows 208 and the second bellows 210. The valving means 212 is in communication with the opening of the first bellows 208 and the opening of the second bellows 210 for valving a flow of the variable viscosity material between the first bellows 208 and the second bellows 210. Thus, the valving means 212 is effective to variably control the flow of the variable viscosity material between the bellows, so that a force acting to compress the first bellows 208 causes the variable viscosity material to flow from the opening of the first bellows 208 through the valving means 212, through the opening of the second bellows 210 and into the second bellows 210. The flow of the variable viscosity material into the second bellows 210 causes the second bellows 210 to expand, while the first bellows 208 contracts. Controlling means, (controller 114 which may include a high-speed microprocessor), controls the valving means 212 to adjust the flow rate of the variable viscosity material from the first bellows 208 to the second bellows 210. Urging means 214 (such as a spring, air spring, or compressible material) is provided for urging the second bellows 210 to compress it so as to cause the variable viscosity material to flow from the second bellows 210, through the valving means 212, and into the first bellows 208. Thus, the urging means 214 forces the variable viscosity material from the second bellows 210 to the first bellows 208 to expand the first bellows 208 after the applied force stops acting to compress the first bellows 208. This configuration of the inventive force dampener offers tremendous advantageous over the prior attempts to provide a controllable dampener using a variable viscosity material (see FIGS. 54(*a*) and 54(*b*)). The inventive configuration is fully self-contained thereby avoiding the difficulties associated with a dynamic seal. Also, the inventive configuration is adaptable to the use of a variety of ER and MR fluid values, such as those described below.

FIG. 28 is an isolated view of the inventive force dampener components. In this case, a spring 214 is disposed in the interior of either or both the first bellows 208 and the second bellows 210. The urging force provided by each respective spring 214 can be chosen depending on design parameters so that an appropriate equilibrium position and force dampening attributes are obtained for a given static load and anticipated displacements.

FIGS. 30(*a*) through 30(*c*) show another embodiment of the inventive force dampener. In this embodiment, a plurality of moving sheet electrode members 216 are disposed in parallel (or concentric) arrangement within an inner cylinder 218. The inner cylinder 218 contains a variable viscosity material (ER fluid, MR fluid, or the like). In the embodiment shown, the moving sheet electrode members 216 are electrically conductive and the variable viscosity material comprises a material capable of undergoing a change in flow characteristics in response to an applied electrical field. However, the configuration of this embodiment may also utilize a magnetically reactive material, in which case, the applied magnetic field is supplied by magnetic field generating means, such as parallel or concentric magnetic field generating coils. In the embodiment shown, each moving sheet electrode moves in response to movement of a force transfer member 220 so as to slide between parallel (or concentric) opposing sheet electrode members 222. As shown in FIG. 30(*a*), when potential is not applied to the moving sheet electrode members 216 and the opposing sheet electrode members 222 (so there is no electrical field applied to the variable viscosity material disposed between them), resistance to movement of the force transfer member 220 is minimum. However, as shown in FIG. 30(*b*), when potential is applied to the moving sheet electrode members 216 and the opposing sheet electrode members 222, the particulates in the variable viscosity material (ER fluid) align, thereby resisting movement of the force transfer member 220. In accordance with this configuration, as the force transfer member 220 moves farther downward, a greater amount of electrode surface area between the moving sheet electrode members 216 and the opposing sheet electrode members 222 applies the electrical field to the variable viscosity material. Therefore, if a constant voltage is applied to the moving sheet electrode members 216 and the opposing sheet electrode members, the movement of the force transfer member 220 is resisted relatively slightly at first, and then automatically the resistance applied by the change in viscosity of the variable viscosity material increases, so as to apply an increasing resistance to movement of the force transfer member 220. The amount of resistance to movement of the force transfer member 220 can be varied by varying the voltage applied to the moving sheet electrode members 216 and the opposing sheet electrode members 222, so as to controllably dampen a force applied due to abrupt displacement of the supported vehicle to maximize the comfort and safety of passengers in the vehicle. Although shown as a flat surface, the moving sheet electrode members 216 may be composed of concentric cylindrical members sliding between similarly shaped opposing cylindrical members. This configuration maximizes the electrode surface area.

The inventive force dampener has been described for use in the suspension system of a vehicle. However, it can also be used to provide protection of buildings to the effects of an earthquake. In this case, the building is supported on a structure which can move in response to the movement of the earth during an earthquake. The inventive force dampener controls movement of the support so that the forces due to the movement of the earth are dissipated, and the effects of these forces on the building are minimized. As advances in ER and MR fluid formulation continue, the change in rheology in response to a varied applied field should make such applications feasible.

As shown in FIG. 30(c), either the moving sheet electrode members 216 or the opposing sheet electrode members may have at least one projecting member (sweeping ridge 16) which projects from the moving sheet electrode member 216 and into the variable viscosity material disposed between the moving sheet electrode members 216 and the opposing sheet electrode members 222. The projecting members are composed of a non-conductive material, if the variable viscosity material is electrically reactive (ER fluid) to prevent shorting between the electrode surfaces. In this case, the dielectric constant of the material comprising the projecting members should be selected so that the electrical field applied between the moving sheet electrode members 216 and opposing sheet electrode members is not appreciably varied due to the existence of the projecting members (i.e., the dielectric constant of the projecting members should match the dielectric constant of the carrier fluid 76 of the ER fluid). If the variable viscosity material is a magnetically reactive material (MR fluid), then the projecting members can be either conductive or non-conductive. In this case, the structure of the moving sheet electrode members 216 and the opposing sheet electrode members 222 is not used to apply an electrical field, and therefore does not have to be electrically conductive. This allows the use of other materials, such as plastics or composites, from which to form the components of the inventive force dampener.

FIGS. 31(a) through 31(c) show another embodiment of the inventive force dampener. In this embodiment, the force transfer member 220 is integrally formed with the moving members to obtain a unitary moving member 198. The unitary moving member 198 comprises a plurality of disk members joined together so as to form a gap between adjacent disk members. The inner cylinder 218 of the inventive force dampener is filled with a variable viscosity material (in the embodiment shown, the variable viscosity material is an MR fluid). The inner cylinder 218 also contains magnetic field applying means (magnetic field generating coil 194), although the magnetic field applying means may be disposed outside the inner cylinder 218, if the inner cylinder has an appropriate magnetic permeability. The unitary moving member 198 is disposed within the inner cylinder 218, and the force transfer member 220 passes through an exit through-hole 34 in sealing cap 102 that seals the inner cylinder 218. Sealing means, such as an O ring seal or a confining electrode 105 (magnetic coil) seal, described below with reference to FIGS. 42(a) through 42(c), prevents the variable viscosity material contained in the inner cylinder 218 from leaking out and from being contaminated. To control the speed at which the force transfer member 220 is able to move (and thus actively dampen a force acting on the force transfer member 220), a magnetic field is applied to the variable viscosity material using the magnetic field generating coil 194. The magnetic field generating coil 194 may be formed by the coil 194 forming method described herein with reference to FIGS. 28(a) through 28(d). As the viscosity of the variable viscosity material increases in response to the applied magnetic field, the speed at which the force transfer member 220 is able to move the unitary moving member 198 for given applied force becomes slower. The plurality of disk members and the disposal of the variable viscosity material in the gap between adjacent disk members greatly enhances the resistance experienced by the force transfer member 220 as compared with a configuration wherein the moving member is merely a single cylindrical unit.

Furthermore, as shown in FIG. 31(c), to minimize the resistance to movement of the moving member when no magnetic field is applied, variable viscosity material through-holes 104 may be provided in disk members so that the variable viscosity material can flow through the variable viscosity material through-holes 104 as the force transfer member 220 moves the unitary moving member 198 within the variable viscosity material. As the variable viscosity material becomes more viscous, the flow through the through-holes 104 is restricted.

FIGS. 31(d) through 31(f) show a variation of the embodiment shown in FIGS. 31(a) through 31(c), wherein the magnetic field applied to the variable viscosity material is augmented by a magnetic field generated by a secondary magnetic field generating coil 194 disposed around the shaft 24 connecting the disk members and/or around at least portion of the force transfer member 220. To obtain an added degree of controllability of the magnetic field, and thus an added degree of controllability of the inventive force dampener, the polarity of the magnetic fields generated by the primary magnetic field generating coil 194 and the secondary magnetic field generating coil 194 (the coil 194 disposed at the shaft 24 and force transfer member 220), can be suitably controlled. For example, the magnetic field applied by the primary magnetic field generating coil 194 can have its North pole orientation in line with the North pole orientation of the magnetic field generated by the secondary magnetic field generating coil 194, or the poles may be reversed. This can be effectively accomplished simply by controlling the direction of DC current applied to the winding 202 of the respective magnetic field generating coil 194.

FIG. 32(a) shows an embodiment of the inventive force dampener in which a first bellows 208 communicates with a second bellows 210 through magnetic field generating valving means 212, so that force applied to compress the first bellows 208 forces a magnetically reactive material through the valving means 212 and into the second bellows 210 thereby causing the second bellows 210 to expand. This configuration, as well as the other embodiments of the inventive force dampener described herein, provides a closed system thus obviating the need for a dynamic seal against leakage evaporation, and contamination. The rate of flow of the variable viscosity material from the first bellows 208 to the second bellows 210 is variably controlled by an applied magnetic field applied to the variable viscosity material at the valving means 212, which in the case of an MR fluid is an electromagnetic field source 224. Urging means 214 (spring 242) is provided for compressing the second bellows 210 to force the variable viscosity material back into the first bellows 208 to establish a state of equilibrium. The spring also compresses the second bellows 210 to force the variable viscosity material into the first bellows 208 in the event that the inventive force dampener is subjected to an extending force (such as when a vehicle tire encounters a pothole 234 (shown in FIG. 34(c)). The valving mean 212 is fixed to the inner walls of the inner cylinder so that the compression of the first bellows 208 forces the variable viscosity material to flow into the second bellows 210.

In the embodiment shown in FIG. 32(b), a magnetic field is generated by a magnetic field generating coil 194 disposed around at least portion of the first bellows 208 and/or the second bellows 210. In this case, the variable viscosity material flows from the first bellows 208 to the second bellows 210 through a conduit portion 226 held fixed to the walls of the inner cylindrical member. The second bellows 210 and the first bellows 208 can compress and expand to control the speed of force transfer member 220, and the variation in the viscosity of the variable viscosity material in response to an applied magnetic field controls the force dampening aspects of the inventive force dampener.

In another alternative embodiment shown in FIGS. 33(a) and 33(b), the variable viscosity material comprises a compressible carrier fluid 76, such as a silicone oil. The compressibility of the silicone oil variable viscosity material is controlled by the strength of an applied magnetic field thereby providing variably controllable force dampening. A spring member 214 (or air bladder) may be disposed within the bellows containing the silicone variable viscosity material to provide a stronger equilibrium restoring force.

FIG. 33(c) shows another embodiment of the inventive force dampener. In this embodiment, a piston 225 is moved through an inner cylinder 218 that is filled with a variable viscosity material. The piston 225 is moved through the variable viscosity material by a force transfer member 220. The force transfer member 220 moves in response to a force applied to it, such due to a bump encountered by a vehicle supported by a suspension system incorporating the inventive force dampener. As with a conventional shock absorber, the inventive force dampener varies the effective spring constant of the suspension spring 240 associated with it. However, unlike a conventional shock absorber, the inventive force dampener provides active control of the energy dissipation qualities of the suspension system. The inventive force dampener continuously varies the effective spring constant of the suspension spring to most effectively counteract the effects of the vehicle displacement due to, for example, an encountered pot hole or bump. The speed at which the force transfer member can move in response to an applied force is controlled by actively controlling the flow rate of the variable viscosity material through the piston 225.

Various piston configurations are shown in the side views and the top plan views shown in FIGS. 33(c)–33(k). FIG. 33(d) shows a sectional side view, while FIG. 33(i) shows a top plan view of one configuration of the piston 225. In this configuration, a plurality of concentric magnetic field generating coils 194 are disposed with a gap between adjacent coils 194. In this case, the inner cylinder 218 is filled with a magnetically reactive variable viscosity material. By controlling the magnetic field generated by each of the magnetic field generating coils 194, the flow rate of the variable viscosity material through the piston 225 (thus, the speed of the force transfer member 220 in response to an applied force) is actively controlled. The flow rate through the piston 225 can be varied within adequate design parameters to allow the spring 240 to retain a "loose" effective spring constant when no field, or a relatively low field is applied to the variable viscosity material, and a "tight" effective spring constant when a relatively strong field is applied. The inventive force dampener will not be susceptible to the disadvantageous bottoming out effect experienced with conventional shock absorbers, since the flow rate can be selected to allow the force transfer member 220 to move as quickly as necessary to accommodate most bumps. FIGS. 33(e) and 33(h) show a configuration of the piston 225 comprising a plurality of concentric electrodes 227 for applying an electric field to an ER fluid disposed between adjacent electrodes 227. Either the piston configuration having concentric magnetic field generating coils 194 or concentric electrodes 227 can utilize a constant or a varied applied field source. The effective size of the orifice through which the variable viscosity material flows can be varied by selectively applying the electrical or magnetic field between selected pairs of adjacent coils 194 or electrodes 227.

FIG. FIGS. 33(f) and 33(k) show another configuration of the piston 225. In this configuration, a plurality of parallel plate electrodes 264 having fluid passing through-holes 266 and space maintainers 268 are stacked as described with reference to FIGS. 39(a)–39(c). The flow through the stacked parallel plate electrodes 264 is controlled by controlling the electrical field applied to the variable viscosity material flowing through the piston 225. FIGS. 33(g) and 33(j) show another configuration of the piston 225. In this configuration, a plurality of mesh electrodes 260 are stacked with spacer components 262 disposed between the adjacent mesh electrodes 260 as described with reference to FIGS. 38(a)–38(e). The configurations of the piston 225 shown in FIGS. 33(c)–(g) are not exhaustive of the possible piston construction. For example, the ganged-plates members 264 shown in FIGS. 37(a)–37(d) can also be used to provide a piston 225 having a variable effective orifice size for actively dampening an applied force. The inventive force dampener obtained by these configurations of the piston 225 makes use of the nearly instantaneous response time of the ER fluids and the MR fluids to offer dramatic improvements over the conventional shock absorber.

An example of the inventive force dampener used as a shock absorber in a suspension system of a vehicle is shown in FIGS. 34(a) through 34(c). In these figures, an isolated and enlarged view of the first bellows 208, valving means 212, and second bellows 210 is shown adjacent to each respective view of the inventive force dampener device to facilitate an understanding of the inventive device when utilized as a shock absorber in the suspension system of vehicle. As shown in FIG. 34(a), when the vehicle is being driven on a smooth surface, both of the inventive force dampener device associated with the left tire 228 and the right tire 230, respectively, are disposed at an equilibrium position. At this equilibrium position, the amount of the variable viscosity material contained in the first bellows 208 and the amount contained in the second bellows 210 is shown as equal. However, it may also be advantageous to provide the inventive force dampener device configured such that a greater amount of the variable viscosity material is disposed in either the first bellows 208 or the second bellows 210 when the force dampener device is in the equilibrium state. If the amount is greater in the first bellows, then the force transferring member 208 has a greater distance downward to travel before the force transfer member 220 bottoms out. In this case, a relatively greater wheel displacement due to a large bump or high speed can be adequately dampened. Additionally, the greater travel distance allows the force transfer member 220 to move quicker through the variable viscosity fluid, allowing the suspension system to be looser. With this relationship of the amounts contained in the first bellows 280 relative to the second bellows 210 in mind, one can extrapolate the design variable for any particular suspension effect. For most driving circumstances, the first bellows should contain the greater amount, since this ratio of contained amounts gives the variable viscosity device the advantageous attributes just described above.

During the application of a compressing force on the first bellows 208, a positive pressure in the first bellows 208 forces the fluid to flow from the first bellow 208 to the second bellows 210. The control of the flow from the first bellows 208, through the valving means 212, to the second bellows 210 provides controllable dampening of the applied compressing force. When an extending force is applied to the first bellows 208, a negative pressure in the first bellows 208 forces the fluid to flow from the second bellows 210 to the first bellows 208. In this case, the control of the flow from the second bellows 210 to the first bellows 208 provides controllable dampening of the applied expanding force.

As shown in FIG. 34(b), when the left tire 228 encounters a bump 232 in the road surface, the force transfer member 220 of the inventive force dampener device, which is fixed to the vehicle body, exerts a force acting to compress the first bellows 208, thereby causing the variable viscosity material to flow through the valving means 212 and into the second bellows 210, causing the second bellows 210 to expand. In this example, the variable viscosity material comprises a material capable of undergoing a change in flow characteristics in response to an applied electrical field. Thus, the valving means 212 comprises means for applying an electrical field to the variable viscosity material. A more detailed description of such valving means 212 is described with reference to FIGS. 37(a) through 41(b). Alternatively, the variable viscosity material may be a material capable of undergoing a change in flow characteristics in response to an applied magnetic field. In this case, the valving means 212 comprises means for applying a magnetic field to the variable viscosity material, and a detailed description of such valving means 212 is described herein with reference to, for example, FIGS. 32(a) and 32(b). Referring again to FIG. 34(b), a controller 114 controls the valving means 212 to adjust the flow rate of the variable viscosity material from the first bellows 208 to the second bellows 210. Thus, the speed at which the force transfer member 220 moves downward while compressing the first bellows 208 is controlled by controlling the flow rate of the variable viscosity material between the first bellows 208 and the second bellows 210. By thus controlling the flow rate of the variable viscosity material, the inventive force dampener can be adjusted so that the effect of the bump 232 encountered by the left tire 228 is suitably constrained to maximize the safety and comfort of passengers in the vehicle. Also, since the change of the flow characteristics of the variable viscosity material in response to the applied field occurs over a very short time span (milli-seconds), the rate at which the force transfer member 220 travels downward can be nearly instantaneously controlled. This control can be accomplished through the use of a high speed microprocessor, so that, for example, during the initial encounter with the bump 232 a relatively small electrical field is applied to the variable viscosity material (ER fluid 72) through the valving means 212, so that initially the force transfer member 220 moves at a relatively fast rate to accommodate the displacement of the bump 232. Within milli-seconds after the initial encounter with the bump 232, the microprocessor can control the valving means 212 so that an increasing electrical field is applied to the variable viscosity material, thereby slowing the flow rate of the variable viscosity material between the first bellows 208 and the second bellows 210, thus gradually slowing down the rate of movement of the force transfer member 220. Also, when driving on a relatively straight road (such as highway), little or no electrical field may be applied by the valving means 212 to the variable viscosity material, so that the inventive suspension system is "loose." Then, when a bump 232 is encountered, the inventive suspension system absorbs the effects of the bump 232, thereby maximizing the ride comfort of passengers in the vehicle. When the driving conditions require a "tighter" suspension, an appropriate constant base-line field can be applied to the variable viscosity material so that the springs 240 of the inventive suspension system behave "stiffer". A user-selectable control function can be provided so that the vehicle suspension is adjusted to the driver's preference and may include settings that adjust the feel of the suspension corresponding to a particular car type (sports, luxury, etc.) or driving condition (highway, city, off-road, etc.).

FIG. 34(c) shows the action of the inventive force dampener device when the left tire 228 encounters a pothole 234. In this case, the force transfer member 220 remains relatively stationary as the axle 236 of the vehicle, which is supported by the suspension system, travels downward. The downward travel of the axle 236 causes a more negative pressure to occur in the first bellows 208 as compared with the equilibrium condition causing the urging means 214 (spring) in contact with the second bellows 210 to compress the second bellows 210 so that the variable viscosity material flows from the second bellows 210, through the valving means 212 and into the first bellows 208. The rate of flow of the variable viscosity material through the valving means 212 is controlled by the controller 114. To return the suspension system to the equilibrium state, the force transfer member 220 exerts a compressing force on the first bellows 208, thereby causing the variable viscosity material to flow back through the valving means 212 and into the second bellows 210 until the equilibrium state (shown in FIG. 34(a)) is reached. Similarly, after the effects of the bump 232 encountered in FIG. 34(b) have been dissipated, the spring urges the second bellows 210 into compression, causing the variable viscosity material to flow back into the first bellows 208 until the equilibrium state is reached. The flow between the first bellows 208 and second bellows 210 of the variable viscosity material may occur several times to dissipate the effects of the bump 232 or pothole 234 and bring the system back into equilibrium. The number of times the flow goes back and forth, and the rate of the flow, is suitably controlled by the controller 114 so that the comfort and safety of the passengers of the vehicle are maximized.

FIGS. 35(a) and 35(b) show the inventive force dampener in use in place of a conventional shock absorber in the suspension system of motor vehicle. In a conventional shock absorber, a piston is attached to the vehicle body, and moves through a fluid that is contained in a cylinder. The force required to cause the fluid to flow from one side of the piston to the other is approximately proportional to the velocity of the piston in the cylinder. The dampening force of the conventional shock absorber is controlled by the viscosity of the fluid and the size of an orifice in the piston through which the fluid flows. The orifice can pass only so much fluid in a given length of time. If the vehicle body to which the piston is attached is displaced faster than the liquid can transfer through the orifice, a bottoming effect occurs. This effect is experienced by the vehicle occupants when a pot hole in the street is hit at too fast a rate. The suspension springs may appear to bottom out, but actually, it is the conventional shock absorber which has bottomed out.

The inventive force dampener, on the other hand, overcomes the disadvantageous of the conventional shock absorber, and as described herein, offers tremendous advantageous that are not obtainable by the conventional vehicle suspension system. The inventive force dampener is disposed between the control arms 238 of the suspension system of the vehicle so that sudden shocks (such as due to bumps 232 or potholes 234) are absorbed by the inventive force dampener. In accordance with the present invention, when configured for use in a vehicle suspension system, a suspension spring 240 defines a hollow center in which is disposed an embodiment of the inventive force dampener. An equilibrium restoring spring 242 may be disposed for applying a restoring force to the first bellows 208 (FIG. 35(a)), or the second bellows 210 (FIG. 35(b)), depending on the construction of the inventive suspension system. In the configuration shown in FIG. 35(a), the force transfer member 220 and the outer cylinder 244 are fixed to the frame of the vehicle through a direct connection with the top control arm. In this case, the equilibrium restoring spring 212 applies an equilibrium restoring force against the second bellows 210. In the configuration shown in FIG. 35(b), the force transfer member 220 is not fixed to frame, only the outer cylinder 244 is fixed to the frame of the vehicle through a direct connection with the top control arm. In this case, the equilibrium restoring spring 242 applies an equilibrium restoring force against the second bellows 210.

FIGS. 36(a) and 36(b) show an alternative configuration of the inventive force dampener used to control the suspension characteristics of a leaf-spring suspension. In this configuration, components of the force dampener embodiments already described herein (FIGS. 29(a) through FIG. 33) may be utilized to provide the inventive force dampening control of the leaf-spring suspension system. As shown in FIG. 36(a), at an equilibrium state, a pair of moving members 242 disposed in a variable viscosity material filled tube 248 are at an equilibrium position. The variable viscosity material filled tube 248 may be fixed on a support 250 so as to support a vehicle. Alternatively, or additionally, the vehicle may be supported by the ends of the leaf-spring 246. Each of the moving members 242 is movable within the tube 248 by a respective force transfer member 220. Each force transfer member 220 is fixed to a portion of a leaf-spring 246 of the suspension system of vehicle. As shown in FIG. 36(b) the leaf-spring 246 flexes to absorb the forces of, for example, a bump encountered by the tires of the vehicle. This causes the force transfer members 220 to move their respective moving member 242 through the variable viscosity material. The speed at which the force transfer member 220 moves is controlled by controlling the viscosity of the variable viscosity material. The more viscous the variable viscosity material is, the slower the moving member 242 is able to move through it, and thus the slower the force transfer member 220 is able to move. By thereby controlling movement of the force transfer member 220, the speed at which the leaf-spring 246 is able to flex is suitably controlled. In the configuration shown, the moving members 242 are supported in the tube 248 by guiding rods 252 so that the moving members move smoothly through the variable viscosity material. The variable viscosity material may be an ER fluid 72, an MR fluid, or other variable viscosity material (such as finely powdered stainless steel). A variable field effective to vary the viscosity of the variable viscosity material is applied in a controlled manner, such as by a high speed microprocessor, to effect appropriate force dampening of the forces encountered by the suspension system of a vehicle. In another configuration, the bellows 208, 210 and valving means 212 system described herein is used to control the effective spring constant on the leaf spring.

FIGS. 37(a) through 37(d) show an embodiment of the inventive ER fluid valve. An ER fluid 72 requires a relatively high voltage electrical field in order to vary the viscosity of the fluid. The high voltage applied electrical field causes particulates in the ER fluid 72 to align from a random orientation into fibrils effective to impart a high shear resistance, and thus an apparent increase viscosity, to the ER fluid 72. To suitably apply this high voltage electrical field, and to maximize the ER fluid 72 effect, the electrode surface area must be maximized, while the gap between electrodes must be minimized. In accordance with the inventive ER fluid valve, a series of valve plate members 254 provide a large electrode surface area to provide more effective application of an electrical field to the ER fluid 72 flowing between the valve plate members 254. Another construction allowing for a tremendous available electrode (or magnetic coil) area is described herein below with reference to FIGS. 46(a) through 46(g). In the embodiment shown in FIGS. 37(a) through 37(d) the adjacent plate members are alternately applied with opposite potentials so that between any two facing plates an electrical field is applied to the ER fluid 72 disposed therein. FIG. 37(a) shows an isolated perspective view of the ER fluid valve 212. As shown, a plurality of parallel conductive plates 256 are stacked with a gap disposed between adjacent plates 256. Opposite polarities are applied to adjacent plates 256 so as to create an electrical field within the gap. This electrical field is effective to cause particles in the ER fluid 72 disposed in the gap to align, thereby restricting the flow of the ER fluid 72 through the ER fluid valve 212. A variable voltage power source is used to energize the plates 256 to provide variable electrical field, and hence, a variable shear resistance to the ER fluid 72. Alternatively, a constant voltage power source can be used to energize the plates 256. To provide variability to the ER fluid flow, the number of plates 256 being energized (such as by a separately controlled electrical connection with each respective plate) can be controlled so that the ER fluid 72 flows without restriction through non-energized gaps, and the ER fluid flow is restricted through energized gaps. Also, the effective gap, and thus the strength of the electrical field, can be controlled by applying opposite polarity to non-adjacent plates 256 (e.g., skipping plate). Since the ER effect is dependent on the applied electrical field, controlling application of the electrical field in this way will adjust the ER fluid flow through the ER fluid valve.

FIG. 37(b) shows an isolated enlarged perspective view of a ganged-plates member 258 comprising one-half of the plates 256 of the ER fluid valve that are formed together. FIG. 37(c) shows a top plan view of two ganged-plates members 258 arranged just prior to assembly. FIG. 37(d) shows the two ganged-plates members 258 assembled to form the ER fluid valve. In this configuration, opposite polarity is applied to each respective plate 256 of the ganged-plates member 258, so that the ER fluid flow is controlled by controlling the strength of the electrical field (e.g., controlling the potential supplied to two facing ganged-plates members 258). The ER fluid flow through the ER fluid valve can also be controlled by controlling the duration of voltage applied to the ganged-plates members 258. In accordance with this feature, the applied voltage is switched on and off, and the timing of the on/off cycle determines the ER fluid flow, thus enabling the use of a constant voltage source or dramatically increasing the control resolution when a variable voltage source is used. Furthermore, the on/off cycle is not necessarily a varied DC current. Instead, an AC current, having a selectable or a constant frequency and voltage can be used. The type of control method used will depend upon the application, the available power supplies and their associated costs, and the properties of the ER fluid being used. As shown in FIGS. 37(a) through 37(d), the inventive ER fluid valve includes a first ganged-plates member 258 for receiving potential and comprising a plurality of parallel plates 256. Each plate is fixed at one end to a mounting member. A second ganged-plates member 258 receives a potential and also comprises a plurality of parallel plates 256. Each plate 256 of the second ganged-plates member 258 is mounted at one end to another mounting member. The first and the second ganged-plates members 258 are disposed in the flow path of the variable viscosity material in an interlocking manner, with each respective plate 256 of the first ganged-plates member 258 being adjacent to a corresponding plate 256 of the second ganged-plates member 258, so as to define a gap between adjacent interlocked plates 256. A voltage is applied to the first and second ganged-plates member 258, respectively, so that an electrical field is applied to the variable viscosity material disposed between adjacent plates of the first and the second ganged-plates members 258.

FIGS. 38(*a*) through 38(*e*) show another embodiment of the inventive ER fluid valve. In this embodiment, a stack of mesh electrodes 260 are applied with a potential. The ER fluid flow through the stack of mesh electrodes 260 is variably controlled by controlling the potential applied to the mesh electrodes 260. Also, by selectively applying the polarity between non-adjacent mesh electrodes 260, the gap between which the electrical field must be applied can be selected. For example, a first and a second electrode (which are adjacent) define the smallest gap distance across which the electrical field can be applied. However, if no electric polarity is applied to the second mesh electrode 260 in the stack, while polarity opposite the polarity of the first mesh electrode 260 is applied to the third mesh electrode, the gap thus becomes the distance between the first and third electrodes. The gap distance (i.e., the distance between the charged electrodes) greatly influences the ER phenomenon. Thus, by controlling the gap distance, the flow rate through the mesh electrode 260 stack can be variably controlled. Such control may also be accomplished in conjunction with, or separately by, controlling the strength of the applied potential. The individual wires of the mesh electrodes 260 may be oriented so that the adjacent electrodes are stacked one on top of another, or alternatively, the mesh electrodes 260 can be disposed so that individual wires of adjacent electrodes have other orientations, such as to dispose the adjacent wires at an offset position. FIG. 38(*d*) shows the offset and non-offset wire configurations. The orientation will depend on the mesh size and configuration, anticipated loads, and the properties of the ER fluid used. FIG. 38(*a*) shows an enlarged top plan view of a portion of one mesh electrode, and FIG. 38(*b*) shows a top plan view of a circular mesh electrode. A plurality of mesh electrodes 260 are stacked, as shown in FIG. 38(*c*), and applied with opposite polarity between adjacent mesh electrodes 260. FIG. 38(*e*) shows a plurality of spacer components 262 which may be provided between the mesh electrodes 260 to maintain consistent gap distances. The spacer components 262 may have different thicknesses, to provide a variety of gap distances between adjacent mesh electrodes 260. Since the electrical field applied to the ER fluid 72 is dependent on the gap distance, a single power source can be used, and control of the ER fluid flow through the ER fluid valve can be obtained by applying a potential between selected mesh electrodes 260, while leaving others without an applied potential. In accordance with this aspect of the invention, at least two wire mesh electrodes 260 are stacked in facing relationship with each other and disposed in a flow path of the variable viscosity material (ER fluid 72). A potential is applied to each mesh electrode 260, so that an electrical field is applied to the variable viscosity material disposed between the adjacent mesh electrodes 260.

FIGS. 39(*a*) through 39(*c*) show another configuration of the inventive ER fluid valve. In this configuration, the ER fluid valve comprises at least two parallel plate electrodes 264, each having at least one fluid passing through-hole 266. The parallel plate electrodes 264 are stacked in facing relationship with each other and disposed in the flow path of the variable viscosity material (ER fluid 72), so that the variable viscosity material can flow through the fluid passing through-holes 266. A potential is applied to each parallel plate electrode 264 so that an electrical field is applied to the variable viscosity material disposed between adjacent parallel plate electrodes 264. As shown in 39(*a*), an inner space maintainer 268 for maintaining the gap between adjacent facing parallel plate electrodes 264 can be provided. The parallel plate electrodes 264 can be formed by a metal stamping process or an injection molding/electroplating process. The space maintainer 268 can be injection molded, stamped, machined from hollow stock, etc. The parallel plate electrodes 264 are stacked so that facing fluid passing through-holes 266 half overlap, allowing easy flow of the ER fluid 72 through the overlapping hole area. This allows the ER fluid 72 to flow freely when not energized. However, when the electrode surfaces of the parallel electrodes are energized, so as to apply an electrical field to the ER fluid 72 disposed between them, the overlapping electrode surface areas of adjacent parallel plate electrodes 264 allows for adequate electrode area to progressively attenuate the flow of the ER fluid 72 through the inventive ER fluid valve 212, depending on the strength of the applied field. As described with reference to the other configurations or embodiments of the inventive ER fluid valve 212, a constant voltage power source may be used which is cycled on/off, or which applies a potential to non-adjacent parallel plate electrodes 264 in a stack, so as to effect the controllability of the flow of the ER fluid 72 through the inventive ER fluid valve. FIG. 39(*b*) is a top plan view of one of the parallel plate electrodes 264. The ratio of the fluid passing through-hole 266 area relative to the electrode surface area can be suitably determined, depending on the flow characteristics required of the energized and non-energized ER fluid 72. As shown in FIG. 39(*c*), the assembled stack of parallel plate electrodes 264 are disposed between the first bellows 208 and the second bellows 210 so that the flow rate of the ER fluid 72 between the bellows 208, 210 can be controlled by controlling the potential applied to the parallel plate electrodes 264.

FIG. 40 shows an inventive method for forming the stack of parallel plate electrodes 264. In accordance with the inventive method, a parallel plate forming substrate 270 is provided (step 1). The parallel plate forming substrate 270 may be formed by injection molding, or cut from a sheet of non-conductive material, such as plastic or a material used in manufacturing printed circuit boards. A conductive surface 272 is formed on the substrate (step 2). The conductive surface 272 may be formed by electroplating, or otherwise depositing a conductive material, such as copper foil, on the surface of the parallel plate forming substrate 270. A spacing material layer 274 is formed on the parallel plate forming substrate 270 over the conductive surface 272 (step 3). The spacing material layer 274 may be formed by any suitable process, such as those used in manufacturing printed wiring boards. The spacing material layer 274 is patterned to form spacer members 14 (steps through 6). The spacer members 14 may be formed by first depositing an etching resist layer 276, and then patterning the etching resist layer 276, or by forming the etching resist layer 276 in a pattern through a silk screen, or by any other suitable forming method such as photolithography and etching method (step 4). After the patterned etching resist layer 276 has been formed on the spacing material layer 274, portions of the spacing material layer 274 not covered by the patterned etching resist are etched away (step 5), and then the patterned etching resist layer 276 is removed (step 6). Alternatively, the patterned etching resist layer 276 may be left in place, in which case its thickness contributes to the overall thickness of the spacer members 14. Fluid passing through-holes 266 are formed in the substrate (step 7) at any suitable step in the inventive method to complete the thus-formed parallel plate electrode. At least two thus-formed parallel plate electrodes 264 are stacked so that the spacer members 14 maintain a predetermined gap between the respective conductive surfaces 272 of adjacent facing parallel plate electrodes 264. This method allows for precise mass manufacturing of the inventive ER fluid valve using highly efficient manufacturing techniques adapted from the conventional manufacture of printed wiring boards.

FIGS. 41(a) and 41(b) illustrate a stack of parallel plate electrodes 264 disposed in the path of flowing ER fluid 72. In FIG. 41(a) the conductive surfaces 272 of the parallel plate electrodes 264 do not have potential applied to them, and thus the ER fluid 72 is not energized. In this case, the ER fluid 72 flows through the stack of parallel plate electrodes 264 (ER fluid valve) by flowing through the fluid passing through-holes 266 of each parallel plate electrode 264. As shown in FIG. 41(b), when potential is applied to the conductive surfaces 272 of the parallel plate electrodes 264, an electrical field is applied to the ER fluid 72 disposed between the facing conductive surfaces 272. The electrical field increases the viscosity of the ER fluid 72, thereby slowing the flow of ER fluid 72 through the ER fluid valve 212. By controlling the strength of the electrical field, the flow rate of the ER fluid 72 through the ER fluid valve 212 is controlled. Thus, the inventive ER fluid valve 212 is effective for variably controlling the flow of ER fluid 72 between two locations, such as, from the first bellows 208 to the second bellows 210, as shown, for example, in FIGS. 29(a) and 29(b).

FIGS. 42(a) through 42(c) show a sealing means for sealing the exit through-hole 34 of the inner cylinder 218 of the inventive force dampener. The sealing means seals the exit through-holes 34 so that the variable viscosity material (ER or MR fluid) is prevented from leaking out, and any variable viscosity material which accumulates on the shaft 24 is removed and recycled back into the inner cylinder 218. The shaft 24 passes through an exit through-hole 34 at the cylinder cap 278 disposed on the inner cylinder 218. The cylinder cap 278 has sloping surfaces so that any variable viscosity material scraped by scrapers 280 from the shaft 24 collects at the bottom and re-enters the inner cylinder 218 via one-way valves. The variable viscosity material retaining collar 282 has a small gap filled with the variable viscosity material. As soon as the force transfer member 220 moves, the collar 282 is energized so that it creates a barrier to the variable viscosity material escape. Adjacent with the collar 282 is a guiding collar 284, with a smaller tolerance between the shaft 24 and the guiding collar walls to guide the smooth movement of the force transfer member 220. The variable viscosity material retaining collar 282 is electrically insulated from the cylinder cap 278 (or the cylinder cap 278 is insulated from the body of the cylinder) and a potential is applied between the shaft 24 and the walls of the variable viscosity material retaining collar 282 as soon as the force transfer member 220 begins to move. The shaft 24 is supplied with a potential opposite the polarity applied to the variable viscosity retaining collar 282 as soon as the shaft 24 (or force transfer collar) begins to move, so that a fluid seal is formed between the variable viscosity retaining collar 282 and the shaft 24. The fluid seal has a shear strength which is easily overcome. Any variable viscosity material which may escape is scraped from the shaft 24 and returned to the interior of the inner cylinder 218. Further, a second tight tolerance guiding collar 284 (not shown) can be disposed prior to the fluid seal to prevent the escape of the variable viscosity material and/or contamination of the interior of the inner cylinder 218.

FIGS. 43(a) through 43(c) shows an embodiment of the inventive force dampener having a height adjustment feature. As will be described in detail below, the height adjustment feature of this embodiment of the inventive force dampener can be used to provide a vehicle suspension system capable of adjusting the height and tilt of the chassis of a vehicle supported by the inventive suspension system. In accordance with this embodiment, as shown in FIG. 43(a), a variable viscosity material is confined within the compressible/expandable first bellows 208 and second bellows 210, which are separated by valving means 212. The first bellows 208 is provided with a port 286 in communication with a hose 288. A force distributing member 290 distributes force supplied by the force transfer member 220, and the force acts to expand and contract the first bellows 208 and second bellows 210 in a manner through which the force is effectively dampened. The force transfer member 220, in this case, supports the vehicle chassis and in an initial position has a height as shown in FIG. 43(a). In the initial position, a control valve 292 between the port 286 and the hose 288 prevents flow of the variable viscosity material through the port 286. The embodiments described herein may utilize a conventional shock absorbing fluid (hydraulic fluid, etc.) that does not have its flow characteristics variable in response to an applied field. In this case, mechanical valves can be used in place of the described ER fluid valve or MR fluid valve.

As will be described below, in accordance with the present invention, the hose 288 itself may act as the valve. The hose 288 shown in FIGS. 43(a) through 43(c) has a plurality of parallel electrodes defining gaps between adjacent parallel electrodes. When the control valve 292 is open, the ER fluid 72 flows within these gaps, so that the ER fluid 72 can flow into and out of the first bellows 208 through the port 286. As shown in FIG. 43(a), when potential is applied to the electrodes in the hose 288, the ER fluid flow is restricted. As shown in FIG. 43(b), the height of the force transfer member 220 (and thus the height of the vehicle chassis from ground level) is adjusted by adding an amount of the ER fluid 72 through the hose 288 and into the first bellows 208 causing it to expand. In this case, the control valve 292 is open and the fluid flows in the direction of the arrow through the port 286. As shown in FIG. 43(c), the height of the vehicle chassis can be lowered by removing the variable viscosity material in the first bellows 208 through the port 286. In this case, the variable viscosity material is taken out of the first bellows 208 through the hose 288 in the direction of the arrow. In FIGS. 43(b) and 43(c), the valving means 212 between the first bellows 208 and the second bellows 210 is preferably closed, so that the variable viscosity material added into (removed from) the first bellows 208 is effective to expand (contract) the first bellows 208, raise (lower) the force transfer member 220, and thus raise (lower) the vehicle chassis.

FIGS. 44(a) through 44(d) shows the use of the inventive force dampener for raising and lowering the height of the vehicle chassis relative to the ground. As shown in FIG.

44(a), during normal driving, the amount of variable viscosity material in the inventive force dampener is such that the height of the vehicle chassis relative to the axle 236 has a distance d. FIG. 44(b) shows the vehicle chassis being raised and additional height δd by the expansion of the first bellows 208 due to added variable viscosity material supplied through the hose 288. By raising the vehicle chassis, the clearance between the vehicle chassis and the ground is increased, making the vehicle better adapted for off-road use. FIG. 44(c) shows the case when the vehicle body is lowered by a height δd relative to the initial height d. In this case, the variable viscosity material is removed from the first bellows 208 through the hose 288 so that the first bellows 208 compresses, thereby lowering the height of the force transfer member 220 supporting the vehicle chassis. This lowering of the vehicle chassis gives the vehicle better aerodynamics, making the vehicle more suitable for high speed, highway conditions. FIG. 44(d) shows the case where the force dampeners supporting one side of the vehicle chassis are lowered while the force dampeners supporting the other side of the vehicle are raised. This feature allows the body of the vehicle to tilt in response to specific conditions, such as when encountering sharp turn. By this feature, the wheels 134 of the vehicle maintain maximum surface contact with the road surface, thus improving the handling capabilities of the vehicle when experiencing sharp cornering. Also, each force dampener is associated with a respective wheel 134 of the vehicle. Since each force dampener is independently controllable, the vehicle chassis can be oriented at suitable tilt and pitch angles by independently controlling the height of the four corners of the vehicle chassis. The tilt and pitch angles of the vehicle chassis can be controlled in response to detection signals received from a suitable sensor, such as a gyroscopic sensor or an accelerometer, so that as the vehicle begins to corner, the change in forces acting on the vehicle due to the angular accelerations associated with the vehicle due to the angular decelerations associated with the vehicle encountering the curve are sensed and counteracted by the change in pitch and tilt orientation obtained by the individual control of the height adjusting force dampeners.

FIG. 45 shows another embodiment of the inventive force dampener. In this case, a single dampener bellows 294 is provided for containing the variable viscosity material within an inner cylinder 218. A force distributing member 290 in contact with the bellows applies force from the force transfer member 220. The force from the force transfer member 220 is dampened by the controlled contraction and expansion of the dampener bellows 294 containing the variable viscosity material. The expansion and contraction of the bellows is controlled by controlling the flow of the variable viscosity material through a hose 288 and into a variable viscosity material reservoir 296. In this embodiment, the variable viscosity material reservoir 296 includes a reservoir bellows 298 which is expandable and contractible depending on the volume of material it contains. A pressurizing fluid reservoir 300 is provided for applying pressure to the reservoir bellows 298 of the variable viscosity material reservoir 296. A pressurizing fluid source 301 (which may be an air compressor, or hydraulic fluid master cylinder) supplies the pressurizing fluid reservoir 296. By increasing the pressure of the pressurizing fluid in the pressurizing fluid reservoir 300, the variable viscosity material is forced from the reservoir bellows 298 in the variable viscosity reservoir, through the hose 288, and into the dampener bellows 294 of the inventive force dampener, thus raising the height of the force transfer member 220. Conversely, by reducing the pressure of the pressurizing fluid in the pressurizing reservoir, the flow of the variable viscosity material increases the volume of the material in the reservoir bellows 298, while decreasing the volume of the material in the dampener bellows 294 in the inventive force dampener, thus lowering the height of the force transfer member 220. If the pressurizing fluid is also compressible, then it acts as a force dampening spring in response to flow of the variable viscosity material between the dampener bellows 294 and the reservoir bellows 298. A variable viscosity material valve hose 288 (as described with reference to FIG. 44) may be provided in communication with both the dampener bellows 294 and the reservoir bellows 298. The flow of the variable viscosity material between the dampener bellows 294 and the reservoir bellows 298 is thus controllable by controlling the fluid valve hose 288. Also, a displacing fluid reservoir 302 may be included within the variable viscosity material reservoir bellows 298 to selectively displace the variable viscosity material, causing the force transfer member 220 to be raised or lowered.

FIGS. 46(a) through 46(g) show embodiments of the inventive variable viscosity material fluid valve hose 288. In the embodiment shown in FIG. 46(a) and 46(d), the variable viscosity material valve hose 288 is effective for valving the flow of magnetically reactive variable viscosity material (MR fluid). In this embodiment, a conductive winding 202 is wrapped around a magnetizable hollow core 304 through which the magnetically reactive variable viscosity material flows. A magnetic field is applied by passing current through the conductive winding 202, so as to control the flow of the magnetically reactive variable viscosity material depending on the applied magnetic field. A magnetically permeable sheath 306 may be provided separating the magnetizable hollow core 304 from the contained variable viscosity material. Also, a durable covering 308 may be provided for protecting the components of the inventive hose 288. As shown in FIG. 46(c), the magnetizable hollow core 304 may be formed by spirally wrapping a suitably formed magnetizable substrate to form a hollow tubular structure. Such structure is similar to the structure of a hard-metal covered electrical wire, typically used in residential home wiring, and is supplied under the trade name "BX cable." The structure shown in FIG. 46(c) provides a flexible variable viscosity material valve hose 288, which also has very high bursting strength. Alternatively, the hollow tubular structure can be formed of a magnetically permeable material that is not magnetizable. In this case, the magnetic field generated by the current flowing through the conductive winding 202 is quickly turned on or off, without the effects of residual magnetism which may occur if the magnetizable core 196 is used. As shown in FIG. 46(d), a plurality of individual hoses constructed as described above can be grouped together to enhance the controllability of the flow of given volume through the plurality of grouped hoses. The valve hose 288 may have a displacing core (not shown) for taking up space within the flow path of the variable viscosity material, so that the variable viscosity material flows close to the source of the magnetic field. Concentric magnetic field generating coils (not shown) may be disposed similar to the concentric electrodes 310 shown in FIGS. 46(e) and 46(g) to increase the magnetic field experience at each unit volume of the flowing variable viscosity material.

FIGS. 46(e) and 46(h) show two possible orientations of the loops of the conductive winding 202. The orientation of the loops determines the direction of the generated magnetic field lines. Other orientations may be selected depending on such things as the method of forming the loops and the behavior of the MR fluid used in response to the applied magnetic field lines direction.

FIGS. 46(f) and 46(g) show another embodiment of the inventive valve hose 288, suitable for use in controlling the flow of an electrically reactive fluid (ER fluid 72). In this embodiment, concentric electrodes 310 apply an electrical field to an ER fluid 72 disposed in the gap between adjacent concentric electrodes 310. The concentric electrodes 310 are separated by spacer elements 312 to maintain a suitable gap between the electrode surfaces. Thus, a fluid channel is provided between the electrode surfaces. A constant power supply can be used to provide a variable flow of the ER fluid 72, if the number of energized electrodes is suitably controlled. Thus, the ER fluid 72 may be free to flow through non-energized fluid channels, while flow through energized fluid channels is restricted. Also, this design allows for a variable pressure of the flowing variable viscosity material, since a given amount of pressurized fluid has to flow through a larger or smaller cross-sectional area.

FIG. 47 shows another embodiment of the inventive force dampener, similar to that shown in FIG. 45. In this case, the force dampener bellows 294 is secured to a bellows mount 314 on a cylinder base 316. The base is threaded, so that a corresponding inner surface of the inner cylinder 218 secures the inner cylinder 218 to the base when assembled. A force transfer member 220 receives an applied force to be dampened, and the applied force is distributed over the top of the dampener bellows 294 by a force distributing member 290. The force distributing member 290 may be fixed to the top of the dampener bellows 294 so that upward movement of the force transfer member 220 expands the dampener bellows 294, and downward movement of the force transfer member 220 contracts the dampener bellows 294. The dampener bellows 294 is secured to the bellows mount 314 by a clamping ring 318 locked around the retaining portion 320 of the dampener bellows 294 disposed over retaining surfaces 322 of the bellows mount 314. A hose coupling 324 on the bellows mount 314 allows for the variable viscosity material to flow into and out of the dampener bellows 294, thereby causing the dampener bellows 294 to expand and contract so as to effect height adjustment and force dampening. A fluid valve hose 288 (as described with reference to FIGS. 46(a) through 46(g)), is provided to variably control the flow of the variable viscosity material between the dampener bellows 294 and reservoir bellows 298. The reservoir bellows 298 is contained within a pressurizing fluid reservoir 300, and mounted in a similar manner as the dampener bellows 294. A supply of pressurizing fluid fed through a supply line 326 controls the pressure of the variable viscosity material contained in the reservoir bellows 298. The pressurizing fluid container screws on to its respective reservoir base 328. A mechanical safety valve 330 can be provided in case of power failure, or hose failure, to maintain a safety margin of integrity of the system, or, to control the flow of the variable viscosity material if the control obtained by the fluid valve hose 288 is inadequate.

FIG. 48(a) shows a use of the inventive force dampener system (any of the embodiments described herein), for dampening the effects of an engine 301 and the rotor vibration of a helicopter 331. Alternatively, the inventive engine dampening system can be used for any aircraft, water craft, land vehicle, or any other application where vibrational dampening is desired. As shown, the helicopter engine is supported on at least one inventive force dampener. In the embodiment shown, the inventive force dampener system utilizes the construction shown in FIG. 47. However, the other embodiments of the inventive force dampener described herein may be used. In this embodiment, each of plurality of dampeners is in communication with single pressurizing fluid reservoir 300. However, each dampener system may have its own pressurizing fluid reservoir 300 Springs (not shown) may be provided for providing suspension to the support structure, and the inventive force dampeners actively vary the resultant spring constant supporting the engine and/or rotor so that a tunable vibration dampening system is provided. The rotor may be coupled to the engine through an embodiment of the inventive variable resistance device. The inventive variable resistance device can be used as a brake (as described with reference to FIG. (a)). In either case, the rotating object being coupled or braked is the shaft rotating the rotor blades. Such configurations have obvious control and safety advantages over any conventional system.

FIG. 48(b) shows a use for the inventive resistance device (variable resistance brake 332) wherein the inventive resistance device quickly slows rotation of rotating object, such as a circular saw blade 334. In this case, when the switch 336 of the circular saw is on, the variable resistance device allows free rotation of the saw blade 334 (the inventive variable resistance device can be used as a clutch mechanism to drive the blade). However, after the switch 336 is turned off, the variable resistance brake 332 quickly absorbs the momentum of the rotating saw blade 334, thus limiting the danger associated with the use of the circular saw. The inventive variable resistance device 5 can also be used in other applications where controlled braking of rotational momentum is desired, such as a chain saw, bicycle, motorcycle, elevator, robotic joints, etc.

FIGS. 49(a) through 49(b) shows another configuration for the inventive vehicle suspension system. In this case, a variable resistance assembly (such as described above with reference to FIGS. 18(a) through 21(b)) is used to supply braking and driving force to the wheels 134 of the vehicle. A generator/motor 125 coupled with the rotation of the wheel 134 through the variable resistance device is used to drive and/or brake rotation of the wheel 134. An embodiment of the inventive force dampener is part of the suspension system suspending the vehicle chassis from the wheel axles 236, and controlling the dampening characteristics of the suspension springs 240. In this configuration, the wheel axles 236 are joined by a joint 338, which is fixed to the vehicle chassis. As shown in FIG. 49(b), when one of the wheels 134 encounters a bump 232, the wheel axle 236 is allowed to move due to the forcing of the encountered bump 232. The force of the encountered bump 232 is dampened through the use of the inventive force dampener, so that the safety and comfort of passengers in the vehicle are enhanced.

FIGS. 50(a) through 50(b) show an embodiment of an inventive suspension system and inventive driving/braking system. A variable resistance assembly 341 (such as described above with reference to FIGS. 18(a) through 21(b)) is oriented vertically, and is used to variably couple rotation of the generator/motor 125 and a respective wheel 134 of the vehicle. A direction changing gear box 340 provides an appropriate driving direction and gear ratio for driving the wheel 134. This configuration places the weight of the generator/motor 125 and variable resistance assembly nearly over the wheel 134 to improve traction and handling and also maximizes the clearance between the vehicle frame 342 and the ground. A short axle 236 supports the vehicle frame 342 through the inventive height adjusting force dampener. When a bump 232 is encountered (FIG. 50(b)), the variable resistance assembly slides through an accommodating portion of the vehicle frame 342. The force of the displacement caused by the bump 232 is dissipated by the inventive suspension system. Also, in accordance with this configuration, the wheels 134 of the vehicle are disposed close to the vehicle corners, thereby improving the passenger compartment space and enhancing the handling of the vehicle. When cornering or braking, the pitch and tilt of the vehicle chassis can be altered to greatly improve the vehicle handling.

FIGS. 51(a) through 51(g) show an embodiment of the inventive variable resistance device 5 used in combination with an embodiment of the inventive force dampener to provide driving, braking, and suspension of a body, such as a vehicle, aircraft, or the like. The configurations shown in FIGS. 51(a) through 51(g) allow each wheel 134 to be driven, braked, and suspended independently. By these configurations, the clearance between, for example, a vehicle frame 342 and the ground, is maximized, since the drive train, braking, and suspension components are disposed vertically adjacent to a corresponding wheel 134. As shown in FIG. 51(a), a variable-resistance assembly, such as that described with reference, for example, to FIGS. 19(a) through 21(b) drives and/or brakes rotation of a wheel 134. In the configuration shown, the variable resistance assembly includes a shaft 24 which is rotationally fixed with the magnetic members of a generator/motor 125 and a rotationally coupled assembly. The rotationally coupled assembly, as shown, is similar to that shown, for example, in FIG. 1, and includes spacer members 14, stacking rods 20, and opposing electrode members 12. In this case, the variable viscosity material used by the inventive variable resistance assembly is an electro-rheological fluid. Also, the rotationally coupled assembly can include components similar to the embodiment shown in FIGS. 25(a) and 25(b), and include the magnetic field generating coil 194. In this case, the variable viscosity material is a magnetically reactive material, such as an MR fluid. The rotationally coupled assembly is rotationally fixed with a drive gear 344. When the rotationally coupled assembly is coupled (through the action of the variable viscosity material) with the shaft 24 via the rotating members 10, the driver gear 344 drives a driven gear 346, which in turn drives the wheel 134. Thus, as described with reference to FIGS. 19(a) through 21(b), the wheel 134 of a vehicle, aircraft, etc. can be efficiently driven and braked. The embodiment of the force dampener includes a toroidal shaped dampener bellows 294 (shown in FIG. 51(c)), which contains a variable viscosity material. However, conventional force dampener materials, such as hydraulic fluids, air, etc. may be used in accordance with this inventive combination of driving/braking means and suspension system. The toroidal shaped dampener bellows 294 defines an interior for accommodating the variable resistance device assembly. To maximize the number of components of the variable resistance device assembly, the vehicle body can accommodate the variable resistance device assembly so as to be able to slide along the longitudinal axis of the variable resistance device assembly as shown in FIG. 51(b). In this case, when the suspension system compresses (such as to absorb the effects of bump 232), the variable resistance device assembly slides upwards as the suspension system compresses, so that the vehicle body remains relatively stationary (relative to the ground), as the effects of the encountered bump 232 are absorbed by the suspension system.

FIGS. 51(d) and 51(e) show an alternative configuration in which a first wheel 348 and a second wheel 350 are rotationally driven and braked by the inventive variable resistance device 5, and support the vehicle body via the inventive force dampener suspension system. In this case, the two wheel construction provides greater stability, driving and braking ability. The first wheel 348 may or may not be driven and/or braked, depending on the application. As shown, the second wheel 350 is driven by a drive-shaft 352 which is rotated by the driven gear 346, which in turn is rotated by the drive gear 344 rotated by the inventive variable resistance assembly. The variable resistance device assembly slides within guides 354 which are adjusted by one or more tilt stabilizing force dampeners 356. As shown, two tilt stabilizing force dampeners 356 are disposed so that upon encountering a bump 232, the inventive suspension system allows the forces associated with encountering the bump 232 to be absorbed, as the first wheel 348 and the first wheel 350 become disposed so as to orient the inventive variable resistance device assembly at an angle offset from the initial vertical orientation. The variable resistance device assembly also slides upwards relative to the vehicle body in response to the encountered bump. One or more additional tilt stabilizing force dampeners 356 may be disposed for more control of the tilt angle of the variable resistance device assembly in response to changes in the inventive suspension system.

FIGS. 51(f) and 51(g) show another embodiment of the dampener bellows 294 used in the various embodiments of the inventive force dampener. As shown, the dampener bellows 294 has the toroidal cross-sectional shape shown in FIG. 51(c). The dampener bellows 294 has a plurality of stages (a two-stage bellows is shown), in which in at least one of the stages the ability to dampen an applied force is individually controllable, and the ability of the stage to adjust the height of the supported body (vehicle body) is also controllable. In the embodiment shown in FIGS. 51(f) and 51(g), a first stage 358 of the dampener bellows 294 is in communication with a shock absorbing bellows 360 via a fluid valve hose 288 (such as the hose 288 described with reference to FIGS. 46(a) through 46(e)). A compressible fluid reservoir 362, which is supplied by a compressible fluid line 364, exerts an urging force on the shock absorbing bellows 360 so that a force applied to the first stage 358 of the dampener bellows 294 causes the variable viscosity material within the dampener bellows 294 to flow through the fluid valve hose 288 and into the shock absorbing bellows 360, and visa-versa, so as to dissipate the applied force. FIG. 51(f) shows a second stage 366 of the dampener bellows 294 extended for adjusting the height of the supported body (vehicle). The second stage 366 of the dampener bellows 294 is in communication with a height adjustment bellows 368 via a fluid valve hose 288. A hydraulic fluid reservoir 370 supplied by a hydraulic fluid line 372, displaces an amount of the variable viscosity material in the height adjustment bellows 368 so as to adjust the height of the supported body (vehicle) by extending the second stage 366 of the dampener bellows 294. As shown in FIG. 51(g), when less hydraulic fluid is contained in the hydraulic fluid reservoir 370, the second stage bellows contracts, thereby lowering the height of the supported body. The suspension springs 240 are disposed around the first stage 358 of the dampener bellows 294. The effective spring constant of the suspension springs 240 is controlled by controlling the flow of the variable viscosity material into and out of the first stage 358 to actively control the feel of the vehicle suspension. The suspension spring 240 contacts a support 371 which supports a telescoping cylinder system 373 which supports a telescoping cylinder system 373 within which is disposed the second stage 366 of the two-stage dampener bellows 294. The second stage 366 may or may not contribute to the dampening aspects of the vehicle suspension system, but, as shown provides height adjustment capabilities. When the second stage is extended (FIG. 51(f) the telescoping cylinder system 373 lifts the vehicle frame 342. By providing the suspension springs 240 at only the first stage 358, the height adjustment of the vehicle frame 342 by the second stage 366 does not expand or compress the suspension spring 240. This configuration provides independent control of both the height adjusting aspects and vehicle suspension aspects separately at each wheel of the vehicle.

FIG. 51(h) shows another configuration of the inventive drive train/braking system and suspension system for a vehicle. This configuration includes a steering mechanism for individually steering each wheel 134 (or wheel pairs 348 and 350). The suspension spring 240 encompasses a toroidal dampener bellows 294. A drive train/braking assembly comprising the inventive variable resistance device (or other driving and braking system) is disposed in the interior of the toroidal dampener bellows 294. A geared rotational support 274 provides a rotatable supporting connection between the wheels 348, 350 and the vehicle frame 342. In this embodiment, a plurality of supporting bearings 376 allows the wheels 348, 350 to pivot relative to the frame 342 about the centrally placed drive gear 344 to effect steering of the vehicle. A driving gear 378 is disposed at one end of a flexible drive shaft 380, and a driven gear 382 is disposed at the other end. The driven gear 382 is rotationally driven by a driving gear 384, which rotates in response to the rotation of a steering wheel 386 by the driver of the vehicle. The drive gear 378 drives the geared rotational support 374 which causes the wheels 348, 350 to pivot and steer the vehicle. The gear ratio between the driving and driven gears of this steering system are chosen to provide an appropriate "feel" to the steering mechanism. A power assist feature can be provided by incorporating a motor, such as a stepping motor (not shown), in the steering system so that the rotation of the steering wheel 386 is translated through the rotation of the stepping motor to rotation of the geared rotation support 374. The flexible drive shaft 380 allows the suspension system to contract and expand without inhibiting the steering of the vehicle. The steering of the wheels associated with each suspension spring 240 of the vehicle can be performed independently and include microprocessor control to enable such effects as both the front wheels and the back wheels turning in one the direction at high speed, while at low speed the back wheel turn in a direction opposite the front wheels. At high speed, the wheels thus turn synchronously to enable stable and consistent steering of the vehicle such as during high-way driving. At low speeds, the front and the back wheels turn in opposite directions, to enable a tighter turning radius for low speed maneuvers such as parallel parking. Also, to provide an even tighter turning radius, one wheel can be braked so as to act as a pivot point while the other wheels are turned. Alternatively, or in addition, steering can be effected by controlled braking and driving of the individual wheels, with or without turning the wheels. For example, to make a right-hand turn, the right front wheel can be braked, while only the left front wheel is driven so that the driven left front wheel drives the vehicle to pivot about the braked right front wheel. In this example, the left back wheel may also be driven or both back wheels are in neutral.

FIGS. 51(i) and 51(j) schematically show a vehicle 388 having the inventive braking-driving/suspension system provided for independently driving and braking all four wheels. The vehicle frame 342 is designed so as to support the vehicle 388 through the inventive braking-driving/suspension system. As shown, each individual suspension system independently supports each wheel 134, and includes a suspension spring 240. The suspension spring 240 can be a coil spring, but could also be a leaf-spring 246 as described with reference to FIGS. 36(a)-36(b). An individual electrical motor/generator 125 is shown schematically. In practical use, the motor/generator 125 will most likely have more bulk than shown. The motor/generator may alternatively be an internal combustion engine, or other rotational power source. In a configuration not shown, a single motor/generator may be provided for driving two or more of the wheels 134 of the vehicle 388. By disposing the drive train, braking system and suspension system of the vehicle 388 as shown, the passenger compartment is enlarged, as compared with conventional automobiles. Also, the wheels 134 are disposed so as to provide a wide wheel base, making the vehicle 388 very stable, and thereby increasing the safety and comfort of the passengers.

FIGS. 52(a) through 52(c) show another inventive use for the inventive force dampener. A force dampening weapons mount is provided having an sight 390, laser source 392 and a weapon tube 393 mounted on a weapons platform 394. The weapons platform 394 is supported on a controlled support 396 by height adjusting members 398 (incorporating the height adjusting features of the inventive force dampener described herein). The controlled support 396 is supported on a dampened support 400 by dampening members 402 (incorporating the force dampening features of the inventive force dampener described herein). The height adjusting members 398 are controlled by aim control circuitry 404 to dispose the weapons platform 394 at a suitable aimed tilt and pitch (FIG. 52(b)). Gyroscopic control circuitry 406 controls the height adjusting members to maintain the tilt and pitch of the weapons platform 394. Dampening control circuitry 408 controls the dampening members 402 to actively dampen vibration, bumps, or other sudden displacements of the weapons platform 394.

The inventive weapons system is shown mounted on a helicopter 331 in FIG. 51(c). The target (tank) is aimed at by controlling the height adjusting members 398 via control signals given through the aim control circuitry 404 so that the line-of-sight of the sight 392 includes the target. In this embodiment, the laser source 390 projects a missile guiding laser beam onto the target. Once set, the line-of-sight of the sight 392 and the projected laser beam from the laser source 390 are maintained on the target by the gyroscopic control circuitry 406 regardless of movement of the helicopter 331 due to wind shifts, etc. Vibrational effects or sudden displacements of the helicopter 331 are absorbed and counteracted by dampening members 402 utilizing active dampening control via the dampening control circuitry 408. The combination of the gyroscopic control and the active dampening control maintain the projected laser beam on the target long enough for the laser guided missile 410 fired from the missile tube 393 to reach the target with exact precision.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

I claim:

1. A resistance device, comprising: a variable viscosity material capable of undergoing a change in flow characteristics in response to an applied field; a moving member having at least one surface in contact with the variable viscosity material so that the change in flow characteristics of the variable viscosity material variably resists movement of the moving member depending on the applied field; applying means for applying the applied field to the variable viscosity material; an opposing member disposed in opposing facing relationship with the moving member; a spacer member disposed for maintaining a gap between the moving member and the opposing member, the spacer member having a variable thickness for selectively varying the gap between the moving member and the opposing member.

2. A resistance device according to claim 1; further comprising at least one projecting member projecting into the variable viscosity material for defining a flow path of the variable viscosity material when movement of the moving member causes the variable viscosity material to flow; and containing means for containing at least the variable viscosity fluid, the moving member, and the projecting member; and a shaft having at least a portion contained within the containing means and having a longitudinal axis; and wherein the moving member has an engaging through-hole for engaging the shaft so that the moving member is rotatable by the shaft relative to the containing means about the longitudinal axis of the shaft and slidable on the shaft along the longitudinal axis of the shaft.

3. A resistance device according to claim 2; wherein the variable viscosity material comprises an electrically reactive material; and wherein the opposing member comprises an opposing electrode member disposed in opposing facing relationship with the moving member so that at least a portion of the projecting member and at least a portion of the variable viscosity material is disposed between the opposing electrode member and the moving member; and wherein the moving member has an electrode surface and is movable by rotation of the shaft relative to the opposing electrode member; and the applying means applies an electrical potential to the opposing electrode member and an opposite electrical potential to the electrode surface of the moving member so as to apply an electrical field to the variable viscosity material disposed between the opposing electrode member and the moving member.

4. A resistance device according to claim 3; wherein the at least one projecting member projects from at least one of the moving member and the opposing electrode member into the variable viscosity material between the opposing electrode member and the moving member.

5. A resistance device according to claim 3; further comprising thickness varying means for selectively varying the thickness of the spacer member disposed between the opposing electrode member and the moving member.

6. A resistance device according to claim 5; wherein the spacer member comprises a compressible material; and the thickness varying means comprises compressing means for selectively compressing the spacer member to selectively vary the thickness of the spacer member.

7. A resistance device according to claim 3; wherein the containing means includes a through-hole; the shaft is disposed so as to extend from within the containing means through the through-hole; and wherein the resistance device further comprises means for applying the potential to the moving member through electrical contact between the moving member and the shaft; and a confining electrode disposed in facing relationship around the shaft and applied with the potential so that an electrical field is applied to at least portion of any of the variable viscosity fluid disposed between the shaft and the confining electrode.

8. A resistance device according to claim 2; wherein the moving member has a conductive surface; and the projecting member comprises non-conductive material.

9. A resistance device according to claim 2; wherein the projecting member is fixed to the moving member.

10. A resistance device, comprising: a variable viscosity material capable of undergoing a change in flow characteristics in response to an applied electrical field; a shaft having a longitudinal axis; at least one moving member, each said moving member having at least one surface facing the variable viscosity material, each said moving member having an engaging through-hole for engaging the shaft so that the moving member engages with and is rotatable by the shaft and is slidable on the shaft along the longitudinal axis; at least one opposing electrode member, each said opposing electrode member being disposed in opposing facing relationship with the surface of at least one corresponding moving member so that the variable viscosity material is disposed between each facing opposing electrode member and the surface of the corresponding moving member; applying means for applying an electrical potential to each opposing electrode member and an opposite electrical potential to each corresponding moving member so as to apply the electrical field to at least portion of the variable viscosity material disposed between at least one opposing electrode member and the corresponding moving member; a spacer member disposed for maintaining a gap between the at least one moving member and the at least one opposing electrode member, the spacer member having a variable thickness for selectively varying the gap between the at least one moving member and the at least one opposing electrode member; and containing means for containing the at least one moving member, at least a portion of the shaft, the spacer member and the at least one opposing electrode member.

11. A resistance device according to claim 10; further comprising at least one projecting member projecting into the variable viscosity material from at least one of the surface of said at least one of the moving member and said at least one of the opposing electrode member.

12. A resistance device according to claim 10; wherein said at least one moving member is disposed between a first opposing electrode member and next opposing electrode member so that an obverse side of said at least one moving member faces the first opposing electrode member and a reverse side of said at least one moving member faces the next opposing electrode member.

13. A resistance device according to claim 10; further comprising a spacer member disposed between at least one opposing electrode member and the corresponding moving member.

14. A resistance device according to claim 13; wherein the spacer member comprises one of a rigid non-compressible material and flexible compressible material.

15. A resistance device according to claim 10; further comprising a plurality of gap maintaining members disposed between at least one moving member and a corresponding opposing electrode member for maintaining predetermined gap between the at least one moving member and the corresponding opposing electrode member.

16. A resistance device according to claim 15; wherein the plurality of gap maintaining members have a round cross section; and said at least one moving member and the corresponding opposing electrode member has at least one receiving surface for receiving at least one of the gap maintaining members.

17. A resistance device according to claim 10; further comprising at least one gap maintaining ridge disposed between said at least one moving member and a corresponding opposing electrode member for maintaining a predetermined gap between said at least one moving member and the corresponding opposing electrode member.

18. A resistance device according to claim 10; wherein at least one of the plurality of moving members and the plurality of opposing electrode members comprises a substrate having a conductive surface formed thereon.

19. A resistance device according to claim 10; wherein the applying means includes means for applying the electrical field selectively between respective moving members and corresponding opposing electrode members so as to control number of pairs of respective moving members and corresponding opposing electrode members having an electrical field applied to the variable viscosity material disposed therebetween.

20. A resistance device, comprising: a variable viscosity material capable of undergoing a change in flow characteristics in response to an applied magnetic field; a shaft having a longitudinal axis; at least one moving member, each moving member having at least one surface facing the variable viscosity material and an engaging through-hole for engaging the shaft so that the moving member engages with and is rotatable by the shaft and is slidable on the shaft along the longitudinal axis; applying means for applying magnetic field to at least portion of the variable viscosity material facing the surface of each said moving member; and containing means for containing the variable viscosity fluid, the shaft, and the plurality of moving members.

21. A resistance device according to claim 20; wherein the applying means comprises a magnetic field generating coil formed by wrapping conductive wire around magnetizable core and then forming the magnetizable core into hollow cylindrical shape.

22. A resistance device according to claim 20; wherein the applying means comprises a plurality of individually controllable magnetic field generating coils, each disposed so as to apply an individually controllable magnetic field through the variable viscosity material.

\* \* \* \* \*